US012433315B2

(12) United States Patent
Winiski et al.

(10) Patent No.: US 12,433,315 B2
(45) Date of Patent: Oct. 7, 2025

(54) AERIAL MYCELIA AND METHODS OF MAKING SAME

(71) Applicant: Ecovative LLC, Green Island, NY (US)

(72) Inventors: Jacob Michael Winiski, Troy, NY (US); Alex James Carlton, Troy, NY (US); Gavin Reim McIntyre, Troy, NY (US); Peter James Mueller, Poestenkill, NY (US); Eben D. Bayer, Troy, NY (US); Asa Trench Snyder, Petersburg, NY (US); Meghan Anne O'Brien, Halfmoon, NY (US); Jessica Hannah Kaplan-Bie, Troy, NY (US); Alex Stephen Friedman, Troy, NY (US); Russell Allan Hazen, Clifton Park, NY (US); Stephen Lomnes, Delmar, NY (US)

(73) Assignee: Ecovative LLC, Green Island, NY (US)

( * ) Notice: Subject to any disclaimer, the term of this patent is extended or adjusted under 35 U.S.C. 154(b) by 56 days.

(21) Appl. No.: 17/736,022

(22) Filed: May 3, 2022

(65) Prior Publication Data

US 2022/0354152 A1    Nov. 10, 2022

Related U.S. Application Data

(60) Provisional application No. 63/184,033, filed on May 4, 2021, provisional application No. 63/184,052, filed on May 4, 2021, provisional application No. 63/184,039, filed on May 4, 2021.

(51) Int. Cl.
*A23L 31/00*    (2016.01)
*A01G 18/00*    (2018.01)
*C12R 1/645*    (2006.01)

(52) U.S. Cl.
CPC .............. *A23L 31/00* (2016.08); *A01G 18/00* (2018.02); *C12R 2001/645* (2021.05)

(58) Field of Classification Search
CPC .......................... A23L 31/00; C12R 2201/645
USPC ....................................................... 47/1.1, 69
See application file for complete search history.

(56) References Cited

U.S. PATENT DOCUMENTS

| 1,979,176 A | 10/1934 | Schicht |
| 2,509,984 A | 5/1950 | Morrow |
| 2,657,647 A | 11/1953 | Rapisarda |
| 2,723,493 A | 11/1955 | Stoller |

(Continued)

FOREIGN PATENT DOCUMENTS

| CN | 104025909 B | 5/2016 |
| CN | 111066577 A | 4/2020 |

(Continued)

OTHER PUBLICATIONS

International Search Report and Written Opinion for PCT/US2022/027499, mailed Sep. 5, 2022.

*Primary Examiner* — Zoe Tam Tran
(74) *Attorney, Agent, or Firm* — Dority & Manning, P.A.

(57) ABSTRACT

This application relates generally to aerial mycelium and methods of making aerial mycelium suitable for use as a food or textile product or ingredient. The aerial mycelium can be grown using a growth matrix provided into a growth environment and introducing aqueous mist into the growth environment. The aqueous mist has a mist deposition rate and a mean mist deposition rate to allow for aerial mycelial growth from the growth matrix.

14 Claims, 13 Drawing Sheets

(56) References Cited

U.S. PATENT DOCUMENTS

| | | |
|---|---|---|
| 2,815,621 A | 12/1957 | Carter |
| 2,964,070 A | 12/1960 | Linhardt |
| 3,268,606 A | 8/1966 | Jaeger |
| 3,316,592 A | 5/1967 | Forrest |
| 3,317,375 A | 5/1967 | Molinet et al. |
| 3,421,554 A | 1/1969 | Carter |
| 3,477,558 A | 11/1969 | Fleischauer |
| 3,499,261 A | 3/1970 | Hullhorst et al. |
| 3,708,952 A | 1/1973 | Schulze et al. |
| 3,717,953 A | 2/1973 | Kuhn et al. |
| 3,782,033 A | 1/1974 | Hickerson |
| 3,810,327 A | 5/1974 | Giansante |
| 3,828,470 A | 5/1974 | Stoller |
| 3,885,048 A | 5/1975 | Liggett |
| 3,911,141 A | 10/1975 | Farr et al. |
| 3,961,938 A | 6/1976 | Iizuka et al. |
| 4,027,427 A | 6/1977 | Stoller et al. |
| 4,036,122 A | 7/1977 | Langen |
| 4,038,807 A | 8/1977 | Beardsley et al. |
| 4,063,383 A | 12/1977 | Green |
| 4,073,956 A | 2/1978 | Yates |
| 4,127,965 A | 12/1978 | Mae |
| 4,136,767 A | 1/1979 | Sarovich |
| 4,226,330 A | 10/1980 | Butler |
| 4,233,266 A | 11/1980 | Kummer |
| 4,263,744 A | 4/1981 | Stoller |
| 4,265,915 A | 5/1981 | MacLennan et al. |
| 4,294,929 A | 10/1981 | Solomons et al. |
| 4,337,594 A | 7/1982 | Hanacek et al. |
| 4,370,159 A | 1/1983 | Holtz |
| 4,568,520 A | 2/1986 | Ackerman et al. |
| 4,620,826 A | 11/1986 | Rubio et al. |
| 4,716,712 A | 1/1988 | Gill |
| 4,722,159 A | 2/1988 | Watanabe et al. |
| 4,847,002 A | 7/1989 | Trumble et al. |
| 4,878,312 A | 11/1989 | Shimizu |
| 4,922,650 A | 5/1990 | Akao et al. |
| 4,960,413 A | 10/1990 | Sagar et al. |
| 5,021,350 A | 6/1991 | Jung et al. |
| 5,030,425 A | 7/1991 | Bowers-Irons et al. |
| 5,074,959 A | 12/1991 | Yamanaka et al. |
| 5,085,998 A | 2/1992 | Lebron et al. |
| 5,088,860 A | 2/1992 | Stockdale et al. |
| 5,123,203 A | 6/1992 | Hiromoto |
| 5,230,430 A | 7/1993 | Kidder |
| 5,306,550 A | 4/1994 | Nishiyama et al. |
| 5,335,770 A | 8/1994 | Baker et al. |
| 5,370,714 A | 12/1994 | Ogawa |
| 5,433,061 A | 7/1995 | Hutchinson et al. |
| 5,440,860 A | 8/1995 | Meli et al. |
| 5,475,479 A | 12/1995 | Hatakeyama et al. |
| 5,486,474 A | 1/1996 | Bradley et al. |
| 5,498,384 A | 3/1996 | Volk et al. |
| 5,503,647 A | 4/1996 | Dahlberg et al. |
| 5,511,358 A | 4/1996 | Morita et al. |
| 5,532,217 A | 7/1996 | Silver et al. |
| 5,569,426 A | 10/1996 | Le Blanc |
| 5,589,390 A | 12/1996 | Higuchi et al. |
| 5,590,489 A | 1/1997 | Hattori et al. |
| 5,598,876 A | 2/1997 | Zanini et al. |
| 5,606,836 A | 3/1997 | Insalaco et al. |
| 5,647,180 A | 7/1997 | Billings et al. |
| 5,681,738 A | 10/1997 | Beelman et al. |
| 5,682,929 A | 11/1997 | Maginot et al. |
| 5,685,124 A | 11/1997 | Jandi |
| 5,711,353 A | 1/1998 | Ichikawa et al. |
| 5,802,763 A | 9/1998 | Milstein |
| 5,854,056 A | 12/1998 | Dschida |
| 5,888,803 A | 3/1999 | Starkey |
| 5,897,887 A | 4/1999 | Haeberli |
| 5,919,507 A | 6/1999 | Beelman et al. |
| 5,944,928 A | 8/1999 | Seidner |
| 5,948,674 A | 9/1999 | Mankiewicz |
| 5,979,109 A | 11/1999 | Sartor et al. |
| 6,041,544 A | 3/2000 | Kananen et al. |
| 6,041,835 A | 3/2000 | Price |
| 6,098,677 A | 8/2000 | Wegman et al. |
| 6,112,504 A | 9/2000 | McGregor et al. |
| 6,143,549 A | 11/2000 | Lamar et al. |
| 6,197,573 B1 | 3/2001 | Suryanarayan et al. |
| 6,226,962 B1 | 5/2001 | Eason et al. |
| 6,300,315 B1 | 10/2001 | Liu |
| 6,306,921 B1 | 10/2001 | Al Ghatta et al. |
| 6,329,185 B1 | 12/2001 | Kofod et al. |
| 6,349,988 B1 | 2/2002 | Foster et al. |
| 6,402,953 B1 | 6/2002 | Gorovoj et al. |
| 6,425,714 B1 | 7/2002 | Waddell |
| 6,444,437 B1 | 9/2002 | Sporleder et al. |
| 6,471,993 B1 | 10/2002 | Shastri et al. |
| 6,475,811 B1 | 11/2002 | Babcock |
| 6,482,942 B1 | 11/2002 | Vittori |
| 6,491,480 B2 | 12/2002 | Waddell |
| 6,500,476 B1 | 12/2002 | Martin et al. |
| 6,523,721 B1 | 2/2003 | Nomoto et al. |
| 6,603,054 B2 | 8/2003 | Chen et al. |
| 6,620,614 B1 | 9/2003 | Luth et al. |
| 6,660,164 B1 | 12/2003 | Stover |
| 6,679,301 B2 | 1/2004 | Makino et al. |
| 6,726,911 B1 | 4/2004 | Jolich et al. |
| 6,960,617 B2 | 11/2005 | Omidian et al. |
| 7,043,874 B2 | 5/2006 | Wasser et al. |
| 7,073,306 B1 | 7/2006 | Hagaman |
| 7,122,176 B2 | 10/2006 | Stamets |
| 7,179,356 B2 | 2/2007 | Aksay et al. |
| 7,395,643 B2 | 7/2008 | Franchini et al. |
| 7,514,248 B2 | 4/2009 | Gower et al. |
| 7,573,031 B2 | 8/2009 | Behar et al. |
| 7,621,300 B2 | 11/2009 | Bonney et al. |
| 7,622,459 B2 | 11/2009 | Gabrizova et al. |
| 7,661,248 B2 | 2/2010 | Conti et al. |
| 7,674,837 B2 | 3/2010 | Gaserod et al. |
| 7,754,653 B2 | 7/2010 | Hintz |
| 7,836,921 B2 | 11/2010 | Isomura et al. |
| 8,001,719 B2 | 8/2011 | Bayer et al. |
| 8,205,646 B2 | 6/2012 | Isomura et al. |
| 8,227,224 B2 | 7/2012 | Kalisz et al. |
| 8,227,233 B2 | 7/2012 | Kalisz et al. |
| 8,241,415 B2 | 8/2012 | Wantling et al. |
| 8,298,809 B2 | 10/2012 | Kalisz et al. |
| 8,298,810 B2 | 10/2012 | Rocco et al. |
| 8,313,939 B2 | 11/2012 | Kalisz et al. |
| 8,517,064 B2 | 8/2013 | Isomura et al. |
| 8,613,957 B2 | 12/2013 | Sigurjonsson et al. |
| 8,658,407 B2 | 2/2014 | Lyons et al. |
| 8,763,653 B2 | 7/2014 | Weigel et al. |
| 8,999,687 B2 | 4/2015 | Bayer et al. |
| 9,079,978 B2 | 7/2015 | Räsänen et al. |
| 9,085,763 B2 | 7/2015 | Winiski et al. |
| 9,253,889 B2 | 2/2016 | Bayer et al. |
| 9,332,779 B2 | 5/2016 | Marga |
| 9,394,512 B2 | 7/2016 | Bayer et al. |
| 9,469,838 B2 | 10/2016 | Schaak et al. |
| 9,485,917 B2 | 11/2016 | Bayer et al. |
| 9,555,395 B2 | 1/2017 | Araldi et al. |
| 9,714,180 B2 | 7/2017 | McIntyre et al. |
| 9,752,122 B2 | 9/2017 | Marga et al. |
| 9,795,088 B2 | 10/2017 | Bayer et al. |
| 9,801,345 B2 | 10/2017 | Bayer et al. |
| 9,803,171 B2 | 10/2017 | Bayer et al. |
| 9,879,219 B2 | 1/2018 | McIntyre et al. |
| 9,914,906 B2 | 3/2018 | Winiski et al. |
| 10,039,306 B2 | 8/2018 | Vrljic et al. |
| 10,125,347 B2 | 11/2018 | Winiski |
| 10,144,149 B2 | 12/2018 | McIntyre et al. |
| 10,154,627 B2 | 12/2018 | McIntyre et al. |
| 10,172,301 B2 | 1/2019 | McNamara et al. |
| 10,266,695 B2 | 4/2019 | Lucht et al. |
| 10,407,675 B2 | 9/2019 | Bayer et al. |
| 10,525,662 B2 | 1/2020 | Bayer et al. |
| 10,533,155 B2 | 1/2020 | Kozubal et al. |
| 10,537,070 B2 | 1/2020 | Betts et al. |
| 10,575,579 B2 | 3/2020 | Egeland et al. |
| 10,577,579 B2 | 3/2020 | Kozubal et al. |
| 10,583,626 B2 | 3/2020 | Bayer et al. |

(56) References Cited

U.S. PATENT DOCUMENTS

| | | | |
|---|---|---|---|
| 10,589,489 B2 | 3/2020 | Bayer et al. |
| 10,590,379 B2 | 3/2020 | Kozubal et al. |
| 10,604,734 B2 | 3/2020 | Amstislavski et al. |
| 10,687,482 B2 | 6/2020 | Ross et al. |
| 10,785,925 B2 | 9/2020 | McNamara et al. |
| 11,000,593 B2 | 5/2021 | Zhang et al. |
| 11,001,801 B2 | 5/2021 | Kozubal et al. |
| 11,015,059 B2 | 5/2021 | Smith et al. |
| 11,015,168 B2 | 5/2021 | Kozubal et al. |
| 11,032,982 B2 | 6/2021 | Ross et al. |
| 11,045,582 B2 | 6/2021 | Pelling et al. |
| 11,058,071 B2 | 7/2021 | Bagnato |
| 11,149,247 B2 | 10/2021 | Harney et al. |
| 11,261,420 B2 | 3/2022 | Kozubal et al. |
| 11,266,085 B2 | 3/2022 | Kaplan-Bie et al. |
| 11,272,726 B2 | 3/2022 | Macur et al. |
| 11,277,979 B2 | 3/2022 | Geetham et al. |
| 11,277,981 B2 | 3/2022 | Ross |
| 11,293,005 B2 | 4/2022 | Carlton et al. |
| 11,297,866 B2 | 4/2022 | Kozubal et al. |
| 11,343,979 B2 | 5/2022 | Mueller et al. |
| 11,359,074 B2 | 6/2022 | Kaplan-Bie et al. |
| 11,359,174 B2 | 6/2022 | Winiski et al. |
| 11,407,973 B2 | 8/2022 | Harney et al. |
| 11,420,366 B2 | 8/2022 | McIntyre et al. |
| 11,432,575 B2 | 9/2022 | Macur et al. |
| 11,459,541 B2 | 10/2022 | Harney et al. |
| 11,464,251 B2 | 10/2022 | Kozubal et al. |
| 11,466,245 B2 | 10/2022 | Harney et al. |
| 11,478,007 B2 | 10/2022 | Macur et al. |
| 11,505,779 B2 | 11/2022 | Kozubal et al. |
| 11,678,617 B2 | 6/2023 | Ross et al. |
| 11,819,846 B2 | 11/2023 | Hanyu et al. |
| 11,859,230 B2 | 1/2024 | Minty et al. |
| 12,070,048 B2 | 8/2024 | Savir et al. |
| 2001/0012235 A1 | 8/2001 | Schuchardt |
| 2002/0110427 A1 | 8/2002 | Waddell |
| 2002/0131828 A1 | 9/2002 | Waddell |
| 2002/0131933 A1 | 9/2002 | Delmotte |
| 2003/0017565 A1 | 1/2003 | Echigo et al. |
| 2003/0056451 A1 | 3/2003 | Plsek et al. |
| 2003/0121201 A1 | 7/2003 | Dahlberg et al. |
| 2003/0232895 A1 | 12/2003 | Omidian et al. |
| 2004/0000090 A1 | 1/2004 | Miller |
| 2004/0020553 A1 | 2/2004 | Amano |
| 2004/0166576 A1 | 8/2004 | Sadaie |
| 2004/0177585 A1 | 9/2004 | Vermette |
| 2005/0133536 A1 | 6/2005 | Kelsey et al. |
| 2005/0137272 A1 | 6/2005 | Gaserod et al. |
| 2006/0121006 A1 | 6/2006 | Chancellor et al. |
| 2006/0134265 A1 | 6/2006 | Beukes |
| 2006/0280753 A1 | 12/2006 | McNeary |
| 2007/0079944 A1 | 4/2007 | Amidon et al. |
| 2007/0196509 A1 | 8/2007 | Riman et al. |
| 2007/0225328 A1 | 9/2007 | Fritz et al. |
| 2007/0227063 A1 | 10/2007 | Dale et al. |
| 2007/0294939 A1 | 12/2007 | Spear et al. |
| 2008/0017272 A1 | 1/2008 | Isomura et al. |
| 2008/0046277 A1 | 2/2008 | Stamets |
| 2008/0047966 A1 | 2/2008 | Carson |
| 2008/0145577 A1 | 6/2008 | Bayer et al. |
| 2008/0234210 A1 | 9/2008 | Rijn et al. |
| 2008/0295399 A1 | 12/2008 | Kawai et al. |
| 2008/0296295 A1 | 12/2008 | Kords et al. |
| 2009/0107040 A1 | 4/2009 | Vandnhove |
| 2009/0111163 A1 | 4/2009 | Hoang et al. |
| 2009/0123608 A1 | 5/2009 | Albers et al. |
| 2009/0148558 A1 | 6/2009 | Kim et al. |
| 2009/0191289 A1 | 7/2009 | Lutz et al. |
| 2009/0241623 A1 | 10/2009 | Matano et al. |
| 2009/0246467 A1 | 10/2009 | Delantar |
| 2009/0272758 A1 | 11/2009 | Karwacki et al. |
| 2009/0307969 A1 | 12/2009 | Bayer et al. |
| 2009/0321975 A1 | 12/2009 | Schlummer |
| 2010/0101190 A1 | 4/2010 | Dillon |
| 2010/0158976 A1 | 6/2010 | O'Brien et al. |
| 2010/0159509 A1 | 6/2010 | Xu et al. |
| 2010/0199601 A1 | 8/2010 | Boldrini et al. |
| 2010/0227931 A1 | 9/2010 | Kuwano et al. |
| 2010/0243135 A1 | 9/2010 | Pepper et al. |
| 2010/0326564 A1 | 12/2010 | Isomura et al. |
| 2011/0094154 A1 | 4/2011 | Joaquin |
| 2011/0108158 A1 | 5/2011 | Huwiler et al. |
| 2011/0265688 A1 | 11/2011 | Kalisz et al. |
| 2011/0268980 A1 | 11/2011 | Kalisz et al. |
| 2011/0269209 A1 | 11/2011 | Rocco et al. |
| 2011/0269214 A1 | 11/2011 | Kalisz et al. |
| 2011/0306107 A1 | 12/2011 | Kalisz et al. |
| 2012/0000165 A1 | 1/2012 | Williams |
| 2012/0006446 A1 | 1/2012 | Isomura et al. |
| 2012/0060446 A1 | 3/2012 | Merz |
| 2012/0076895 A1 | 3/2012 | Kirejevas et al. |
| 2012/0115199 A1 | 5/2012 | Li et al. |
| 2012/0124839 A1 | 5/2012 | Kalisz et al. |
| 2012/0132314 A1 | 5/2012 | Weigel et al. |
| 2012/0135504 A1 | 5/2012 | Ross |
| 2012/0220017 A1* | 8/2012 | Pan ................... C12P 17/181 |
| | | 435/254.1 |
| 2012/0225471 A1 | 9/2012 | McIntyre et al. |
| 2012/0227899 A1 | 9/2012 | McIntyre et al. |
| 2012/0231140 A1 | 9/2012 | Hofmann et al. |
| 2012/0270031 A1 | 10/2012 | Guan et al. |
| 2012/0270302 A1 | 10/2012 | Bayer et al. |
| 2012/0315687 A1 | 12/2012 | Bayer et al. |
| 2013/0095560 A1 | 4/2013 | McIntyre et al. |
| 2013/0105036 A1 | 5/2013 | Smith et al. |
| 2013/0210327 A1 | 8/2013 | Corominas |
| 2013/0224840 A1 | 8/2013 | Bayer et al. |
| 2013/0274892 A1 | 10/2013 | Lelkes et al. |
| 2013/0309755 A1 | 11/2013 | McIntyre et al. |
| 2014/0038619 A1 | 2/2014 | Moulsley |
| 2014/0056653 A1 | 2/2014 | Scully et al. |
| 2014/0069004 A1 | 3/2014 | Bayer et al. |
| 2014/0093618 A1 | 4/2014 | Forgacs et al. |
| 2014/0163142 A1 | 6/2014 | Zhang et al. |
| 2014/0173977 A1 | 6/2014 | Juscius |
| 2014/0186927 A1 | 7/2014 | Winiski et al. |
| 2014/0220217 A1 | 8/2014 | Brown et al. |
| 2014/0302560 A1* | 10/2014 | Kelly .................. A23L 21/25 |
| | | 435/71.1 |
| 2014/0371352 A1 | 12/2014 | Dantin et al. |
| 2015/0033620 A1 | 2/2015 | Geetham et al. |
| 2015/0038619 A1 | 2/2015 | McIntyre et al. |
| 2015/0101509 A1 | 4/2015 | McIntyre et al. |
| 2015/0197358 A1 | 7/2015 | Larsen |
| 2015/0342138 A1 | 12/2015 | Bayer et al. |
| 2015/0342224 A1 | 12/2015 | Medoff |
| 2016/0002589 A1 | 1/2016 | Winiski |
| 2016/0073589 A1 | 3/2016 | McNamara et al. |
| 2016/0264926 A1 | 9/2016 | Winiski et al. |
| 2016/0355779 A1 | 12/2016 | Ross |
| 2017/0000040 A1 | 1/2017 | Bayer et al. |
| 2017/0028600 A1 | 2/2017 | McIntyre et al. |
| 2017/0071214 A1 | 3/2017 | Rehage |
| 2017/0218327 A1 | 8/2017 | Amstislavski et al. |
| 2017/0253849 A1 | 9/2017 | Miller et al. |
| 2017/0253852 A1 | 9/2017 | Bayer et al. |
| 2018/0014468 A1 | 1/2018 | Ross et al. |
| 2018/0035704 A1* | 2/2018 | Wicking ............... A61K 36/06 |
| 2018/0148682 A1 | 5/2018 | Ross et al. |
| 2018/0368337 A1 | 5/2018 | McIntyre et al. |
| 2019/0059431 A1 | 2/2019 | Kozubal et al. |
| 2019/0090436 A1 | 3/2019 | Betts et al. |
| 2019/0284307 A1 | 9/2019 | Chase et al. |
| 2019/0322997 A1 | 10/2019 | Schaak |
| 2019/0330668 A1 | 10/2019 | Kozubal et al. |
| 2019/0338240 A1 | 11/2019 | Carlton et al. |
| 2019/0359931 A1 | 11/2019 | Mueller et al. |
| 2019/0373935 A1* | 12/2019 | Huggins .............. A23L 33/195 |
| 2019/0390156 A1 | 12/2019 | Bayer et al. |
| 2020/0024577 A1 | 1/2020 | Carlton et al. |
| 2020/0025672 A1 | 1/2020 | Scullin et al. |
| 2020/0055274 A1 | 2/2020 | Bayer et al. |
| 2020/0080050 A1 | 3/2020 | Nahmias |

(56) References Cited

U.S. PATENT DOCUMENTS

| | | |
|---|---|---|
| 2020/0095535 A1 | 3/2020 | Kozubal et al. |
| 2020/0157506 A1 | 5/2020 | Bayer et al. |
| 2020/0196541 A1 | 6/2020 | Ross et al. |
| 2020/0208097 A1 | 7/2020 | Winiski |
| 2020/0239830 A1 | 7/2020 | O'Brien et al. |
| 2020/0255794 A1 | 8/2020 | Amstislavski et al. |
| 2020/0268031 A1 | 8/2020 | Macur et al. |
| 2020/0270559 A1 | 8/2020 | Macur et al. |
| 2020/0392341 A1 | 12/2020 | Smith et al. |
| 2021/0017486 A1 | 1/2021 | Kozubal et al. |
| 2021/0127601 A9 | 5/2021 | Kaplan-Bie et al. |
| 2021/0317433 A9 | 10/2021 | Schaak |
| 2021/0348117 A9 | 11/2021 | Winiski |
| 2021/0401019 A1 | 12/2021 | Bayer et al. |
| 2022/0007777 A1 | 1/2022 | Wang et al. |
| 2022/0025318 A1 | 1/2022 | Gandia et al. |
| 2022/0061365 A1 | 3/2022 | Vrljic et al. |
| 2022/0127784 A1 | 4/2022 | Handlin et al. |
| 2022/0142907 A1 | 5/2022 | Bayer et al. |
| 2022/0240557 A1 | 8/2022 | Kawabata et al. |
| 2022/0290199 A1 | 9/2022 | Greetham et al. |
| 2022/0295825 A1 | 9/2022 | Ghotra et al. |
| 2022/0298470 A1 | 9/2022 | Sayed et al. |
| 2022/0315881 A1 | 10/2022 | Macur |
| 2022/0333055 A1 | 10/2022 | Winiski et al. |
| 2022/0354068 A1 | 11/2022 | Carlton et al. |
| 2022/0361424 A1 | 11/2022 | Mueller et al. |
| 2022/0386666 A1 | 12/2022 | Kawabata et al. |
| 2022/0389356 A1 | 12/2022 | Macur et al. |
| 2022/0396052 A9 | 12/2022 | Bayer et al. |
| 2023/0013465 A1 | 1/2023 | Kaplan-Bie et al. |
| 2023/0016412 A1 | 1/2023 | Perry |
| 2023/0024708 A1 | 1/2023 | Kaplan-Bie et al. |
| 2023/0056666 A1 | 2/2023 | Winiski et al. |
| 2023/0371561 A1 | 11/2023 | Feldman |
| 2024/0147920 A1 | 5/2024 | Driel et al. |
| 2024/0172775 A1 | 5/2024 | Langan |
| 2024/0276929 A1 | 8/2024 | Rademakers |

FOREIGN PATENT DOCUMENTS

| | | | |
|---|---|---|---|
| CN | 216106969 U | 3/2022 | |
| IN | 202141024595 A | 7/2021 | |
| KR | 102463058 B1 | 11/2022 | |
| WO | WO-2019099474 A1 * | 5/2019 | ............. A01G 18/60 |

* cited by examiner

1010 ↑ Airflow Direction

AERIAL MYCELIA AND METHODS OF MAKING SAME

CROSS-REFERENCE TO RELATED APPLICATIONS

This application is related to International PCT Application No. PCT/US2020/058934, filed Nov. 4, 2020, U.S. Provisional Patent Application No. 62/930,829, filed Nov. 5, 2019, entitled TUNABLE MYCOLOGICAL BIOPOLYMER; U.S. Provisional Patent Application No. 62/946,752, filed Dec. 11, 2019, entitled MUSHROOM MYCELIUM AS A MATRIX FOR PRODUCING NON-ANIMAL DERIVED PRODUCTS; U.S. Provisional Patent Application No. 63/028,361, filed May 21, 2020, entitled EDIBLE MYCELIA AND METHODS OF MAKING THE SAME; and U.S. Provisional Patent Application No. 63/075,694, filed Sep. 8, 2020, entitled EDIBLE MYCELIA AND METHODS OF MAKING THE SAME, the disclosures of which are incorporated herein by reference in their entirety to the extent not inconsistent with the content of this disclosure.

INCORPORATION BY REFERENCE TO ANY PRIORITY APPLICATIONS

Any and all applications for which a foreign or domestic priority claims is identified in the Application Data Sheet as filed with the present application are hereby incorporated by reference under 37 C.F.C. § 1.57. This application claims the benefit of U.S. Provisional Patent Application No. 63/184,033, filed May 4, 2021, entitled "AERIAL MYCELIA AND METHODS OF MAKING SAME," and U.S. Provisional Patent Application No. 63/184,052, filed May 4, 2021, entitled "EDIBLE AERIAL MYCELIA AND METHODS OF MAKING SAME," and U.S. Provisional Patent Application No. 63/184,039, filed May 4, 2021, entitled "AERIAL MYCELIA AND METHODS OF MAKING SAME," the disclosures of which are incorporated herein by reference in their entirety.

BACKGROUND

Field

This application relates generally to aerial mycelium and methods of making aerial mycelium suitable for use as a food or textile product or ingredient. Such a food product or ingredient can include edible aerial mycelium having a texture that is analogous to a whole-muscle meat product, such as for example mycelium-based bacon, or other meat alternatives. Such a textile product or ingredient can be used in the manufacture of mycelium-based textile products, leather-like materials, petroleum-based product alternatives, composites, or foams.

Description

There is increasing demand for mycelium-based products, both in the food industry (for example, as a meat-substitute) and in other non-food-related industries, such as textiles, packaging, and others, as such products offer the potential for environmentally-friendly alternatives to currently-favored products in these industries.

Given that such mycelium-based products are relatively new to the industrial world, there is also a need for improved methods for growing mycelium that are repeatable and energy efficient, while providing high quality and quantity mycelium-based products.

SUMMARY

For purposes of summarizing the invention and the advantages achieved over the prior art, certain objects and advantages of the invention have been described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In some aspects, a method of making an aerial mycelium is disclosed that includes: providing a growth matrix comprising a substrate and a fungus; incubating the growth matrix as a solid-state culture in a growth environment for an incubation time period; and introducing aqueous mist into the growth environment throughout the incubation time period, or a portion thereof; wherein the aqueous mist has a mist deposition rate and a mean mist deposition rate, and the mean mist deposition rate is less than or equal to about 10 microliter/cm2/hour, thereby producing extra-particle aerial mycelial growth from the growth matrix; wherein the growth matrix comprises the substrate and a fungal inoculum, said fungal inoculum comprising said fungus; or wherein the growth matrix comprises a colonized substrate, said colonized substrate comprising the substrate, wherein said substrate is previously colonized with mycelium of said fungus.

In some aspects, the method of making an aerial mycelium can include the following features: the growth environment can include a growth atmosphere having a relative humidity, an oxygen (O2) content, and a carbon dioxide (CO2) content, wherein the CO2 content is at least about 0.02% (v/v) and less than about 8% (v/v); the mist deposition rate can be less than or equal to about 150 microliter/cm2/hour; and the mean mist deposition rate can be less than or equal to about 5 microliter/cm2/hour or is less than or equal to about 3 microliter/cm2/hour.

In some aspects, the mist deposition rate is less than about 100 microliter/cm2/hour.

In some aspects, the mist deposition rate is less than about 10 microliter/cm²/hour.

In some aspects, the $CO_2$ content is within a range of about 0.2% (v/v) to about 7% (v/v).

In some aspects, the $CO_2$ content is greater than about 2% (v/v).

In some aspects, the $CO_2$ content is within a range of about 3% (v/v) to about 7% (v/v).

In some aspects, the mist deposition rate is less than about 2 microliter/cm²/hour.

In some aspects, the mean mist deposition rate is within a range of about 0.2 to about 0.8 microliter/cm²/hour.

In some aspects, the mist deposition rate is less than about 1 microliter/cm²/hour.

In some aspects, the mist deposition rate is at least about 0.05 microliter/cm²/hour and the mean mist deposition rate is at least about 0.02 microliter/cm²/hour.

In some aspects, the ratio of the mist deposition rate and the mean mist deposition rate is within a range of about 3:1 to about 1:1.

In some aspects, a method of making an aerial mycelium is disclosed that includes: incubating a growth matrix in a growth environment for an incubation time period, wherein the growth matrix comprises a substrate and a fungus; introducing aqueous mist into the growth environment throughout the incubation time period, or a portion thereof; and producing extra-particle aerial mycelial growth from the growth matrix; wherein introducing comprises introducing the aqueous mist into the growth environment resulting in a mean mist deposition rate of at most about 0.45 microliter/$cm^2$/hour.

In some aspects, introducing comprises introducing the aqueous mist into the growth environment resulting in an instantaneous mist deposition rate and the mean mist deposition rate, wherein the ratio of the instantaneous mist deposition rate to the mean mist deposition rate is at most about 20 to about 1.

In some aspects, the ratio of the instantaneous mist deposition rate to the mean mist deposition rate is at most about 10 to about 1.

In some aspects, the ratio of the instantaneous mist deposition rate to the mean mist deposition rate is at most about 5 to about 1.

In some aspects, the growth environment comprises a misting apparatus; and introducing comprises introducing the aqueous mist into the growth environment via the misting apparatus, resulting in the mean mist deposition rate; wherein the misting apparatus is operated at a duty cycle, and wherein the duty cycle is at least about 5%.

In some aspects, the duty cycle is at least about 10%.

In some aspects, the duty cycle is at least about 20%.

In some aspects, introducing further comprises introducing the aqueous mist into the growth environment resulting in an instantaneous mist deposition rate of at most about 2 microliter/$cm^2$/hour.

In some aspects, the mean mist deposition rate is at least about 0.01 microliter/$cm^2$/hour.

In some aspects, said growth environment comprises a growth atmosphere, said growth atmosphere having a carbon dioxide content, wherein said carbon dioxide content modulates with fungal respiration over the course of the incubation time period.

In some aspects, said growth environment comprises a growth atmosphere, said growth atmosphere having a carbon dioxide content, wherein said carbon dioxide content is not a preselected carbon dioxide content.

In some aspects, a method of making an aerial mycelium is disclosed that includes: incubating a growth matrix in a growth environment for an incubation time period, wherein the growth matrix comprises a substrate and a fungus; introducing aqueous mist into the growth environment during the incubation time period, or a portion thereof, wherein the aqueous mist comprises a conductivity, wherein the conductivity is no greater than about 50 microsiemens/cm; and producing extra-particle aerial mycelial growth from the growth matrix; wherein: the growth environment comprises a growth atmosphere characterized as having a carbon dioxide content, wherein the carbon dioxide content is less than about 7% (v/v) over the course of the incubation time period; and (i) the incubation time period ends no later than when a visible fruiting body forms; (ii) the incubation time period ends when a visible fruiting body forms; or (iii) the extra-particle aerial mycelial growth does not contain a visible fruiting body.

In some aspects, introducing comprises introducing aqueous mist into the growth environment during a portion of the incubation time period, wherein the portion of the incubation time period comprises a mycelial vertical expansion phase.

In some aspects, introducing comprises introducing aqueous mist into the growth environment during a portion of the incubation time period, wherein the portion of the incubation time period begins between a second day and a fourth day of the incubation time period.

In some aspects, introducing comprises introducing the aqueous mist throughout the portion of the incubation time period.

In some aspects, the growth environment does not exclude light.

In some aspects, the growth environment comprises natural light.

In some aspects, the growth environment comprises a growing light.

BRIEF DESCRIPTION OF THE DRAWINGS

The features and advantages of the invention described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. In some instances, the drawings may not be drawn to scale.

DETAILED DESCRIPTION

Figure 1:
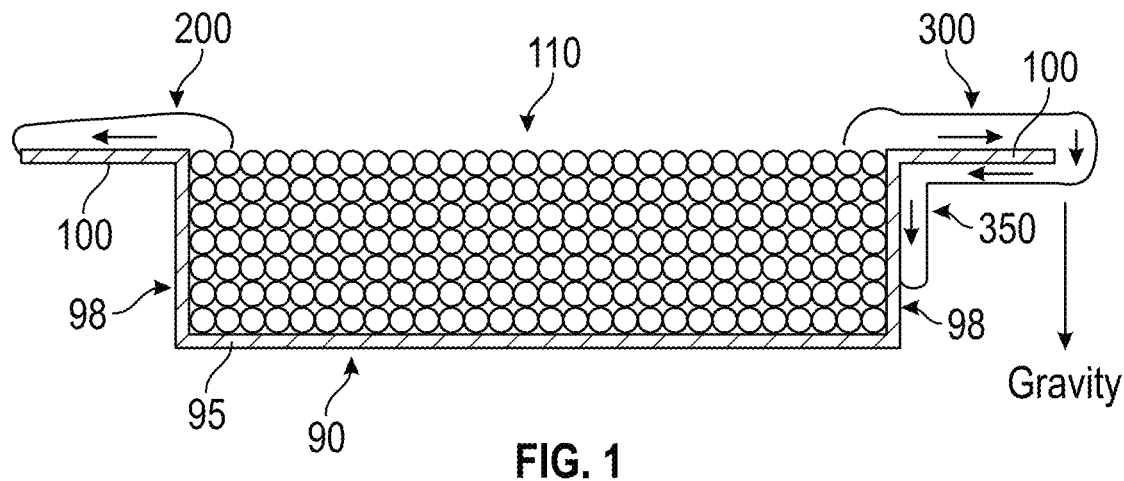
FIG. 1 illustrates positive gravitropism in extra-particle appressed mycelial growth.

The present disclosure provides for an aerial mycelium, methods of making an aerial mycelium, and uses thereof.

U.S. Patent Application Publication No. 2015/0033620, International PCT Patent Application No. WO2019/099474A1, the entirety of which are incorporated herein by reference thereto, except where inconsistent with the disclosure herein, describe methods of growing a mycological biopolymer material and products resulting therefrom. However, there are ongoing challenges to grow mycological biopolymer materials and products that can be used in the food industry (for example, as a meat-substitute product, and one that may present to the consumer a product that offers the appearance and texture of traditional meat material (i.e., beef, pork, poultry, and seafood)), and in other industries, such as textiles, packaging, and others.

It is an object of the present invention to provide improved mycelial products and corresponding methods for growing and manufacturing the same. For example, there remains a need for mycelial products and production methods that are safer, more energy efficient, more sustainable, and less expensive. There remains a need for mycelium-based foods that can serve as meat alternatives and offer unique sensory, nutritive, sustainability and economic advantages. There is a need for reducing incubation time periods and/or reducing the risk of microbial contamination during the production of mycelium products. There is a need for certain mycelial products with desired physical characteristics, such as a desired thickness.

The following discussion presents detailed descriptions of the several embodiments of mycelium products and methods of the same shown in the figures. These embodiments are not intended to be limiting, and modifications, variations, combinations, etc., are possible and within the scope of this disclosure.

The present disclosure provides for an aerial mycelium, methods of making an aerial mycelium, and uses thereof.

It is an object of the invention to provide an improved mycelium in the form of an aerial mycelium that is suitable for use as a textile, such as a leather-like material, or a petroleum-based material alternative, such as a foam.

It is another object of the invention to provide a method of making an aerial mycelium suitable for use as a textile, such as a leather-like material, or a petroleum-based material alternative, such as a foam.

It is yet another object of the invention to provide a product containing an aerial mycelium, and a method of making a product comprising an aerial mycelium, such as a textile, including a leather-like material, or a petroleum-based material alternative, including a foam.

It is another object of the invention to provide a mycelium-based product having a texture that is analogous to a textile or leather-like material.

Methods of making aerial mycelia of the present disclosure, methods of post-processing the aerial mycelia, and aerial mycelia and processed aerial mycelia obtained therefrom, can be adapted to prepare a wide variety of materials and products. Generally contiguous aerial mycelium panels can be implemented for applications such as, for example, materials and products that can be used to replace animal-derived or petroleum-based textiles, leather and leather-like materials and products, or to provide foam-like materials for use in upholstery, apparel, military gear, athletic gear, footwear, and the like.

It is another object of the invention to provide an improved aerial mycelium in the form of an edible aerial mycelium that is suitable for use as a food product, including a food ingredient for making mycelium-based food product, such as a whole-muscle meat alternative food product, a seafood alternative food product, a poultry alternative food product or a carbohydrate-based alternative food product.

It is another object of the invention to provide a method of making an edible aerial mycelium suitable for use as a food product, including a food ingredient, such as a whole-muscle meat alternative food product, a seafood alternative food product, a poultry alternative food product or a carbohydrate-based alternative food product.

It is yet another object of the invention to provide an edible product containing an edible aerial mycelium, and a method of making an edible product comprising an edible aerial mycelium.

It is another object of the invention to provide a mycelium-based food product having a texture that is analogous to a whole-muscle meat product.

In some aspects, the present disclosure provides for an aerial mycelium, and for methods of making an aerial mycelium, wherein the aerial mycelium is a growth product of a fungus. In some embodiments, the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces, Wolfiporia, Ceriporiopsis, Chlorociboria, Daedalea, Daedaleopsis, Daldinia, Ganoderma, Hypoxylon, Inonotus, Lenzites, Omphalotus, Oxyporus, Phanerochaete, Phellinus, Polyporellus, Porodaedalea, Pycnoporus, Scytalidium, Stereum, Trametes* or *Xylaria*. In some further embodiments, the fungus is a species of the genus *Bondarzewia, Ceriporiopsis, Daedalea, Daedaleopsis, Fomitopsis, Ganoderma, Inonotus, Lenzites, Omphalotus, Oxyporus, Phellinus, Polyporellus, Polyporus, Porodaedalea, Pycnoporus, Stereum, Trametes* or *Xylaria*. In some more particular embodiments, the fungus is selected from the group consisting of *Bondarzewia berkleyii, Daedalea quercina, Daedaleopsis* spp.,

*Daedaleopsis confragosa, Daedaleopsis septentrionalis, Fomitopsis* spp., *Fomitopsis cajanderi, Fomitopsis pinicola, Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Inonotus* spp., *Inonotus obliqus, Inonotus hispidus, Inonotus dryadeus, Inonotus tomentosus, Lenzites betulina, Phellinus* spp., *Phellinus ignarius, Phellinus gilvus, Polyporus* spp., *Polyporus squamosus, Polyporus badius, Polyporus umbellatus, Polyporus squamosus, Polyporus tuberaster, Polyporus arcularius, Polyporus albeolaris, Polyporus radicatus, Porodaedalea pini, Pycnoporus* spp., *Pycnoporus* spp., *Pycnoporus sanguineus, Pycnoporus cinnabarinus, Stereum* spp., *Stereum ostea, Stereum hirsutum, Trametes* spp., *Trametes versicolor, Trametes elegans, Trametes suaveolens, Trametes hirsute, Trametes gibbosa, Trametes ochraceae, Trametes villosa, Trametes cubensis* and *Trametes pubescens*. In some other embodiments, the fungus is a pigment-producing fungus of a genus selected from the group consisting of *Chlorociboria, Daldinia, Hypoxylon, Phanerochaete* and *Scytalidium*. In yet some other embodiments, the fungus is a species of the genus *Ganoderma*. In some further embodiments, the fungus is *Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum* or *Ganoderma weberianum*. In some preferred embodiments, the fungus is *Ganoderma sessile*.

In some aspects, the present disclosure provides for an aerial mycelium, and for methods of making an aerial mycelium, wherein the aerial mycelium is a growth product of a fungus. In some embodiments, the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces* or *Wolfiporia*. In some further embodiments, the fungus is a species of the genus *Pleurotus*. In some more particular embodiments, the fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus foridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuber-regium*. In some preferred embodiments, the fungus is *Pleurotus ostreatus*.

Definitions Related to Mycelium and its Characterization

"Mycelium" as used herein refers to a connective network of fungal hyphae.

"Hyphae" as used herein refers to branched filament vegetative cellular structures that are interwoven to form mycelium.

"Fruiting body" as used herein refers to a stipe, pileus, gill, pore structure, or a combination thereof.

"Extra-particle mycelial growth" (EPM) as used herein refers to mycelial growth, which can be either appressed or aerial.

"Extra-particle appressed mycelial growth" as used herein refers to a distinct mycelial growth that is surface-tracking (thigmotropic), is determinate in growth substantially orthogonal to the surface of a growth matrix, is indeterminate in growth substantially parallel to the surface of the growth matrix, and which exhibits positive gravitropism. "Appressed mycelium" as used herein refers to a continuous mycelium obtained from extra-particle appressed mycelial growth, and which is substantially free of growth matrix.

"Determinate growth" as used herein refers to growth that occurs until a maximum final dimension is achieved while growth continues to occur in other dimensions. Either determinate or indeterminate mycelial growth above the surface of a growth matrix defines a mycelium's native thickness.

"Indeterminate growth" as used herein refers to growth that expands indefinitely in a given direction as long as mycelial growth is occurring.

"Positive gravitropism" as used herein refers to growth that preferentially occurs in the direction of gravity.

"Extra-particle aerial mycelial growth" as used herein refers to a distinct mycelial growth that occurs upward and outward from the surface of a growth matrix, and which exhibits negative gravitropism. "Aerial mycelium" as used herein refers to mycelium obtained from extra-particle aerial mycelial growth, and which is substantially free of growth matrix.

"Negative gravitropism" as used herein refers to mycelial growth that preferentially occurs in the direction away from gravity. As disclosed herein, extra-particle aerial mycelial growth exhibits negative gravitropism. Without being bound by any particular theory, this may be attributable at least in part to the geometric restriction of the growth format, wherein an uncovered tool having a bottom and side walls contains a growth matrix. With such geometric restriction, growth will primarily occur along the unrestricted dimension(s), which in the scenario is primarily vertically (negatively gravitropic). In a geometrically unrestricted scenario, extra-particle aerial mycelial growth could be described as being neutrally gravitropic, aerial, and radial in which growth will expand in all directions from its point source.

To better understand these terms, an embodiment of positive gravitropism in extra-particle appressed mycelial growth of the present disclosure is illustrated in FIG. 1. Referring to FIG. 1, a growth unit consists of a single tray container 90 with a bottom 95 and side walls 98, with horizontally oriented rigid surfaces placed as a skirt 100 oriented at the lip of the tray container 90. The tray container contains growth matrix 110 (circles). In the absence of physical water mist deposition, extra-particle mycelial growth (EPM) expands along this horizontal surface 200 as a function of a preference for surface-tracking growth. In this case, if/when the expanding EPM reaches the boundary of the horizontally oriented skirt 100, EPM will default to a combination of surface-tracking and positive gravitropism, continuing to expand along the underside of the skirt 300 or the side walls 98 of the tray container 350.

Figure 2:
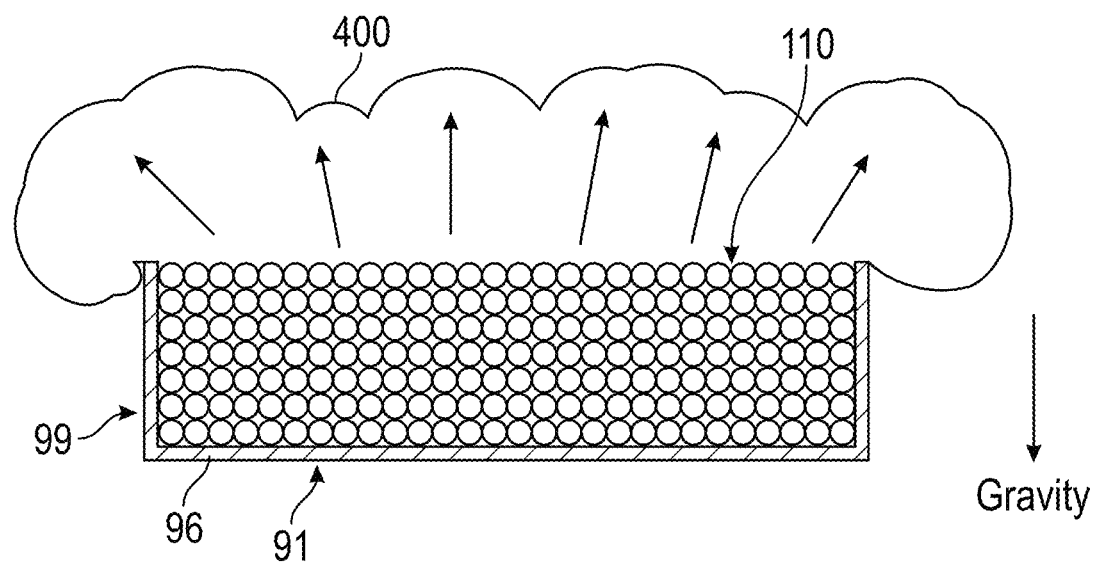
FIG. 2 illustrates negative gravitropism in extra-particle aerial mycelial growth.

To better understand these terms, an embodiment of negative gravitropism in extra-particle aerial mycelial growth of the present disclosure is illustrated in FIG. 2. Referring to FIG. 2, the growth unit consists of a single tray 91 container with a bottom 96 and side walls 99. The tray container 91 contains growth matrix 110 (circles). Aqueous mist (not shown) is deposited directly onto the exposed growth matrix surface, resulting in EPM initiating across the exposed surface. With continued physical aqueous mist deposition, EPM continues to expand forming a contiguous 400, semi-contiguous, or discontiguous volume of extra-particle aerial mycelial growth as a combined function of mist deposition rates and mean mist deposition rates.

"Mycelium-based" as used herein refers to a composition substantially comprising mycelium.

In a further aspect, the present disclosure provides for an aerial mycelium characterized as having particular physiochemical properties.

A "native" property as used herein refers to a property associated with a mycelium obtained after an incubation time period has elapsed and upon subsequent removal of the mycelial growth from a growth matrix, and prior to any optional environmental, physical, or other post-processing step(s) or excursion(s), whether intentional or unintentional, that substantially alters the property. In some aspects, the present disclosure provides for a mycelium characterized as having one or more "native" properties. In some further aspects, the native property is a native density, a native thickness, a native nutritional content, a native moisture content, a native compressive modulus, and so on. In a nonlimiting example, an environmental step can be a drying step, such as one that reduces the aerial mycelial native moisture content to less than about 80% (w/w). In another nonlimiting example, a physical step can be a compression step that substantially reduces the thickness of an aerial mycelium.

"Native moisture content" as used herein refers to the moisture content of a mycelium obtained after an incubation time period has elapsed and the resulting mycelial growth has been removed from a growth matrix, and prior to performing any optional environmental, physical, or other post-processing step(s) that may increase or decrease the moisture content of the mycelium so obtained. In some embodiments, a mycelium of the present disclosure is characterized as having a native moisture content. In some embodiments, the native moisture content is expressed as a mean native moisture content.

In some embodiments, an aerial mycelium of the present disclosure can have a native moisture content of at most about 75% (w/w). In some embodiments, an aerial mycelium can have a moisture content of greater than about 80% (w/w). In some further embodiments, an aerial mycelium of the present disclosure can have a native moisture content of at least about 85% (w/w), or at least about 90% (w/w). In some embodiments, an aerial mycelium of the present disclosure can have a native moisture content of at most about 95% (w/w), at most about 94% (w/w), or at most about 93% (w/w). In some more particular embodiments, an aerial mycelium can have a native moisture content of about 81% (w/w), about 82% (w/w), about 83% (w/w), about 84% (w/w), about 85% (w/w), about 86% (w/w), about 87% (w/w), about 88% (w/w), about 89% (w/w), about 90% (w/w), about 91% (w/w), about 92% (w/w), about 93% (w/w), about 94% (w/w), or about 95% (w/w), or any range therebetween. In some embodiments, an aerial mycelium can have a native moisture content within a range of about 75% (w/w) to about 95% (w/w), about 80% (w/w) to about 95% (w/w), about 75% (w/w) to about 93% (w/w) or about 80% (w/w) to about 93% (w/w). Typically, an aerial mycelium of the present disclosure has a native moisture content of about 90% (w/w). In some embodiments, an appressed mycelium of the present disclosure can have a native moisture content of not more than about 80% (w/w), for example, within a range of about 70% (w/w) to about 80% (w/w).

Applicant has shown that mist deposition rates and mean mist deposition rates can be tuned to drive a target native moisture content of an aerial mycelium (e.g., see Examples 47 to 54). Reducing moisture content of an aerial mycelium can advantageously reduce the risk of microbial contamination.

In some embodiments, a mycelium of the present disclosure is characterized as having a native thickness. In some embodiments, the native thickness is expressed as a mean native thickness as determined from sampling over the volume of the mycelium. Typically, the native mycelial thickness is determined from a mycelium obtained after an incubation time period has elapsed and the resulting extra-particle mycelial growth has been removed from a growth matrix, and prior to performing any optional environmental, physical, or other post-processing step(s) that may compress or expand the thickness of the mycelium so obtained.

In some aspects, an aerial mycelium of the present disclosure has a native thickness of greater than about 10 mm. In some embodiments, an aerial mycelium of the present disclosure can have a native thickness of at least about 15 mm, at least about 20 mm, at least about 25 mm, at least about 30 mm, at least about 35 mm, at least about 40 mm, at least about 45 mm, at least about 50 mm, at least about 55 mm, at least about 60 mm, at least about 65 mm or at least about 70 mm. In some embodiments, the native thickness is a mean native thickness. Thus, in some further embodiments, an aerial mycelium of the present disclosure can have a mean native thickness of at least about 15 mm, at least about 20 mm, at least about 25 mm, at least about 30 mm, at least about 35 mm, at least about 40 mm, at least about 45 mm, at least about 50 mm, at least about 55 mm or at least about 60 mm. In some embodiments, the native thickness is a median native thickness. Thus, in some further embodiments, an aerial mycelium of the present disclosure can have a median native thickness of at least about 15 mm, at least about 20 mm, at least about 25 mm, at least about 30 mm, at least about 35 mm, at least about 40 mm, at least about 45 mm, at least about 50 mm, at least about 55 mm, at least about 60 mm, or at least about 65 mm. In some embodiments, the native thickness is a maximum native thickness. Thus, in some further embodiments, an aerial mycelium of the present disclosure can have a maximum native thickness of at most about 150 mm, at most about 125 mm, at most about 100 mm, at most about 95 mm, at most about 90 mm, or at most about 85 mm.

In some other aspects, at least a portion of an aerial mycelium (or an aerial mycelial panel) of the present disclosure can have a native thickness of greater than about 10 mm. In some embodiments, at least a portion of an aerial mycelium of the present disclosure can have a native thickness of at least about 15 mm, at least about 20 mm, at least about 25 mm, at least about 30 mm, at least about 35 mm, at least about 40 mm, at least about 45 mm, at least about 50 mm, at least about 55 mm, at least about 60 mm, at least about 65 mm, at least about 70 mm, at least about 75 mm or at least about 80 mm. In some more particular embodiments, the portion can be at least about 10%, at least about 20%, at least about 30%, at least about 40%, at least about 50%, at least about 60% at least about 70%, at least about 80% or at least about 90% of the aerial mycelium.

Thus, in some embodiments, the present disclosure provides for an aerial mycelium, wherein at least 25% of the aerial mycelium (i.e., at least 25% of a single aerial mycelial panel) can have a native thickness of at least about 20 mm, at least about 25 mm, at least about 30 mm, at least about 35 mm, at least about 40 mm, at least about 45 mm, at least about 50 mm, at least about 55 mm, at least about 60 mm, at least about 65 mm or at least about 70 mm. In some embodiments, the present disclosure provides for an aerial mycelium, wherein at least 50% of the aerial mycelium can have a native thickness of at least about 20 mm, at least about 25 mm, at least about 30 mm, at least about 35 mm, at least about 40 mm, at least about 45 mm, at least about 50 mm, at least about 55 mm, at least about 60 mm, at least about 65 mm or at least about 70 mm. In some embodiments, the present disclosure provides for an aerial mycelium, wherein at least 75% of the aerial mycelium can have a native thickness of at least about 20 mm, at least about 25 mm, at least about 30 mm, at least about 35 mm, at least about 40 mm, at least about 45 mm, at least about 50 mm, at least about 55 mm, or at least about 60 mm. In a nonlimiting example, the present disclosure provides for an aerial mycelium, wherein 75% of the aerial mycelium has a native thickness of about 54 mm, 50% of the aerial mycelium has a native thickness of about 66 mm, and 25% of the aerial mycelium has a native thickness of about 70 mm (e.g., see Example 39, Table 1, Panel A).

In some further embodiments, an aerial mycelium of the present disclosure can have a native thickness of at least about 20 mm, at least about 30 mm or at least about 40 mm over at least 60% of the aerial mycelium. In yet further embodiments, an aerial mycelium of the present disclosure can have a native thickness of at least about 20 mm, at least about 30 mm or at least about 40 mm over at least 70% of the aerial mycelium. In even more particular embodiments, an aerial mycelium of the present disclosure can have a native thickness of at least about 20 mm or at least about 30 mm over at least 70% of the aerial mycelium. In some more particular embodiments still, an aerial mycelium of the present disclosure can have a native thickness of at least about 20 mm over at least 80% of the aerial mycelium. In some preferred embodiments, an aerial mycelium of the present disclosure can have a native thickness of at least about 20 mm over at least 90% of the aerial mycelium.

In some aspects, a mycelium of the present disclosure is characterized as having a surface area. The surface area of an aerial mycelium of the present disclosure can be characterized as the area of the aerial mycelium that occupies the plane that is substantially orthogonal to the direction of mycelial growth.

In some aspects, an aerial mycelium of the present disclosure can have a surface area that is at least about 80% of the surface area of the growth matrix or is at least about 90% of the surface area of the growth matrix. In some further aspects, an aerial mycelium of the present disclosure can have a surface area that is at most about 125% of the surface area of the growth matrix. In some further aspects, an aerial mycelium of the present disclosure can have a surface area of at least about 1 square inch. In some yet further aspects, an aerial mycelium of the present disclosure can have a surface area of at most about 2,000 square feet.

In some aspects, a mycelium of the present disclosure is characterized as a contiguous mycelium. A contiguous mycelium of the present disclosure can be obtained by removing a contiguous extra-particle mycelial growth from a growth matrix as a contiguous object.

"Contiguous" as used herein in connection with an extra-particle aerial mycelial growth or an aerial mycelium refers to an extra-particle aerial mycelial growth or an aerial mycelium having a contiguous volume, wherein the contiguous volume is at least about 15 cubic inches, has a series of linked hyphae over the contiguous volume, or both. In some embodiments, an aerial mycelium of the present disclosure can have a contiguous volume of at least about 150 cubic inches, at least about 300 cubic inches or more. In some embodiments, a contiguous aerial mycelium of the present disclosure can be obtained by removing a contiguous extra-particle aerial mycelial growth from a growth matrix as a contiguous 3-dimensional object, which may be referred to herein as a panel.

In some embodiments, a mycelium of the present disclosure is characterized as having a native density. In some embodiments, the native density is expressed as a mean native density as determined from sampling over the volume of the mycelium.

"Native density" as used herein in connection with an aerial mycelium refers to the density of an aerial mycelium having a native moisture content of at least about 80% (w/w), or at least about 90% (w/w), and at most about 100% (w/w). Typically, the native density is determined from a mycelium obtained after an incubation time period has elapsed and the resulting mycelial growth has been removed from a growth matrix, and prior to performing any optional environmental, physical, or other post-processing step(s) that may compress or expand the aerial mycelium so obtained. An environmental step can be a drying step that reduces the aerial mycelial native moisture content to less than about 80% (w/w). Density (mass/volume) can be measured using any conventional instrument and method for determining the mass, and for volume of eccentric/non-rectilinear aerial mycelium samples a 3D scan is made of the sample, e.g., using an Einscan Pro 3D scanner according to the manufacturer's instructions. Volume of the sample is then derived from the meshed 3D object file (i.e. .stl or .asc file). Volume for rectilinear samples is determined by simply measuring the xyz of the sample.

Thus, in some embodiments, an aerial mycelium of the present disclosure can have a mean native density of no greater than about 70 pounds per cubic foot (pcf). In some embodiments, an aerial mycelium of the present disclosure can have a mean native density within a range of about 0.05 to about 70 pcf. In a further embodiment, an aerial mycelium of the present disclosure can have a mean native density within a range of about 0.05 to about 15 pcf. Example 23 of the present disclosure discloses a non-limiting example of an aerial mycelium having a low native density of about 0.06 pcf.

In some other embodiments, an aerial mycelium of the present disclosure can have a mean native density within a range of about 1 pcf to about 70 pcf. In some further embodiments, the aerial mycelium can have a mean native density of at least about 1 pcf, at least about 2 pcf, at least about 3 pcf, at least about 4 pcf, at least about 5 pcf, at least about 6 pcf, at least about 7 pcf, at least about 8 pcf, at least about 9 pcf or at least about 10 pcf. In yet some further embodiments, the aerial mycelium can have a mean native density of at most about 60 pcf, at most about 55 pcf, at most about 50 pcf, at most about 45 pcf, at most about 40 pcf, at most about 35 pcf, at most about 30 pcf, at most about 25 pcf, at most about 20 pcf or at most about 15 pcf. In some embodiments, an aerial mycelium of the present disclosure has a mean native density within a range of about 0.1 pcf to about 50 pcf, about 0.1 pcf to about 45 pcf, about 0.1 pcf to about 40 pcf, about 0.1 pcf to about 35 pcf, about 0.1 pcf to about 30 pcf, about 0.1 pcf to about 25 pcf, about 0.1 pcf to about 20 pcf, about 0.1 pcf to about 15 pcf, about 0.1 pcf to about 10 pcf, about 0.1 pcf to about 8 pcf, about 0.1 pcf to about 7 pcf, about 0.1 pcf to about 6 pcf, or about 0.1 pcf to about 5 pcf. In some embodiments, an aerial mycelium of the present disclosure has a mean native density within a range of about 1 pcf to about 50 pcf, about 1 pcf to about 45 pcf, about 1 pcf to about 40 pcf, about 1 pcf to about 35 pcf, about 1 pcf to about 30 pcf, about 1 pcf to about 25 pcf, about 1 pcf to about 20 pcf, about 1 pcf to about 15 pcf, about 1 pcf to about 10 pcf, about 1 pcf to about 8 pcf, about 1 pcf to about 7 pcf, about 1 pcf to about 6 pcf, or about 1 pcf to about 5 pcf. In some further embodiments, an aerial mycelium of the present disclosure has a mean native density within a range of about 2 pcf to about 50 pcf, about 2 pcf to about 45 pcf, about 2 pcf to about 40 pcf, about 2 pcf to about 35 pcf, about 2 pcf to about 30 pcf, about 2 pcf to about 25 pcf, about 2 pcf to about 20 pcf, about 2 pcf to about 15 pcf, about 2 pcf to about 10 pcf, about 2 pcf to about 8 pcf, about 2 pcf to about 7 pcf, about 2 pcf to about 6 pcf, or about 2 pcf to about 5 pcf. In some yet further embodiments, an aerial mycelium of the present disclosure has a mean native density within a range of about 3 pcf to about 50 pcf, about 3 pcf to about 45 pcf, about 3 pcf to about 40 pcf, about 3 pcf to about 35 pcf, about 3 pcf to about 30 pcf, about 3 pcf to about 25 pcf, about 3 pcf to about 20 pcf, about 3 pcf to about 15 pcf, about 3 pcf to about 10 pcf, about 3 pcf to about 8 pcf, about 3 pcf to about 7 pcf, about 3 pcf to about 6 pcf, or about 3 pcf to about 5 pcf. In some more particular embodiments, an aerial mycelium of the present disclosure has a mean native density of about 0.05 pcf, about 1 pcf, about 2 pcf, about 3 pcf, about 4 pcf, about 5 pcf, about 6 pcf, about 7 pcf, about 8 pcf, about 9 pcf, about 10 pcf, about 11 pcf, about 12 pcf, about 13 pcf, about 14 pcf or about 15 pcf, or any range therebetween.

In yet other embodiments, an aerial mycelium of the present disclosure can have a mean native density of at most about 15 pcf. In some embodiments, an aerial mycelium can have a mean native density within a range of about 0.1 pcf to about 15 pcf. In some embodiments, an aerial mycelium can have a mean native density of at most about 10 pcf, or at most about 5 pcf.

In some embodiments, a mycelium of the present disclosure is characterized as having a dry density. In some embodiments, the dry density is expressed as a mean dry density as determined from sampling over the volume of the mycelium.

"Dry density" (or bone-dry density) as used herein refers to the density of a mycelium having a moisture content of no greater than about 10% (w/w). Typically, the dry density of a mycelium is determined after removing mycelial growth from a growth matrix to obtain a mycelium, and subsequently drying the mycelium to a moisture content of no greater than about 10% (w/w).

Thus, in some embodiments, an aerial mycelium of the present disclosure can have a mean dry density of at most about 7 pcf, at most about 6 pcf or at most about 5 pcf. In some embodiments, an aerial mycelium of the present disclosure can have a mean dry density within a range of about 0.05 pcf to about 7 pcf, about 0.05 pcf to about 6 pcf, about 0.05 to about 5 pcf, about 0.05 to about 4 pcf, about 0.05 to about 3 pcf, about 0.1 pcf to about 7 pcf, about 0.1 to about 6 pcf, about 0.1 to about 5 pcf, about 0.1 to about 4 pcf or about 0.1 to about 3 pcf. In some further embodiments, an aerial mycelium of the present disclosure has a mean dry density within a range of about 0.1 pcf to about 2 pcf. In some more particular embodiments, an aerial mycelium of the present disclosure has a mean dry density of about 0.1 pcf, about 0.2 pcf, about 0.3 pcf, about 0.4 pcf, about 0.5 pcf, about 0.6 pcf, about 0.7 pcf, about 0.8 pcf, about 0.9 pcf, about 1.0 pcf, about 1.1 pcf, about 1.2 pcf, about 1.3 pcf, about 1.4 pcf, about 1.5 pcf, about 1.6 pcf, about 1.7 pcf, about 1.8 pcf, about 1.9 pcf or about 2 pcf, or any range therebetween.

In some aspects, an aerial mycelium of the present disclosure can be further characterized by its hyphal width. In some embodiments, an aerial mycelium of the present disclosure has a mean hyphal width of no greater than about 20 microns (um), or no greater than about 15 microns. In some embodiments, an aerial mycelium of the present disclosure has a mean hyphal width within a range of about 0.1 micron to about 20 microns, about 0.1 micron to about 15 microns, or about 0.2 microns to about 15 microns, or any range between each of these values.

"Open volume" as used herein refers to the ratio of the volume of interstices of a mycelium to the volume of its mass. Open volume can be measured by helium pycnometry, see, e.g., Understanding Material Characteristics Through Signature Traits from Helium Pycnometry, Huong Giang T. Nguyen, Jarod C. Horn, Matthew Bleakney, Daniel W. Siderius, and Laura Espinal, published online Jan. 30, 2019. Open volume can also be measured using confocal microscopy, where a 3D volume of the hyphal matrix is imaged according to normal protocols used by people of ordinary skill in confocal microscopy. Then image analysis tools are used to measure the volume fraction (BoneJ, implemented in ImageJ).

In some aspects, an aerial mycelium of the present disclosure can be characterized as having a "volume fraction." In some embodiments, an aerial mycelium of the present disclosure can have a volume fraction of at least about 50% (v/v), at least about 60%, or at least about 70% (v/v). In some embodiments, an aerial mycelium of the present disclosure can have a volume fraction within a range of about 50% to about 90%, or about 60% to about 80%. In some embodiments, the aerial mycelium having a volume fraction is a dried aerial mycelium. In some further embodiments, the dried aerial mycelium has a moisture content of less than about 10% (w/w).

In some aspects, an aerial mycelium of the present disclosure can be characterized as having a median pore diameter. In some embodiments, an aerial mycelium of the present disclosure can have a median pore diameter within a range of about 10 microns to about 50 microns, about 15 microns to about 45 microns, or about 20 microns to about 35 microns.

As disclosed herein, an aerial mycelium of the present disclosure comprises a growth grain. As further disclosed herein, an aerial mycelium can be characterized by its direction of mycelial growth. The growth grain is generally aligned along a first axis, which may be referred to herein as an "aerial mycelial growth axis." The orientation of the growth grain may be evident at a macroscopic scale. The orientation of the growth grain may be made more evident by the ease with which the aerial mycelium panel tears along this growth grain, in analogy to the grain of a cut of meat. When looking microscopically, the growth grain may be visible as a function of aggregations of hyphae that are oriented into larger aligned structures. Accordingly, physical properties of an aerial mycelium of the present disclosure can vary depending on how a physical (e.g., a mechanical) test or step is performed relative to the growth grain or to the first axis. In some non-limiting embodiments, a physical property of an aerial mycelium can be assessed in a direction parallel to the first axis, in a direction perpendicular to the first axis, or both. In other non-limiting examples, a physical property of an aerial mycelium can be assessed with the growth grain, against the growth grain, or both. Such physical properties can include Kramer shear force, ultimate tensile strength and compressive modulus, compressive stress, and the like.

In some embodiments, a mycelium of the present disclosure is characterized as having a Kramer shear force. "Kramer shear force" as would be readily understood by a person of ordinary skill in the art in the food industry, is mechanical technique of measuring hardness and cohesiveness of food, and can be used for providing an indicator of texture (see Muscle Foods: Meat Poultry and Seafood Technology, by B. C. Breidenstein, D. M. Kinsman and A. W. Kotula; Chapter 11, Quality Characteristics; Springer Science & Business Media, Mar. 9, 2013; see also, Comparison Between Allo-Kramer and Warner Bratzler Devices to Assess Rabbit Meat Tenderness; by M. Bianchi, M. Petracci, M. Pascual and C. Cavani, Mar. 15, 2016, the entire contents of which are hereby incorporated by reference in its entirety, to the extent not inconsistent with this disclosure). A Kramer shear force of a material can be obtained as standard output from a Kramer shear cell test and reported as a force-to-mass ratio, expressed in maximum kilograms of force per gram of material (kg/g). The maximum kilograms of force value can be taken from the peak of the Load-Extension curve recorded from a load cell.

Thus, in some embodiments, an aerial mycelium of the present disclosure, or an edible product containing an aerial mycelium of the present disclosure, including but not limited to an edible food product or food ingredient, can have a Kramer shear force of less than about 30 kg/g, of less than about 25 kg/g, of less than about 20 kg/g, of less than about 15 kg/g, of less than about 10 kg/g, or less than about 6 kg/g. In some further embodiments, an aerial mycelium of the present disclosure, or an edible product containing an aerial mycelium of the present disclosure, including but not limited to an edible food product or food ingredient, can have a Kramer shear force of no greater than about 5 kg/g, no greater than about 4 kg/g, no greater than about 3 kg/g or no greater than about 2 kg/g. In some further embodiments, an aerial mycelium of the present disclosure, or an edible product containing an aerial mycelium of the present disclosure, including but not limited to an edible food product or food ingredient, can have a Kramer shear force of at least about 0.1 kg/g, at least about 0.2 kg/g, at least about 0.3 kg/g, at least about 0.4 kg/g or at least about 0.5 kg/g. In yet some further embodiments, an aerial mycelium of the present disclosure, or an edible product containing an aerial mycelium of the present disclosure, including but not limited to an edible food product or food ingredient, can have a Kramer shear force of within a range of about 1 to about 15 kg/g, or within a range of about 2 to about 10 kg/g. In yet still further embodiments, an aerial mycelium of the present disclosure, or an edible product containing an aerial mycelium of the present disclosure, including but not limited to an edible food product or food ingredient, can have a Kramer shear force of about 1 kg/g, of about 2 kg/g, of about 3 kg/g, of about 4 kg/g, of about 5 kg/g, of about 6 kg/g, of about 7 kg/g, of about 8 kg/g, of about 9 kg/g, of about 10 kg/g, of about 11 kg/g, of about 12 kg/g, of about 13 kg/g, of about 14 kg/g or of about 15 kg/g, or any range therebetween.

In some embodiments, an aerial mycelium of the present disclosure, or an edible product containing an aerial mycelium of the present disclosure, including but not limited to an edible food product or food ingredient, can have a Kramer shear force in the dimension parallel to the direction of aerial mycelial growth of no greater than about 6 kg/g, no greater than about 5 kg/g, no greater than about 4 kg/g, no greater than about 3 kg/g or no greater than about 2 kg/g. In some embodiments, an aerial mycelium of the present disclosure is characterized as having a native Kramer shear force value in the dimension parallel to the direction of aerial mycelial growth of within a range of about 1.5 kg/g to about 5.5 kg/g. In some more particular embodiments, the aerial mycelium of the present disclosure has a native Kramer shear force in the dimension parallel to the direction of aerial mycelial growth, of about 1.5 kg/g, about 1.6 kg/g, about 1.7 kg/g, about 1.8 kg/g, about 1.9 kg/g, about 2.0 kg/g, about 2.1 kg/g, about 2.2 kg/g, about 2.3 kg/g, about 2.4 kg/g, about 2.5 kg/g, about 2.6 kg/g, about 2.7 kg/g, about 2.8 kg/g, about 2.9 kg/g, about 3.0 kg/g, about 3.1 kg/g, about 3.2 kg/g, about 3.3 kg/g, about 3.4 kg/g, about 3.5 kg/g, about 3.6 kg/g, about 3.7 kg/g, about 3.8 kg/g, about 3.9 kg/g, about 4.0 kg/g, about 4.1 kg/g, about 4.2 kg/g, about 4.3 kg/g, about 4.4 kg/g, about 4.5 kg/g, about 4.6 kg/g, about 4.7 kg/g, about 4.8 kg/g, about 4.9 kg/g, about 5.0 kg/g, about 5.1 kg/g, about 5.2 kg/g, about 5.3 kg/g, about 5.4 kg/g or about 5.5 kg/g, or any range therebetween.

In some embodiments, an aerial mycelium of the present disclosure can have a native Kramer shear force in a dimension substantially parallel to the growth grain, wherein the native Kramer shear force in the dimension substantially parallel to the growth grain is within a range of about 1 kilogram/gram (kg/g) to about 3 kg/g. In some further embodiments, the aerial mycelium can have a native Kramer shear force of at most about 2.5 kg/g, or at most about 2 kg/g.

In some embodiments, an aerial mycelium of the present disclosure, or an edible product containing an aerial mycelium of the present disclosure, including but not limited to an edible food product or food ingredient, can have a Kramer shear force in the dimension perpendicular to the direction of aerial mycelial growth of no greater than about 9 kg/g, no greater than about 8 kg/g, no greater than about 7 kg/g, no greater than about 6 kg/g, no greater than about 5 kg/g, no greater than about 4 kg/g, no greater than about 3 kg/g or no greater than about 2 kg/g. In some further embodiments, an aerial mycelium of the present disclosure can have a native Kramer shear force in the dimension perpendicular to the direction of aerial mycelial growth, of within a range of about 2.5 to about 9.0 kg/g. In some more particular embodiments, the aerial mycelium of the present disclosure has a native Kramer shear force in the dimension perpendicular to the direction of aerial mycelial growth, of about 2.5 kg/g, about 2.6 kg/g, about 2.7 kg/g, about 2.8 kg/g, about 2.9 kg/g, about 3.0 kg/g, about 3.1 kg/g, about 3.2 kg/g, about 3.3 kg/g, about 3.4 kg/g, about 3.5 kg/g, about 3.6 kg/g, about 3.7 kg/g, about 3.8 kg/g, about 3.9 kg/g, about 4.0 kg/g, about 4.1 kg/g, about 4.2 kg/g, about 4.3 kg/g, about 4.4 kg/g, about 4.5 kg/g, about 4.6 kg/g, about 4.7 kg/g, about 4.8 kg/g, about 4.9 kg/g, about 5.0 kg/g, about 5.1 kg/g, about 5.2 kg/g, about 5.3 kg/g, about 5.4 kg/g, about 5.5 kg/g, about 5.6 kg/g, about 5.7 kg/g, about 5.8 kg/g, about 5.9 kg/g, about 6.0 kg/g, about 6.1 kg/g, about 6.2 kg/g, about 6.3 kg/g, about 6.4 kg/g, about 6.5 kg/g, about, 6.6 kg/g, about 6.7 kg/g, about 6.8 kg/g, about 6.9 kg/g, about 7.0 kg/g, about 7.1 kg/g, about 7.2 kg/g, about 7.3 kg/g, about 7.4 kg/g, about 7.5 kg/g, about 7.6 kg/g, about 7.7 kg/g, about 7.8 kg/g, about 7.9 kg/g, about 8.0 kg/g, about 8.1 kg/g, about 8.2 kg/g, about 8.3 kg/g, about 8.4 kg/g, about 8.5 kg/g, about 8.6 kg/g, about 8.7 kg/g, about 8.8 kg/g, about 8.9 kg/g or about 9.0 kg/g, or any range therebetween.

In some further embodiments, an oven-dried aerial mycelium of the present disclosure can have a Kramer shear force in the dimension parallel to the direction of aerial mycelial growth, of within a range of about 50 kg/g to about 120 kg/g. In some more particular embodiments, the oven-dried aerial mycelium of the present disclosure has a Kramer shear force in the dimension parallel to the direction of aerial mycelial growth of about 50 kg/g, about 51 kg/g, about 52 kg/g, about 53 kg/g, about 54 kg/g, about 55 kg/g, about 56 kg/g, about 57 kg/g, about 58 kg/g, about 59 kg/g, about 60 kg/g, about 61 kg/g, about 62 kg/g, about 63 kg/g, about 64, kg/g, about 65 kg/g, about 66 kg/g, about 67 kg/g, about 68 kg/g, about 69 kg/g, about 70 kg/g, about 71 kg/g, about 72 kg/g, about 73 kg/g, about 74 kg/g, about 75 kg/g, about 76 kg/g, about 77 kg/g, about 78 kg/g, about 79 kg/g, about 80 kg/g, about 81 kg/g, about 82 kg/g, about 83 kg/g, about 84, kg/g, about 85 kg/g, about 86 kg/g, about 87 kg/g, about 88 kg/g, about 89 kg/g, about 90 kg/g, about 91 kg/g, about 92 kg/g, about 93 kg/g, about 94 kg/g, about 95 kg/g, about 96 kg/g, about 97 kg/g, about 98 kg/g, about 99 kg/g, about 100 kg/g, about 101 kg/g, about 102 kg/g, about 103 kg/g, about 104, kg/g, about 105 kg/g, about 106 kg/g, about 107 kg/g, about 108 kg/g, about 109 kg/g, about 110 kg/g, about 111 kg/g, about 112 kg/g, about 113 kg/g, about 114, kg/g, about 115 kg/g, about 116 kg/g, about 117 kg/g, about 118 kg/g, about 119 kg/g or about 120 kg/g, or any range therebetween. Thus, in some embodiments, an aerial mycelium of the present disclosure can have a native Kramer shear force of greater than about 100 kg/g of aerial mycelium.

Hyphal alignments can be measured by methods known in the art (e.g., Boudaoud A. et al., FibrilTool, an ImageJ plug-in to quantify fibrillar structures in raw microscopy images, Nature Protocols, 9, 457-463, 2014, the entire contents of which are hereby incorporated by reference in their entirety to the extent not inconsistent with the content of this disclosure), which outputs strengths of hyphal alignment as fractional anisotropy, which is a scaled value from 0 (0%, absolute isotropy) to 1 (100%, absolute anisotropy). An aerial mycelium of the present disclosure can have a fractional anisotropy of at least about 5%, of at least about 10%, of at least about 40%, of at least about 50%, of at least about 60%, of at least about 70%, of at least about 80%, of at least about 90%, or in some embodiments, at most about 95%.

In some embodiments, an aerial mycelium of the present disclosure is characterized as having an ultimate tensile strength In some embodiments, an aerial mycelium can have an ultimate tensile strength in a dimension substantially parallel to the growth grain after drying the aerial mycelium to a final moisture content of less than about 10% (w/w), wherein the ultimate tensile strength in the dimension substantially parallel to the growth grain after the drying of the aerial mycelium to a final moisture content of less than about 10% (w/w) is no greater than about 50 pounds per square inch (psi). In some embodiments, the ultimate tensile strength in the dimension substantially parallel to the growth grain after the drying of the aerial mycelium to a final moisture content of less than about 10% (w/w) is no greater than about 40 psi.

In some embodiments, an aerial mycelium of the present disclosure is characterized as having an ultimate tensile strength. In some embodiments, an aerial mycelium of the present disclosure has a native ultimate tensile strength of no greater than about 5 psi, no greater than about 4 psi, no greater than about 3 psi, or no greater than about 2 psi. In some embodiments, an aerial mycelium of the present disclosure has a native ultimate tensile strength of no greater than about 1.5 psi, no greater than about 1.4 psi, no greater than about 1.3 psi, no greater than about 1.2 psi, or no greater than about 1.1 psi. In some embodiments, an aerial mycelium of the present disclosure has a native ultimate tensile strength of at least about 0.1 psi, at least about 0.2 psi, or at least about 0.3 psi.

In some embodiments, the ultimate tensile strength of the aerial mycelia of the present disclosure can be characterized in the direction parallel to the direction of aerial mycelial growth, perpendicular to the direction of mycelial growth, or as a ratio thereof.

In some embodiments, an aerial mycelium of the present disclosure has a native ultimate tensile strength in the dimension parallel to the direction of aerial mycelial growth of no greater than about 5 psi, no greater than about 4 psi, no greater than about 3 psi, or no greater than about 2 psi. In some embodiments, an aerial mycelium of the present disclosure has a native ultimate tensile strength in the dimension parallel to the direction of aerial mycelial growth of no greater than about 1.9 psi, no greater than about 1.8 psi, no greater than about 1.7 psi, or no greater than about 1.6 psi. In some embodiments, an aerial mycelium of the present disclosure has a native ultimate tensile strength in the dimension parallel to the direction of aerial mycelial growth of at least about 0.1 psi, at least about 0.2 psi, at least about 0.3 psi, at least about 0.4 psi or at least about 0.5 psi. In some embodiments, an aerial mycelium of the present disclosure has a native ultimate tensile strength in the dimension parallel to the direction of aerial mycelial growth within a range of about 0.1 psi to about 3 psi, about 1.2 to about 2 psi, or about 0.5 psi to about 1.6 psi. In some more particular embodiments, an aerial mycelium of the present disclosure has a native ultimate tensile strength in the dimension parallel to the direction of aerial mycelial growth, of about 0.1 psi, about 0.2 psi, about 0.3 psi, about 0.4 psi, about 0.5 psi, about 0.6 psi, about 0.7 psi, about 0.8 psi, about 0.9 psi, about 1.0 psi, about 1.1 psi, about 1.2 psi, about 1.3 psi, about 1.4 psi, about 1.5 psi or about 1.6 psi, or any range therebetween.

In some embodiments, an aerial mycelium of the present disclosure has a native ultimate tensile strength in the dimension perpendicular to the direction of aerial mycelial growth of no greater than about 3 psi, no greater than about 2.5 psi, no greater than about 2 psi, no greater than about 1.5 psi, no greater than about 1 psi or no greater than about 0.5 psi. In some embodiments, an aerial mycelium of the present disclosure has a native ultimate tensile strength in the dimension perpendicular to the direction of aerial mycelial growth within a range of about 0.1 to about 2 psi, about 0.1 to about 1.5 psi, about 0.1 to about 1 psi, about 0.1 to about 0.5 psi, about 0.2 psi to about 2 psi, about 0.2 to about 1.5 psi, about 0.2 to about 1 psi, about 0.2 to about 0.5 psi, or about 0.3 psi to about 0.5 psi. In some more particular embodiments, the aerial mycelium of the present disclosure has a native ultimate tensile strength in the dimension perpendicular to the direction of aerial mycelial growth of about 0.3 psi, about 0.4 psi or about 0.5 psi, or any range therebetween.

In some embodiments, an aerial mycelium of the present disclosure has a native ultimate tensile strength in the dimension parallel to the direction of aerial mycelial growth that is at most about 10-fold greater, at most about 5-fold greater, at most about 4-fold greater, at most about 3-fold greater, or at most about 2-fold greater than a native ultimate tensile strength in the dimension perpendicular to the direction of aerial mycelial growth. In some embodiments, an aerial mycelium of the present disclosure has a native ultimate tensile strength in the dimension parallel to the direction of aerial mycelial growth, and a native ultimate tensile strength in the dimension perpendicular to the direction of aerial mycelial growth, in a ratio of about 2:1, about 2.5:1, about 3:1, about 3.5:1 or about 4:1. In some more particular embodiments, an aerial mycelium of the present disclosure has a native ultimate tensile strength in the dimension parallel to the direction of aerial mycelial growth, and a native ultimate tensile strength in the dimension perpendicular to the direction of aerial mycelial growth, in a ratio of about 3:1.

In some embodiments, an aerial mycelium of the present disclosure can have a native ultimate tensile strength in a dimension substantially parallel to the growth grain, wherein the native ultimate tensile strength in the dimension substantially parallel to the growth grain is no greater than about 3 psi or is no greater than about 2 psi. In some embodiments, the aerial mycelium comprises a perimeter, wherein the native ultimate tensile strength is at least about 1 inch from the perimeter, at least about 2 inches from the perimeter, or at least about 3 inches from the perimeter. "Perimeter" refers to the boundary of the sample in the X and Y dimension.

In some embodiments, an aerial mycelium of the present disclosure can have a native ultimate tensile strength in a dimension substantially parallel to the growth grain and a native ultimate tensile strength in a dimension substantially perpendicular to the growth grain, wherein the native ultimate tensile strength in the dimension substantially parallel to the growth grain is at least about 2-fold greater than the native ultimate tensile strength in the dimension substantially perpendicular to the growth grain. In some embodiments, the aerial mycelium can have a native ultimate tensile strength in the dimension substantially parallel to the growth grain that is at most about 10-fold greater than the native ultimate tensile strength in the dimension substantially perpendicular to the growth grain. In some further embodiments, the aerial mycelium can have a native ultimate tensile strength in the dimension substantially parallel to the growth grain that is at most about 5-fold greater than the native ultimate tensile strength in the dimension substantially perpendicular to the growth grain. In some embodiments, the aerial mycelium comprises a perimeter, and each said native ultimate tensile strength is at least about 1 inch from the perimeter, at least about 2 inches from the perimeter, or at least about 3 inches from the perimeter.

In some embodiments, an aerial mycelium of the present disclosure has a native ultimate tensile strength of about 16 psi. In some embodiments, the aerial mycelium can be compressed to a mean density of about 0.4 g/cm$^3$ and an ultimate tensile strength of about 310 psi.

In some embodiments, an aerial mycelium of the present disclosure is characterized as having a modulus of elasticity. In some embodiments, an aerial mycelium can have a modulus of elasticity of no greater than about 150 psi, of no greater than about 125 psi, or of no greater than about 100 psi.

In some embodiments, an aerial mycelium of the present disclosure is characterized as having a compressive modulus and a compressive stress. Aerial mycelia of the present disclosure were evaluated for compressive modulus and compressive stress using specimens obtained from edge tissue, center tissue, or both. "Edge tissue" means tissue that is sampled within about 1 inch of the perimeter. "Center tissue" means material drawn from anywhere between the very center (equidistant from the perimeter in both X and Y) and up to 1 inch from the perimeter. Specimens were evaluated by compression in the direction parallel to the direction of mycelial growth, perpendicular to mycelial growth, or both.

Compressive modulus and compressive stress were determined for both edge and center tissue specimens upon compression to 10% strain in the direction parallel and perpendicular to the direction of mycelial growth. Accordingly, in some embodiments, an aerial mycelium of the present disclosure can be characterized as having a native compressive modulus at 10% strain of no greater than about 10 psi, no greater than about 5 psi, no greater than about 4 psi or no greater than about 3 psi. In some embodiments, an aerial mycelium of the present disclosure can be characterized as having a native compressive modulus at 10% strain of within a range of about 0.01 psi to about 5 psi, about 0.01 to about 4 psi, about 0.01 to about 3.5 psi, about 0.01 to about 3 psi, about 0.01 to about 2.5 psi, about 0.05 psi to about 5 psi, about 0.05 to about 4 psi, about 0.05 to about 3.5 psi, about 0.05 to about 3 psi, about 0.05 to about 2.5 psi, about 0.1 psi to about 5 psi, about 0.1 to about 4 psi, about 0.1 to about 3.5 psi, about 0.1 to about 3 psi, about 0.1 to about 2.5 psi, about 0.1 to about 2 psi, about 0.5 psi to about 0.7 psi, or within a range of about 0.58 psi to about 0.62 psi. In some embodiments, an aerial mycelium can be characterized as having a native compressive modulus at 10% strain of about 0.01 psi, about 0.02 psi, about 0.03 psi, about 0.04 psi, 0.50 psi, about 0.51 psi, about 0.52 psi about 0.53 psi, about 0.54 psi, about 0.55 psi, about 0.56 psi, about 0.57 psi, about 0.58 psi, about 0.59 psi, about 0.60 psi, about 0.61 psi, about 0.62 psi, about 0.63 psi, about 0.64 psi, about 0.65 psi, about 0.66 psi, about 0.67 psi, about 0.69 psi, about 0.70 psi, about 0.8 psi, about 0.85 psi, about 0.9 psi, about 0.95 psi, about 1 psi, about 1.1 psi, about 1.2 psi, about 1.3 psi, about 1.4 psi, about 1.5 psi, about 1.6 psi, about 1.7 psi, about 1.8 psi, about 1.9 psi, about 2 psi, about 2.1 psi, about 2.2 psi, about 2.3 psi, about 2.4 psi, about 2.5 psi, about 2.6 psi, about 2.7 psi, about 2.8 psi, about 2.9 psi or about 3 psi; or any ranges therebetween. In some embodiments, an aerial mycelium can be characterized as having a mean native compressive modulus at 10% strain of no greater than about 5 psi, no greater than about 4 psi, no greater than about 3 psi or no greater than about 2 psi. In some embodiments, an aerial mycelium of the present disclosure can be characterized as having a mean native compressive modulus at 10% strain within a range of about 0.1 psi to about 1.8 psi; or of about 1 psi. In some aspects, an aerial mycelium of the present disclosure can be characterized as having a native compressive stress at 10% strain of no greater than about 1 psi. In some further embodiments, an aerial mycelium can be characterized as having a native compressive stress at 10% strain within a range of about 0.01 psi to about 0.5 psi, about 0.01 psi to about 0.4 psi, or about 0.01 psi to about 0.3 psi. In some embodiments, an aerial mycelium can be characterized as having a native compressive stress at 10% strain within a range of about 0.05 psi to about 0.15 psi, or about 0.08 psi to about 0.13 psi. In some embodiments, an aerial mycelium has a native compressive stress at 10% strain of about 0.05 psi, about 0.06 psi, about 0.07 psi, about 0.08 psi, about 0.09 psi, about 0.10 psi, about 0.11 psi, about 0.12 psi, about 0.13 psi, about 0.14 psi, about 0.15 psi, or any ranges therebetween. In some embodiments, an aerial mycelium can be characterized as having a mean native compressive stress at 10% strain of no greater than about 1 psi, no greater than about 0.5 psi, or no greater than about 0.25 psi. In some embodiments, an aerial mycelium can be characterized as having a mean native compressive stress at 10% strain within a range of about 0.01 psi to about 1 psi, about 0.01 psi to about 0.5 psi, about 0.01 psi to about 0.25, about 0.01 psi to about 0.2 psi, about 0.02 psi to about 1 psi, about 0.02 psi to about 0.5 psi, about 0.02 psi to about 0.25, or about 0.02 psi to about 0.2 psi; or of about 0.1 psi.

Compressive modulus and compressive stress were determined for both edge and center tissue specimens upon compression to 10% strain in the direction parallel to the direction of mycelial growth. Accordingly, in some embodiments, an aerial mycelium can be characterized as having a native compressive modulus at 10% strain in a direction parallel to the direction of mycelial growth of no greater than about 10 psi, no greater than about 5 psi, or no greater than about 4 psi. In some embodiments, an aerial mycelium can be characterized as having a native compressive modulus at 10% strain in a direction parallel to the direction of mycelial growth within a range of about 0.5 psi to about 5 psi, about 0.5 to about 4 psi, about 0.5 to about 3.5 psi, about 0.5 to about 3 psi, about 0.5 to about 2.5 psi, or about 0.5 to about 2 psi. In some embodiments, an aerial mycelium can be characterized as having a mean native compressive modulus at 10% strain in a direction parallel to the direction of mycelial growth of no greater than about 5 psi, no greater than about 4 psi, no greater than about 3 psi, or no greater than about 2.5 psi. In some embodiments, an aerial mycelium can be characterized as having a mean native compressive modulus at 10% strain in a direction parallel to the direction of mycelial growth within a range of about 0.1 psi to about 3 psi, about 0.2 psi to about 3 psi, about 0.3 psi to about 3 psi, about 0.4 psi to about 3 psi, about 0.5 psi to about 3 psi, about 0.5 psi to about 2.5, about 1 to about 2 psi; or of about 1.5 psi. In some further embodiments, an aerial mycelium can be characterized as having a native compressive stress at 10% strain in a direction parallel to the direction of mycelial growth of no greater than about 1 psi, no greater than about 0.5 psi, or no greater than about 0.3 psi. In some embodiments, an aerial mycelium can be characterized as having a native compressive stress at 10% strain in a direction parallel to the direction of mycelial growth within a range of about 0.01 psi to about 1 psi, about 0.01 psi to about 0.5 psi, about 0.01 psi to about 0.4 psi, or about 0.05 psi to about 0.3 psi. In some embodiments, an aerial mycelium can be characterized as having a mean native compressive stress at 10% strain in a direction parallel to the direction of mycelial growth of no greater than about 1 psi, no greater than about 0.5 psi, or no greater than about 0.25 psi. In some embodiments, an aerial mycelium can be characterized as having a mean native compressive stress at 10% strain in a direction substantially parallel to the direction of mycelial growth within a range of about 0.05 psi to about 0.25 psi, about 0.1 psi to about 0.2 psi; or of about 0.15 psi.

Compressive modulus and compressive stress were determined for both edge and center tissue specimens upon compression to 10% strain in the direction perpendicular to the direction of mycelial growth. Accordingly, in some embodiments, an aerial mycelium can be characterized as having a native compressive modulus at 10% strain in a direction perpendicular to the direction of mycelial growth of no greater than about 2 psi, no greater than about 1.5 psi, no greater than about 1 psi, or no greater than about 0.75 psi. In some embodiments, an aerial mycelium can be characterized as having a native compressive modulus at 10% strain in a direction perpendicular to the direction of mycelial growth within a range of about 0.1 psi to about 2 psi, about 0.1 psi to about 1.5 psi, about 0.1 psi to about 1 psi, or about 0.1 psi to about 0.75 psi. In some embodiments, an aerial mycelium can be characterized as having a mean native compressive modulus at 10% strain in a direction perpendicular to the direction of mycelial growth of no greater than about 1.5 psi, no greater than about 1 psi, or no greater than about 0.5 psi. In some embodiments, an aerial mycelium can be characterized as having a mean native compressive modulus at 10% strain in a direction perpendicular to the direction of mycelial growth within a range of about 0.1 psi to about 1.5 psi, about 0.1 psi to about 1 psi, about 0.1 psi to about 0.5 psi, about 0.1 to about 0.4 psi; or of about 0.3 psi. In some further embodiments, an aerial mycelium can be characterized as having a native compressive stress at 10% strain in a direction perpendicular to the direction of mycelial growth of no greater than about 0.3 psi, no greater than about 0.2 psi, or no greater than about 0.1 psi. In some embodiments, an aerial mycelium can be characterized as having a native compressive stress at 10% strain in a direction perpendicular to the direction of mycelial growth within a range of about 0.01 to about 0.3 psi, within a range of about 0.01 to about 0.2 psi, or about 0.01 psi to about 0.1 psi. In some embodiments, an aerial mycelium can be characterized as having a mean native compressive stress at 10% strain in a direction perpendicular to the direction of mycelial growth of no greater than about 0.15 psi, or no greater than about 0.1 psi. In some embodiments, an aerial mycelium can be characterized as having a mean native compressive stress at 10% strain in a direction perpendicular to the direction of mycelial growth within a range of about 0.01 psi to about 0.15 psi, about 0.01 to about 0.1 psi; or of about 0.05 psi.

Compressive modulus and compressive stress were determined for center tissue specimens upon compression to 10% strain in the direction parallel to the direction of mycelial growth. As disclosed herein, an aerial mycelium of the present disclosure can be processed to remove edge tissue. Accordingly, in some embodiments, an aerial mycelium (or center tissue of an aerial mycelium) can be characterized as having a native compressive modulus at 10% strain in a direction parallel to the direction of mycelial growth of no greater than about 10 psi, no greater than about 9 psi, no greater than about 8 psi, no greater than about 7 psi, no greater than about 6 psi, no greater than about 5 psi, no greater than about 4 psi or no greater than about 3 psi. In some embodiments, an aerial mycelium (or center tissue of an aerial mycelium) can be characterized as having a native compressive modulus at 10% strain in a direction parallel to the direction of mycelial growth within a range of about 0.5 psi to about 10 psi, about 0.5 psi to about 7.5 psi, about 0.5 psi to about 5 psi, about 0.5 psi to about 4 psi, about 0.5 psi to about 3.5 psi, about 0.5 psi to about 3 psi, about 0.5 psi to about 2.5 psi, about 1 psi to about 3 psi, or about 1 psi to about 2.5 psi. In some embodiments, an aerial mycelium (or center tissue of an aerial mycelium) can be characterized as having a mean native compressive modulus at 10% strain in a direction parallel to the direction of mycelial growth of no greater than about 8 psi, no greater than about 7 psi, no greater than about 6 psi, no greater than about 5 psi, no greater than about 4 psi or no greater than about 3 psi. In some embodiments, an aerial mycelium (or center tissue of an aerial mycelium) can be characterized as having a mean native compressive modulus at 10% strain in a direction parallel to the direction of mycelial growth within a range of about 1 psi to about 5 psi, about 1 psi to about 4 psi, about 1 psi to about 3 psi; or of about 1.0 psi, about 1.1 psi, about 1.2 psi, about 1.3 psi, about 1.4 psi, about 1.5 psi, about 1.6 psi, about 1.7 psi, about 1.8 psi, about 1.9 psi, about 2.0 psi, or about 2.1 psi, about 2.2 psi, about 2.3 psi, about 2.4 psi or about 2.5 psi; or any ranges therebetween. In some further embodiments, an aerial mycelium (or center tissue of an aerial mycelium) can be characterized as having a native compressive stress at 10% strain in a direction parallel to the direction of mycelial growth of no greater than about 1 psi, no greater than about 0.9 psi, no greater than about 0.8 psi, no greater than about 0.7 psi, no greater than about 0.6 psi, no greater than about 0.5 psi, no greater than about 0.4 psi, no greater than about 0.3 psi or no greater than about 0.2 psi. In some embodiments, an aerial mycelium (or center tissue of an aerial mycelium) can be characterized as having a native compressive stress at 10% strain in a direction parallel to the direction of mycelial growth within a range of about 0.05 psi to about 1 psi, about 0.05 psi to about 0.75 psi, about 0.05 to about 0.5 psi, about 0.05 psi to about 0.4 psi, about 0.05 psi to about 0.3 psi, about 0.05 to about 0.2 psi, about 0.1 psi to about 0.5 psi or about 0.1 psi to about 0.4 psi, about 0.1 psi to about 0.3 psi or about 0.1 to about 0.2 psi. In some embodiments, an aerial mycelium (or center tissue of an aerial mycelium) can be characterized as having a mean native compressive stress at 10% strain in a direction parallel to the direction of mycelial growth of no greater than about 0.8 psi, no greater than about 0.7 psi, no greater than about 0.6 psi, no greater than about 0.5 psi, no greater than about 0.4 psi or no greater than about 0.3 psi. In some embodiments, an aerial mycelium (or center tissue of an aerial mycelium) can be characterized as having a mean native compressive stress at 10% strain in a direction parallel to the direction of mycelial growth within a range of about 0.05 psi to about 0.8 psi, about 0.05 psi to about 0.7 psi, about 0.05 psi to about 0.6 psi, about 0.05 psi to about 0.5 psi, about 0.05 psi to about 0.4 psi, about 0.05 psi to about 0.3 psi, about 0.05 to about 0.25 psi, about 0.05 psi to about 0.2 psi, about 0.1 psi to about 0.8 psi, about 0.1 psi to about 0.7 psi, about 0.1 psi to about 0.6 psi, about 0.1 psi to about 0.5 psi, about 0.1 psi to about 0.4 psi, about 0.1 psi to about 0.3 psi, about 0.1 to about 0.25 psi, or about 0.1 psi to about 0.2 psi; or of about 0.05 psi, about 0.06 psi, about 0.07 psi, about 0.08 psi, about 0.09 psi, about 0.1 psi, about 0.15 psi, about 0.2 psi, about 0.25 psi, or about 0.3 psi, or any ranges therebetween.

Compressive modulus and compressive stress were determined for center tissue specimens upon compression to 10% strain in the direction perpendicular to the direction of mycelial growth. Accordingly, in some embodiments, an aerial mycelium (or center tissue of an aerial mycelium) can be characterized as having a native compressive modulus at 10% strain in a direction perpendicular to the direction of mycelial growth of no greater than about 2 psi, no greater than about 1.5 psi, no greater than about 1 psi, no greater than about 0.75 psi, or no greater than about 0.5 psi. In some embodiments, an aerial mycelium (or center tissue of an aerial mycelium) can be characterized as having a native compressive modulus at 10% strain in a direction perpendicular to the direction of mycelial growth within a range of about 0.01 to about 2 psi, about 0.01 to about 1.5 psi, about 0.01 to about 1 psi, about 0.01 to about 0.9 psi, about 0.01 to about 0.8 psi, about 0.01 to about 0.7 psi, about 0.05 to about 2 psi, about 0.05 to about 1.5 psi, about 0.05 to about 1 psi, about 0.05 to about 0.9 psi, about 0.05 to about 0.8 psi, about 0.05 to about 0.7 psi, about 0.1 to about 2 psi, about 0.1 to about 1.5 psi, about 0.1 to about 1 psi, about 0.1 to about 0.9 psi, about 0.1 to about 0.8 psi or about 0.1 to about 0.7 psi. In some embodiments, an aerial mycelium (or center tissue of an aerial mycelium) can be characterized as having a mean native compressive modulus at 10% strain in a direction perpendicular to the direction of mycelial growth of no greater than about 1.5 psi, no greater than about 1 psi or no greater than about 0.75 psi. In some embodiments, an aerial mycelium (or center tissue of an aerial mycelium) can be characterized as having a mean native compressive modulus at 10% strain in a direction perpendicular to the direction of mycelial growth within a range of about 0.01 to about 2 psi, about 0.01 to about 1.5 psi, about 0.01 to about 1 psi, about 0.01 to about 0.9 psi, about 0.01 to about 0.8 psi, about 0.01 to about 0.7 psi, about 0.05 to about 2 psi, about 0.05 to about 1.5 psi, about 0.05 to about 1 psi, about 0.05 to about 0.9 psi, about 0.05 to about 0.8 psi, about 0.05 to about 0.7 psi, about 0.1 psi to about 1.5 psi, about 0.1 psi to about 1 psi, about 0.1 psi to about 0.9 psi, about 0.1 psi to about 0.8 psi, about 0.1 psi to about 0.7 psi, or about 0.1 psi to about 0.6 psi. In some further embodiments, an aerial mycelium (or center tissue of an aerial mycelium) can be characterized as having a native compressive stress at 10% strain in a direction perpendicular to the direction of mycelial growth of no greater than about 0.5 psi, no greater than about 0.4 psi, no greater than about 0.3 psi, no greater than about 0.2 psi, no greater than about 0.1 psi, no greater than about 0.09 psi, no greater than about 0.08 psi, no greater than about 0.07 psi, no greater than about 0.06 psi, no greater than about 0.05 psi, no greater than about 0.04 psi or no greater than about 0.03 psi. In some further embodiments, an aerial mycelium (or center tissue of an aerial mycelium) can be characterized as having a native compressive stress at 10% strain in a direction perpendicular to the direction of mycelial growth within a range of about 0.01 to about 0.5 psi, about 0.01 to about 0.4 psi, about 0.01 to about 0.3 psi, about 0.01 to about 0.2 psi, about 0.01 psi to about 0.1 psi, about 0.01 to about 0.09 psi, about 0.01 to about 0.08 psi, about 0.01 psi to about 0.07 psi, about 0.01 psi to about 0.06 psi, about 0.01 to about 0.05 psi, about 0.01 psi to about 0.04 psi, about 0.01 to about 0.03 psi, about 0.02 psi to about 0.1 psi, about 0.02 psi to about 0.09 psi, about 0.02 psi to about 0.08 psi, about 0.02 to about 0.07 psi, about 0.02 to about 0.06 psi, or about 0.02 to about 0.05 psi. In some embodiments, an aerial mycelium (or center tissue of an aerial mycelium) can be characterized as having a mean native compressive stress at 10% strain in a direction perpendicular to the direction of mycelial growth of no greater than about 0.3 psi, no greater than about 0.2 psi, or no greater than about 0.1 psi. In some embodiments, an aerial mycelium (or center tissue of an aerial mycelium) can be characterized as having a mean native compressive stress at 10% strain in a direction perpendicular to the direction of mycelial growth within a range of about 0.01 to about 0.3 psi, about 0.01 psi to about 0.2 psi, about 0.01 psi to about 0.1 psi, about 0.01 to about 0.09 psi, about 0.01 to about 0.08 psi, about 0.01 to about 0.07 psi, about 0.01 to about 0.06 psi, about 0.01 to about 0.05 psi, about 0.01 to about 0.04 psi, about 0.01 to about 0.03 psi, about 0.02 psi to about 0.3 psi, about 0.02 psi to about 0.2 psi, about 0.02 psi to about 0.1 psi, about 0.03 psi to about 0.3 psi, about 0.03 psi to about 0.2 psi, or about 0.03 psi to about 0.1 psi; or of about 0.02 psi, about 0.03 psi, about 0.04 psi, about 0.05 psi, about 0.06 psi or about 0.07 psi, or any ranges therebetween.

Aerial mycelia of the present disclosure can exhibit a compressive modulus upon compression in the dimension parallel to the direction of mycelial growth that exceeds the compressive modulus upon compression in the dimension perpendicular to the direction of mycelial growth. Thus, in some aspects, an aerial mycelium (or center tissue of an aerial mycelium) of the present disclosure can have a compressive modulus at 10% strain, upon compression in the dimension parallel to the direction of mycelial growth, of at least about 2-fold, at least about 3-fold, at least about 4-fold, at least about 5-fold, at least about 6-fold, at least about 7-fold, at least about 8-fold or at least about 9-fold greater than the compressive modulus at 10% strain upon compression in the dimension perpendicular to mycelial growth, or any range therebetween. In some embodiments, an aerial mycelium (or center tissue of an aerial mycelium) of the present disclosure can have a compressive modulus at 10% strain, upon compression in the dimension parallel to the direction of mycelial growth, of up to about 20-fold greater, or up to about 10-fold greater, than the compressive modulus at 10% strain, upon compression in the dimension perpendicular to mycelial growth.

Similarly, an aerial mycelium (or center tissue of an aerial mycelium) of the present disclosure can exhibit a compressive stress upon compression in the dimension parallel to the direction of mycelial growth that exceeds the compressive stress upon compression in the dimension perpendicular to the direction of mycelial growth. Thus, in some aspects, an aerial mycelium (or center tissue of an aerial mycelium) of the present disclosure can have a compressive stress at 10% strain, upon compression in the dimension parallel to the direction of mycelial growth, of at least about 2-fold, at least about 3-fold, at least about 4-fold or at least about 5-fold greater than the compressive stress at 10% strain upon compression in the dimension perpendicular to mycelial growth, or any range therebetween. In some embodiments, an aerial mycelium (or center tissue of an aerial mycelium) of the present disclosure can have a compressive stress at 10% strain, upon compression in the dimension parallel to the direction of mycelial growth, of up to about 5-fold, 6-fold, up to about 7-fold, up to about 8-fold, up to about 9-fold, up to about 10-fold, up to about 15-fold or up to about 20-fold greater than the compressive stress at 10% strain upon compression in the dimension perpendicular to mycelial growth.

Compressive stress was determined for both edge and center tissue specimens upon compression to about 65% strain, with compression in the direction perpendicular to the direction of mycelial growth. Accordingly, in some embodiments, an aerial mycelium of the present disclosure can be characterized as having a native compressive stress at 65% strain, upon compression in the direction perpendicular to the direction of mycelial growth, of no greater than about 10 psi, no greater than about 5 psi, no greater than about 1 psi, or no greater than about 0.5 psi. In some embodiments, an aerial mycelium of the present disclosure can be characterized as having a native compressive stress at 65% strain, upon compression in the direction perpendicular to the direction of mycelial growth within a range of about 0.01 psi to about 1 psi, about 0.01 psi to about 0.5 psi, about 0.02 psi to about 1 psi, about 0.02 psi to about 0.5 psi, about 0.03 psi to about 1 psi, about 0.03 psi to about 0.5 psi, or about 0.03 psi to about 0.4 psi. In some embodiments, an aerial mycelium of the present disclosure can be characterized as having a mean native compressive stress at 65% strain, upon compression in the direction perpendicular to the direction of mycelial growth, of no greater than about 10 psi, no greater than about 5 psi, no greater than about 1 psi, or no greater than about 0.5 psi. In some embodiments, an aerial mycelium of the present disclosure can be characterized as having a mean native compressive stress at 65% strain, upon compression in the direction perpendicular to the direction of mycelial growth, within a range of about 0.01 psi to about 1 psi, about 0.01 psi to about 0.5 psi, about 0.02 psi to about 1 psi, about 0.02 psi to about 0.5 psi, about 0.03 psi to about 1 psi, about 0.03 psi to about 0.5 psi, about 0.04 psi to about 1 psi, or about 0.04 to about 0.5 psi.

In some embodiments, an aerial mycelium of the present disclosure can have a native compressive modulus at 10% strain in a dimension substantially parallel to the growth grain, wherein the native compressive modulus at 10% strain in the dimension substantially parallel to the growth grain is at most about 5 psi, at most about 4 psi, or at most about 3 psi. In some embodiments, the aerial mycelium comprises a perimeter, and each said native compressive modulus is at least about 1 inch from the perimeter, at least about 2 inches from the perimeter, or at least about 3 inches from the perimeter.

In some embodiments, an aerial mycelium of the present disclosure can have a native compressive modulus at 10% strain in a dimension substantially parallel to the growth grain and a native compressive modulus at 10% strain in a dimension substantially perpendicular to the growth grain, wherein the native compressive modulus at 10% strain in the dimension substantially parallel to the growth grain is at least about 2-fold greater, or is at least about 3-fold greater, than the native compressive modulus at 10% strain in the dimension substantially perpendicular to the growth grain. In some embodiments, the aerial mycelium can have a native compressive modulus at 10% strain in the dimension substantially parallel to the growth grain that is at most about 20-fold greater than the native compressive modulus at 10% strain in the dimension substantially perpendicular to the growth grain, that is at most about 15-fold greater than the native compressive modulus at 10% strain in the dimension substantially perpendicular to the growth grain. In some embodiments, the aerial mycelium comprises a perimeter, and each said native compressive modulus is at least about 1 inch from the perimeter, at least about 2 inches from the perimeter, or at least about 3 inches from the perimeter.

In some embodiments, an aerial mycelium of the present disclosure can have a native compressive stress at 10% strain in a dimension substantially parallel to the growth grain, wherein the native compressive stress at 10% strain in the dimension substantially parallel to the growth grain is at most about 1 psi or is at most about 0.5 psi. In some embodiments, the aerial mycelium comprises a perimeter, and each said native compressive stress is at least about 1 inch from the perimeter, at least about 2 inches from the perimeter, or at least about 3 inches from the perimeter.

In some embodiments, an aerial mycelium of the present disclosure can have a native compressive stress at 10% strain in a dimension substantially parallel to the growth grain and a native compressive stress at 10% strain in a dimension substantially perpendicular to the growth grain, wherein the native compressive stress at 10% strain in the dimension substantially parallel to the growth grain is at least about 2-fold greater than the native compressive stress at 10% strain in the dimension substantially perpendicular to the growth grain. In some embodiments, the aerial mycelium can have a native compressive stress at 10% strain in the dimension substantially parallel to the growth grain that is at most about 20-fold greater, at most about 15-fold greater, at most about 10-fold greater, or at most about 5-fold greater than the native compressive stress at 10% strain in the dimension substantially perpendicular to the growth grain.

In some embodiments, the aerial mycelium comprises a perimeter, and each said native compressive modulus is at least about 1 inch from the perimeter, at least about 2 inches from the perimeter, or at least about 3 inches from the perimeter.

Compressive stress was determined for center tissue specimens upon compression to about 65% strain, with compression in the direction perpendicular to the direction of mycelial growth. Accordingly, in some embodiments, an aerial mycelium (or center tissue of an aerial mycelium) of the present disclosure can be characterized as having a native compressive stress at 65% strain, upon compression in the direction perpendicular to the direction of mycelial growth, of no greater than about 10 psi, no greater than about 5 psi, no greater than about 1 psi, no greater than about 0.5 psi, or no greater than about 0.25 psi. In some embodiments, an aerial mycelium (or center tissue of an aerial mycelium) of the present disclosure can be characterized as having a native compressive stress at 65% strain, upon compression in the direction perpendicular to the direction of mycelial growth, within a range of about 0.01 psi to about 1 psi, about 0.01 psi to about 0.5 psi, about 0.01 psi to about 0.25 psi, about 0.02 psi to about 1 psi, about 0.02 psi to about 0.5 psi, about 0.02 psi to about 0.25 psi, about 0.03 psi to about 1 psi, about 0.03 psi to about 0.5 psi, about 0.03 psi to about 0.25 psi, about 0.04 psi to about 1 psi, about 0.04 to about 0.5 psi, or about 0.04 to about 0.25 psi. In some embodiments, an aerial mycelium (or center tissue of an aerial mycelium) of the present disclosure can be characterized as having a mean native compressive stress at 65% strain, upon compression in the direction perpendicular to the direction of mycelial growth, of no greater than about 10 psi, no greater than about 5 psi, no greater than about 1 psi, no greater than about 0.5 psi, or no greater than about 0.25 psi. In some embodiments, an aerial mycelium (or center tissue of an aerial mycelium) of the present disclosure can be characterized as having a mean native compressive stress at 65% strain, upon compression in the direction perpendicular to the direction of mycelial growth, within a range of about 0.01 psi to about 1 psi, about 0.01 psi to about 0.5 psi, about 0.01 psi to about 0.25 psi, about 0.02 psi to about 1 psi, about 0.02 psi to about 0.5 psi, about 0.02 psi to about 0.25 psi, about 0.02 psi to about 0.2 psi, about 0.03 psi to about 1 psi, about 0.03 psi to about 0.5 psi, about 0.03 psi to about 0.25 psi, about 0.03 psi to about 0.2 psi, about 0.04 psi to about 1 psi, about 0.04 psi to about 0.5 psi, about 0.04 to about 0.25 psi, about 0.04 to about 0.2 psi, about 0.05 psi to about 1 psi, about 0.05 to about 0.5 psi, about 0.05 to about 0.25 psi or about 0.05 psi to about 0.2 psi, or about 0.05 psi to about 0.15 psi.

An aerial mycelium of the present disclosure can be characterized as having an edge comprising an outer perimeter and as having a center that is interior to the edge. Thus, in some aspects, an aerial mycelium can comprise edge tissue, i.e., mycelial tissue occurring at the edge or perimeter of the aerial mycelium. In other aspects, the aerial mycelial panel can be characterized as having center tissue, i.e., tissue occurring interior to the edge of the mycelium. In a non-limiting embodiment, the center tissue comprises aerial mycelial tissue occurring interior to the edge by at least 1 inch, at least 2 inches, at least 3 inches, at least 4 inches, at least 5 or at least 6 inches from said edge. In some embodiments, an aerial mycelium of the present disclosure can be processed or "trimmed" to remove edge tissue. In a non-limiting example, an aerial mycelium (or panel) can be processed by removing up to about 1 inch, up to about 2 inches, or up to about 3 inches or more of edge tissue from the perimeter of the aerial mycelium (or panel). The amount of edge tissue to be removed can be determined based upon factors such as the volume or the physical properties of the original aerial mycelium (or panel), and/or the desired volume or physical properties of the resulting processed tissue.

In some embodiments, there is provided a batch of aerial mycelia. "Batch" as used herein refers to a quantity of goods produced at one time, wherein the quantity of goods produced at one time is at least two (2). In some embodiments, the quantity is at most about 10,000, at most about 5,000, at most about 1000, at most about 500, at most about 100, at most about 50, at most about two dozen or at most about a dozen. A batch of aerial mycelia of the present disclosure can be produced in a growth chamber or other system configured for growing aerial mycelia, or another controlled growth environment. In some embodiments, a batch of aerial mycelia of the present disclosure is produced under a predetermined set of growth conditions.

Thus, in some embodiments, there is provided a batch of aerial mycelia (or aerial mycelial panels). In some embodiments, greater than 50% of the aerial mycelia (or aerial mycelial panels) in said batch conform to having one or more properties. Non-limiting examples of said properties include a native density, a native moisture content, a native thickness, a native volume, absence of a fruiting body, a native compressive modulus, a native compressive stress, a native ultimate tensile strength and/or a native Kramer shear force, wherein each said property can have a preestablished value or range of values. In some further embodiments, greater than 50% of the aerial mycelia (or aerial mycelial panels) in the batch conform to at least two, at least three, at least four, at least five, at least six or more of said properties. In some embodiments, at least about 75% or more of the aerial mycelia (or aerial mycelial panels) in a batch confirm to having at least one, two, three, four, five, six or more of said properties. In some embodiments, an aerial mycelium of a batch of aerial mycelia (or aerial mycelial panels) can have one or more of said properties that are predetermined, e.g., by establishing a set of growth conditions and target values or ranges of values prior to making the aerial mycelium or batch of aerial mycelia.

Any of the methods herein can be implemented to make a batch of edible or non-edible aerial mycelium, wherein greater than 50% of the panels in the batch comprise an edible or a non-edible aerial mycelium according to the method being implemented. In some implementations, greater than 50% of the panels in the batch are suitable for use (e.g., are for use) in the manufacture of a textile product, including a leather-like product. In some implementations, the textile product, including the leather-like product, is a mycelium-based textile product. In some implementations, greater than 50% of the panels in the batch are suitable for use (e.g., are for use) in the manufacture of a food product. In some implementations, the food product is a mycelium-based food product.

Definitions and Methods Related to Materials for Growing Mycelium

"Substrate" as used herein refers to a material or surface thereof, from or on which an organism lives, grows and/or obtains its nourishment. In some embodiments, a substrate provides sufficient nutrition to the organism under target growth conditions such that the organism can live and grow without providing the organism a further source of nutrients. A variety of substrates are suitable to support the growth of an aerial mycelium of the present disclosure. Suitable substrates are disclosed, for example, in US20200239830A1, the entire contents of which are hereby incorporated by reference in their entirety to the extent not inconsistent with the content of this disclosure. In some embodiments, the substrate is a natural substrate. Non-limiting examples of a natural substrate include a lignocellulosic substrate, a cellulosic substrate, or a lignin-free substrate. A natural substrate can be an agricultural waste product or one that is purposefully harvested for the intended purpose of food production, including mycelial-based food production. Further non-limiting examples of substrates suitable for supporting the growth of mycelia of the present disclosure include soy-based materials, oak-based materials, maple-based materials, corn-based materials, seed-based materials and the like, or combinations thereof. The materials can have a variety of particle sizes, as disclosed in US20200239830A1, and occur in a variety of forms, including shavings, pellets, chips, flakes, or flour, or can be in monolithic form. Non-limiting examples of suitable substrates for the production of mycelia of the present disclosure include corn stover, maple flour, maple flake, maple chips, soy flour, chickpea flour, millet seed flour, oak pellets, soybean hull pellets and combinations thereof. Additional useful substrates for the growth of mycelia are disclosed herein.

"Growth media" or "growth medium" as used herein refers to a substrate and an optional further source of nutrition that is the same as or different from the substrate, wherein the substrate, the nutrition source, or both are intended for fungal consumption to support mycelial growth.

"Growth matrix" as used herein refers to a matrix containing a growth medium and a fungus. In some embodiments, the fungus is provided as a fungal inoculum; thus, in such embodiments, the growth matrix comprises an inoculated substrate. In other embodiments, the growth matrix comprises a colonized substrate, as defined below. Thus, as disclosed herein, a growth matrix of the present disclosure, comprising an inoculated substrate or a colonized substrate, can be incubated in a growth environment to produce extra-particle aerial mycelial growth therefrom.

"Inoculated substrate" as used herein refers to a substrate that has been inoculated with fungal inoculum. For example, an inoculated substrate can be formed by combining an uninoculated substrate with a fungal inoculum. An inoculated substrate can be formed by combining an uninoculated substrate with a previously inoculated substrate. An inoculated substrate can be formed by combining an inoculated substrate with a colonized substrate.

"Spawn" as used herein refers to the carrier of a living fungal culture of mycelium grown onto or within a substrate and held in stasis until it is ready to transfer into another substrate for growth. Spawn is formed by inoculating a substrate with fungal inoculum and incubating for sufficient time to allow for fungal colonization. Spawn can be made with, for example, soy, wood, or seeds including white millet, and can be in the form of shavings, pellets, chips, flakes, flour, particles, liquids, or combinations thereof, and is not intended to be limiting to a particular size, shape, or state of matter. For example, spawn can be implemented in a liquid or solid form.

"Colonized substrate" as used herein refers to an inoculated substrate that has been incubated for sufficient time to allow for fungal colonization. A colonized substrate of the present disclosure can be characterized as a contiguous hyphal mass grown throughout the entirety of the volume of the growth media substrate. The colonized substrate may further contain residual nutrition that has not been consumed by the colonizing fungus. As is understood by persons of ordinary skill in the art, a colonized substrate has undergone primary myceliation, sometimes referred to by skilled artisans as having undergone a "mycelium run." Thus, in some particular aspects, a colonized substrate consists essentially of a substrate and a colonizing fungus in a primary myceliation phase. For many fungal species, asexual sporulation occurs as part of normal vegetative growth, and as such could occur during the colonization process. Non-limiting examples of such fungi include *Ganoderma, Grifola, Laetiporus, Polyporus, Cerioporus, Laricifomes, Fomes*, and *Fomitopsis*. Accordingly, in some embodiments, a colonized substrate of the present disclosure may also contain asexual spores (conidia). In some aspects, a colonized substrate of the present disclosure can exclude growth progression into sexual reproduction and/or vegetative foraging. Sexual reproduction includes fruiting body formation (primordiation and differentiation) and sexual sporulation (meiotic sporulation). Vegetative foraging includes any mycelial growth away from the colonizing substrate (such as aerial growth). Thus, in some further aspects, a colonized substrate can exclude mycelium that is in a vertical expansion phase of growth. As used herein, a vertical expansion phase occurs between primary myceliation and primordiation. A colonized substrate can enter a mycelial vertical expansion phase during incubation in a growth environment of the present disclosure. For example, a colonized substrate can enter a mycelial vertical expansion phase upon introducing aqueous mist into the growth environment and/or depositing aqueous mist onto colonized substrate and/or any ensuing extra-particle growth. In some embodiments, the use of aqueous mist can be adjusted, for example, to desired levels and timing, to affect the topology of the growth.

In some aspects, the present disclosure provides for a method of preparing a growth media or a growth matrix. A prepared and unsterilized substrate is an available resource with high and unselective inoculum potential. Reducing the bioburden of the substrate prior to inoculation with a target fungus can minimize or exclude other potential colonizers. Thus, in some aspects, growth media of the present disclosure can be treated to reduce its bioburden prior to inoculation with the target fungus. In a non-limiting example, the growth media bioburden can be reduced by pasteurization or sterilization, including heat sterilization or steam sterilization of the growth media, each of which may include pressure. In some embodiments, the growth media bioburden can be reduced by irradiation with electromagnetic radiation. In some embodiments, the electromagnetic radiation comprises gamma rays, X-rays, UV, or UV-visible radiation. In some embodiments, the growth media bioburden can be reduced by plasma sterilization. In some embodiments, the growth media bioburden can be reduced by chemical treatment. In some embodiments, the growth media bioburden can be reduced by treatment with ethylene oxide. In some embodiments, the growth media bioburden can be reduced by treatment with hydrogen peroxide. The hydrogen peroxide treatment can include exposure of the substrate (or growth media) to hydrogen peroxide vapor, hydrogen peroxide solution, or both. In some embodiments, the growth media bioburden can be reduced by treatment with alkali. In a non-limiting example, a substrate (or growth media) can be treated by exposure to an alkaline solution, including but not limited to soaking the substrate (or growth media) in an alkaline solution.

By reducing the bioburden of the substrate (or growth media) to minimize or exclude all potential colonizers prior to inoculation, and then inoculating the resulting substrate (or growth media) with the target fungus at a suitable inoculation rate, and physically excluding competitors (e.g., by containing the inoculated substrate or growth media in a sealed bag, colonizing in a sterile or sanitary environment, etc.), a high and selective inoculum potential is created for the target fungus. Colonization of the substrate by the target fungus creates a priority effect for the target fungus based on spatial, metabolic, and chemical dominance (spanning both the intra- and inter-particle matrix comprising the substrate and colonizing fungus), offsetting the subsequent need for physical exclusion of competitors. In general, colonization shifts the exclusion of competitors/contaminants from a physical system level to a biological level and increases freedom to operate on the physical system level. Once this shift in fungal dominance over competitors has occurred, if the inter-particle matrix is broken up or fragmented into discrete particles, the fungus still has a functional priority effect; that is, each discrete particle is still spatially and metabolically dominated by the target fungus.

Thus, in some embodiments, a colonized substrate can be fragmented into smaller portions to provide a fragmented colonized substrate. As used herein, "fragmented colonized substrate" refers to a plurality of discrete particles of colonized substrate. The discrete colonized substrate particles can be characterized as having a particle size. The particle size can have a range, wherein the maximum particle size is less than that of the colonized substrate prior to the fragmentation, and the minimum particle size is substantially the same as the particle size of the substrate prior to the colonization. Methods of fragmenting the colonized substrate can include applying sufficient force to the colonized substrate such that the colonized substrate is fragmented into a plurality of discrete colonized substrate particles. This may simply involve breaking up the colonized substrate into "clumps." The fragmentation can be performed on a colonized substrate contained in a container. For example, the container can be an aerated bag within which a substrate underwent colonization. Force can be applied to the contained colonized substrate to provide a contained fragmented substrate. Alternatively, the fragmentation can be performed after removal of the colonized substrate from a container. For example, a colonized substrate can reside on an open tray or surface and be physically fragmented, e.g., by hand, machine, or other means of applying force.

Any suitable substrate can be used alone, or optionally combined with a nutrient source, as media to support mycelial growth. The growth media can be hydrated to a final target moisture content prior to inoculation with a fungal inoculum. In a non-limiting example, the substrate or growth media can be hydrated to a final moisture content of at least about 50% (w/w), at most about 80% w/w, within a range of about 50% (w/w) to about 80% (w/w), within a range of about 50% (w/w) to about 75% (w/w), within a range of about 50% (w/w) to about 65% (w/w), within a range of about 50% (w/w) to about 60% (w/w), or within a range of about 60% (w/w) to about 70% (w/w). Growth media hydration can be achieved via the addition of any suitable source of moisture. In a non-limiting example, the moisture source can be liquid phase water, an aqueous solution containing one or more additives (including but not limited to a nutrient source), and/or gas phase water. In some embodiments, at least a portion of the moisture is derived from steam utilized during bioburden reduction of the growth media. In some embodiments, inoculation of the growth media with the fungal inoculum can include a further hydration step to achieve a target moisture content, which can be the same or different than the moisture content of the growth media. For example, if growth media loses moisture during fungal inoculation, the fungal inoculated growth media can be hydrated to compensate for the lost moisture.

In some embodiments, a growth matrix of the present disclosure is provided as a solid-state matrix. In other embodiments, a growth matrix of the present disclosure is provided as a slurry.

Methods for the production of an aerial mycelium disclosed herein require an inoculation stage, wherein an inoculum is used to transport an organism into a substrate. The inoculum, which carries a desired fungal strain, is produced in sufficient quantities to inoculate a target quantity of substrate. The inoculation can provide a plurality of myceliation sites (nucleation points) distributed throughout the substrate. Inoculum can take the form of a liquid, a slurry, or a solid, or any other known vehicle for transporting an organism from one growth-supporting environment to another. Generally, the inoculum comprises water, carbohydrates, sugars, vitamins, other nutrients, and fungi. The inoculum typically contains enzymatically available carbon and nitrogen sources (e.g., lignocellulosic biomass, chitinous biomass, carbohydrates) augmented with additional micronutrients (e.g., vitamins, minerals). The inoculum can contain inert materials (e.g., perlite). In a non-limiting example, the fungal inoculum can be a seed-supported fungal inoculum, a feed grain-supported fungal inoculum, a seed-sawdust mixture fungal inoculum, or another commercially available fungal inoculum, including specialty proprietary spawn types provided by inoculum retailers. In some aspects, a fungal inoculum can be characterized by its density. "Feed grain" herein refers to grain used for agriculture or food, as distinguished from "growth grain" as defined and used elsewhere herein. In some embodiments, a fungal inoculum has a density of about 0.1 gram per cubic inch to about 10 grams per cubic inch, or from about 1 gram per cubic inch to about 7 grams per cubic inch. A skilled person can modify variables including the substrate or growth media component identities, substrate or growth media nutrition profile, substrate or growth media moisture content, substrate or growth media bioburden, inoculation rate and inoculum constituent concentrations to arrive at a suitable medium to support aerial mycelial growth. In some embodiments, the inoculation rate can be expressed as a percentage of the target volume of the substrate or growth media (% (v/v)). In some embodiments, the inoculation rate can range from about 0.1% (v/v) to about 80% (v/v). In some embodiments, the inoculation rate is at most about 50% (v/v), at most about 45% (v/v), at most about 40% (v/v), at most about 30% (v/v), at most about 25% (v/v), at most about 20% (v/v), at most about 15% (v/v), at most about 10% (v/v) or at most about 5% (v/v). In some embodiments, the inoculation rate is about 1% (v/v), about 2% (v/v), about 3% (v/v), about 4% (v/v), about 5% (v/v), about 6% (v/v), about 7% (v/v), about 8% (v/v), about 9% (v/v), about 10% (v/v), about 11% (v/v), about 12% (v/v), about 13% (v/v), about 14% (v/v), about 15% (v/v), about 16% (v/v), about 17% (v/v), about 18% (v/v), about 19% (v/v), about 20% (v/v), about 21% (v/v), about 22% (v/v), about 23% (v/v), about 24% (v/v), about 25% (v/v), about 26% (v/v), about 27% (v/v), about 28% (v/v), about 29% (v/v) or about 30% (v/v); or any range therebetween. In some embodiments, the inoculation rate can be expressed as a percentage of the target dry mass of the substrate or growth media (% (w/w)). In some embodiments, the inoculation rate can range from about 0.1% (w/w) to about 80% (w/w). In some embodiments, the inoculation rate is at most about 50% (w/w), at most about 45% (w/w), at most about 40% (w/w), at most about 30% (w/w), at most about 25% (w/w), at most about 20% (w/w), at most about 15% (w/w), at most about 10% (w/w) or at most about 5% (w/w). In some embodiments, the inoculation rate is about 1% (w/w), about 2% (w/w), about 3% (w/), about 4% (w/w), about 5% (w/w), about 6% (w/w), about 7% (w/w), about 8% (w/w), about 9% (w/w), about 10% (w/w), about 11% (w/w), about 12% (w/w), about 13% (w/w), about 14% (w/w), about 15% (w/w), about 16% (w/w), about 17% (w/w), about 18% (w/w), about 19% (w/w), about 20% (w/w), about 21% (w/w), about 22% (w/w), about 23% (w/w), about 24% (w/w), about 25% (w/w), about 26% (w/w), about 27% (w/w), about 28% (w/w), about 29% (w/w) or about 30% (w/w); or any range therebetween.

As disclosed herein, a growth medium of the present disclosure can be inoculated after reducing its bioburden. When the method of reducing the growth media bioburden involves heat, it can be necessary to cool the growth media prior to adding the fungal inoculum to maintain fungal viability for subsequent growth. In a non-limiting example, a growth medium can be steam sterilized and subsequently cooled to ambient room temperature, or to no greater than about 37° C. In another non-limiting example, the growth medium can be cooled to fall within a temperature range suitable to support fungal mycelial growth, such as a temperature that supports primary myceliation when the inoculated growth media is intended for subsequent incubation under colonization conditions to produce a colonized substrate, or to a temperature that supports extra-particle aerial mycelial growth when the inoculated growth media is intended for subsequent incubation in a growth environment to produce an aerial mycelium.

A growth medium inoculated with fungal inoculum can be incubated in a growth environment of the present disclosure for an incubation time period to produce extra-particle aerial mycelial growth. Alternatively, the fungal-inoculated growth medium can be incubated under colonization conditions in a colonization environment of the present disclosure for a colonization time period to provide a colonized substrate, which is optionally fragmented. The colonized substrate or fragmented colonized substrate can be subsequently incubated in the growth environment for an incubation time period to produce extra-particle aerial mycelial growth.

A colonization environment of the present disclosure refers to an environment that supports primary myceliation. The colonization environment is characterized as having a temperature and a relative humidity that supports primary myceliation. In some embodiments, a colonization environment of the present disclosure can exclude a condition that produces aerial mycelial growth; thus, the colonization environment can exclude aqueous mist. The colonization environment can include a primary colonization environment immediately surrounding the fungal-inoculated growth medium and an optional secondary colonization environment surrounding the primary colonization environment. Typically, the colonization conditions allow for sufficient aeration of the fungal-inoculated growth medium during or throughout the colonization time period. Thus, in some embodiments, the colonization conditions allow for gas exchange to occur between the fungal-inoculated growth medium in a primary colonization environment and the secondary colonization environment. In a non-limiting example, the fungal-inoculated growth medium can be contained in a breathable container characterized as having a primary colonization environment, and the container can be stored in the secondary colonization environment. Non-limiting examples of a breathable container include a perforated bag, a microperforated bag or a gas-permeable filter patch bag; such containers can be otherwise sealed. In some embodiments, the primary colonization environment temperature is within a range of about 4° C. to about 37° C. In some more particular embodiments, the primary colonization environment temperature is within a range of about 15° C. to about 30° C. The colonization temperature can be optimized for a particular fungus and can be above or below the recited ranges for extremophiles. In some embodiments, the primary colonization environment relative humidity can be at least about 90%, at least about 95%, at least about 96%, at least about 97%, at least about 98%, or at least about 99%. In some embodiments, the fungal-inoculated growth medium is characterized as having colonization pH. In some embodiments, the fungal-inoculated growth medium pH can at least about pH 3 and at most about pH 10 over the course of the colonization time period or can be at least about pH 3 and at most about pH 7 over the course of the colonization period. In some embodiments, the pH of the fungal-inoculated growth medium is within a range of about pH 6 to about pH 7 at the beginning of the colonization time period and decreases to a pH within a range of about pH 3 to about pH 5, or about pH 4 to about pH 5 over the course of the colonization time period, concurrent with the primary myceliation of the substrate. In some embodiments, the first and second colonization environments are substantially the same, at least with respect to temperature and relative humidity. In some embodiments, the relative humidity of the secondary colonization environment can be substantially lower than that of the primary colonization environment, so long as sufficient relative humidity is maintained in the primary colonization environment (e.g., inside the sealed bag or container).

A fungal-inoculated growth medium can be incubated in a colonization environment for a colonization time period. A colonization time period is sufficient to allow the substrate to be fully colonized, thereby producing a single colony of mycelium containing the substrate, which typically presents as a contiguous matrix. In some embodiments, the colonization time period can end no later than when a visible fruiting body forms, but most preferably prior to when a visible fruiting body forms. In a non-limiting example, the colonization time period can end prior to a karyogamy or meiosis phase of the fungal reproductive cycle. In some embodiments, the substrate colonization time period is within a range of about 1 day to about 3 weeks and can be optimized based on the target fungus. In some embodiments, the substrate colonization time period is about 1 day to about 10 days. Trial substrate colonization runs can be used to inform the period of time in the colonization environment during which substrate colonization is achieved without the formation of visible fruiting bodies.

After incubation of the fungal-inoculated growth medium in the colonization environment for the colonization time period, or prior to incubating a colonized substrate to a growth environment, supplemental nutrition and/or moisture can be added to the colonized substrate. In some embodiments, the supplemental nutrition is a macronutrient. In some embodiments, the macronutrient is provided as a flour. When a colonized substrate is fragmented to provide a fragmented colonized substrate, supplemental nutrition and/or moisture can be added during or after the fragmentation, and prior to incubating the fragmented colonized substrate in the growth environment.

In some further aspects, a colonized substrate can be stored in a storage environment for a storage time period prior to incubating the colonized substrate in a growth environment of the present disclosure. The storage can allow for a colonized or fragmented colonized substrate to be stockpiled for subsequent use or for other logistical purposes. The storage environment and storage time period are typically adjusted such that the colonized or fragmented colonized substrate, at the end of the storage time period, is substantially similar to the colonized or fragmented colonized substrate at the end of the colonization time period. Thus, the storage environment can be an environment that slows the metabolism of the colonizing fungus and/or maintains the colonizing fungus in a primary myceliation stage. In a non-limiting example, the storage environment can be an environment having a temperature substantially below that of the colonization environment. In another non-limiting example, the storage environment can be a refrigerated environment. In some further embodiments, the storage time in the colonization environment can be up to about a month.

In some aspects, the present disclosure provides for growth media preparation, fungal-inoculated growth medium preparation, and subsequent mycelial growth to occur in a single locale, or in two or more locales. For example, growth media bioburden reduction and/or inoculation can be performed in a locale that is the same or different from the locale wherein substrate colonization and/or aerial mycelial growth occurs. Methods of reducing growth media bioburden, including those disclosed herein (supra) or generally known in the art, can be applied to "in situ" bioburden reduction of a locale of the present disclosure, including a first, second or third (or further) locale, as disclosed herein, and the contents thereof. A means and/or agent suitable for use in reducing bioburden of a locale can be introduced to the locale via one or more points of entry to the locale, including an HVAC system, a misting system, a 3D printer, and the like.

In some embodiments, reduction of growth media bioburden occurs in a first locale, inoculation of the resulting growth media with fungal inoculum occurs a second locale, and production of mycelial growth (e.g., substrate colonization and/or extra-particle aerial mycelial growth from the fungal-inoculated growth medium) occurs in a third locale.

In other embodiments, reduction of growth media bioburden occurs in a first locale, inoculation of the resulting growth media with fungal inoculum occurs in the first locale, and production of mycelial growth (e.g., substrate colonization and/or extra-particle aerial mycelial growth from the resulting fungal-inoculated growth medium) occurs in a second locale.

In yet other embodiments, reduction of growth media bioburden occurs in a first locale, inoculation of the resulting growth media with fungal inoculum occurs in the first locale, and production of mycelial growth (e.g., substrate colonization and/or extra-particle aerial mycelial growth from the resulting fungal-inoculated growth medium) also occurs in the first locale.

In some more particular embodiments, the growth media is loaded into a growth locale. The growth locale can be a growth chamber or system configured to support conditions required for each of growth media bioburden reduction, growth media inoculation, and the growth of a mycelium of the present disclosure. The growth media within in the growth locale is treated to reduce the growth media bioburden to the desired level, and subsequently inoculated with fungal inoculum therein. The growth locale conditions can be subsequently modified to a growth environment of the present disclosure, with an optional interim substrate colonization step. In a non-limiting example, the locale is a growth chamber equipped with hardware that supports the growth media (e.g., trays, conveyer belts, shelves, beds or other surfaces or containers, as disclosed herein), and the growth media is loaded into the growth chamber. This can be achieved at scale using a conventional head filler, conveyer, or other loading equipment. If necessary, the growth chamber is closed off from the ambient environment in preparation for the bioburden reduction step. The growth media is then treated (e.g., with steam) to achieve the desired level of sterility. The growth chamber environmental conditions are then modified to those that support inoculation, and the resulting growth media is then inoculated "in place" by any suitable means. For example, an automated robotic system can be used to inoculate the growth media. In some embodiments, the fungal inoculum can be in the form of a liquid or a slurry. Accordingly, the liquid or slurry inoculum could be pumped into the chamber and deposited into or onto the growth media, e.g., via a sprayer, a 3D printer, or other suitable means. The growth chamber environmental conditions are then modified to those that support mycelial growth. The resulting fungal-inoculated growth medium is then exposed to the growth environment conditions to produce the mycelial growth. Optionally, the modification of the growth locale conditions to a growth environment is preceded by modification of the growth locale conditions to those of a colonization environment. Thus, each step of bioburden reduction, inoculation, optionally, substrate colonization, and aerial mycelial growth production can be performed in a single locale.

Figure 9:
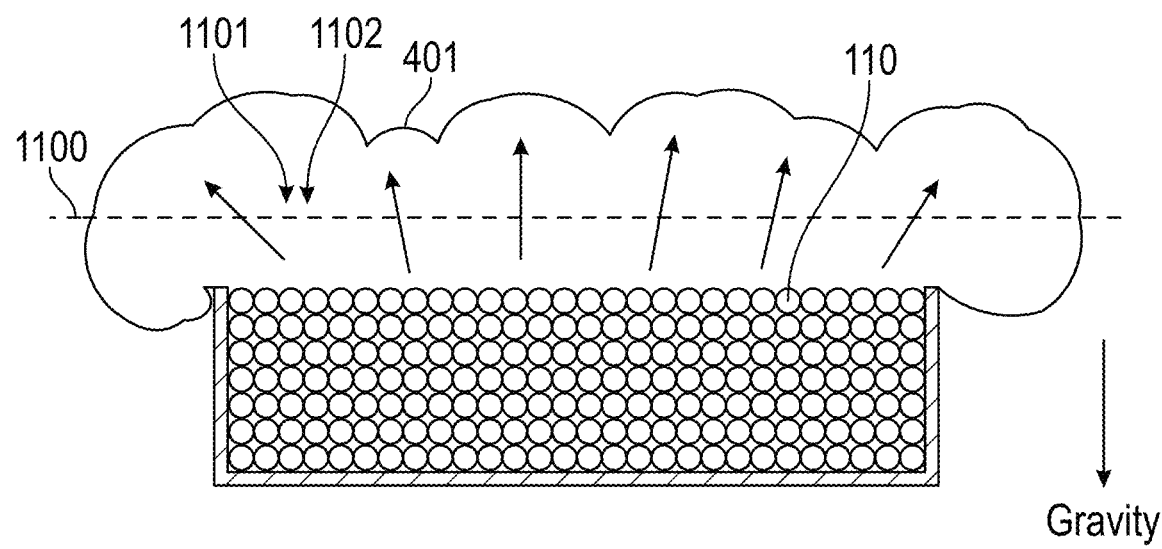
FIG. 9 illustrates a cross sectional schematic view of a growth matrix with extra-particle growth extending through a perforated sheet.

FIG. 9 illustrates a cross sectional schematic view of a growth matrix with extra-particle growth extending through a perforated sheet 1100. The growth matrix 110 is illustrated with circles, below a perforated sheet 1100 shown in dashed lines. The perforations are illustrated by the blank portions 1101 shown between the solid portions 1102 of the line, which allow extra-particle growth 401 through the perforations 1101. The extra-particle growth 401 is the portion shown without circles, extending from the growth matrix 110, through the perforations 1101, and continuing through to the opposite side of the sheet 1100.

The sheet can comprise a woven or nonwoven sheet, or any sheet otherwise suitable for such purpose. The sheet can be extended a selected distance above the growth matrix (e.g., about 0.1 to 10 mm). The sheet can be positioned relative to the growth matrix, to allow the extra-particle growth 401 to grow through the perforations 1101 (e.g., in the center of the extra-particle growth).

Definitions and Methods Related to Growth Environment

US Published Patent Application 2015/0033620, the entire contents of which is hereby incorporated by reference in its entirety to the extent not inconsistent with the content of this disclosure, describes techniques for growing a material comprising aerial mycelium, referred to as a "mycological biopolymer." As described therein, a mycological biopolymer product provided by the disclosed method is characterized as containing a homogenous biopolymer matrix that is comprised predominantly of fungal chitin and trace residues (e.g., beta-glucan, proteins). The mycological biopolymer is up-cycled from domestic agricultural lignocellulosic waste and is made by inoculating the substrate made of domestic agricultural lignocellulosic waste with a selected fungus in a container that is sealed off from the ambient environment external to the container. In addition to the substrate and fungal inoculum, the container contains a void space. A network of undifferentiated aerial mycelium comprising a chitin-polymer grows into and fills the void space of the container. The chitin-polymer-based aerial mycelium is subsequently extracted from the substrate and dried. As further described in US2015/0033620, the environmental conditions for producing the mycological biopolymer product described therein, i.e., a high carbon dioxide ($CO_2$) content (about 3% to about 7% by volume) and an elevated temperature (from about 85° F. to about 95° F.), prevent full differentiation of the fungus into a mushroom, as evidenced by the absence of a visible fruiting body.

In one aspect, the present disclosure provides an aerial mycelium. In a further aspect, the aerial mycelium does not contain a visible fruiting body.

As described in WO2019/099474A1, the entire contents of which is hereby incorporated by reference in its entirety to the extent not inconsistent with the content of this disclosure, another method of growing a mycological biopolymer material employs incubation of a substrate with nutritive value inoculated with a fungus in containers that are placed in a closed incubation chamber with air flows passed over each container while the chamber is maintained with a predetermined environment of humidity, temperature, carbon dioxide, and oxygen.

The aerial mycelia of the present disclosure are growth products obtained from an inoculated substrate incubated for a period of time (i.e., an incubation time period) in a growth environment, as disclosed herein.

In some aspects, a method of making an aerial mycelium of the present disclosure comprises placing a growth matrix in contact with a tool. In some aspects, the tool can have a base having a surface area. In some embodiments, the surface area can be at least about 1 square inch. In some embodiments, the surface area can be at most about 2000 square feet. In some embodiments, the growth matrix can be placed in contact with the base, e.g., placed on top of or distributed across the base. In some embodiments, the base can be a planar surface. Non-limiting examples of a tool include a tray, a sheet, a table, or a conveyer belt. In some embodiments, the tool can have at least one wall. In some embodiments, the base and the at least one wall can together form a cavity. In some embodiments, the growth matrix can be placed or packed in the tool cavity. In some embodiments, the tool can be an uncovered tool. In some other embodiments, the tool can have a lid, the lid having at least one opening, or the tool can be covered at least in part with a perforated barrier. Non-limiting embodiments of a tool having a lid with an opening are disclosed in US2015/0033620A1. An uncovered tool, or a tool having a lid with an opening or a perforated barrier, and further having growth matrix on or within the tool, can allow for aqueous mist to be deposited onto the growth matrix surface, and/or onto any resulting mycelial growth.

"Growth environment" as used herein refers to an environment that supports the growth of mushrooms or mycelia, as would be readily understood by a person of ordinary skill in the art in the mushroom or mycelial cultivation industry, and which contains a growth atmosphere having a gaseous environment of carbon dioxide ($CO_2$), oxygen ($O_2$), and a balance of other atmospheric gases including nitrogen ($N_2$), and is further characterized as having a relative humidity. In some aspects of the present disclosure, the growth atmosphere can have a $CO_2$ content of at least about 0.02% (v/v), at least about 5% (v/v), less than about 8% (v/v), less than about 10% (v/v), between about 0.02% and 10%, between about 0.02% and 8%, between about 5% and 10%, or between about 5% and 8%. In some other aspects, the growth atmosphere can have an $O_2$ content of at least about 12% (v/v), or at least about 14% (v/v), and at most about 21% (v/v). In yet other aspects, the growth atmosphere can have an $N_2$ content of at most about 79% (v/v). Each foregoing $CO_2$, $O_2$, or $N_2$ content is based on a dry gaseous environment, notwithstanding the growth environment atmosphere relative humidity.

Temperature and Light

In some further aspects, a method of making an aerial mycelium of the present disclosure comprises incubating the growth matrix in a growth environment, wherein the growth environment has a temperature that supports mycelial growth. In some embodiments, the growth environment has a temperature within a range of about 55° F. to about 100° F., or within a range of about 60° F. to about 95° F. In some more particular embodiments, the growth environment has a temperature within a range of about 80° F. to about 95° F., or within a range of about 85° F. to about 90° F. throughout the incubation time period. In other embodiments, the growth environment has a temperature within a range of about 60° F. to about 75° F., within a range of about 65° F. to about 75° F., or within a range of about 65° F. to about 70° F. In some embodiments, the growth environment temperature can be tuned to optimize for the growth of a particular fungal genus, species, or strain.

In some aspects of the present disclosure, the growth environment suitable for the growth of the aerial mycelia of the present disclosure can be a dark environment. "Dark environment" as used herein in connection with a growth environment would be readily understood by a person of ordinary skill in the art in the mushroom or mycelial cultivation industry and refers to an environment without natural or ambient light, and without growing lights.

Exposing fungi to white light, and especially blue light, has been associated with the induction of fruiting and the enhancement of production efficiency of oyster mushrooms (e.g., see Roshita & Goh, AIP Conference Proceedings 2030, 020110 (2018)), the entire contents of which are hereby incorporated by reference in their entirety to the extent not inconsistent with the content of this disclosure. Surprisingly, Applicant has discovered that an aerial mycelium for some species of the present disclosure, such as *Ganoderma*, absent visible fruiting bodies, can be prepared by the methods of the present disclosure in the presence of white light, which includes blue light. Aerial mycelium prepared in the presence of white light was consistent in yield, thickness, density, morphology and in the absence of visible fruiting bodies when compared to control aerial mycelia produced under the same growth conditions but in a dark environment (e.g., see Example 37). Thus, in some embodiments, a growth environment suitable for the growth of the aerial mycelia of the present disclosure is not a dark environment. In some embodiments, the growth environment does not exclude light. In some embodiments, the growth environment can include natural light. In some embodiments, the growth environment can include ambient light. In some embodiments, the growth environment can include a growing light.

Air Content and Air Flow

As disclosed in US2015/0033620, environmental conditions for producing a mycological biopolymer include a $CO_2$ content of about 3% to about 7% (v/v) to prevent full differentiation of the fungus into a mushroom. Accordingly, in some aspects, the present disclosure provides for methods of producing an aerial mycelium in a growth environment comprising a growth atmosphere, wherein the growth atmosphere can have a $CO_2$ content within a range of about 3% (v/v) to about 7% (v/v), or within a range of about 5% (v/v) to about 7% (v/v). In some embodiments, the growth atmosphere can have a $CO_2$ content of about 3%, about 4%, about 5%, about 6%, or about 7% (v/v), or any range therebetween.

Surprisingly, Applicant has discovered that an aerial mycelium of the present disclosure can be produced without visible fruiting bodies under conditions wherein aqueous mist is introduced into a growth environment having a growth atmosphere containing much lower $CO_2$ content. For example, Applicant has shown that aerial mycelia obtained from a growth environment of circulating mist and an atmosphere having a mean $CO_2$ content of about 0.04% (v/v) over the course of the incubation time period or having a mean $CO_2$ content of about 2% (v/v) over the incubation time period were similar in yield, thickness, density, and morphology to aerial mycelia obtained via growth in an atmosphere having a mean $CO_2$ content of 5% (v/v) but otherwise identical growth conditions (see Example 36). Thus, the present disclosure advantageously provides for a safer, more efficient, and more cost-effective manufacturing process with reduced environmental impact (e.g., by circumventing the risk of exposure to high $CO_2$ content growth environments, increasing operator accessibility to growth environments, eliminating the costs associated with $CO_2$ injection into the growth environment, and reducing off-gassing of $CO_2$ into the atmosphere). As further disclosed herein, Applicant has shown that aerial mycelia of increased thickness can be obtained via incubation in a growth environment characterized as having a particular misting profile (e.g., see Examples 47 to 54). Prior to this discovery, efforts to obtain thicker aerial mycelia included extending incubation time periods to support continued aerial growth over time. As extended incubation time periods can increase the risk of fruiting body formation, strategies known to attenuate fruiting body formation (e.g., elevated $CO_2$ content) were simultaneously employed. The present disclosure advantageously provides for methods of making aerial mycelia of increased thickness, absent visible fruiting bodies, by adopting preselected misting profiles, without requiring a high $CO_2$ content growth environment. The ability to increase aerial mycelial thickness, absent visible fruiting bodies, by tuning mist deposition rate can also advantageously reduce incubation time periods, thereby allowing more efficient production of aerial mycelia and reduced risk of microbial contamination that can occur in high moisture environments.

Thus, the present disclosure provides for a method of growing aerial mycelia in a growth environment comprising a growth atmosphere having markedly reduced $CO_2$ content compared to the prior state of the art of growing aerial mycelia. Accordingly, in some embodiments, the growth atmosphere $CO_2$ content can be less than about 3% (v/v). In some embodiments, the growth atmosphere $CO_2$ content can be no greater than about 2.9% (v/v), no greater than about 2.8% (v/v), no greater than about 2.7% (v/v), no greater than about 2.6% (v/v) or no greater than about 2.5% (v/v). In some further embodiments, the growth atmosphere $CO_2$ content can be less than 2.5% (v/v). In some embodiments, a growth atmosphere of the present disclosure can have a $CO_2$ content of at least about 0.02% (v/v). In some embodiments, a growth atmosphere of the present disclosure can have a $CO_2$ content of at least about 0.03% (v/v). In some further embodiments, the growth atmosphere $CO_2$ content can approximate ambient atmospheric $CO_2$ content; for example, the growth atmosphere $CO_2$ content can be at least about 0.04% (v/v). In some more particular embodiments, the growth atmosphere $CO_2$ content can be within a range of about 0.02% to about 3% (v/v), about 0.02% to about 2.5% (v/v), about 0.03% to about 3% (v/v), about 0.03% to about 2.5% (v/v), about 0.04% to about 3% (v/v), or about 0.04% to about 2.5% (v/v).

In other embodiments, the growth atmosphere $CO_2$ content can be within a wider range. Thus, in some embodiments, the growth atmosphere $CO_2$ content can be within a range of about 0.02% to about 7% (v/v), within a range of about 0.04% to about 7% (v/v), within a range of about 0.1% to about 7% (v/v), within a range of about 0.2% to about 7% (v/v), within a range of about 1% to about 7% (v/v), or within a range of about 2% to about 7% (v/v); or can be within a range of about 0.02% to about 5% (v/v), within a range of about 0.04% to about 5% (v/v), within a range of about 0.1% to about 5% (v/v), within a range of about 0.2% to about 5% (v/v), or within a range of about 1% to about 5% (v/v). In some more particular embodiments, the growth atmosphere $CO_2$ content can be about 1%, about 2%, about 3%, or any range therebetween. In yet other embodiments, the growth atmosphere $CO_2$ content can be a mean $CO_2$ content over the course of the incubation time period. In some embodiments, the growth atmosphere mean $CO_2$ content can be less than about 3% (v/v), less than 2.5% (v/v), or no greater than about 2% (v/v) over the course of the incubation time period.

It is understood that fungal growth requires respiration, which can increase $CO_2$ content and decrease oxygen ($O_2$) content in the growth atmosphere, particularly in an enclosed growth environment such as an incubation chamber or "growth chamber." In some aspects, the present disclosure provides for a growth environment having a growth atmosphere that is maintained during the incubation time period by replenishing the growth environment with one or more of the atmospheric gases, such as $CO_2$, replenishing the growth environment with air having the same composition as the target growth atmosphere composition, venting the growth environment to reduce content of one or more gases, or a combination thereof. In a non-limiting example, if the $CO_2$ content in a growth chamber is below a target set point, $CO_2$ gas can be infused into the growth chamber. Conversely, if the $CO_2$ content exceeds a target set point, then fresh air having the target growth atmosphere composition can be introduced into the growth chamber while venting the chamber to release the existing air having the high $CO_2$ content. Accordingly, growth chamber atmospheric content can be maintained via $CO_2$ and fresh air infusion to maintain a target $CO_2$ set point; as such, $O_2$ and other atmospheric components are maintained indirectly and fluctuate as a function of fungal respiration. In some other aspects, the present disclosure provides for a growth environment wherein the growth atmosphere $CO_2$ and $O_2$ contents are allowed to modulate with fungal respiration, without adjusting the growth atmosphere to maintain preselected $CO_2$ or $O_2$ content. Thus, the growth environment can be a closed system. The present disclosure also provides for a growth environment wherein the growth atmosphere $CO_2$ and $O_2$ contents are allowed to modulate with fungal respiration, and further allowing for adjustments to be made to the growth atmosphere under conditions wherein a particular preselected growth atmospheric condition is breached. In a non-limiting example, an aerial mycelium can be grown in a growth atmosphere that allows for natural fungal respiration to occur, with a preselected $CO_2$ content ranging from about 0.02% to about 7% $CO_2$ (v/v), wherein the $CO_2$ content is adjusted (e.g., by injection of $CO_2$ into the growth atmosphere) if the $CO_2$ content falls outside the scope of the preselected range.

A growth environment of the present disclosure can be further characterized as having an atmosphere having a pressure as would be readily understood by a person of ordinary skill in the art in the mushroom or mycelial cultivation industry. In a non-limiting embodiment, a growth atmosphere of the present disclosure can have an atmospheric pressure within a range of about 27 to about 31 inches of mercury (Hg), can have an atmospheric pressure of about 29 to about 31 inches Hg, or can have an atmospheric pressure of about 29.9 inches Hg. In some embodiments, a growth environment of the present disclosure can be characterized as having an ambient atmospheric pressure.

In some aspects of the present disclosure, the growth environment suitable for the growth of the aerial mycelia of the present disclosure is characterized as having an airflow. In some further aspects, the air composition of the airflow can be substantially the same as the composition of the growth environment atmosphere. In some embodiments, an airflow can be used to direct and/or deposit aqueous mist that is present in the growth environment towards or onto a growth matrix. The skilled person can adopt various means of directing the flows of air, including baffles, perforated barriers, airflow boxes and/or other tools that can be suitably positioned in the growth environment or in relation to tools or beds containing growth matrix in order to achieve the desired outcome, including a substantially homogeneous airflow, with respect to direction and/or velocity, across a plurality of growth matrices in the growth environment, and/or a substantially homogeneous introduction and/or deposition of mist in the growth environment.

"Horizontal airflow" as used herein refers to flows of air directed substantially parallel to the surface of a growth matrix and any subsequent extra-particle mycelial growth.

Figure 3:
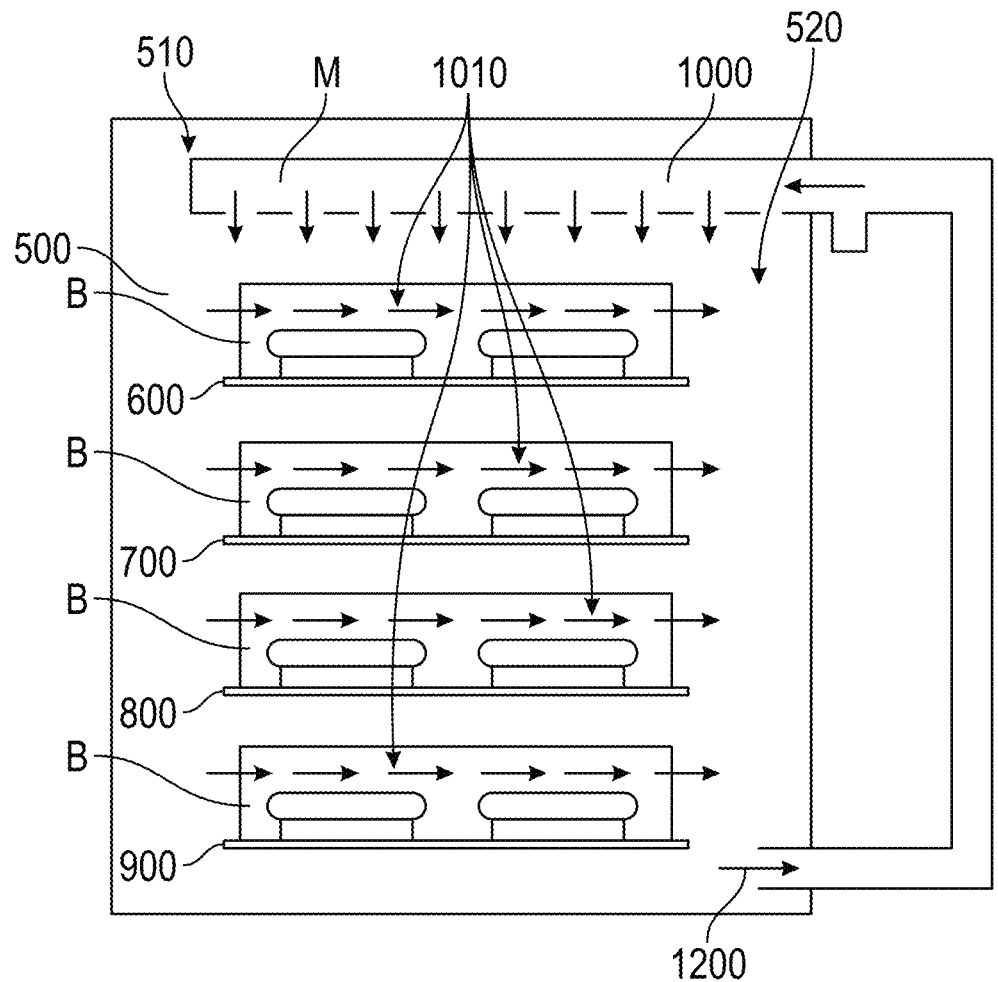
FIG. 3 illustrates horizontal airflow.
Figure 4A:
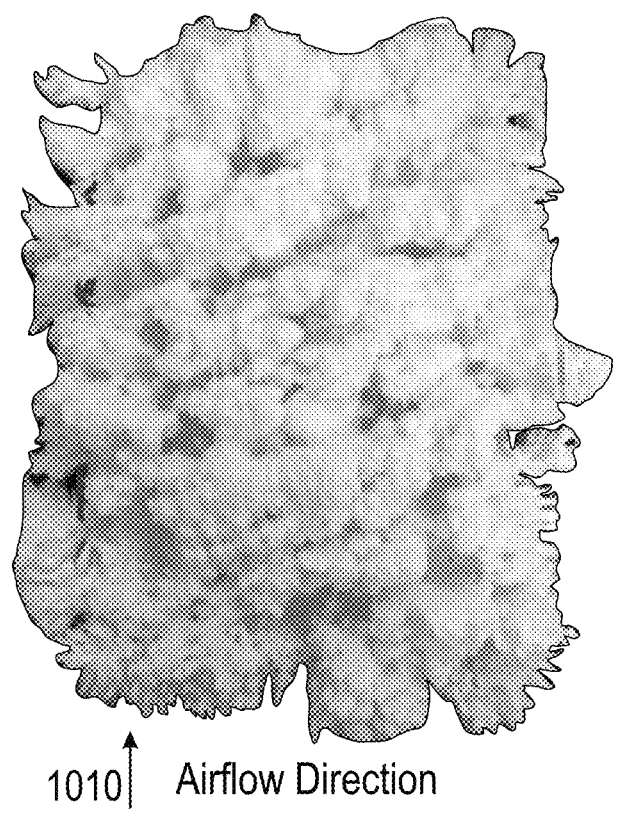
FIGS. 4A and 4B show a top view and side view, respectively, of an image of an extra-particle aerial mycelium and growth matrix in a Pyrex dish after removal from a growth chamber, according to Example 4.
Figure 4B:
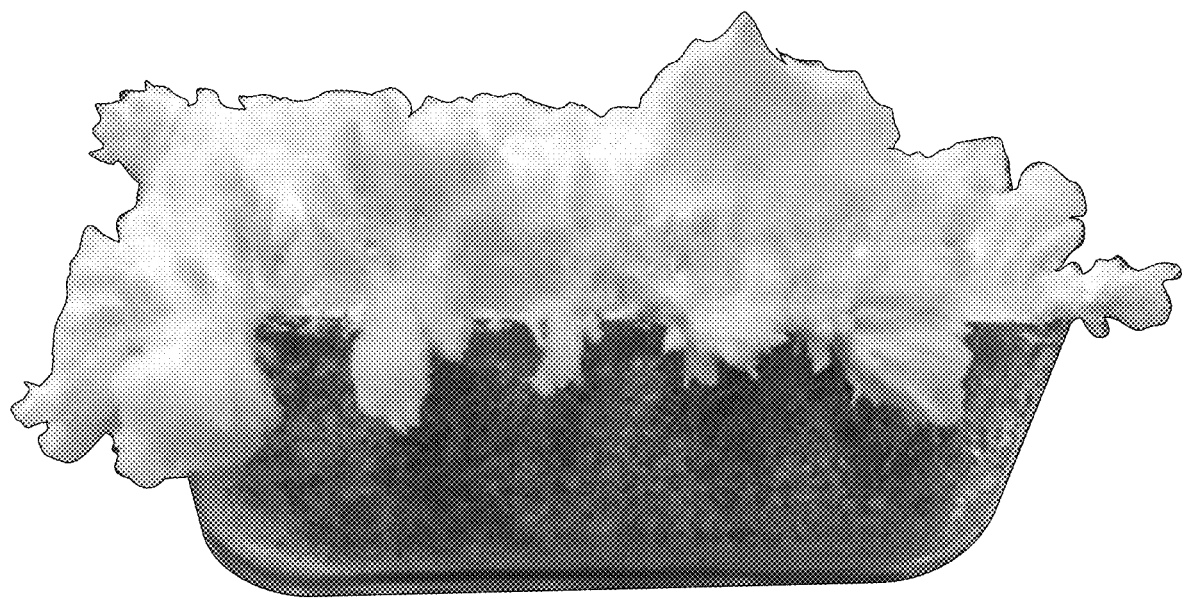
Figure 5A:
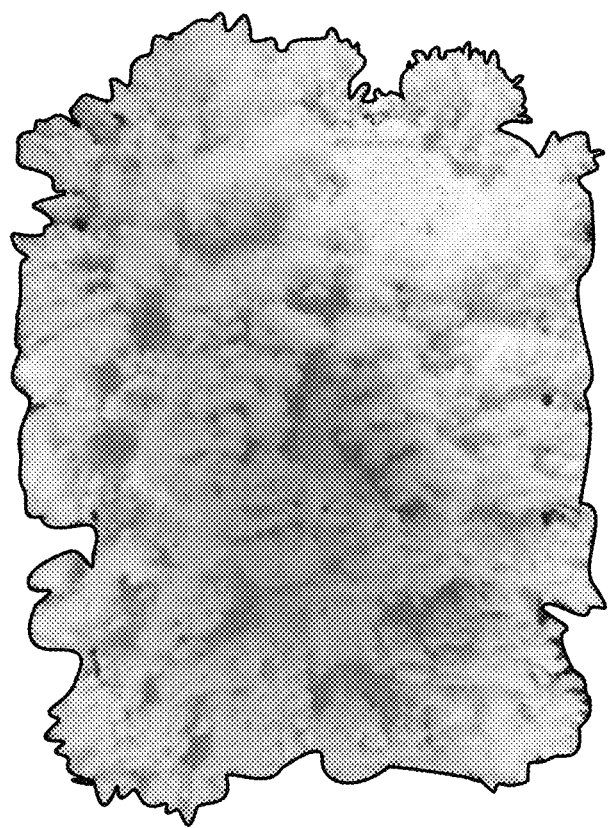
FIGS. 5A and 5B show a top view and side view, respectively, of an image of an extra-particle aerial mycelium and growth matrix in a Pyrex dish after removal from a growth chamber, according to Example 5.
Figure 5B:
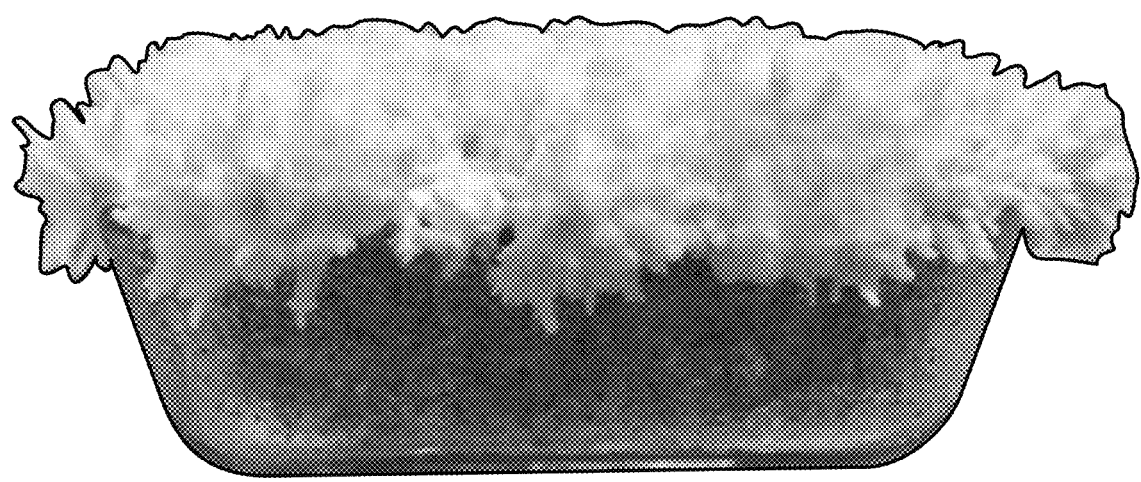
Figure 6A:
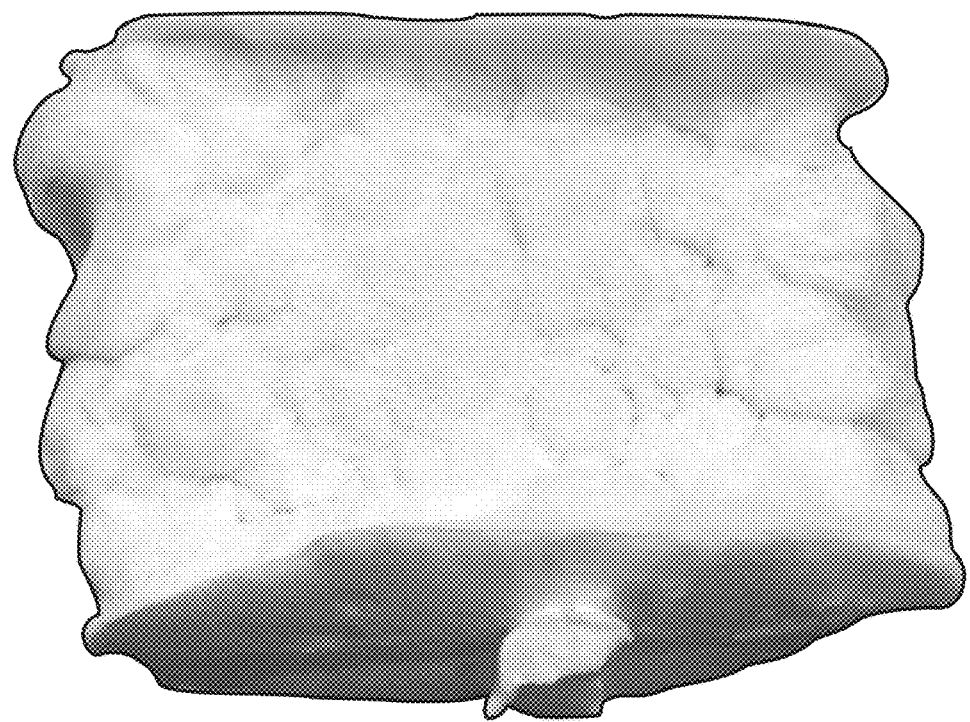
FIGS. 6A and 6B show a top view and side view, respectively, of an image of an extra-particle aerial mycelium and growth matrix in a Pyrex dish after removal from a growth chamber, according to Example 6.
Figure 6B:
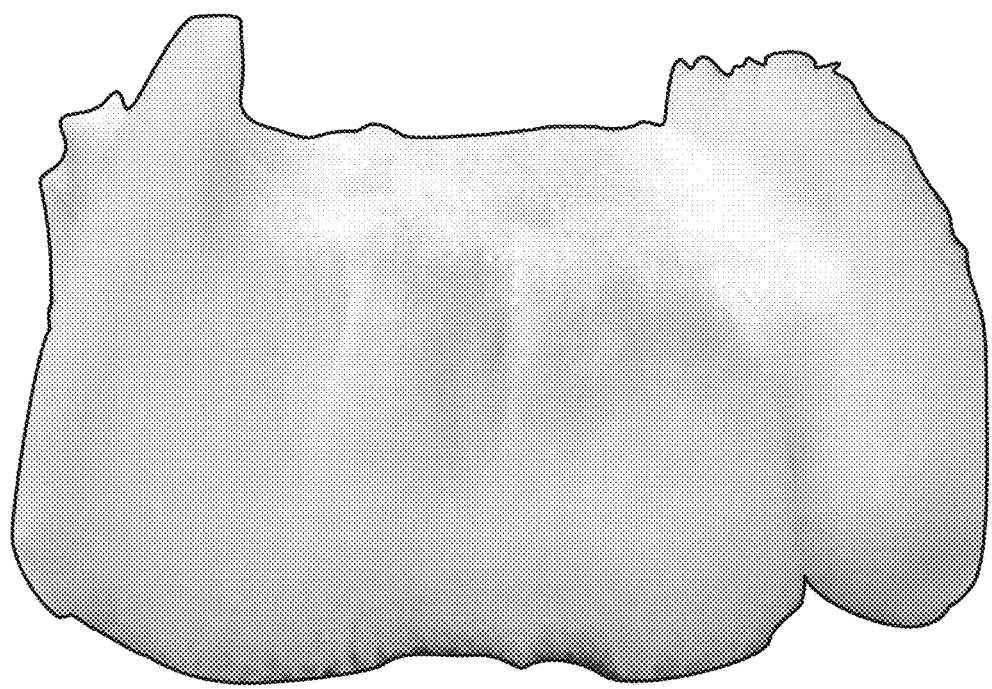
Figure 7A:
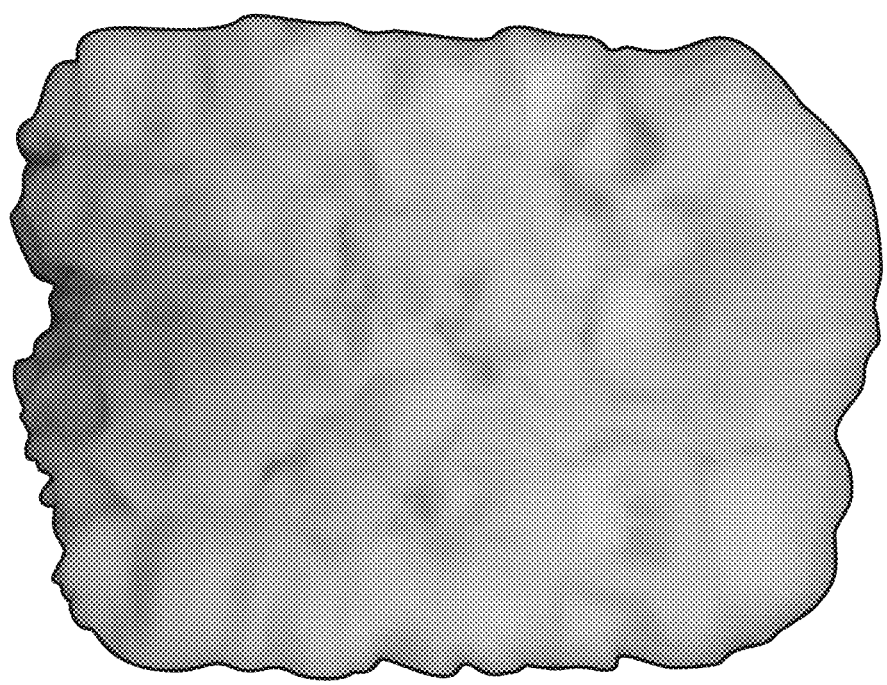
FIGS. 7A and 7B show a top view and side view, respectively, of an image of an extra-particle aerial mycelium and growth matrix in a Pyrex dish after removal from a growth chamber, according to Example 7.
Figure 7B:
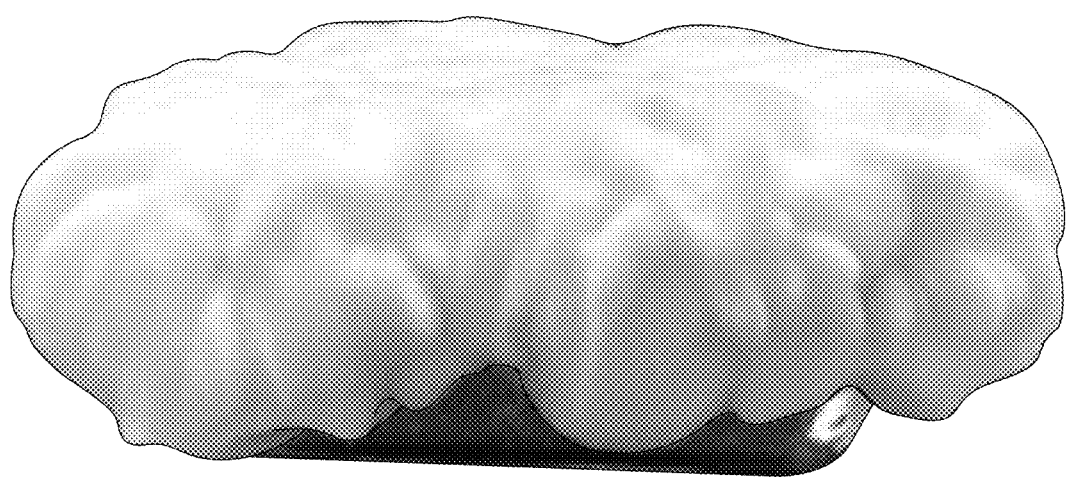

An embodiment of horizontal airflow of the present disclosure is illustrated in FIG. 3. Referring to FIG. 3, the method of growing a mycelium of the present disclosure employs a closed incubation chamber 500 having a plurality of vertically spaced apart shelves 600, 700, 800, 900 and transparent front walls (not shown) for viewing the interior of the chamber 500. In addition, an air flow system 1000 is connected with the chamber 500 for directing substantially horizontal air flows across the chamber 500 as indicated by the arrows 1010 from one side 510 of the chamber 500 to and through the opposite side 520 of the chamber 500. As illustrated, the air flow system 1000 includes a manifold M in the upper part of the chamber 500 for distributing humidified air across the top of the chamber 500 for cascading down the shelves 600, 700, 800, 900 until being recirculated on the bottom right 1200 for re-humidification. Each shelf 600, 700, 800, 900 of the chamber 500 is sized to receive an air box B that contains two containers each of which contains a growth media 110 comprised of a substrate and a fungus.

Thus, in some other aspects the method of preparing an aerial mycelium of the present disclosure can include directing an airflow through the growth environment. In some embodiments, the airflow can be a relatively high airflow environment, wherein the airflow can have a velocity of greater than about 250 linear feet per minute (lfm). In other embodiments, the airflow can be a relatively lower airflow environment, wherein the airflow can have a velocity of less than about 150 lfm, less than about 125 lfm, less than about 100 lfm or less than about 75 lfm. In some more particular embodiments, the growth environment can have an airflow, wherein the airflow velocity is less than about 50 lfm, less than about 40 lfm, less than about 30 lfm or less than about 25 lfm.

In some embodiments, the airflow is a substantially horizontal airflow. In some embodiments, the substantially horizontal air flow can have a velocity of no greater than about 350 lfm, or a velocity no greater than about 300 lfm. In other embodiments, the substantially horizontal airflow can have a velocity of no greater than about 275 lfm, a velocity of no greater than about 175 lfm, a velocity of no greater than about 150 lfm, a velocity of no greater than about 125 lfm, or a velocity of no greater than about 110 lfm. In some further embodiments, the velocity is at least about 5 lfm, at least about 10 lfm, at least about 15 lfm, at least about 20 lfm, at least about 25 lfm, at least about 30 lfm, at least about 35 lfm, at least about 40 lfm, at least about 45 lfm or at least about 50 lfm. In some more particular embodiments, the substantially horizontal airflow has mean velocity of about 5 lfm, about 10 lfm, about 15 lfm, about 20 lfm, about 25 lfm, about 30 lfm, about 35 lfm, about 40 lfm, about 45 lfm, about 50 lfm, about 55 lfm, about 60 lfm, about 65 lfm, about 70 lfm, about 75 lfm, about 80 lfm, about 85 lfm, about 90 lfm, about 95 lfm, about 100 lfm, about 105 lfm, about 110 lfm, about 115 lfm or about 120 lfm. In some more particular embodiments still, the substantially horizontal air flow can have a velocity within a range of about 5 lfm to about 125 lfm, within a range of about 5 lfm to about 100 lfm, within a range of about 5 lfm to about 75 lfm, or within a range of about 5 lfm to about 50 lfm. In yet more particular embodiments, the substantially horizontal air flow can have a velocity within a range of about 5 lfm to about 40 lfm, or within a range of about 5 to about 25 lfm. In other embodiments, the substantially horizontal air flow can have a velocity within a range of about 40 lfm to about 120 lfm. Without being bound to any particular theory, the flows of air can facilitate the distribution of mist throughout the growth environment, can facilitate the distribution of mist onto the growth matrix surface and/or extra-particle mycelial growth, or both. The air flow and misting apparatus can be tuned in concert to achieve the desired mist deposition rate and/or mean mist deposition rate, and to tune the mycelial tissue morphology.

Mist Deposition

"Mist deposition rate" as used herein refers to the rate at which mist is deposited per discrete instance of mist deposition. Any standalone usage herein of "mist deposition rate," without the prefix "mean," refers to the rate at which mist is deposited per discrete instance of mist deposition and is used interchangeably herein with "instantaneous mist deposition rate" or "momentary mist deposition rate." "Mean mist deposition rate" is not used interchangeably herein with respect to "mist deposition rate" and is as defined elsewhere herein. The mist deposition rate can be based on or determined by measuring the volume of mist deposited on a surface area over a period of time, wherein the period of time is a fraction of the total incubation time period. In a non-limiting example, the mist is deposited on an exposed surface of growth matrix at a mist deposition rate of about 1 microliter per square centimeter of growth matrix per hour. In another non-limiting example, the mist is deposited on extra-particle aerial mycelial growth, and the mist deposition rate is about 1 microliter per square centimeter of the extra-particle aerial mycelial growth per hour. In some embodiments, the mist deposition rate can be reported as the volume of mist deposited per misting duty cycle. For the purposes of the present disclosure, a mist deposition rate of 1 microliter per centimeter squared per hour (1 $uL/cm^2/hour$) is substantially equivalent to a mist deposition rate of 1 milligram per centimeter squared per hour (1 mg/cm²/hour), solute concentration notwithstanding.

"Mean mist deposition rate" as used herein refers to a mist deposition rate averaged over an incubation time period. The mean mist deposition rate can be expressed based on a surface area over which the mist is deposited. In a non-limiting example, the mist is deposited on an exposed surface of growth matrix at a mean mist deposition rate of about a microliter per square centimeter of growth matrix per hour. In another non-limiting example, the mist is deposited on an exposed surface of growth matrix containing extra-particle aerial mycelial growth, and the mean mist deposition rate is about 1 microliter per square centimeter of the growth matrix containing the extra-particle aerial mycelial growth per hour. For the purposes of the present disclosure, a mean mist deposition rate of 1 microliter per centimeter squared per hour (1 uL/cm²/hour) is substantially equivalent to a mean mist deposition rate of 1 milligram per centimeter squared per hour (1 mg/cm²/hour), solute concentration notwithstanding.

In some aspects of the present disclosure, there is provided a method of making an aerial mycelium. In some aspects, the method comprises: providing a growth matrix; and incubating the growth matrix in a growth environment for an incubation time period. In some embodiments, the growth matrix is a fungal-inoculated growth medium. In other embodiments, the growth matrix is a precolonized substrate.

In some aspects, the aerial growth response can be affected by the presence of mist in the growth environment, and/or by mist deposition in the growth environment, and/or by mist deposition on the growth matrix. Applicant has shown that aerial growth does not occur in the absence of aqueous mist in the growth environment and/or in the absence of mist deposition in the growth environment (these conditions give rise to appressed mycelia), and that aerial growth does occur in the presence of aqueous mist in the growth environment, and/or in the presence of mist deposition in the growth environment.

In some embodiments, a growth environment can be provided that has an amount of mist present therein. The amount of mist present can be established before or during various actions taken within the growth environment, for example, during incubating a growth matrix. Thus, in some embodiments, a method of making an aerial mycelium of the present disclosure can include exposing a growth matrix to a growth environment that has an amount of mist present therein. In some embodiments, exposing the growth matrix to the growth environment can include introducing aqueous mist into the growth environment. In some embodiments, the aqueous mist can be introduced into the growth environment resulting in a detectable quantity of deposited mist in the growth environment. In some more particular embodiments, aqueous mist can be introduced into the growth environment resulting in a mean mist deposition rate that results in a detectable quantity of deposited mist in the growth environment. For example, aqueous mist can be introduced into the growth environment resulting in a mean mist deposition rate that results in a detectable quantity of deposited mist on surfaces of the container or other structure, on the growth matrix, on the extra-particle aerial mycelial growth, and/or on other structures within the growth environment. Methods of detecting deposited mist include visual inspection methods for visibly detectable deposited mist, measuring a quantity of deposited mist based on mass of collected mist or deposited solute, or other reasonable detection methods.

A non-limiting example of a method of measuring an amount of deposited mist can be based upon the method of measuring mean mist deposition rate disclosed herein with respect to Example 8. Thus, in some embodiments, the aqueous mist can be introduced into the growth environment resulting in a mean mist deposition rate that does not result in a measurable mass of deposited mist in the growth environment. This can be confirmed after placing one or more open Petri dishes of known surface area in a growth environment during an incubation time period for at least 24 hours and at most about 7 days. Throughout this incubation time period, some amount of mist is present within the growth environment based upon some amount of mist introduction, allowing for the collection of some theoretical amount of deposited mist in the one or more open Petri dishes. The total theoretical mass of collected mist can be determined (to determine the mass of the deposited mist) and divided by the period of time (to determine the mean mist deposition rate based on mass).

In some other embodiments, aqueous mist can be introduced into the growth environment resulting in a mean mist deposition rate that does not result in a detectable quantity of deposited mist in the growth environment. For example, the aqueous mist can be introduced into the growth environment resulting in a mean mist deposition rate that does not result in a detectable quantity of deposited mist on surfaces of the growth environment container or other structure, on the growth matrix, on the extra-particle aerial mycelial growth, and/or on other structures within the growth environment. Methods of detecting deposited mist include visual inspection methods for visibly detectable deposited mist, measuring a quantity of deposited mist based on mass of collected mist or deposited solute, or other reasonable detection methods.

A non-limiting example of a method of measuring an amount of deposited mist can be based upon the method of measuring mean mist deposition rate disclosed herein with respect to Example 8. Thus, in some embodiments, the aqueous mist can be introduced into the growth environment resulting in a mean mist deposition rate that does not result in a measurable mass of deposited mist in the growth environment. This can be confirmed after placing one or more open Petri dishes of known surface area in a growth environment during an incubation time period for at least 24 hours and at most about 7 days. Throughout this incubation time period, some amount of mist is present within the growth environment based upon some amount of mist introduction, allowing for the collection of some theoretical amount of deposited mist in the one or more open Petri dishes. The total theoretical mass of collected mist can be determined (to determine the mass of the deposited mist) and divided by the period of time (to determine the mean mist deposition rate based on mass). In embodiments wherein the aqueous mist present in the growth environment does not result in measurable mist deposition in the growth environment based on mass, the total amount (i.e., mass) of collected mist is negligible, i.e., not measurable within the tolerance of the balance used to determine the mass, but at some small amount above zero.

In some other embodiments, aqueous mist can be introduced into the growth environment resulting in a mean mist deposition rate that does not result in a measurable volume of deposited mist in the growth environment. This can be confirmed after placing one or more open Petri dishes of known surface area in a growth environment during an incubation time period for at least 24 hours and at most about 7 days. Throughout this incubation time period, some amount of mist is present within the growth environment based upon some amount of mist introduction, allowing for the collection of some theoretical volume of deposited mist in the one or more open Petri dishes. The total theoretical volume of collected mist can be determined (to determine the volume of the deposited mist) and divided by the period of time (to determine the mean mist deposition rate based on volume). In embodiments wherein the aqueous mist present in the growth environment does not result in measurable mist deposition in the growth environment based on volume, the total amount (i.e., volume) of collected mist is negligible, i.e., not measurable within the tolerance of the volumetric equipment used to determine the volume, but at some small amount above zero.

In yet other embodiments, the aqueous mist can be introduced into the growth environment resulting in a mean mist deposition rate that does not result in visible deposited mist in the growth environment. This can be confirmed after placing one or more open Petri dishes in a growth environment during an incubation time period for at least 24 hours and at most about 7 days. Throughout this incubation time period, some amount of mist is present within the growth environment based upon some amount of mist introduction, allowing for the collection of some theoretical amount of deposited mist in the one or more open Petri dishes. During and/or upon completion of the incubation time period, the one or more open Petri dishes can be visually inspected to confirm that no visible amount of mist deposition is present (functionally, when the one or more Petri dishes are dry).

Aerial mycelia of the present disclosure can be grown in a matter of weeks or days. This feature is of practical value in the production of food ingredient or food product, where time and efficiency are at a premium. Accordingly, the presently disclosed method of making an aerial mycelium comprises incubating a growth matrix in a growth environment for an incubation time period of up to about 3 weeks. In some embodiments, the incubation time period can be within a range of about 4 days to about 17 days. In some further embodiments, the incubation time period can be within a range of about 7 days to about 16 days, within a range of about 8 days to about 15 days, within a range of about 9 days to about 15 days, within a range of about 9 days to about 14 days, within a range of about 8 to about 14 days, within a range of about 7 to about 13 days, or within a range of about 7 to about 10 days. In some more particular embodiments, the incubation time period can be about 7 days, about 8 days, about 9 days, about 10 days, about 11 days, about 12 days, about 13 days, about 14 days, about 15 days or about 16 days, or any range therebetween.

Advantageously, incubating a growth matrix comprising a colonized substrate (wherein said colonized substrate comprises a growth medium previously colonized with mycelium of a fungus) in a growth environment of the present disclosure can result in earlier expression of aerial tissue compared to incubation of a growth matrix comprising substantially the same or a similar growth medium and a fungal inoculum, wherein the fungal inoculum contains a fungus. Accordingly, a method of making an aerial mycelium of the present disclosure can comprise incubating a growth matrix comprising a colonized substrate (wherein said colonized substrate comprises a growth medium previously colonized with mycelium of a fungus) in a growth environment for an incubation time period, and producing extra-particle aerial mycelial growth therefrom, wherein the incubation time period is at least about 1 day, at least about 2 days, at least about 3 days, or at least about 4 days less than the incubation time period for producing extra-particle aerial mycelial growth from a growth matrix comprising a growth medium and a fungal inoculum, wherein the fungal inoculum comprises a fungus.

In some other embodiments, the incubation time period ends no later than when a visible fruiting body forms. In a non-limiting example, the incubation time period can end prior to a karyogamy or meiosis phase of the fungal reproductive cycle. In some other embodiments, the incubation time period ends when a visible fruiting body forms. As disclosed herein, aerial mycelia of the present disclosure can be prepared without the formation of a visible fruiting body, thus, in some embodiments, an incubation time period can end without regard to the formation of a visible fruiting body. Trial incubation runs can be used to inform the period of time in the growth environment during which sufficient extra-particle aerial mycelial growth product occurs (e.g., aerial mycelial growth of a predetermined thickness) without the formation of visible fruiting bodies.

In some embodiments, the method of making an aerial mycelium of the present disclosure can comprise introducing aqueous mist into the growth environment throughout the incubation time period.

Beyond the discovery of a binary aerial growth response to aqueous mist (supra), Applicant has also discovered that aerial mycelia of the present disclosure can be prepared by exposing a growth matrix to aqueous mist throughout a portion of the incubation time period (e.g., by introducing mist into the growth environment throughout a portion of the incubation time period). Applicant has measured vertical expansion kinetics of mycelia over the course of an entire incubation period and has characterized the kinetics as having a primary myceliation phase and a vertical expansion phase (see Example 38). The primary myceliation phase included days 1 to 3 of the incubation time period. Introducing aqueous mist throughout a portion of the incubation time period (wherein the portion included the vertical expansion phase), and not introducing aqueous mist on days 1 to 3 of the incubation time period was sufficient to produce aerial mycelium having substantially similar characteristics to aerial mycelia obtained by depositing mist throughout the entire incubation period.

Thus, while some aspects of the present disclosure provide for a method of making an aerial mycelium comprising exposing a growth matrix to a growth environment comprising aqueous mist throughout the incubation time period (e.g., by introducing aqueous mist into the growth environment throughout the incubation time period, i.e., throughout the entire incubation time period), in other aspects, the present disclosure provides for a method of making an aerial mycelium comprising exposing a growth matrix to aqueous mist throughout a portion of the incubation time period (e.g., by introducing aqueous mist into the growth environment throughout a portion of the incubation time period). In some embodiments, a portion of the incubation time period can comprise a vertical expansion phase. In some further embodiments, a portion of the incubation time period can further comprise at least a portion of a primary myceliation phase. In some other embodiments, a portion of the incubation time period can exclude a primary myceliation phase. In yet some other embodiments, a portion of the incubation time period can comprise a vertical expansion phase. Accordingly, in some aspects, introducing aqueous mist into a growth environment throughout a portion of an incubation time period can comprise introducing aqueous mist into the growth environment throughout a vertical expansion phase.

In some embodiments, introducing aqueous mist into the growth environment throughout a portion of the incubation time period can comprise introducing aqueous mist into the growth environment throughout a vertical expansion phase and can exclude introducing aqueous mist during the primary myceliation phase. In some embodiments, the portion of the incubation time period can terminate at the end of a vertical expansion phase or can terminate at the end of an incubation time period.

In some other aspects, a portion of an incubation time period can begin during a first day, a second day, a third day or a fourth day of the incubation time period. Accordingly, in some aspects, introducing aqueous mist into a growth environment throughout a portion of an incubation time period can comprise introducing aqueous mist into the growth environment during a first, a second, a third or a fourth day of the incubation time period. In some embodiments, the portion of the incubation time period can terminate at the end of a vertical expansion phase or can terminate at the end of an incubation time period.

In some aspects, the total volume of aqueous mist introduced into the growth environment throughout the incubation period, or a portion thereof, is less than about 200 microliters/cm$^2$, is less than about 100 microliters/cm$^2$, is less than about 50 microliters/cm$^2$, is less than about 25 microliters/cm$^2$, is less than about 20 microliters/cm$^2$, is less than about 15 microliters/cm$^2$, or is less than about 10 microliters/cm$^2$. In some further aspects, the total volume of aqueous mist introduced into the growth environment throughout the incubation period, or a portion thereof, is at least about 5 microliters/cm$^2$.

In some aspect of the present disclosure, the aqueous mist can contain one or more dissolved solutes. US 2020/0146224, the entire contents of which are hereby incorporated by reference in their entirety to the extent not inconsistent with the content of this disclosure, discloses a method of growing a mycelium biopolymer material comprising placing the plurality of containers in a closed incubation chamber and distributing a mist through the incubation chamber for passage over the growth media in each container, wherein the mist includes moisture and a solute, such as minerals. US 2020/0146224 further discloses that growing tissue in each container comprises aerial hypha growing up and out of a nutritious space into a non-nutrient environment, and that, in order to control growth in such an environment, the organism employs the use of turgor pressure to regulate the extension of the hyphae at the hyphal tip; thus, regulating the amount, distribution and/or droplet size of available moisture and solutes deposited across the top surface of the growing material can control the osmotic gradient created within the hyphae and subsequently, its growth rate and pattern of colonization. Surprisingly, Applicant has discovered that aerial mycelial growth can be produced by introducing aqueous mist into the growth environment, which can result in depositing aqueous mist in the growth environment, wherein the aqueous mist contains substantially no amounts of dissolved solute onto the growth matrix and/or the extra-particle aerial mycelial growth produced therefrom. Examples 6 and 7 of the present disclosure each disclose a method of making an aerial mycelium, wherein the aqueous mist is sourced from tap water having a conductivity within a range of 400 to 500 microsiemens/cm; Examples 30, 31, 36 and 37 each disclose a method of making an aerial mycelium, wherein the aqueous mist is sourced from reverse osmosis filtered water having a conductivity within a range of 20 to 40 microsiemens/cm; and Examples 10 and 11 each disclose a method of making an aerial mycelium, wherein the aqueous mist is sourced from distilled water having a conductivity of about 3 microsiemens/cm. In addition to Applicant's discovery of a binary aerial growth response to aqueous mist (supra), Applicant has further discovered that this binary response is observed even when the aqueous mist contains substantially no amounts of dissolved solute. Moreover, the aerial mycelia of the present disclosure have properties including their native thickness that exceed those observed under standard culture conditions and exceed those of any mycelia found in nature.

Thus, in some aspects, the present disclosure provides for a method of growing an aerial mycelium in a growth environment, the growth environment comprising a growth matrix and aqueous mist, wherein the aqueous mist can have a conductivity of no greater than about 1100 microsiemens/cm. In some further aspects, the aqueous mist conductivity can be no greater than about 1000 microsiemens/cm, no greater than about 900 microsiemens/cm, no greater than about 800 microsiemens/cm, no greater than about 700 microsiemens/cm, no greater than about 600 microsiemens/cm, no greater than about 500 microsiemens/cm, no greater than about 400 microsiemens/cm, no greater than about 300 microsiemens/cm, no greater than about 200 microsiemens/cm, or no greater than about 100 microsiemens/cm. In some other aspects, the aqueous mist conductivity can be no greater than about 50 microsiemens/cm, no greater than about 40 microsiemens/cm, no greater than about 30 microsiemens/cm, no greater than about 20 microsiemens/cm, no greater than about 10 microsiemens/cm, or no greater than about 5 microsiemens/cm. In some further aspects, the method of growing the aerial mycelium comprises introducing aqueous mist into a growth environment comprising a growth matrix, wherein the aqueous mist can have a conductivity of no greater than about 500 microsiemens/cm. In some further aspects, the aqueous mist conductivity can be no greater than about 400 microsiemens/cm, no greater than about 300 microsiemens/cm, no greater than about 200 microsiemens/cm, or no greater than about 100 microsiemens/cm. In some other aspects, the aqueous mist conductivity can be no greater than about 50 microsiemens/cm, no greater than about 40 microsiemens/cm, no greater than about 30 microsiemens/cm, no greater than about 20 microsiemens/cm, no greater than about 10 microsiemens/cm, or no greater than about 5 microsiemens/cm.

As disclosed herein, in some embodiments, the mist comprises one or more solutes. In some embodiments, the one or more solutes is an additive. Non-limiting examples of additives are disclosed herein.

In some further aspects of the disclosure, the mist that is introduced into the growth environment is characterized as having a mist deposition rate and a mean mist deposition rate.

In some embodiments, the mean mist deposition rate is less than or equal to about 10 microliter/cm$^2$/hour, is less than or equal to about 5 microliter/cm$^2$/hour, is less than or equal to about 4 microliter/cm$^2$/hour, is less than or equal to about 3 microliter/cm$^2$/hour, or is less than or equal to about 2 microliter/cm$^2$/hour. In some embodiments, the mean mist deposition rate is less than or equal to about 1 microliter/cm$^2$/hour, is less than or equal to about 0.95 microliter/cm$^2$/hour, is less than or equal to about 0.9 microliter/cm$^2$/hour, less than or equal to about 0.85 microliter/cm$^2$/hour, is less than or equal to about 0.8 microliter/cm$^2$/hour, is less than or equal to about 0.75 microliter/cm$^2$/hour, is less than or equal to about 0.7 microliter/cm$^2$/hour, is less than or equal to about 0.65 microliter/cm$^2$/hour, is less than or equal to about 0.6 microliter/cm$^2$/hour, is less than or equal to about 0.55 microliter/$cm^2$/hour, or is less than or equal to about 0.5 microliter/$cm^2$/hour. In some further embodiments, the mean mist deposition rate is at least about 0.01 microliter/$cm^2$/hour, is at least about 0.02 microliter/$cm^2$/hour, is at least about 0.03 microliter/$cm^2$/hour, is at least about 0.04 microliter/$cm^2$/hour or is at least about 0.05 microliter/$cm^2$/hour. In yet some further embodiments, the mean mist deposition rate is within a range of: about 0.01 to about 10 microliter/$cm^2$/hour, about 0.01 to about 5 microliter/$cm^2$/hour, about 0.01 to about 4 microliter/$cm^2$/hour, about 0.01 to about 3 microliter/$cm^2$/hour, about 0.01 to about 2 microliter/$cm^2$/hour, about 0.01 to about 1 microliter/$cm^2$/hour, about 0.01 to about 1 microliter/$cm^2$/hour, about 0.01 to about 0.9 microliter/$cm^2$/hour, about 0.01 to about 0.8 microliter/$cm^2$/hour, about 0.01 to about 0.75 microliter/$cm^2$/hour, about 0.01 to about 0.7 microliter/$cm^2$/hour, about 0.02 to about 10 microliter/$cm^2$/hour, about 0.02 to about 5 microliter/$cm^2$/hour, about 0.02 to about 4 microliter/$cm^2$/hour, about 0.02 to about 3 microliter/$cm^2$/hour, about 0.02 to about 2 microliter/$cm^2$/hour, about 0.02 to about 1 microliter/$cm^2$/hour, about 0.02 to about 0.9 microliter/$cm^2$/hour, about 0.02 to about 0.8 microliter/$cm^2$/hour, about 0.02 to about 0.75 microliter/$cm^2$/hour, about 0.02 to about 0.7 microliter/$cm^2$/hour, about 0.03 to about 10 microliter/$cm^2$/hour, about 0.03 to about 5 microliter/$cm^2$/hour, about 0.03 to about 4 microliter/$cm^2$/hour, about 0.03 to about 3 microliter/$cm^2$/hour, about 0.03 to about 2 microliter/$cm^2$/hour, about 0.03 to about 1 microliter/$cm^2$/hour, about 0.03 to about 0.9 microliter/$cm^2$/hour, about 0.03 to about 0.8 microliter/$cm^2$/hour, about 0.03 to about 0.75 microliter/$cm^2$/hour, about 0.03 to about 0.7 microliter/$cm^2$/hour, about 0.04 to about 10 microliter/$cm^2$/hour, about 0.04 to about 5 microliter/$cm^2$/hour, about 0.04 to about 4 microliter/$cm^2$/hour, about 0.04 to about 3 microliter/$cm^2$/hour, about 0.04 to about 2 microliter/$cm^2$/hour, about 0.04 to about 1 microliter/$cm^2$/hour, about 0.04 to about 0.9 microliter/$cm^2$/hour, about 0.04 to about 0.8 microliter/$cm^2$/hour, about 0.04 to about 0.75 microliter/$cm^2$/hour, about 0.04 to about 0.7 microliter/$cm^2$/hour, about 0.05 to about 10 microliter/$cm^2$/hour, about 0.05 to about 5 microliter/$cm^2$/hour, about 0.05 to about 4 microliter/$cm^2$/hour, about 0.05 to about 3 microliter/$cm^2$/hour, about 0.05 to about 2 microliter/$cm^2$/hour, about 0.05 to about 1 microliter/$cm^2$/hour, about 0.05 to about 0.9 microliter/$cm^2$/hour, about 0.05 to about 0.8 microliter/$cm^2$/hour, about 0.05 to about 0.75 microliter/$cm^2$/hour, about 0.05 to about 0.7 microliter/$cm^2$/hour, about 0.1 to about 10 microliter/$cm^2$/hour, about 0.1 to about 5 microliter/$cm^2$/hour, about 0.1 to about 4 microliter/$cm^2$/hour, about 0.1 to about 3 microliter/$cm^2$/hour, about 0.1 to about 2 microliter/$cm^2$/hour, about 0.1 to about 1 microliter/$cm^2$/hour, about 0.1 to about 0.9 microliter/$cm^2$/hour, about 0.1 to about 0.8 microliter/$cm^2$/hour, about 0.1 to about 0.75 microliter/$cm^2$/hour, about 0.1 to about 0.7 microliter/$cm^2$/hour, about 0.2 to about 10 microliter/$cm^2$/hour, about 0.2 to about 5 microliter/$cm^2$/hour, about 0.2 to about 4 microliter/$cm^2$/hour, about 0.2 to about 3 microliter/$cm^2$/hour, about 0.2 to about 2 microliter/$cm^2$/hour, about 0.2 to about 1 microliter/$cm^2$/hour, about 0.2 to about 0.9 microliter/$cm^2$/hour, about 0.2 to about 0.8 microliter/$cm^2$/hour, about 0.2 to about 0.75 microliter/$cm^2$/hour, about 0.2 to about 0.7 microliter/$cm^2$/hour, about 0.2 to about 0.6 microliter/$cm^2$/hour, about 0.2 to about 0.5 microliter/$cm^2$/hour, about 0.2 to about 0.4 microliter/$cm^2$/hour, about 0.3 to about 0.5 microliter/$cm^2$/hour, about 0.3 to about 0.4 microliter/$cm^2$/hour or about 0.30 to about 0.35 microliter/$cm^2$/hour. In some more particular embodiments, the mean mist deposition rate is about 0.05 microliters/$cm^2$/hour, about 0.10 microliters/$cm^2$/hour, about 0.15 microliters/$cm^2$/hour, about 0.20 microliters/$cm^2$/hour, about 0.25 microliters/$cm^2$/hour, about 0.30 microliters/$cm^2$/hour, about 0.35 microliters/$cm^2$/hour, about 0.40 microliters/$cm^2$/hour, about 0.45 microliters/$cm^2$/hour, about 0.50 microliters/$cm^2$/hour, about 0.55 microliters/$cm^2$/hour, about 0.60 microliters/$cm^2$/hour, about 0.65 microliters/$cm^2$/hour, about 0.70 microliters/$cm^2$/hour, about 0.75 microliters/$cm^2$/hour, about 0.80 microliters/$cm^2$/hour, about 0.85 microliters/$cm^2$/hour, about 0.90 microliters/$cm^2$/hour, about 0.95 microliters/$cm^2$/hour, or about 1.0 microliters/$cm^2$/hour, or any range therebetween.

In yet some further aspects of the disclosure, the mist that is introduced into the growth environment is characterized as having a mist deposition rate.

In some embodiments, the mist deposition rate is less than about 50 microliter/$cm^2$/hour, is less than about 25 microliter/$cm^2$/hour, is less than about 15 microliter/$cm^2$/hour, is less than about 10 microliter/$cm^2$/hour, is less than about 5 microliter/$cm^2$/hour, is less than about 4 microliter/$cm^2$/hour, is less than about 3 microliter/$cm^2$/hour, or is less than about 2 microliter/$cm^2$/hour. In some more particular embodiments, the mist deposition rate is less than about 1 microliter/$cm^2$/hour. In some further embodiments, the mist deposition rate is at least about 0.01 microliter/$cm^2$/hour, is at least about 0.02 microliter/$cm^2$/hour, is at least about 0.03 microliter/$cm^2$/hour, is at least about 0.04 microliter/$cm^2$/hour, or is at least about 0.05 microliter/$cm^2$/hour. In yet some further embodiments, the mist deposition rate is within a range of: about 0.05 to about 0.8 microliter/$cm^2$/hour, about 0.05 to about 0.75 microliter/$cm^2$/hour, about 0.1 to about 0.8 microliter/$cm^2$/hour, about 0.1 to about 0.75 microliter/$cm^2$/hour, about 0.2 to about 0.8 microliter/$cm^2$/hour, about 0.2 to about 0.75 microliter/$cm^2$/hour, about 0.2 to about 0.7 microliter/$cm^2$/hour, about 0.2 to about 0.6 microliter/$cm^2$/hour, about 0.2 to about 0.5 microliter/$cm^2$/hour, about 0.2 to about 0.4 microliter/$cm^2$/hour, about 0.3 to about 0.5 microliter/$cm^2$/hour, about 0.3 to about 0.4 microliter/$cm^2$/hour or about 0.30 to about 0.35 microliter/$cm^2$/hour. In yet more particular embodiments still, the mist deposition rate is about 0.01 microliters/$cm^2$/hour, about 0.02 microliters/$cm^2$/hour, about 0.03 microliters/$cm^2$/hour, about 0.04 microliters/$cm^2$/hour, about 0.05 microliters/$cm^2$/hour, about 0.10 microliters/$cm^2$/hour, about 0.15 microliters/$cm^2$/hour, about 0.20 microliters/$cm^2$/hour, about 0.25 microliters/$cm^2$/hour, about 0.30 microliters/$cm^2$/hour, about 0.35 microliters/$cm^2$/hour, about 0.40 microliters/$cm^2$/hour, about 0.45 microliters/$cm^2$/hour, about 0.50 microliters/$cm^2$/hour, about 0.55 microliters/$cm^2$/hour, about 0.60 microliters/$cm^2$/hour, about 0.65 microliters/$cm^2$/hour, about 0.70 microliters/$cm^2$/hour, about 0.75 microliters/$cm^2$/hour, about 0.80 microliters/$cm^2$/hour, about 0.85 microliters/$cm^2$/hour, about 0.90 microliters/$cm^2$/hour, or about 0.95 microliters/$cm^2$/hour, or any range therebetween.

In some embodiments, the mist deposition rate is at most about 20-fold greater than the mean mist deposition rate. In some embodiments, the mist deposition rate is at most about 10-fold greater than the mean mist deposition rate. In some further embodiments, the mist deposition rate is at most about 5-fold greater, is at most 4-fold greater, is at most about 3-fold greater, or is at most about 2-fold greater than the mean mist deposition rate. In some embodiments, the mist deposition rate is substantially the same as the mean mist deposition rate. In some more particular embodiments, the mist deposition rate is less than about 2 microliter/$cm^2$/hour and the mean mist deposition rate is less than about 1 microliter/$cm^2$/hour. In yet further embodiments, the mist deposition rate and the mean mist deposition rate are each less than about 1 microliter/cm$^2$/hour. In yet further embodiments still, the mist deposition rate is less than about 1 microliter/cm$^2$/hour, and the mean mist deposition rate is less than about 0.5 microliter/cm$^2$/hour.

In other embodiments, the mist deposition rate is at most about 150 microliter/cm$^2$/hour, is at most about 100 microliter/cm$^2$/hour, is at most about 75 microliter/cm$^2$/hour, is at most about 50 microliter/cm$^2$/hour, or is at most about 25 microliter/cm$^2$/hour. In some further embodiments, the mist deposition rate is at least about 10 microliters/cm$^2$/hour or is at least about 15 microliters/cm$^2$/hour. In some embodiments, the mist deposition rate is at most about 100 microliter/cm$^2$/hour, and the mean mist deposition rate is at least about 10 microliters/cm$^2$/hour or is at least about 15 microliters/cm$^2$/hour.

In some non-limiting embodiments, aqueous mist can be introduced into the growth environment via a misting apparatus, which can be incorporated into the growth environment. The apparatus that introduces the aqueous mist can be the same or different than an apparatus that controls relative humidity of the growth environment. Non-limiting examples of a misting apparatus suitable for introducing mist into the growth environment include a high pressure misting pump, a nebulizer, an aerosol generator or aerosolizer, a mist generator, an ultrasonic nebulizer, an ultrasonic aerosol generator or aerosolizer, an ultrasonic mist generator, a dry fog humidifier, an ultrasonic humidifier or an atomizer misting system (including but not limited to a "misting puck"), essentially as described in WO 2019/099474 A1, the entire content of which is hereby incorporated by reference in its entirety, or a print head configured to deposit mist, such as a 3D printer, essentially as described in U.S. patent application Ser. No. 16/688,699, the entire content of which is hereby incorporated by reference in its entirety. In some other non-limiting embodiments, mist can be introduced into the growth environment via modulation of growth environmental factors such as growth environment atmospheric pressure, temperature and/or relative humidity, or via modulation of the growth atmosphere dew point.

In some embodiments, the mist can be continuously introduced into the growth environment. In some further embodiments, the continuous introduction of mist can be pulse width modulated. In some other embodiments, the continuous introduction of mist deposition can occur at a fixed rate. In yet some other embodiments, the continuous introduction of mist deposition can occur at a variable rate.

In other embodiments, the mist can be intermittently introduced into the growth environment. In some further embodiments, the intermittent introduction of mist can occur at a fixed rate. In other further embodiments, the intermittent introduction of mist can occur at a variable rate. In other further embodiments, the intermittent introduction of mist can occur at regular or irregular periods. In other further embodiments, the intermittent introduction of mist can occur with regular or irregular intervals therebetween without mist introduction.

In some embodiments, a misting apparatus can be operated at a particular duty cycle. In some embodiments, the misting apparatus is operated at a duty cycle of about 100%. In some embodiments, the misting apparatus is operated at a duty cycle within a range of about 0.1% to about 100%. In some embodiments, the misting apparatus is operated at a duty cycle within a range of about 1% to about 100%, about 5% to about 100%, about 10% to about 100%, about 15% to about 100%, about 20% to about 100% or about 25% to about 100%. In some other embodiments, the misting apparatus is operated at a duty cycle of less than 100%. In some embodiments, the misting apparatus is operated at a duty cycle of no greater than about 75%, no greater than about 50%, no greater than about 40%, no greater than about 30%, no greater than about 25%, no greater than about 20% or no greater than about 15%. In some further embodiments, the misting apparatus is operated at a duty cycle of at least about 1%, at least about 5%, at least about 10%, at least about 15%, at least about 20% or at least about 25%. In some more particular embodiments, the misting apparatus is operated within a range of about 1% to about 15%, about 5% to about 25%, about 25% to about 50%, about 50% to about 75%, or about 75% to about 100%.

In some embodiments, a duty cycle can be further characterized by a cycle period. Non-limiting examples include a duty cycle period of about 3600 second (i.e., about 1 hour), about 1800 seconds (i.e., about 30 minutes), about 360 seconds, (i.e., about 6 minutes), about 180 seconds (i.e., about 3 minutes), or about 60 seconds (i.e., about 1 minute), or any value or range therebetween. In some embodiments, a duty cycle period can be at most about 60 minutes, at most about 30 minutes, at most about 15 minutes, or at most about 10 minutes. In some other embodiments, a duty cycle period can be at most about 9 minutes, at most about 8 minutes, at most about 7 minutes or at most about 6 minutes.

As disclosed herein, a method of making an aerial mycelium of the present disclosure can include introducing aqueous mist into the growth environment throughout an incubation time period. Introducing aqueous mist "throughout the incubation time period" as used herein refers to introducing the aqueous mist from the beginning of the incubation time period to the end of the incubation time period. In some aspects, introducing aqueous mist into the growth environment can comprise operating a misting apparatus at a duty cycle of greater than zero from the beginning of the incubation time period to the end of the incubation time period. In a non-limiting example, introducing aqueous mist into a growth environment throughout the incubation time period can comprise operating a misting apparatus at a 50% duty cycle from the beginning of the incubation time period to the end of the incubation time period. Further to this non-limiting example, the misting apparatus operating at the 50% duty cycle can have a duty cycle period of at most about 10 minutes. Thus, in this non-limiting example, the misting apparatus can operate (and thus release mist) for 5 minutes out of each 10-minute duty cycle period, and each 10-minute duty cycle period repeats from the beginning of the incubation time period to the end of the incubation time period. Similarly, introducing mist "throughout a portion of the incubation time period" as used herein refers to introducing the mist from the beginning of the portion of the incubation time period to the end of the portion of the incubation time period. In some embodiments, the end of the portion of the incubation time period can be the end of the entire incubation time period. In some aspects, introducing aqueous mist into the growth environment throughout a portion of the incubation time period can comprise operating a misting apparatus at a duty cycle of greater than zero from the beginning of the portion of the incubation time period to the end of the portion of the incubation time period. It will be understood that introducing aqueous mist "throughout the incubation time period" and "throughout a portion of the incubation time period" as used herein can include, but do not require, mist introduction at exactly the beginning, nor exactly the end of the incubation time period or the portion of the incubation time period, for example, in embodiments where the mist is not applied continuously throughout the entirety of the incubation time period or the portion of the incubation time period.

In some aspects, the present disclosure provides for an aqueous mist characterized as having a mean droplet diameter. In some embodiments, the aqueous mist has a droplet diameter within a range of about 1 to about 30 microns, within a range of about 1 to about 25 microns, within a range of about 1 to about 20 microns, within a range of about 1 to about 15 microns, within a range of about 1 to about 10 microns, or within a range of about 5 to about 10 microns.

The present disclosure provides for a growth environment atmosphere that is characterized as having a relative humidity sufficient to support mycelial growth. In some aspects, a growth environment atmosphere of the present disclosure can have a relative humidity of at least about 70%. In some other embodiments, a growth environment atmosphere of the present disclosure can have a relative humidity of at least about 75%, at least about 80%, at least about 85%, or at least about 90%. In yet some other embodiments, a growth environment atmosphere of the present disclosure can have a relative humidity of at least about 95%. In some more particular embodiments, the growth environment atmosphere can have a relative humidity of at least about 96%, or at least about 97%. In some even more particular embodiments, the growth environment atmosphere can have a relative humidity of at least about 98%. In yet more particular embodiments still, the growth environment atmosphere can have a relative humidity of at least about 99% or can have a relative humidity of about 100%. In some embodiments, the growth environment atmosphere can have a relative humidity of 99.0%, 99.1%, 99.2%, 99.3%, 99.4%, 99.5%, 99.6%, 99.7%, 99.8% or 99.9%; or any range therebetween. In some more particular embodiments, the growth environment atmosphere can have a relative humidity of at least 99.9%. In some embodiments, the growth environment atmosphere can have a relative humidity of about 100%. In some further embodiments still, the growth environment atmosphere can have a relative humidity of greater than 100%. In some embodiments, the growth environment atmosphere can be a saturated atmosphere. In some other embodiments, the growth environment atmosphere can be a supersaturated atmosphere. As used herein, a "supersaturated atmosphere" refers to an atmosphere wherein the relative humidity greater than 100%. Regardless of the relative humidity of the growth environment atmosphere, a growth environment of the present disclosure that is suitable for producing aerial mycelium contains liquid phase water in the form of aqueous mist. Thus, even in a growth environment having a saturated or supersaturated atmosphere, methods of growing aerial mycelia of the present disclosure can include introducing aqueous mist to the growth environment; accordingly, a growth environment of the present disclosure can include a saturated or supersaturated growth atmosphere plus aqueous mist that is introduced from a source other than the water vapor held in the saturated or supersaturated atmosphere. In sum, a growth environment of the present disclosure contains water vapor and droplets of liquid water in the form of aqueous mist.

Means of introducing and regulating relative humidity of a growth environment suitable for the growth of mushrooms and/or mycelia would be readily understood by a person of ordinary skill in the art in the mushroom or mycelial cultivation industry. In some embodiments, the relative humidity can be controlled independent of misting using conventional heating, ventilation, and air conditioning (HVAC) practices. For example, gaseous moisture can be added to the growth environment introducing steam into the growth atmosphere via such conventional HVAC practices. In other embodiments, an interplay between the gas phase water vapor and liquid phase aqueous mist can be exploited. Accordingly, aqueous mist can be introduced into the growth environment at an increased or decreased rate as a means of modifying the growth environment relative humidity.

Applicant has discovered that aerial mycelial growth can be produced from a growth matrix in a growth environment comprising very low levels of aqueous mist. Thus, in some aspects of the present disclosure, there is provided a method of making an aerial mycelium, comprising incubating a growth matrix in a growth environment for an incubation time period, wherein the growth matrix comprises a substrate and a fungus; introducing aqueous mist into the growth environment throughout the incubation time period, or a portion thereof; and producing extra-particle aerial mycelial growth from the growth matrix; wherein introducing comprises introducing the aqueous mist into the growth environment resulting in a mean mist deposition rate of at most about 0.45 microliter/cm$^2$/hour. In some embodiments, the introducing comprises introducing the aqueous mist into the growth environment resulting in an instantaneous mist deposition rate and the mean mist deposition rate, wherein the ratio of the instantaneous mist deposition rate to the mean mist deposition rate is at most about 20 to about 1. In some embodiments, the ratio of the instantaneous mist deposition rate to the mean mist deposition rate is at most about 10 to about 1. In some embodiments, the ratio of the instantaneous mist deposition rate to the mean mist deposition rate is at most about 5 to about 1. In some embodiments, the introducing further comprises introducing the aqueous mist into the growth environment resulting in an instantaneous mist deposition rate of at most about 2 microliter/cm$^2$/hour. In some embodiments, the introducing comprises introducing the aqueous mist into the growth environment resulting in a mean mist deposition rate of at most about 0.40 microliter/cm$^2$/hour, at most about 0.35 microliter/cm$^2$/hour, at most about 0.30 microliter/cm$^2$/hour, at most about 0.25 microliter/cm$^2$/hour, at most about 0.20 microliter/cm$^2$/hour, at most about 0.15 microliter/cm$^2$/hour, or at most about 0.10 microliter/cm$^2$/hour. In some embodiments, the mean mist deposition rate is at least about 0.01 microliter/cm$^2$/hour. In some embodiments, the growth matrix comprises the substrate and a fungal inoculum, said fungal inoculum comprising said fungus. In some other embodiments, the growth matrix comprises a colonized substrate, said colonized substrate comprising the substrate, wherein said substrate is previously colonized with mycelium of said fungus. In some embodiments, the colonized substrate is a fragmented colonized substrate.

In some other aspects of the present disclosure, there is provided a method of making an aerial mycelium, comprising incubating a growth matrix in a growth environment for an incubation time period, wherein the growth matrix comprises a substrate and a fungus; introducing aqueous mist into the growth environment throughout the incubation time period, or a portion thereof; and producing extra-particle aerial mycelial growth from the growth matrix; wherein introducing comprises introducing the aqueous mist into the growth environment resulting in a mean mist deposition rate of that is below about 0.01 microliter/cm$^2$/hour. In some embodiments, the introducing comprises introducing the aqueous mist into the growth environment resulting in a mean mist deposition rate that does not result in a detectable quantity of deposited mist in the growth environment. In some embodiments, the introducing comprises introducing the aqueous mist into the growth environment resulting in a mean mist deposition rate that does not result in a visible quantity of deposited mist in the growth environment. In some embodiments, the introducing comprises introducing the aqueous mist into the growth environment resulting in a mean mist deposition rate that does not result in a measurable quantity of deposited mist in the growth environment. In some embodiments, the introducing comprises introducing the aqueous mist into the growth environment resulting in a mean mist deposition rate that does not result in detectable quantities of deposited mist in the growth environment on the growth matrix, the extra-particle aerial mycelial growth, or both. In some embodiments, the growth matrix comprises the substrate and a fungal inoculum, said fungal inoculum comprising said fungus. In some other embodiments, the growth matrix comprises a colonized substrate, said colonized substrate comprising the substrate, wherein said substrate is previously colonized with mycelium of said fungus. In some embodiments, the colonized substrate is a fragmented colonized substrate.

In some other aspects of the present disclosure, there is provided a method of making an aerial mycelium, comprising incubating a growth matrix in a growth environment for an incubation time period, wherein the growth matrix comprises a substrate and a fungus; introducing aqueous mist into the growth environment throughout the incubation time period, or a portion thereof; and producing extra-particle aerial mycelial growth from the growth matrix; wherein the total quantity of aqueous mist resulting from the introducing aqueous mist that is deposited on the growth matrix, the resulting extra-particle aerial mycelial growth, or both, is negligible. In some embodiments, the growth matrix comprises the substrate and a fungal inoculum, said fungal inoculum comprising said fungus. In some other embodiments, the growth matrix comprises a colonized substrate, said colonized substrate comprising the substrate, wherein said substrate is previously colonized with mycelium of said fungus. In some embodiments, the colonized substrate is a fragmented colonized substrate.

In some other aspects of the present disclosure, there is provided a method of making an aerial mycelium, comprising providing a growth environment, the growth environment comprising an amount of aqueous mist; incubating a growth matrix in the growth environment for an incubation time period, wherein the growth matrix comprises a substrate and a fungus, wherein incubating comprises exposing the growth matrix to the aqueous mist during at least a portion of the incubation time period; and producing extra-particle aerial mycelial growth from the growth matrix; wherein a mean mist deposition rate resulting from the amount of aqueous mist during the at least a portion of the incubation time period is below about 0.01 microliter/cm$^2$/hour. In some embodiments, the mean mist deposition rate is below an amount that results in a detectable quantity of deposited mist in the growth environment. In some embodiments, the method further comprises introducing the aqueous mist into the growth environment. In some embodiments, the growth matrix comprises the substrate and a fungal inoculum, said fungal inoculum comprising said fungus. In some other embodiments, the growth matrix comprises a colonized substrate, said colonized substrate comprising the substrate, wherein said substrate is previously colonized with mycelium of said fungus. In some embodiments, the colonized substrate is a fragmented colonized substrate.

In some other aspects of the present disclosure, there is provided a method of making an aerial mycelium, comprising introducing aqueous mist into a growth environment; incubating a growth matrix in a growth environment for an incubation time period, wherein the growth matrix comprises a substrate and a fungus, and wherein incubating comprises exposing the growth matrix to the aqueous mist; and producing extra-particle aerial mycelial growth from the growth matrix; wherein introducing comprises introducing the aqueous mist into the growth environment resulting in a mean mist deposition rate that is below about 0.01 microliter/cm$^2$/hour. In some embodiments, introducing comprises introducing the aqueous mist into the growth environment resulting in a mean mist deposition rate that does not result in a detectable quantity of deposited mist in the growth environment. In some embodiments, the growth matrix comprises the substrate and a fungal inoculum, said fungal inoculum comprising said fungus. In some other embodiments, the growth matrix comprises a colonized substrate, said colonized substrate comprising the substrate, wherein said substrate is previously colonized with mycelium of said fungus. In some embodiments, the colonized substrate is a fragmented colonized substrate.

Definitions and Methods Related to Edibility

In some aspects, the present disclosure provides for an edible mycelium-based food product or an edible mycelium-based food ingredient.

"Edible" as used herein refers to being generally regarded as safe to be eaten by humans, especially after cooking; being generally considered palatable by humans; and/or being capable of being substantially masticated by humans.

An edible mycelium-based food product or food ingredient can be distinguished from a mycelium-based medicine or from a mycelium-based nutritional supplement upon consideration of factors such as the method, form and/or quantity for ingestion.

In some embodiments, an edible mycelium-based product or ingredient of the present disclosure can exclude a mycelium-based medicine. In some other embodiments, an edible mycelium-based product or ingredient of the present disclosure can exclude a mycelium-based nutritional supplement.

In some aspects, the present disclosure provides for an aerial mycelium characterized by its native nutritional content. As used herein, "native nutritional content" refers to the nutritional content of an aerial mycelium obtained after an incubation time period has elapsed and the resulting mycelial growth has been removed from a growth matrix, and prior to performing any optional environmental, physical, or other post-processing step(s) that may substantially alter the nutritional content of the aerial mycelium so obtained. Non-limiting examples of native nutritional content include native protein content, native fat content, native carbohydrate content, native dietary fiber content, native vitamin content, native mineral content, and so on. Typically, the nutritional content is reported based on the dry weight of the mycelium (see Example 34).

Thus, in some aspects, an aerial mycelium of the present disclosure is characterized as having a native protein content. In some embodiments, an aerial mycelium of the present disclosure is characterized as having a native protein content of at least about 20% (w/w), or at least about 25% (w/w), on a dry weight basis. In some further embodiments, an aerial mycelium of the present disclosure is characterized as having a native protein content of at most about 50% (w/w), or at most about 45% (w/w), on a dry weight basis. In some embodiments, an aerial mycelium of the present disclosure is characterized as having a native protein content within a range of about 20% to about 50% (w/w), about 21% to about 49% (w/w), about 22% to about 48% (w/w), about 23% to about 47%, about 24% to about 46% (w/w), about 25% to about 45% (w/w), about 26% to about 44% (w/w), about 27% to about 43% (w/w) or about 28% to about 42% (w/w), on a dry weight basis. In some more particular embodiments, an aerial mycelium of the present disclosure is characterized as having a native protein content of about 20% (w/w), about 21% (w/w), about 22% (w/w), about 23% (w/w), about 24% (w/w), about 25% (w/w), about 26% (w/w), about 27% (w/w), about 28% (w/w), about 29% (w/w), about 30% (w/w), about 31% (w/w), about 32% (w/w), about 33% (w/w), about 34% (w/w), about 34% (w/w), about 35% (w/w), about 36% (w/w), about 37% (w/w), about 38% (w/w), about 39% (w/w), about 40% (w/w), about 41% (w/w), about 42% (w/w), about 43% (w/w), about 44% (w/w), about 45% (w/w), about 46% (w/w), about 47% (w/w), about 48% (w/w), about 49% (w/w) or about 50% (w/w), on a dry weight basis.

In some aspects, an aerial mycelium of the present disclosure is characterized as having a native fat content. As used herein, native fat content refers to native triglyceride content, and can be determined according to methods known to persons of ordinary skill in the art. In a non-limiting example, the fat content is determined according to Example 34C. In some embodiments, an aerial mycelium of the present disclosure is characterized as having a native fat content of at most about 7% (w/w), or at most about 6% (w/w), on a dry weight basis. In some further embodiments, an aerial mycelium of the present disclosure is characterized as having a native fat content of at least about 1% (w/w), at least about 1.5% (w/w), at least about 2% (w/w), at least about 2.5% w/w) or at least about 3% (w/w), on a dry weight basis. In yet some further embodiments, an aerial mycelium of the present disclosure is characterized as having a native fat content within a range of about 1% (w/w) to about 7% (w/w), or about 1.5% to about 6.5% (w/w), on a dry weight basis. In some more particular embodiments, an aerial mycelium of the present disclosure is characterized as having a native fat content of about 1% (w/w), about 1.1% (w/w), about 1.2% (w/w), about 1.3% (w/w), about 1.4% (w/w), about 1.5% (w/w), about 1.6% (w/w), about 1.7% (w/w), about 1.8% (w/w), about 1.9% (w/w), about 2.0% (w/w), about 2.1% (w/w), about 2.2% (w/w), about 2.3% (w/w), about 2.4% (w/w), about 2.5% (w/w), about 2.6% (w/w), about 2.7% (w/w), about 2.8% (w/w), about 2.9% (w/w), about 3.0% (w/w), about 3.1% (w/w), about 3.2% (w/w), about 3.3% (w/w), about 3.4% (w/w), about 3.5% (w/w), about 3.6% (w/w), about 3.7% (w/w), about 3.8% (w/w), about 3.9% (w/w), about 4.0% (w/w), about 4.1% (w/w), about 4.2% (w/w), about 4.3% (w/w), about 4.4% (w/w), about 4.5% (w/w), about 4.6% (w/w), about 4.7% (w/w), about 4.8% (w/w), about 4.9% (w/w), about 5.0% (w/w), about 5.1% (w/w), about 5.2% (w/w), about 5.3% (w/w), about 5.4% (w/w), about 5.5% (w/w), about 5.6% (w/w), about 5.7% (w/w), about 5.8% (w/w), about 5.9% (w/w), about 6.0% (w/w), about 6.1% (w/w), about 6.2% (w/w), about 6.3% (w/w), about 6.4% (w/w), about 6.5% (w/w), about 6.6% (w/w), about 6.7% (w/w), about 6.8% (w/w), about 6.9% (w/w) or about 7.0% (w/w), on a dry weight basis.

In some aspects, an aerial mycelium of the present disclosure is characterized as having a native carbohydrate content. In some embodiments, an aerial mycelium of the present disclosure is characterized as having a native carbohydrate content of at least about 30% (w/w), or at least about 35% (w/w), on a dry weight basis. In some further embodiments, an aerial mycelium of the present disclosure is characterized as having a native carbohydrate content of at most about 60% (w/w), or at most about 55% (w/w), on a dry weight basis. In some embodiments, an aerial mycelium of the present disclosure is characterized as having a native carbohydrate content within a range of about 30% (w/w) to about 60% (w/w), about 35% (w/w) to about 55% (w/w), about 40% (w/w) to about 55% (w/w), about 40% (w/w) to about 50% (w/w), or about 45% (w/w) to about 55% (w/w), on a dry weight basis. In some more particular embodiments, an aerial mycelium of the present disclosure is characterized as having a native carbohydrate content of about 30% (w/w), about 31% (w/w), about 32% (w/w), about 33% (w/w), about 34% (w/w), about 34% (w/w), about 35% (w/w), about 36% (w/w), about 37% (w/w), about 38% (w/w), about 39% (w/w), about 40% (w/w), about 41% (w/w), about 42% (w/w), about 43% (w/w), about 44% (w/w), about 45% (w/w), about 46% (w/w), about 47% (w/w), about 48% (w/w), about 49% (w/w), about 50% (w/w), about 51% (w/w), about 52% (w/w), about 53% (w/w), about 54% (w/w), about 55% (w/w), about 56% (w/w), about 57% (w/w), about 58% (w/w), about 59% (w/w) or about 60% (w/w), on a dry weight basis.

In some aspects, an aerial mycelium of the present disclosure is characterized as having a native inorganic content. As used herein, native inorganic content is reported based on ash content, which can be determined according to methods known to persons of ordinary skill in the art. In a non-limiting example, the ash content is determined according to Example 34F. In some embodiments, an aerial mycelium of the present disclosure is characterized as having a native inorganic content of at least about 5% (w/w), at least about 6% (w/w), at least about 7% (w/w), at least about 8% (w/w) or at least about 9% (w/w), or at least about 10% (w/w), on a dry weight basis. In some further embodiments, an aerial mycelium of the present disclosure is characterized as having a native inorganic content of at most about 20% (w/w), on a dry weight basis. In some embodiments, an aerial mycelium of the present disclosure is characterized as having a native inorganic content within a range of about 5% (w/w) to about 20% (w/w), about 6% (w/w) to about 20% (w/w), about 7% (w/w) to about 20% (w/w), about 8% (w/w) to about 20% (w/w), about 9% (w/w) to about 20% (w/w), about 10% (w/w) to about 20% (w/w), or about 9% (w/w) to about 18% (w/w), on a dry weight basis. In some more particular embodiments, an aerial mycelium of the present disclosure is characterized as having a native inorganic content of about 5% (w/w), about 6% (w/w), about 7% (w/w), about 8% (w/w), about 9% (w/w), about 10% (w/w), about 11% (w/w), about 12% (w/w), about 13% (w/w), about 14% (w/w), about 15% (w/w), about 16% (w/w), about 17% (w/w), about 18% (w/w), about 19% (w/w) or about 10% (w/w), on a dry weight basis.

In some aspects, an aerial mycelium of the present disclosure is characterized as having a native dietary fiber content. In some embodiments, an aerial mycelium of the present disclosure is characterized as having a native dietary fiber content of at least about 15% (w/w), on a dry weight basis. In some further embodiments, an aerial mycelium of the present disclosure is characterized as having a native dietary fiber content of at most about 35% (w/w), on a dry weight basis. In some embodiments, an aerial mycelium of the present disclosure is characterized as having a native dietary fiber content within a range of about 15% (w/w) to about 35% (w/w), on a dry weight basis. In some more particular embodiments, an aerial mycelium of the present disclosure is characterized as having a native dietary fiber content of about 15% (w/w), about 16% (w/w), about 17% (w/w), about 18% (w/w), about 19% (w/w), about 20%

(w/w), about 21% (w/w), about 22% (w/w), about 23% (w/w), about 24% (w/w), about 25% (w/w), about 26% (w/w), about 27% (w/w), about 28% (w/w), about 29% (w/w), about 30% (w/w), about 31% (w/w), about 32% (w/w), about 33% (w/w), about 34% (w/w) or about 35% (w/w), on a dry weight basis.

In some aspects, the present disclosure provides for an aerial mycelium having a native potassium content of at least about 4000 milligrams of potassium per 100 grams of dry aerial mycelium. In some embodiments, an aerial of the present disclosure has a native potassium content within a range of about 4000 mg potassium per 100 g dry aerial mycelium to about 7000 mg potassium per 100 g dry aerial mycelium. In some further embodiments, an aerial of the present disclosure has a native potassium content within a range of about 4500 mg potassium per 100 g dry aerial mycelium to about 6500 mg potassium per 100 g dry aerial mycelium.

Methods Related to Post-Processing Steps

In some aspects, the present disclosure provides for methods of post-processing an aerial mycelium of the present disclosure. Methods of post-processing mycelial tissue, including methods of post-processing a mycelial biopolymer to provide a material that can be used to replace textiles, leather and leather-like materials, or to provide a high-density foam-like material for use in upholstery, apparel, military gear, athletic gear, and footwear, are disclosed in US 2018/0282529 A1, the entire contents of which are hereby incorporated by reference in their entirety to the extent not inconsistent with the content of this disclosure.

Methods of post-processing as described herein can be used to modify a mycelium, including an aerial mycelium, to provide an edible food ingredient scaffold or food product, such as a panel, a slab, or strips, of mycelium-based bacon. This post-processing can include steps such as cutting, slicing, pressing, and/or perforating. The post-processing can include amending the mycelium through boiling, brining, drying, fatting, and/or the incorporation of additives. The post-processing of the mycelium provides a mycelium-based product that more closely resembles animal tissue. Any number of steps or combinations of steps can be performed in any variety of sequences to achieve the desired result. Methods of processing mycelial tissue are disclosed in US2020/0024557A1, the entire contents of which are hereby incorporated by reference in their entirety to the extent not inconsistent with the content of this disclosure.

As disclosed herein, an aerial mycelium of the present disclosure can be obtained as a contiguous 3-dimensional object, such as a panel. Thus, an aerial mycelium or a panel or slab thereof can be further characterized by its volume. In some embodiments, the volume of an aerial mycelium (or panel) can be characterized by its thickness, such as its native thickness. In some further embodiments, the aerial mycelial volume can be characterized by its surface area. As such, the surface area of an aerial mycelial (or panel) can be further characterized as having a length and a width.

In some aspects, an aerial mycelium of the present disclosure can be compressed to form a higher density material. The mycelium can be compressed in any direction, such as with the growth grain or against the growth grain. In some embodiments, an aerial mycelium can be compressed in a direction substantially parallel with respect to the aerial mycelial growth axis (first axis) to form a compressed aerial mycelium. In some embodiments, an aerial mycelium can be compressed in a direction substantially non-parallel with respect to the aerial mycelial growth axis (first axis) to form a compressed aerial mycelium. In some further embodiments, the compressed aerial mycelium has a mean density, wherein the mean density of the compressed aerial mycelium is at least about 2-fold greater than the mean native density of the aerial mycelium.

A compressed mycelium can have a fractional anisotropy that is substantially the same as that of the original aerial mycelium prior to the compression or can have a higher percentage of fractional anisotropy as compared to the original aerial mycelium prior to the compression. In some embodiments, a compressed mycelium can have a fractional anisotropy of at least about 10%, or at least about 15%. In some embodiments, a compressed mycelium can have a fractional anisotropy that is substantially greater than that of the original aerial mycelium prior to the compression. Conversely, an aerial mycelium of the present disclosure can have a fractional anisotropy that is substantially less than that of the compressed mycelium.

The compressing can be completed on an aerial mycelium, for example, on a panel or section (as described further below), to form a compressed panel or section, respectively. The compressing can be completed with the compression force applied in a compressing direction which is substantially non-parallel with respect to the first axis. In some embodiments, the panel or section is compressed in a compressing direction relative to the first axis which is within a range of greater than 45 degrees and less than 135 degrees, for example, greater than about 70 degrees and less than about 110 degrees, or greater than about 80 degrees and less than about 100 degrees, with respect to the first axis. In some embodiments, the compressing direction is substantially orthogonal to the first axis.

In some aspects, compressing comprises applying force to a panel, section, or strip. The force can be applied via physical impact, via a static or dynamic load. In some embodiments, mechanical force, including pneumatic or hydraulic force, can be applied, for example, via a mechanical press, such as a hydraulic press or pneumatic press. The compressing can reduce the volume and increase the density of the panel, section, or strip.

In some embodiments, compressing comprises constraining a panel, section, or strip during said compression. In some embodiments, constraining comprises constraining a first dimension of a panel (or a section or strip) that is substantially perpendicular to the growth grain (or first axis), and further constraining a second dimension that is both substantially parallel to the growth grain (or first axis) and substantially perpendicular to the compressing direction; consequently, a native panel thickness can be retained. In a non-limiting example, an aerial mycelium is constrained such that it's native thickness and its width are constrained during compression, such that its length is reduced via the compression. In some embodiments, an aerial mycelium can be compressed to within a range of about 15 to about 75% of its original length or width. In some further embodiments, the aerial mycelium can be compressed to within a range of about 30% to about 40% of its original length or width.

In some aspects, compressing an aerial mycelium comprises applying a force to an aerial mycelium (e.g., a panel, a section, or a strip) that is less than the force required to shear the aerial mycelium (e.g., the panel, section, or strip).

In some embodiments, compressing an aerial mycelial panel, at least one section or at least one strip, can provide a compressed panel, section, or strip, respectively, having a compressive stress at 65% strain of less than about 10 psi, less than about 1 psi or less than about 0.5 psi. Thus, in some embodiments, the present disclosure provides for a compressed panel, at least one compressed section or at least one compressed strip characterized as having a compressive stress at 65% strain of less than about 10 psi. In some embodiments, a compressed panel, an at least one compressed section or an at least one compressed strip can be characterized as having a compressive stress at 65% strain of less than about 1 psi. In some embodiments, a compressed panel, an at least one compressed section or an at least one compressed strip can be characterized as having a compressive stress at 65% strain of at most about 0.5 psi.

An aerial mycelium or a compressed mycelium of the present disclosure can be further processed by forming one or more sections and/or one or more strips. To form one or more sections or strips, the mycelium or compressed mycelium can be cut in any direction, such as with the growth grain or against the growth grain. In a non-limiting example, an aerial mycelium can be cut against the growth grain to provide a thinner panel (e.g., an aerial mycelium having a mean native thickness of about 80 mm can be cut against the growth grain to provide two panels, each having a mean thickness of about 40 mm).

As it is an object of the present disclosure to provide a food product or ingredient having the look and mouth-feel of a whole cut of meat (e.g., a whole muscle meat alternative), it can be important to retain the mycelial growth grain, in whole or at least in part. Thus, in some aspects, a post-processing method can exclude cutting, shearing, grinding and/or "mincing" a mycelium, or more particularly, can exclude cutting, shearing, grinding and/or "mincing" a mycelium against the growth grain. In some embodiments, a post-processing method can exclude an extrusion step. Thus, in some embodiments, a food product or ingredient of the present disclosure can exclude an extruded, ground and/or minced mycelium-based product. In some embodiments, a post-processing method of the present disclosure can comprise cutting an aerial mycelium with the growth grain.

Notwithstanding, if desired, a mycelium of the present disclosure can be minced and/or extruded to prepare minced and/or extruded food product or food ingredient. The minced and/or extruded mycelium can be used as such or can be reassembled into organized structures to create food product or food ingredient having the desired target properties.

In some aspects, an aerial mycelium, or a compressed mycelium, of the present disclosure can be sectioned by cutting a panel of aerial mycelium, or a compressed mycelium (e.g., compressed panel), to form one or more sections, or one or more compressed sections, respectively. In some aspects, an aerial mycelium or a compressed mycelium is cut in a cutting direction substantially parallel with respect to the first axis. In some embodiments, the aerial mycelium or a compressed mycelium (e.g. panel) is cut in a cutting direction within a range of plus or minus 45 degrees with respect to the first axis, for example, within a range of plus or minus about 30 degrees with respect to the first axis, or within a range of plus or minus about 15 degrees with respect to the first axis, or within a range of plus or minus about 10 degrees, 5 degrees, 3 degrees, or 1 degree with respect to the first axis, or any range therebetween.

An aerial or compressed mycelium, or a section thereof, can be further processed into strips. In some aspects, an aerial mycelium (e.g., panel) or compressed mycelium (e.g., compressed panel), or section thereof is cut in a cutting direction substantially parallel with respect to the first axis to provide at least one strip or at least one compressed strip. In some embodiments, an aerial or compressed mycelium or section thereof is cut in a cutting direction within a range of plus or minus 45 degrees with respect to the first axis, for example, within a range of plus or minus about 30 degrees with respect to the first axis, or within a range of plus or minus about 15 degrees with respect to the first axis, or within a range of plus or minus about 10 degrees, 5 degrees, 3 degrees, or 1 degree with respect to the first axis, or any range therebetween, to provide at least one strip or at least one compressed strip.

Cutting can be achieved by a variety of means, including but not limited to cutting with a knife, a meat or deli slicer, a bacon slicer, an ultrasonic cutter, a water jet cutter, a bandsaw, and the like.

Figure 14A:
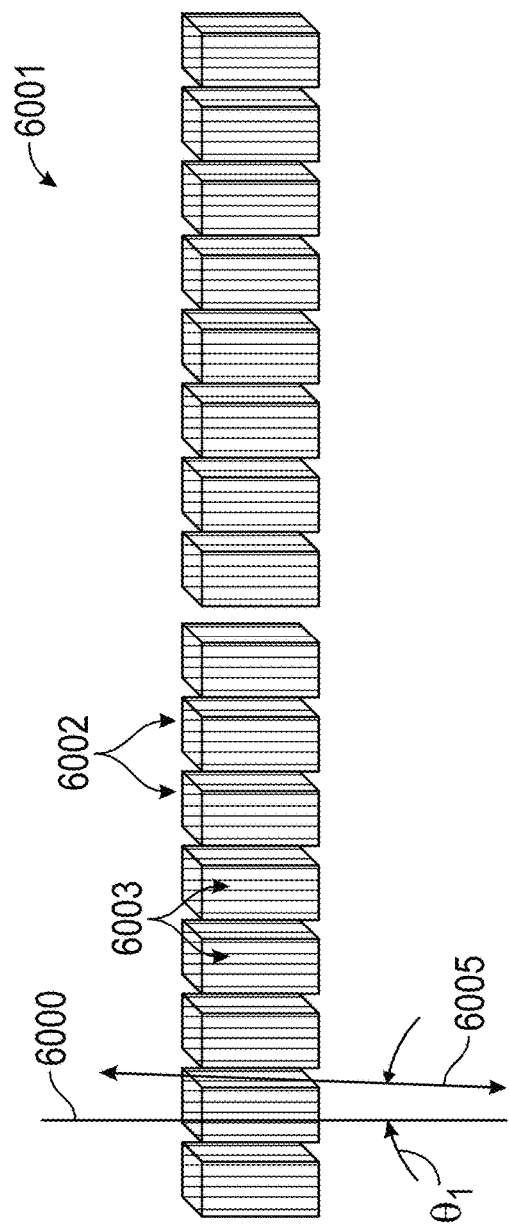
FIGS. 14A and 14B illustrate embodiments of processing an aerial mycelial panel, including a cutting step (FIG. 14A) and a compressing step (FIG. 14B).
Figure 14B:
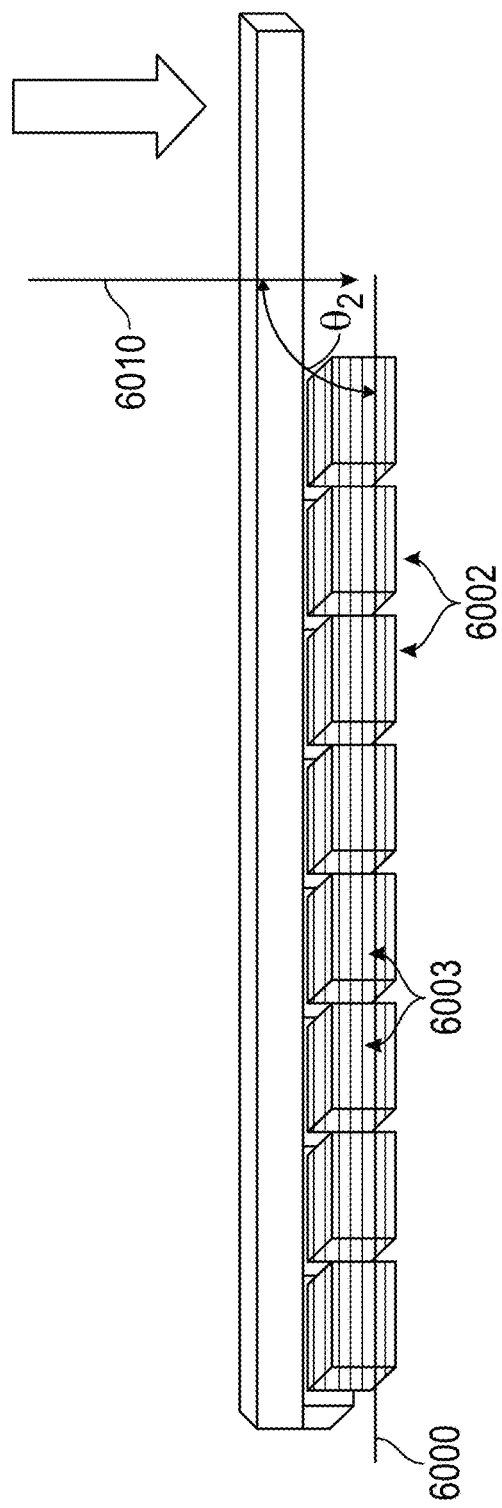

FIGS. 14A and 14B illustrate examples of the aforementioned cutting and compressing steps, and relative angular orientations, for an aerial mycelium 6001. The aerial mycelium 6001 is characterized as having a direction of mycelial growth along an axis 6000, as shown by growth grains 6003. For example, FIG. 14A illustrates an aerial mycelium 6001 which has been sectioned by cutting the aerial mycelium 6001, to form one or more sections 6002. The sections 6002 were formed by cutting the aerial mycelium or a compressed mycelium in a cutting direction 6005 at an angle θ1 which is substantially parallel with respect to the axis 6000. The cutting step shown in FIG. 14A can be implemented before or after a compression step. For example, the cutting step can be implemented on a compressed or uncompressed mycelium, e.g., a compressed or uncompressed panel, respectively, to form sections 6002.

FIG. 14B illustrates compressing the sections 6002 in a compressing direction 6010 at an angle θ2 which is substantially non-parallel with respect to the axis 6000. The compressing step shown in FIG. 14B can be implemented before or after a cutting step. For example, the compression step can be implemented to compress sections 6002, as shown, or can be performed on the aerial mycelium 6001 prior to forming sections 6002. Multiple compression and cutting steps can be performed in a sequence, for example, the aerial mycelium can be cut to form a section, and the section can be cut to form strips, and so forth, with one or more compression steps implemented before or after the cutting steps within this sequence.

Figure 15A:
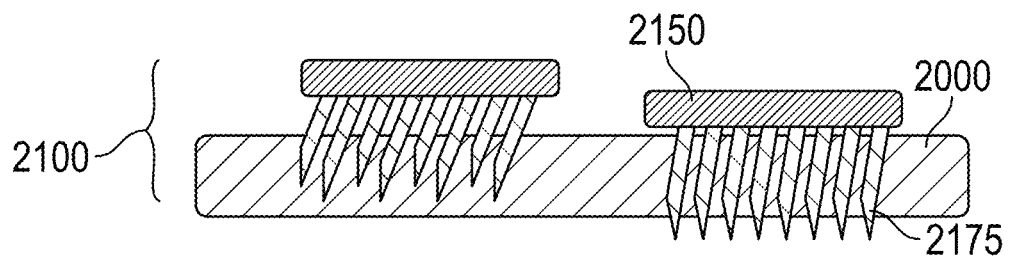
FIGS. 15A and 15B illustrate embodiments of perforating an aerial mycelial panel (FIG. 15A) and perforated mycelia with various perforation patterns (FIG. 15B).
Figure 15B:
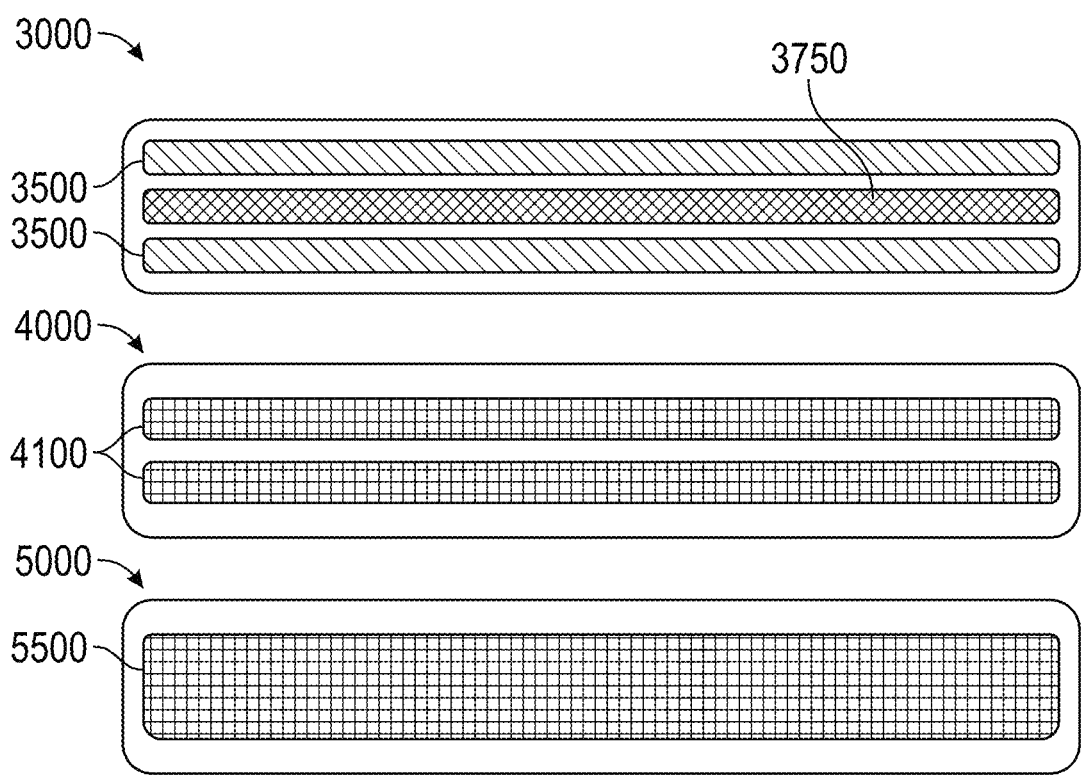

FIGS. 15A and 15B illustrate embodiments of perforating an aerial mycelial panel (FIG. 15A) and perforated mycelia with various perforation patterns (FIG. 15B). In some aspects, the present disclosure provides for perforating a mycelium, including an aerial mycelium, such as a panel, a section or a strip, or a compressed panel, section, or strip 2100. In some aspects, a perforating step is to disrupt mycelial tissue network, modify texture, form a mycelium that more closely mimics animal tissue in appearance and/or mouth-feel, and/or cooks at different rates. In some embodiments, perforating can include needling. Thus, one or more needles 2175 or the like can be inserted to penetrate an outer surface or face 2000 of a mycelium (e.g., a panel, section, strip or a compressed panel, section, or strip) (see, e.g., the left side of FIG. 15A), and/or can be inserted through the entire tissue (see, e.g., the right side of FIG. 15A). Perforating can be varied in density, intensity, depth, and shape (see, e.g., FIG. 15B), and/or by using needles 2175 (e.g., any perforating tool or technique suitable to perforate the material) of various gauges, lengths and shapes (e.g., straight or barbed) across the matrix to disrupt tissue network, and to create sections that cook at different rates than others, modifying finished texture. The needles 2175 can be oriented in a head block or roller 2150 to create a desired pattern of holes in the panel. The perforation can be through one face or surface 2000 or through both surfaces or faces. FIG. 15B illustrates multiple views of various perforations that may be used in connection with perforating mycelium. For Example, the uppermost figure illustrates a top down view of a sliced mycelium panel or portion 3000 in which two similar patterns 3500 sandwich a secondary pattern 3750. The second figure of 15B shows a top down view of a sliced mycelium panel or portion 4000 having two similar patterns of needling partially covering the surface 4100. The third view in FIG. 15B illustrates a top down view of a sliced mycelium panel or portion 5000 having a single needle pattern 5500 covering a portion of the surface.

In some aspects, the present disclosure provides for post-processing steps via one or more amending steps to amend a mycelium, such as boiling, brining, drying and/or fatting. Chemical and/or enzymatic methods can be used to amend the mycelial tissue, for example, as described in US2020/0024557A1.

Accordingly, a mycelium (e.g., an aerial mycelium) of the present disclosure (or any section or strip obtained therefrom, or any compressed and/or perforated panel, section, or strip) can be boiled. In some aspects, the boiling is to reduce moisture, modify or denature proteins, disinfect, reduce, or remove native compounds and/or malodors, and/or reduce bitterness. In a non-limiting example, a mycelium (or any section or strip obtained therefrom, or any compressed and/or perforated panel, section, or strip) can be boiled to remove volatile compounds, anti-nutrients, or both. In some embodiments, a volatile compound can include a polyphenolic compound. In some embodiments, an anti-nutrient can include a lysin, a lectin, or both. In some embodiments, a boiling step comprises boiling an aerial mycelium of the present disclosure (or any section or strip obtained therefrom, or any compressed and/or perforated panel, section, or strip) in an aqueous solution. In some embodiments, the aqueous solution comprises one or more additives. In some more particular embodiments, the aqueous solution contains salt. In some embodiments, the aqueous solution can have a salt concentration of at most about 26% (w/w) (i.e., a saturated saline solution). In some embodiments, the salt concentration is within a range of about 0.1% (w/w) to about 26% (w/w), about 0.1% to about 15% (w/w), about 0.5% to about 10% (w/w), about 0.5% to about 5% (w/w) or about 1% to about 3%. In some embodiments, the salt is sodium chloride. Other additives can include but are not limited to flavorants and/or colorants. The time and/or temperature of the boiling and the concentration of the salt and any additives can be adjusted by the skilled person to achieve the desired salt content, additive content, moisture content, protein denaturization, sterility, native compound and/or malodors content or the like in the resulting boiled composition or final product.

In some aspects, a mycelium (e.g., an aerial mycelium or panel) of the present disclosure (or any section or strip obtained therefrom, or any compressed and/or perforated panel, section or strip, or any boiled panel, section, or strip) can be brined, for example, to impart flavor and/or color. In some embodiments, a brining step can include contacting an aerial mycelium (e.g., panel, or any section or strip obtained therefrom, or any compressed and/or perforated panel, section or strip, or any boiled panel, section, or strip) with a brine fluid. In some embodiments, a brine fluid can be an aqueous solution containing salt. In some embodiments, the aqueous salt solution can have a salt concentration of at most about 26% (w/w) (i.e., a saturated saline solution). In some embodiments, the salt concentration is within a range of about 0.1% (w/w) to about 26% (w/w), about 0.1% to about 15% (w/w), about 0.5% to about 10% (w/w), about 0.5% to about 5% (w/w) or about 1% to about 3%. In some embodiments, the salt is sodium chloride. In some embodiments, the brine fluid comprises one or more additives. In some embodiments, the one or more additives includes flavorants and/or colorants. A brining step can comprise soaking, marinating, or simmering a mycelium (e.g., an aerial mycelium or panel) of the present disclosure (or any section or strip obtained therefrom, or any compressed and/or perforated panel, section or strip, or any boiled panel, section, or strip) in the brine fluid, or can comprise injecting or topically applying the brine fluid. The time and/or temperature of the brining and the concentration of the salt and any further additives can be adjusted by the skilled person to achieve the desired salt and additive content in the resulting brined composition or final product.

In some aspects, a mycelium (e.g., an aerial mycelium) of the present disclosure (or any section or strip obtained therefrom, or any compressed and/or perforated panel, section or strip, or any boiled panel, section or strip, or any brined panel, section, or strip) can be dried. In some embodiments, a drying step can include heating a mycelium (e.g., an aerial mycelium) of the present disclosure (or any section or strip obtained therefrom, or any compressed and/or perforated panel, section or strip, or any boiled panel, section or strip, or any brined panel, section, or strip. The drying or more particularly, the heating, can be performed by any variety of means, including a conventional oven, a convection oven, a microwave, a dehydrator or a freeze dryer or the like. The drying time and means can be adjusted by the skilled person to achieve the desired moisture content of the resulting dried composition or final product.

In some aspects, a mycelium (e.g., an aerial mycelium) of the present disclosure, or any section or strip obtained therefrom, or any compressed and/or perforated panel, section or strip, or any boiled panel, section or strip, or any brined panel, section, or strip, each of which is optionally dried, can be fatted. In some embodiments, a fatting step can include contacting a mycelium (e.g., an aerial mycelium) of the present disclosure, or any section or strip obtained therefrom, or any compressed and/or perforated panel, section or strip, or any boiled panel, section or strip, or any brined panel, section, or strip, each of which is optionally dried, with a fat. Non-limiting embodiments of fatting include marinating, confitting, injecting, or topically applying the fat. Non-limiting examples of a fat are disclosed herein. In some embodiments, the fat further comprises an additive, including but not limited to a colorant, flavorant, or both. After adding the fat, the fatted mycelial tissue can be cooled to set the fat. The cooling step can include refrigeration of the fatted tissue.

Any number of combinations of processing steps can be implemented, such as cutting, compressing, boiling, brining, and/or fatting, and so on, to provide a cut, compressed, boiled, brined and/or fatted mycelium. In a non-limiting example, a strip of aerial mycelium, having been processed via brining and fatting, can be referred to herein as a brined, fatted strip. In another non-limiting example, a strip of aerial mycelium, having been processed via compressing (prior to or after a cutting step), brining and fatting, can be referred to herein as a compressed, brined, fatted strip.

In some aspects, the present disclosure provides for the incorporation of one or more additives into the mycelial tissue or onto the surface of the mycelial tissue. The additive can be incorporated during or after the growth of the mycelium, and before, during or after any one or more post-processing steps. Additives suitable for the incorporation into a mycelium of the present disclosure and methods of incorporating the same are disclosed in US2020/

0024557A1. Additional useful additives for incorporation into edible mycelia of the present disclosure, and methods of incorporation thereof, are disclosed herein.

In some aspects, an additive can be a colorant. In some embodiments, a colorant is a tannin. An additive can be a naturally occurring additive or an artificial additive, or a combination thereof.

In some aspects, an additive can be a fat, a protein, a peptide, an amino acid, a flavorant, an aromatic agent, a mineral, a vitamin, a micronutrient, a colorant, or a preservative; or a combination thereof. An additive can be a naturally occurring additive or an artificial additive, or a combination thereof.

Non-limiting examples of a fat include almond oil, animal fat, avocado oil, butter, canola oil (rapeseed oil), coconut oil, corn oil, grapeseed oil, hempseed oil, lard, mustard oil, olive oil, palm oil, peanut oil, rice bran oil, safflower oil, soybean oil, sunflower seed oil, vegetable oil, or vegetable shortening; or a combination thereof. In some embodiments, the fat is a plant-based oil or fat. In some embodiments, the plant-based oil is coconut oil or avocado oil. In some embodiments, the oil is a refined oil. In some embodiments, the fat is animal fat. In some embodiments, the animal fat is pork fat, chicken fat or duck fat.

Non-limiting examples of a flavorant include a smoke flavorant, umami, maple, a salt, a sweetener, a spice, or a meat flavor (e.g., pork flavor); or a combination thereof. Non-limiting examples of a smoke flavorant include applewood flavor, hickory flavor, liquid smoke; or a combination thereof.

Non-limiting examples of umami include a glutamate, such as sodium glutamate.

Non-limiting examples of a salt include sodium chloride, table salt, flaked salt, sea salt, rock salt, kosher salt, or Himalayan salt; or a combination thereof.

Non-limiting examples of a sweetener sugar, cane sugar, brown sugar, honey, molasses, juice, nectar, or syrup (e.g., maple syrup), saccharin, aspartame, acesulfame potassium (Ace-K), sucralose, neotame, advantame, steviol glycosides, and extracts obtained from Siraitia grosvenorii Swingle fruit, also known as Luo Han Guo or monk fruit; or a combination thereof.

Non-liming examples of a colorant include beet extract, beet juice, or paprika; or a combination thereof.

Non-limiting examples of a spice include paprika, pepper, mustard, garlic, chili, jalapeno, and the like; or a combination thereof.

"Aromatic agent" as used herein refers to a substance having a distinctive fragrance.
Non-Liming Examples of an Aromatic Agent Include Allicin.

Non-limiting examples of a mineral include iron, magnesium, manganese, selenium, zinc, calcium, sodium, potassium, molybdenum, iodine, or phosphorus; or a combination thereof.

Non-limiting examples of a vitamin include ascorbic acid (vitamin C), biotin, a retinoid, a carotene, vitamin A, thiamine (vitamin B1), riboflavin (vitamin B2), niacin (vitamin B3), pantothenic acid (vitamin B5), pyridoxine (vitamin B6), folate, folic acid (vitamin B9), cobalamin (vitamin B12), choline, calciferol (vitamin D), alpha-tocopherol (vitamin E) or phylloquinone (menadione, vitamin K); or a combination thereof.

Non-limiting examples of a protein include a plant-derived protein, a heme protein; or a combination thereof.

Non-limiting examples of an amino acid include alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, or valine; or a combination thereof.

One or more additives can be incorporated into a mycelium of the present disclosure at virtually any step(s) during or between the mycelium growth or post-processing steps described herein.

In some embodiments, one or more additives can be included in (e.g., admixed with) a growth matrix, growth media, growth media substrate, and/or in a further source of nutrition (e.g., a nutritional supplement) in the growth media.

As disclosed in US2020/0024557A1, an additive can be deposited on the growth media during the growth process, either through liquid or solid deposition, or though natural cellular uptake (bioadsorption), e.g., increasing mineral content in the growth media, to increase final content in the panel of tissue. Furthermore, during growth, desired nutrients, flavors, or other additives can be aerosolized into the growth chamber, condense on the propagating tissue, and be incorporated into the matrix.

As disclosed herein, an aerial mycelium of the present disclosure can be obtained by depositing aqueous mist onto a growth matrix, an extra-particle mycelial growth or both. The mist can contain a solute, and the solute can be one or more additives. Thus, one or more additives can be incorporated into a growth matrix and/or extra-particle mycelial growth (and thus, into the aerial mycelium obtained therefrom) via misting.

As further disclosed in US2020/0024557A1, a mycelial panel can be infused with at least one additive.

In some embodiments, one or more additives is added to a mycelium during the incubation time period. In some embodiments, one or more additives is added to a mycelium after the incubation time period. In some embodiments, one or more additives is added to a mycelium after extraction from the growth matrix.

In some embodiments, one or more additives is added during one or more post-processing steps. Thus, one or more additives can be incorporated into a mycelium by injection into a mycelium, during boiling (e.g., by incorporating additives in the aqueous solution used for boiling), during brining (e.g., in a brine fluid), during fatting (e.g., in the fat), or at any time prior to packaging. An additive can be included with the packaged goods.

An edible mycelium of the present disclosure, in any form, including an aerial mycelium for use as a food ingredient, a food product, a strip of mycelium-based bacon, and the like, can be packaged to provide a finished product. The package can include a label describing cooking instructions, storage or handling instructions, nutritional information, or a combination thereof.

Thus, in some embodiments, there is provided a mycelium-based bacon product, said product comprising oyster mushroom mycelium, coconut oil, organic sugar, sea salt, vegan natural flavors, and beet juice. The oyster mushroom mycelium can be obtained from an aerial mycelial of the present disclosure, wherein the aerial mycelium is a growth product of the fungus *Pleurotus ostreatus*, and wherein the aerial mycelium has a growth grain. In some embodiments, the product is not an extruded product and is not a minced product. The product can be packaged, and the package can include a label comprising cooking instructions, storage or handling instructions, nutritional information, or a combination thereof.

In some aspects, the present disclosure provides for a method of cooking at least one edible strip of mycelium-based bacon. The method can comprise at least one of pan frying and baking. The pan frying and baking can be at a temperature within a range of about 275° F. to about 400° F. The cooking can be terminated when the edible strip of mycelium-based bacon is crisp.

One or more additives can be incorporated into a mycelium of the present disclosure at virtually any step(s) during or between the mycelium growth or post-processing steps described herein.

In some embodiments, one or more additives can be included in (e.g., admixed with) a growth matrix, growth media, growth media substrate, and/or in a further source of nutrition (e.g., a nutritional supplement) in the growth media.

As disclosed in US2020/0024557A1, an additive can be deposited on the growth media during the growth process, either through liquid or solid deposition, or though natural cellular uptake (bioadsorption). Furthermore, during growth, desired additives can be aerosolized into the growth chamber, condense on the propagating tissue, and be incorporated into the matrix.

As disclosed herein, an aerial mycelium of the present disclosure can be obtained by depositing aqueous mist onto a growth matrix, an extra-particle mycelial growth or both. The mist can contain a solute, and the solute can be one or more additives. Thus, one or more additives can be incorporated into a growth matrix and/or extra-particle mycelial growth (and thus, into the aerial mycelium obtained therefrom) via misting.

As further disclosed in US2020/0024557A1, a mycelial panel can be infused with at least one additive.

In some embodiments, one or more additives is added to a mycelium during the incubation time period. In some embodiments, one or more additives is added to a mycelium after the incubation time period. In some embodiments, one or more additives is added to a mycelium after extraction from the growth matrix.

Aerial mycelia of the present disclosure, and methods of making and/or processing aerial mycelia of the present disclosure, can be adapted to prepare a variety of food products, including whole-muscle meat alternatives, seafood alternatives, poultry alternatives and carbohydrate-based food alternatives. Additional non-limiting examples of food products that can be prepared from aerial mycelia of the present disclosure include a bacon alternative, a jerky alternative, a deli meat alternative, a steak alternative, a chicken alternative, a chicken nugget alternative, a fish filet alternative, a shellfish alternative, a clam alternative, an oyster alternative, a scallop alternative, a shrimp alternative, a smoked salmon alternative, a pulled pork alternative, a cheese alternative, a convenience food, a snack food, a pasta, a confection, a bread or a baked good.

EXAMPLES

The following sets forth several non-limiting examples of making mycelia of the present disclosure and of processing mycelia of the present disclosure.

Example 1

Growth media was prepared by hand mixing corn stover substrate (375 g) with poppy seed (90 g), maltodextrin (16 g), calcium sulfate (5 g), and water to about 65% moisture content (w/w) in polypropylene bags. The resulting growth media was pretreated by sterilization at 121° C. at 15 psi for 60 minutes, cooled to room temperature, then inoculated with *Ganoderma sessile* white millet feed grain spawn under aseptic conditions.

The resulting growth matrix was placed in an uncovered Pyrex food dish with a volume of 59 cubic inches to a density of 26.5 pounds per cubic foot (pcf)) and incubated for a time period of 7 days in a growth chamber having an atmosphere maintained at 5% (v/v) $CO_2$, 14 to 20% (v/v) $O_2$, and >99% relative humidity via evaporative moisture, throughout the incubation time period. Growth chamber atmospheric content was maintained based on $CO_2$ and fresh air injection to maintain the given $CO_2$ setpoint, as such $O_2$ and other atmospheric components are maintained indirectly and fluctuate as a function of fungal respiration. Throughout the incubation period, the temperature was maintained at 85° F. The incubation was performed entirely in the dark. The growth chamber was equipped with a fan, which provided a flow of air (the air containing the same components as the growth chamber atmosphere described above) directed substantially parallel to the growth matrix at a rate within a range of about 70 to 100 linear feet per minute throughout the incubation period. The growth chamber was further equipped with a commercial ultrasonic mister that, in this case, was not operated thereby excluding mist from the growth environment.

At the end of the incubation time period, the Pyrex dish with growth matrix and resulting extra-particle mycelial growth was removed from the growth chamber, and the extra-particle mycelial growth was manually extracted from the growth matrix using a scalpel as an appressed, distinctly non-floccose and non-aerial, positively gravitropic and thigmotropic, contiguous mycelium sheet which grew along the exterior face of the Pyrex dish (11.3 g) having a moisture content of about 79% (w/w) (as determined via a Mettler Toledo HB43-S series halogen moisture analyzer), a mean thickness of 2.5 mm with a maximum thickness of 9.3 mm and a mean native density of 30 pcf. The mycelium sheet was dried at 110° F. for 24 hours to a final moisture content of equal to or less than 10% (w/w), after which the mean dry density of the mycelium sheet was 4.2 to 7.5 pcf.

Example 2

An appressed mycelium was obtained essentially as described in Example 1, with the following exceptions: the corn stover was replaced with maple flour substrate with an approximate particle size of 0.5 mm (800 g); calcium sulfate was excluded from the growth media; the growth media was inoculated with *Pleurotus ostreatus* white millet feed grain spawn rather than with *Ganoderma sessile*; the Pyrex food dish was filled with growth matrix to a density of 32 pcf; and the incubation temperature was 75° F.

At the end of the incubation time period, the Pyrex dish with growth matrix and resulting extra-particle mycelial growth was removed from the growth chamber, and the extra-particle mycelial growth was manually extracted from the growth matrix using a scalpel as an appressed, distinctly non-floccose and non-aerial, felty to sub-felty, positively gravitropic and thigmotropic, contiguous mycelium sheet which grew along the exterior face of the Pyrex dish (3.8 g) having a moisture content of about 77% (w/w), a mean thickness of 2.5 mm with a maximum thickness of 8.5 mm. The mycelium sheet was desiccated at room temperature for 24 hours to a final moisture content of equal to or less than 10% (w/w).

Example 3

Growth media was prepared by hand mixing corn stover substrate (375 g) with poppy seed (90 g), maltodextrin (16 g), calcium sulfate (5 g), and water to about 65% moisture content (w/w) in polypropylene bags. The resulting growth media was pretreated by sterilization at 121° C. at 15 psi for 60 minutes, cooled to room temperature, then inoculated with *Ganoderma sessile* white millet feed grain spawn under aseptic conditions.

For each growth replicate the resulting growth matrix was placed in an uncovered Pyrex food dish with a volume of 59 cubic inches to a density of 26.5 pcf and incubated for a time period of 7 days in a growth chamber having an atmosphere maintained at 5% (v/v) $CO_2$, 14 to 20% (v/v) $O_2$, and >99% relative humidity via evaporative moisture, throughout the incubation time period. Growth chamber atmospheric content was maintained based on $CO_2$ and fresh air injection to maintain the given $CO_2$ setpoint, as such $O_2$ and other atmospheric components are maintained indirectly and fluctuate as a function of fungal respiration. Throughout the incubation period the temperature was maintained within the range of 85 to 90° F. The incubation was performed entirely in the dark. The growth chamber was equipped with a fan, which provided a flow of air (the air containing the same components as the growth chamber atmosphere described above) directed substantially parallel to the surface of the growth matrix at a rate within a range of about 70 to 100 linear feet per minute throughout the incubation period. The growth chamber was further equipped with a commercial ultrasonic mister supplied with tap water having a conductivity of between 400 and 500 microsiemens/cm operated at a 2% duty cycle over a 360 second cycle period. The mist was circulated within the growth chamber via the directed airflow resulting in mist deposition onto the surface of the growth matrix and the subsequent extra-particle mycelial growth at a mist deposition rate of 144 microliters/$cm^2$/hour, and a mean mist deposition rate of 3 microliters/$cm^2$/hour throughout the incubation time period.

At the end of the incubation time period, the Pyrex dish with growth matrix and resulting extra-particle aerial mycelial growth was removed from the growth chamber, and the extra-particle aerial mycelial growth was manually extracted from the growth matrix using a hand saw affixed with a scalloped blade as a multitude of discrete bulbous pieces of negatively gravitropic aerial mycelium (73-88 g) having a moisture content of about 91-93% (w/w), a mean thickness of >10 mm and a mean native density of 39-64 pcf. The harvested mycelium was dried at 110° F. for 24 hours to a final moisture content of equal to or less than 10% (w/w), after which the mean dry density of the panel was 4.2 to 5.4 pcf.

Example 4

Aerial mycelium was prepared as described in Example 3, with the following exceptions. Throughout the incubation period the temperature was maintained at a temperature of 85° F. The ultrasonic mister was operated at a 0.3% duty cycle over an 1800-second cycle period. The mist was deposited onto the surface of the growth matrix and the resulting extra-particle mycelial growth at a mist deposition rate of 64 microliters/$cm^2$/hour, and a mean mist deposition rate of 0.2 microliters/$cm^2$/hour throughout the incubation time period.

At the end of the incubation time period, the Pyrex dish with growth matrix and resulting extra-particle aerial mycelial growth was removed from the growth chamber, and the extra-particle aerial mycelial growth was manually extracted from the growth matrix using a hand saw affixed with a scalloped blade as a multitude of discrete coralloid to bulbous-coralloid pieces of negatively gravitropic aerial mycelium (58 g) having a moisture content of about 89% (w/w), a mean thickness of >10 mm and a mean native density of 32 pcf. The harvested mycelium was dried at 110° F. for 24 hours to a final moisture content of equal to or less than 10% (w/w), after which the mean dry density of the panel was 4.15 pcf.

Example 5

Aerial mycelium was prepared as described in Example 3, with the following exceptions. Throughout the incubation period the temperature was maintained at 85° F. The ultrasonic mister was operated at a 0.2% duty cycle over an 1800-second cycle period. The mist was deposited onto the surface of the growth matrix and the resulting extra-particle mycelial growth at a mist deposition rate of 18 microliters/$cm^2$/hour, and a mean mist deposition rate of 0.03 microliters/$cm^2$/hour throughout the incubation time period.

At the end of the incubation time period, the Pyrex dish with growth matrix and resulting extra-particle aerial mycelial growth was removed from the growth chamber, and the extra-particle aerial mycelial growth was manually extracted from the growth matrix using a hand saw affixed with a scalloped blade as a multitude of discrete coralloid to bulbous-coralloid pieces of negatively gravitropic aerial mycelium (35-47 g) having a moisture content of about 85-86% (w/w), a mean thickness of >10 mm and a mean native density of 19-22 pcf. The harvested mycelium was dried at 110° F. for 24 hours to a final moisture content of equal to or less than 10% (w/w), after which the mean dry density of the panel was 3.4 to 3.7 pcf.

Example 6

Aerial mycelium was prepared as described in Example 3, with the following exceptions. Throughout the incubation period the temperature was maintained at 85° F. The ultrasonic mister was placed beneath an acrylic box with a ¾" opening from which, when the mister was in operation, mist was emitted thus reducing the mist output from the ultrasonic mister into the growth environment by >90% compared to mist emission without the acrylic box. The ultrasonic mister was operated at a 45% duty cycle over a 360 second cycle period. The mist was circulated within the growth chamber via the directed airflow resulting in mist deposition onto the surface of the growth matrix and the resulting extra-particle mycelial growth throughout the incubation time period. Four pairs of panels were obtained by growth under the following mist deposition paradigms:

(A) mist deposition rate 0.07 microliters/$cm^2$/hour; mean mist deposition rate 0.03 microliters/$cm^2$/hour, (B) mist deposition rate 0.24 microliters/$cm^2$/hour, mean mist deposition rate 0.11 0.24 microliters/$cm^2$/hour, (C) mist deposition rate 0.36 microliters/$cm^2$/hour, mean mist deposition rate 0.16 microliters/$cm^2$/hour, and (D) mist deposition rate 0.54 microliters/$cm^2$/hour; mean mist deposition rate 0.24 microliters/$cm^2$/hour.

At the end of the incubation time period, each Pyrex dish with growth matrix and resulting extra-particle aerial mycelial growth was removed from the growth chamber, and the extra-particle aerial mycelial growth was manually extracted from the growth matrix using a hand saw affixed with a scalloped blade to provide 8 panels presenting as contiguous mats of negatively gravitropic, bulbous, floccose to subcottony, aerial mycelium (see FIG. 6, which shows a mycelium from pair (A)). The properties of the aerial mycelia are summarized below, wherein the dry density data were obtained after drying the harvested mycelium at 110° F. for 24 hours to a final moisture content of equal to or less than 10% (w/w):

| Pair | Native moisture content (%, w/w) | Biological efficiency | Dry density (pcf) | Native density | Mean thickness (mm) |
|---|---|---|---|---|---|
| (A) | 87%, 93% | 11.1%, 5.2% | 1.35, 1.50 | ND, 4.08 | ND, 27.8 |
| (B) | 81%, 84% | 13.2%, 10.2% | 1.12, 1.33 | 4.78, 5.72 | 34.5, 27.6 |
| (C) | 83%, 86% | 9.6%, 8.5% | 1.89, 2.28 | 5.92, 7.24 | 24.9, 20.1 |
| (D) | 84%, 82% | 10.6%, 10.4% | 1.54, 1.25 | 7.23, 4.91 | 24.15, 28.23 |

ND: not determined

Example 7

Growth media was prepared by hand mixing maple flour substrate with an approximate particle size of 0.5 mm (800 g) with poppy seed (90 g), maltodextrin (14 g), and water to about 65% moisture content (w/w) in polypropylene bags. The resulting growth media was pretreated by sterilization at 121° C. at 15 psi for 60 minutes, cooled to room temperature, then inoculated with *Pleurotus ostreatus* white millet feed grain spawn under aseptic conditions.

The resulting growth matrix was placed in an uncovered Pyrex food dish with a volume of 59 cubic inches to a density of 32 pcf and incubated for a time period of 7 days in a growth chamber having an atmosphere maintained at 5% (v/v) $CO_2$, 14 to 20% (v/v) $O_2$, and >99% relative humidity via evaporative moisture, throughout the incubation time period. Growth chamber atmospheric content was maintained based on $CO_2$ and fresh air injection to maintain the given $CO_2$ setpoint, as such $O_2$ and other atmospheric components are maintained indirectly and fluctuate as a function of fungal respiration. Throughout the incubation period, the temperature was maintained at 75° F. The incubation was performed entirely in the dark. The growth chamber was equipped with a fan, which provided a flow of air (the air containing the same components as the growth chamber atmosphere described above) directed substantially parallel to the surface of the growth matrix at a rate within a range of about 70 to 100 linear feet per minute throughout the incubation period. The growth chamber was further equipped with a commercial ultrasonic mister supplied with tap water having a conductivity of between 400 and 500 microsiemens/cm. The ultrasonic mister was placed beneath an acrylic box with a ¾" opening from which, when the mister was in operation, mist was emitted thus reducing the mist output from the ultrasonic mister into the growth environment by >90% compared to mist emission without the acrylic box. The ultrasonic mister was operated at a 45% duty cycle over a 360 second cycle period. The mist was circulated within the growth chamber via the directed airflow resulting in mist deposition onto the surface of the growth matrix and the resulting extra-particle mycelial growth at a mist deposition rate of 0.24 microliters/$cm^2$/hour, and a mean mist deposition rate of 0.11 microliters/$cm^2$/hour throughout the incubation time period.

At the end of the incubation time period, the Pyrex dish with growth matrix and resulting extra-particle aerial mycelial growth was removed from the growth chamber, and the extra-particle aerial mycelial growth was manually extracted from the growth matrix using a hand saw affixed with a scalloped blade as a contiguous mat of negatively gravitropic, bulbous, floccose to sub-cottony, aerial mycelium (59 g) having a moisture content of about 88% (w/w), a mean thickness of 19.8 mm and a mean native density of 10 pcf. The harvested mycelium mat was desiccated at room temperature for 24 hours to a final moisture content of equal to or less than 10% (w/w), after which the mean dry density of the panel was 1.4 pcf.

Example 8

The mean mist deposition rate within a growth environment is measurable by a variety of methods. In one method, the mean mist deposition rate was measured by placing one or more open Petri dishes of known surface area in a growth environment during an incubation period for at least 24 hours throughout which mist is introduced into the growth environment, collecting the mist deposited in the open Petri dish(es), determining the total volume or mass of collected mist, and dividing the volume or mass by the period of time.

Mist deposition was assessed during abiotic (growth chamber absent fungal-inoculated growth media) and biotic trials (growth chamber containing fungal-inoculated growth media) using Celltreat 90×15 mm polypropylene Petri dishes, which were weighed without lids both before and after a mist deposition time period of 24 hours using an Intell-Lab Balance Model PM 300 having a resolution of 0.001 g, a minimum mass of 0.01 g, and a maximum mass of 300 g. Linearity between paired abiotic and biotic measurements at mean mist deposition rates in the range of 0 to 5 mg/$cm^2$/hour showed a coefficient of variation ($R^2$) of 0.98. A mass of collected mist of 0.01 g corresponded to a mean mist deposition rate of 0.006 mg/$cm^2$/hour and gave rise to a film of moisture on the surface of the Petri dish that was visible to the naked eye. The limit of quantification (LOQ) of mean mist deposition rate was established as 0.006 mg/$cm^2$/hour. The limit of detection (LOD) of the mean mist deposition rate was established as a rate below the LOQ that did not give rise to moisture on the Petri dish that was visible to the naked eye. For the purposes of the present disclosure, a mean mist deposition rate of 1 milligram per centimeter squared per hour (1 mg/$cm^2$/hour) is substantially equivalent to 1 microliter per centimeter squared per hour (1 uL/$cm^2$/hour), solute concentration notwithstanding. Accordingly, the LOQ of mean mist deposition rate can be expressed as 0.006 uL/$cm^2$/hour, and the LOD of the mean mist deposition rate can be expressed as a rate below 0.006 uL/$cm^2$/hour that did not give rise to moisture on the Petri dish that was visible to the naked eye.

It is hypothesized that the aforementioned methods for assessing the mean mist deposition rate, with respect to a Petri dish in a growth environment would correlate and thus provide similar results for assessing these same variables on the container, on the growth matrix, on the extra-particle aerial mycelial growth, and/or on other structures within the growth environment. Additionally, the aforementioned methods can be applied and thus would correlate and provide similar results for assessing the mist deposition rate (i.e., instantaneous mist deposition rate) by dividing the mean mist deposition rate by the duty cycle.

Example 9

Hyphal filament width. Aerial and appressed mycelia were obtained essentially as described in Examples 1 to 8 and 11 to 23. After extraction from the growth matrix, the mycelium was dried for 18 hours at 110° F., after which the residual moisture content was less than about 10% (w/w) of the total mass of the mycelium. Dried aerial mycelia exhibited about 50% contraction. Sections were sliced along the thickness of the dried mycelium and embedded in epoxy resin. The epoxy embedded mycelium was then microsectioned and optically analyzed via autofluorescence to determine the hyphal width of the mycelial tissue. Alternatively, the tissue was sampled fresh via a simple tease mount, stained, and manual imaging and cell width measurement performed. The results indicated that the mean hyphal width ranged from about 0.2 micron to about 15 microns.

Example 10

Aerial mycelium was prepared as described in Example 7, with the following exceptions. The incubation time period was 9 days. The ultrasonic mister was supplied with distilled water having a conductivity of about 3 microsiemens/cm. The mist was deposited onto the surface of the growth matrix and the resulting extra-particle mycelial growth at a mist deposition rate of 0.2 microliters/$cm^2$/hour, and a mean mist deposition rate of 0.09 microliters/$cm^2$/hour throughout the incubation time period.

A Wenglor OPT20 laser rangefinder was affixed to the top exterior portion of the growth chamber, where the growth chamber was made of clear acrylic, such that the laser with a spot size of 9 mm emitted at 660 nm was facing the growth matrix. The output of the laser rangefinder was integrated with the growth chamber such that the distance between the growth matrix, and subsequent aerial growth produced from the growth matrix, and the laser rangefinder during the incubation period was detected and recorded in real time during the incubation period. As such the aerial growth rate was monitored over the 9-day incubation period in order to detect when aerial growth was occurring and when aerial growth ceased indicating transition to the stationary phase, at which point the incubation period was ended.

At the end of the incubation time period, the Pyrex dish with growth matrix and resulting extra-particle aerial mycelial growth was removed from the growth chamber, and the extra-particle aerial mycelial growth was manually extracted from the growth matrix using a hand saw affixed with a scalloped blade as a contiguous mat of negatively gravitropic, bulbous, floccose to sub-cottony, aerial mycelium (63 g) having a moisture content of about 91% (w/w), a mean thickness of 20.01 mm, a maximum thickness of 30.36 mm, and a mean native density of 14 pcf. The harvested mycelium mat was desiccated at room temperature for 24 hours to a final moisture content of equal to or less than 10% (w/w), after which the mean dry density of the panel was 1.6 pcf.

Example 11

Aerial mycelium was prepared as described in Example 7, with the following exceptions. The incubation time period was 9 days. The ultrasonic mister was supplied with distilled water having a conductivity of about 3 microsiemens/cm. The mist was deposited onto the surface of the growth matrix and the resulting extra-particle mycelial growth at a mist deposition rate of 0.35 microliters/$cm^2$/hour, and a mean mist deposition rate of 0.16 microliters/$cm^2$/hour throughout the incubation time period.

At the end of the incubation time period, the Pyrex dish with growth matrix and resulting extra-particle aerial mycelial growth was removed from the growth chamber, and the extra-particle aerial mycelial growth was manually extracted from the growth matrix using a hand saw affixed with a scalloped blade as a contiguous mat of negatively gravitropic, bulbous, floccose to sub-cottony, aerial mycelium (73 g) having a moisture content of about 89% (w/w), a mean thickness of 35.7 mm, a maximum thickness of 50.38 mm, and a mean native density of 10 pcf. The harvested mycelium mat was desiccated at room temperature for 24 hours to a final moisture content of equal to or less than 10% (w/w), after which the mean dry density of the panel was 1.4 pcf.

Example 12

Growth media was prepared by combining via machine mixing on a dry mass basis maple flour substrate of an approximate particle size of 0.5 mm (87.5%) with poppy seed (10%), maltodextrin (2%) and calcium sulfate (0.5%). The mixed substrate was hydrated to about 65% moisture content (w/w) and sterilized in a mixing pressure vessel at 20 psi (130° C.) for 30 minutes. After cooling to below 26° C. the resulting growth media was inoculated with *Pleurotus ostreatus* white millet feed grain spawn under aseptic conditions.

The resulting growth matrix was dispensed into twenty-four uncovered Cambro food pans with a volume of 560 cubic inches at a rate of 1767 g of growth media per pan and incubated for a time period of 13 days in a growth chamber having an atmosphere maintained at an average of 0.2% (v/v) $CO_2$, 14 to 20% (v/v) $O_2$, and approximately 99.8% relative humidity throughout the incubation time period. Growth chamber atmospheric content was maintained based on $CO_2$ and fresh air injection to maintain the given $CO_2$ setpoint, as such $O_2$ and other atmospheric components are maintained indirectly and fluctuate as a function of fungal respiration. Throughout the incubation period, the temperature was maintained between 65 and 72.5° F. The incubation was performed entirely in the dark. The growth chamber was equipped with forced air circulation, which provided a flow of air (the air containing the same components as the growth chamber atmosphere described above) directed substantially parallel to the surface of the growth matrix of each of the 24 Cambro trays, which are arranged on shelves such that there is adequate volume around each tray to allow for airflow, at a rate within a range of about 70 to 100 linear feet per minute throughout the incubation period. The growth chamber was further equipped with a commercial ultrasonic mister supplied with tap water having a conductivity of between about 400 and 500 microsiemens/cm. The ultrasonic mister was placed such that mist was emitted into the air stream, thereby disbursing mist homogeneously into the growth chamber. The ultrasonic mister was operated at a 100% duty cycle. The mist was circulated within the growth chamber via the directed airflow resulting in mist deposition onto the surface of the growth matrix of each Cambro tray and the resulting extra-particle mycelial growth at a mist deposition and a mean mist deposition rate each ranging from 0.16 to 0.68 microliters/$cm^2$/hour (depending on Cambro tray position within the growth chamber) throughout the incubation time period.

At the end of the incubation time period, each Cambro tray containing the growth matrix and resulting extra-particle aerial mycelial growth was removed from the growth chamber, and the extra-particle aerial mycelial growth was mechanically extracted from the growth matrix as a contiguous mat of negatively gravitropic, bulbous, floccose to sub-cottony, aerial mycelium (671-766 g per tray) having a moisture content of about 91% (w/w) and a mean thickness of >10 mm.

Example 13

The methods disclosed herein may also be performed according to the follow contemplated protocol.

Growth media is prepared by combining by machine mixing in a sterile vessel maple flour substrate (1545 g; approximate particle size 0.5 mm, pretreated by sterilization at 265° F. at 20 psi for 30 minutes) with poppy seed (180 g), maltodextrin (32 g) and calcium sulfate (10 g). The resulting growth media is then inoculated with *Pleurotus ostreatus* (Jacquin: Fries) strain ATCC 58753 NRRL 2366 white millet feed grain or *Pleurotus ostreatus* ATCC 56761 (180 g).

The resulting growth matrix is placed in an uncovered Cambro food pan with a volume of 560 cubic inches and incubated for a time period of 13 days in a growth chamber having a growth atmosphere maintained at 5% (v/v) $CO_2$, 14 to 20% (v/v) $O_2$, atmospheric $N_2$ (about 78% (v/v), and 99% relative humidity, throughout the incubation time period. Throughout the incubation period, the temperature is maintained within the range of 65 to 70° F. The incubation is performed entirely in the dark. The growth chamber is equipped with an airflow box, which provides a flow of air (the air containing the same components as the growth chamber atmosphere described above) directed substantially parallel to the surface of the growth matrix at a rate of about 81 linear feet per minute throughout the incubation period. The growth chamber is further equipped with a submersible misting puck apparatus operated at a 40% duty cycle over a 180 second cycle period, and mist is deposited onto the surface of the growth matrix and the resulting extra-particle mycelial growth at a mean mist deposition rate within a range of 0.30 to 0.35 microliters/$cm^2$/hour throughout the incubation time period.

At the end of the incubation time period, the resulting extra-particle aerial mycelial growth is removed from the chamber and mechanically extracted from the growth matrix as a single panel of aerial mycelium. The panel (600 g) had a moisture content of about 90% (w/w), a thickness of about 30 to 60 mm and a mean density of 10 to 15 pounds per cubic foot.

Example 14

Growth media was prepared by combining by machine mixing in a sterile vessel maple flour substrate (1545 g; approximate particle size 0.5 mm), poppy seed (180 g), maltodextrin (32 g) and calcium sulfate (10 g). The mixture was hydrated to a final moisture content of 62% (w/w), sterilized at 265° F. at 20 psi for 30 minutes, and cooled. The resulting growth media was then inoculated with fungal inoculum containing *Pleurotus ostreatus* spawn and white millet feed grain.

The resulting growth matrix was placed in an uncovered Cambro food pan with a volume of 560 cubic inches and incubated for a time period of 13 days in a growth chamber having a growth atmosphere maintained at 5% (v/v) $CO_2$, 14 to 20% (v/v) $O_2$, atmospheric $N_2$ (about 78% (v/v), and 99% relative humidity, throughout the incubation time period. Throughout the incubation period, the temperature was maintained within the range of 65 to 70° F. The incubation was performed entirely in the dark. The growth chamber was equipped with an airflow box, which provided a flow of air (the air containing the same components as the growth chamber atmosphere described above) directed substantially parallel to the surface of the growth matrix at a rate of about 81 linear feet per minute throughout the incubation period. The growth chamber was further equipped with a submersible misting puck apparatus operated at a 40% duty cycle over a 180 second cycle period, and mist was deposited onto the surface of the growth matrix and the resulting extra-particle mycelial growth at a mean mist deposition rate of within a range of 0.30 to 0.35 microliters/$cm^2$/hour throughout the incubation time period.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium (600 g) having a moisture content of about 90% (w/w), a thickness of about 38 to 64 mm and a mean native density of 5.5 pounds per cubic foot. The panel was dried at 110° F. for 18 hours to a final moisture content of about 10% (w/w), after which the mean dry density of the panel of 0.55 pounds per cubic foot.

Example 15

Growth media was prepared by machine mixing, in a sterile vessel, maple flour substrate (1545 g; approximate particle size 0.5 mm) with defatted soy flour (150 g). The mixture was hydrated to a final moisture content of 60 to 65% (w/w), sterilized at 265° F. at 20 psi for 30 minutes, and cooled. The resulting growth media was then inoculated with fungal inoculum containing *Pleurotus ostreatus* spawn and white millet feed grain.

The resulting growth matrix was placed in an uncovered Cambro food pan with a volume of 560 cubic inches and incubated for a time period of 13 days in a growth chamber having a growth atmosphere of 5% (v/v) CO2, 14 to 20% (v/v) O2, 78% (v/v) $N_2$, and 99% relative humidity. Throughout the incubation period, the temperature was maintained within the range of 65 to 70° F. The incubation was performed entirely in the dark. The growth chamber was equipped with an airflow box, which provided a flow of air (the air containing the same components as the growth chamber atmosphere described above) directed substantially parallel to the surface of the growth matrix at a rate of about 81 linear feet per minute throughout the incubation period. The growth chamber was further equipped with a submersible misting puck apparatus operated at a 40% duty cycle over a 180 second cycle period, and mist was deposited onto the surface of the growth matrix and the resulting extra-particle mycelial growth at a mist deposition rate of 0.35 microliters/$cm^2$/hour, and a mean mist deposition rate of 0.30 microliters/$cm^2$/hour throughout the incubation time period.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium (1000 g) having a moisture content of about 90% (w/w), a thickness of about 38 to 75 mm and a mean native density of 8 pounds per cubic foot. The panel was dried at 110° F. for 18 hours to a final moisture content of about 10% (w/w), after which the dry density of the panel was 0.8 pounds per cubic foot.

Example 16

Aerial mycelium was prepared as described in Example 15, with the following exceptions. The growth media was prepared by combining by aseptically hand mixing maple flour substrate (1545 g; approximate particle size 0.5 mm) with chickpea flour (150 g) prior to the hydration, sterilization, cooling, and inoculation with fungal inoculum containing *Pleurotus ostreatus* spawn and white millet feed grain.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium (530 g) having a moisture content of about 90% (w/w), a thickness of about 38 to 50 mm and an estimated mean native density of 5.25 pounds per cubic foot. The panel was dried at 110° F. for 18 hours to a final moisture content of about 10% (w/w), after which the dry density of the panel was 0.53 pounds per cubic foot.

Example 17

Aerial mycelium was prepared as described in Example 15, with the following exceptions. The growth media was prepared by combining by aseptically hand mixing maple flour substrate (1545 g; approximate particle size 0.5 mm) with millet seed flour (150 g) prior to the hydration, sterilization, cooling, and inoculation with fungal inoculum containing *Pleurotus ostreatus* spawn and white millet feed grain.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium (150 g) having a moisture content of about 90% (w/w), a thickness of about 13 to 26 mm and an estimated mean native density of 3.75 pounds per cubic foot. The panel was dried at 110° F. for 18 hours to a final moisture content of about 10% (w/w), after which the dry density of the panel was 0.38 pounds per cubic foot.

Example 18

Aerial mycelium was prepared as described in Example 15, with the following exceptions. The growth media was prepared by machine mixing in a sterile vessel maple flake substrate (1250 g; approximate particle size 2.0 mm) with defatted soy flour (150 g) prior to the hydration, sterilization, cooling, and inoculation with fungal inoculum containing *Pleurotus ostreatus* spawn and white millet feed grain.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium (500 g) having a moisture content of about 90% (w/w), a thickness of about 13 to 60 mm and a mean native density of 9.75 pounds per cubic foot. The panel was dried at 110° F. for 18 hours to a final moisture content of about 10% (w/w), after which the dry density of the panel was 0.98 pounds per cubic foot.

Example 19

Aerial mycelium was prepared as described in Example 15, with the following exceptions. The growth media was prepared by combining by aseptically hand mixing oak flake substrate (1250 g; approximate particle size 2.0 mm) with defatted soy flour (150 g) prior to hydration, sterilization, cooling, and inoculation with fungal inoculum containing *Pleurotus ostreatus* spawn and white millet feed grain.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium (210 g) having a moisture content of about 90% (w/w), a thickness of about 7 to 38 mm and an estimated mean native density of 7.5 pounds per cubic foot. The panel was dried at 110° F. for 18 hours to a final moisture content of about 10% (w/w), after which the dry density of the panel was 0.75 pounds per cubic foot.

Example 20

Aerial mycelium was prepared as described in Example 15, with the following exceptions. The growth media was prepared by machine mixing in a sterile vessel oak pellet substrate (680 g to 700 g; approximate particle size 2.0 to 4.0 mm) with soybean hull pellets (680 g to 700 g) prior to hydration, sterilization, cooling, and inoculation with fungal inoculum containing *Pleurotus ostreatus* spawn and white millet feed grain.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium (350 g) having a moisture content of about 90% (w/w), a thickness of about 13 to 51 mm and an estimated mean native density of 7.25 pounds per cubic foot. The panel was dried at 110° F. for 18 hours to a final moisture content of about 10% (w/w), after which the dry density of the panel was 0.73 pounds per cubic foot.

Example 21

Aerial mycelium was prepared as described in Example 15, with the following exceptions. The growth media was prepared by combining by aseptically hand mixing maple chip substrate (1350 g; approximate particle size 50.0 mm) with defatted soy flour (150 g) prior to hydration, sterilization, cooling, and inoculation with fungal inoculum containing *Pleurotus ostreatus* spawn and white millet feed grain.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium (375 g) having a moisture content of about 90% (w/w), a thickness of about 10 to 38 mm and an estimated mean native density of 10.1 pcf. The panel was dried at 110° F. for 18 hours to a final moisture content of about 10% (w/w), after which the dry density of the panel was 0.1 pcf.

Example 22

Aerial mycelium was prepared as described in Example 15, with the following exceptions. Growth media was prepared by machine mixing in a vessel maple flake substrate (1250 g; approximate particle size 2.0 mm) with defatted soy flour (150 g). The mixture was hydrated to a final moisture content of 60 to 65% (w/w), pasteurized at 212° F. at 0-5 psi for 30 minutes, and cooled. The resulting growth media was then inoculated with fungal inoculum containing *Pleurotus ostreatus* spawn and white millet feed grain.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium (600 g) having a moisture content of about 90% (w/w), a thickness of about 26 to 60 mm and a mean native density of 7 pcf. The panel was dried at 110° F. for 18 hours to a final moisture content of about 10% (w/w), after which the dry density of the panel was 0.7 pounds per cubic foot.

Example 23

Aerial mycelium was prepared as described in Example 15, with the following exceptions. The growth media was prepared by combining by aseptically hand mixing vermiculite substrate (1200 g; approximate particle size 0.5 to 1.0 mm), poppy seed (180 g), maltodextrin (32 g) and calcium sulfate (10 g) prior to hydration, sterilization, cooling, and inoculation with fungal inoculum containing *Pleurotus ostreatus* spawn and white millet feed grain.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium (20 g) having a moisture content of about 90% (w/w), a thickness of about 10 to 20 mm and an estimated and approximate mean native density of 0.6 pounds per cubic foot. The panel was dried at 110° F. for 18 hours to a final moisture content of about 10% (w/w), after which the dry density of the panel was 0.06 pounds per cubic foot.

Example 24

Malt Extract Agar (MEA) was prepared by dissolving 20 g/L malt extract and 20 g/L agar agar in distilled water and autoclaving at 121° C. for 10 minutes. The MEA was cooled to 65° C. and dispensed into 90×15 mm petri dishes at rate of 20 mL per dish to an approximate depth of 5 mm allowing for a 10 mm headspace when the petri dish lid is applied. The petri dishes containing MEA (i.e., MEA plates) were inoculated with *Pleurotus ostreatus* ATCC 56761 by transferring a 0.5 mm diameter agar plug as provided as frozen in a cryogenic storage ampule by ATCC and transferring the subculture of mycelial tissue to the center of the MEA plate under aseptic conditions. Inoculated plates were incubated in the dark at between 22-32° C. for a period of 7 days, during which *Pleurotus ostreatus* grows across the agar surface forming a circular, radial, zonate or non-zonate, floccose to cottony, subcottony, or subfelty colony with a maximum colonial thickness from the agar surface of 5 mm and a total colony radius of 20 to 30 mm.

Example 25

Malt Extract Agar (MEA) was prepared by dissolving 20 g/L malt extract and 20 g/L agar agar in distilled water and autoclaving at 121° C. for 10 minutes. The MEA was cooled to 65 C and dispensed into 90×15 mm petri dishes as at rate of 20 mL per dish to an approximate depth of 5 mm allowing for a 10 mm headspace when the petri dish lid is applied. The petri dishes containing MEA (i.e., MEA plates) were inoculated with *Ganoderma sessile* by either transferring a 0.5 mm diameter agar plug sub-cultured from another culture plate or with a pre-meiotic tissue biopsy from a basidiocarp sampled under aseptic conditions and transferring the subculture of biopsy tissue to the center of the MEA plate under aseptic conditions. Inoculated plates were incubated in the dark at between 22-32° C. for a period of 7 days, during which *Ganoderma sessile* grows across the agar surface forming a circular, radial, zonate or non-zonate, appressed and subfelty colony with a maximum colonial thickness from the agar surface of <2 mm.

Example 26

Malt Extract Agar (MEA) was prepared by dissolving 20 g/L malt extract and 20 g/L agar agar in distilled water and autoclaving at 121° C. for 10 minutes. The MEA was cooled to 65 C and dispensed into 90×15 mm petri dishes as at rate of 20 mL per dish to an approximate depth of 5 mm allowing for a 10 mm headspace when the petri dish lid is applied. The petri dishes containing MEA (i.e., MEA plates) were inoculated with *Pleurotus ostreatus* by either transferring a 0.5 mm diameter agar plug sub-cultured from another culture plate, or with a pre-meiotic tissue biopsy from a basidiocarp sampled under aseptic conditions and transferring the subculture of biopsy tissue to the center of the MEA plate under aseptic conditions. Inoculated plates were incubated in the dark at between 22-32 C for a period of 7 days, during which *Pleurotus ostreatus* grows across the agar surface forming a circular, radial, zonate or non-zonate, floccose to cottony, or subcottony colony with a maximum colonial thickness from the agar surface of 5 mm to 8 mm.

Example 27

Dry white millet (800 g) was combined with distilled water (600 mL) and CaSO4 (10 g) in polypropylene bags affixed with 0.2 micron filters and pressure sterilized at 121° C. at 15 psi for 60 minutes. After cooling to room temperature, under aseptic conditions, approximately ⅙ of a 90×15 mm MEA culture of either *Pleurotus ostreatus* or *Ganoderma sessile* was cut into approximately 5×5 mm cubes and transferred into the polypropylene bag containing prepared white millet. The polypropylene bag was heat sealed and mixed by hand to distribute the MEA culture cubes through the white millet. The bag was incubated at temperatures between 22-32° C. for 7 days, mixed by hand to agitate the white millet particles, then incubated for an additional 5 to 7 days until mycelium was visible around and between the white millet particles (i.e., the white millet was colonized). The colonized white millet was then stored at 4° C. until use.

Example 28

Kramer shear force. Kramer shear force was measured using an Instron® Universal Testing Machine, Model 3345 having a 1 kiloNewton (1 kN) load cell, in connection with a Kramer Shear cell, Catalog no. S5403 having a 2 kN capacity and equipped with five 3 mm thick blades.

Panels of aerial mycelium grown from *Ganoderma sessile* were prepared essentially as described in Example 6. At the end of the incubation time period, the resulting extra-particle aerial mycelial growth was removed from the chamber and mechanically extracted from the growth matrix as a single panel of aerial mycelium having a moisture content of at least about 80% (w/w). The panels were then allowed to acclimate to ambient atmospheric conditions (room temperature and relative humidity) for about 24 hours, but not dried in an oven or desiccated. Aerial mycelial samples were then cut from each panel and weighed, and then placed in the 1.75 inch by 1.75 inch Kramer shear cell for analysis.

After each sample was placed in the cell, attempts were made to shear the samples through the 1.75 inch by 1.75 inch cross-section extrusion grate. These efforts overloaded the 1 kN load cell capacity, indicating that the Kramer shear force of each sample was greater than 100 kg/g of aerial mycelium.

A. Kramer Shear Force Testing for *Pleurotus ostreatus* Aerial Mycelia.

Two batches of aerial mycelium panels grown from *Pleurotus ostreatus* were prepared as follows. Briefly, growth media was prepared by combining via machine mixing on a dry mass basis maple flour substrate of an approximate particle size of 0.5 mm (87.5%) with poppy seed (10%), maltodextrin (2%) and calcium sulfate (0.5%). The mixed substrate was hydrated to about 65% moisture content (w/w) and sterilized in a mixing pressure vessel at 20 psi (130° C.) for 30 minutes. After cooling to below 26° C. the resulting growth media was inoculated with fungal inoculum containing *Pleurotus ostreatus* spawn and white millet feed grain. The resulting growth matrix was placed in an uncovered Cambro food pan with a volume of 560 cubic inches and incubated for a time period of 9 to 13 days in a growth chamber having a growth atmosphere maintained at 5% (v/v) $CO_2$, 14 to 20% (v/v) $O_2$, atmospheric $N_2$ (about 78% (v/v), and 99% relative humidity, throughout the incubation time period, during which the temperature was maintained within the range of 65 to 70° F. The incubation was performed entirely in the dark. The growth chamber was equipped with an airflow box, which provided a flow of air (the air containing the same components as the growth chamber atmosphere described above) directed substantially parallel to the surface of the growth matrix at a rate within a range of 125 to 155 linear feet per minute (first batch), or 220 to 275 linear feet per minute (second batch), throughout the incubation period. The growth chamber was further equipped with a submersible misting puck apparatus operated at a mean duty cycle of 61%, and mist was deposited onto the surface of the growth matrix and the resulting extra-particle mycelial growth. In a typical experiment, the mist was deposited at a mean mist deposition rate of within a range of about 0.30 to about 0.35 microliters/cm$^2$/hour throughout the incubation time period.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium having a moisture content of at least about 80% (w/w).

On the day of extraction from the growth matrix, four "fresh" panels of aerial mycelium, obtained as described above, were analyzed via Kramer shear cell testing.

Briefly, specimens were sliced from the center (3) and the edge (3) of each panel to provide 24 specimens per panel. Each specimen was weighed, placed in the 1.75 inch by 1.75 inch Kramer shear cell, and sheared through the 1.75 inch by 1.75 inch cross-section extrusion grate, either in the dimension substantially parallel to the direction of aerial mycelial growth ("with grain"), or in the dimension substantially perpendicular to the direction of aerial mycelial growth ("against grain"). The maximum kilograms of force value was taken from the peak of the Load-Extension curve recorded from the load cell. The grams of material was taken from the mass of the sample obtained prior to being placed in the 1.75"×1.75" Kramer shear cell. The maximum kilograms of force value was divided by the mass of the sample in grams to yield a kg/g ratio. The Kramer shear force for the aerial mycelia obtained from *P. ostreatus* was within a range of about 2 kg per gram of aerial mycelium to about 15 kg per gram of aerial mycelium. More particularly, the specimens obtained from the fresh panels exhibited Kramer shear force values in a range of 1.95 to 8.40 kg/g.

Figure 10A:
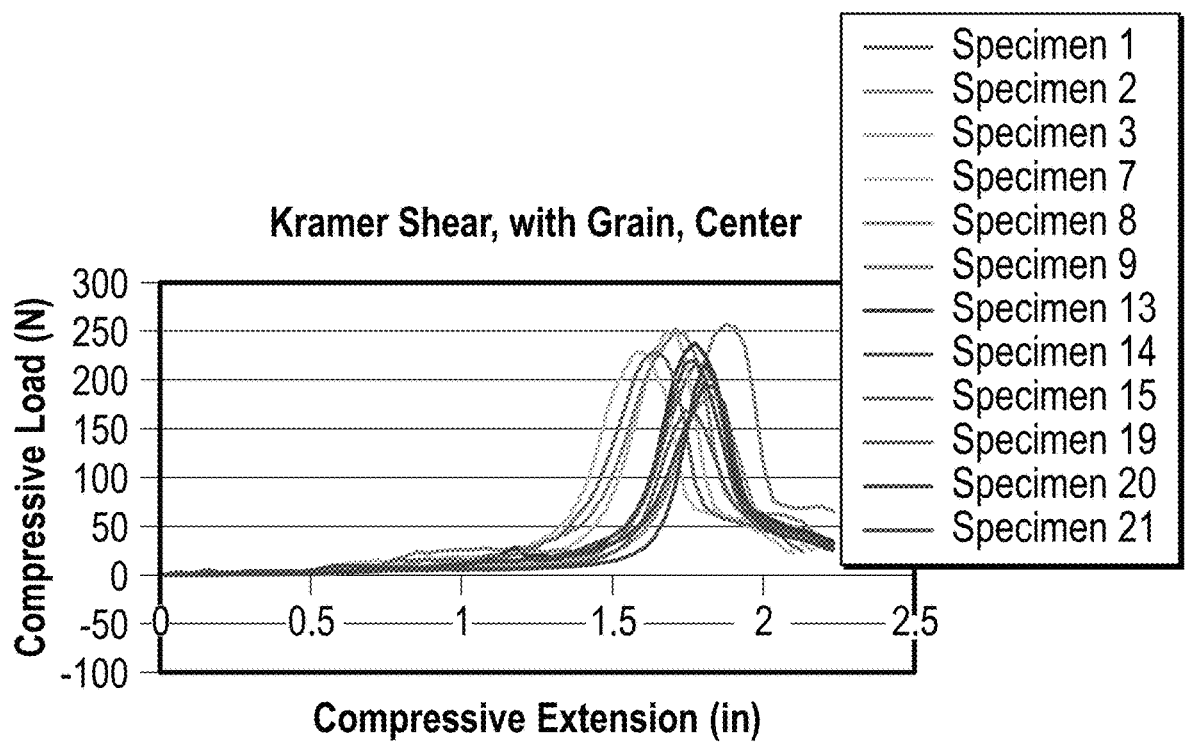
FIGS. 10 A-C show graphs of compressive load (Newtons; N) versus compressive extension (inches) obtained during Kramer shear force testing of aerial mycelia upon shearing in the dimension substantially parallel to the direction of aerial mycelial growth, according to Example 28 (FIGS. 10A and B) and Example 32 (FIG. 10C).
Figure 10B:
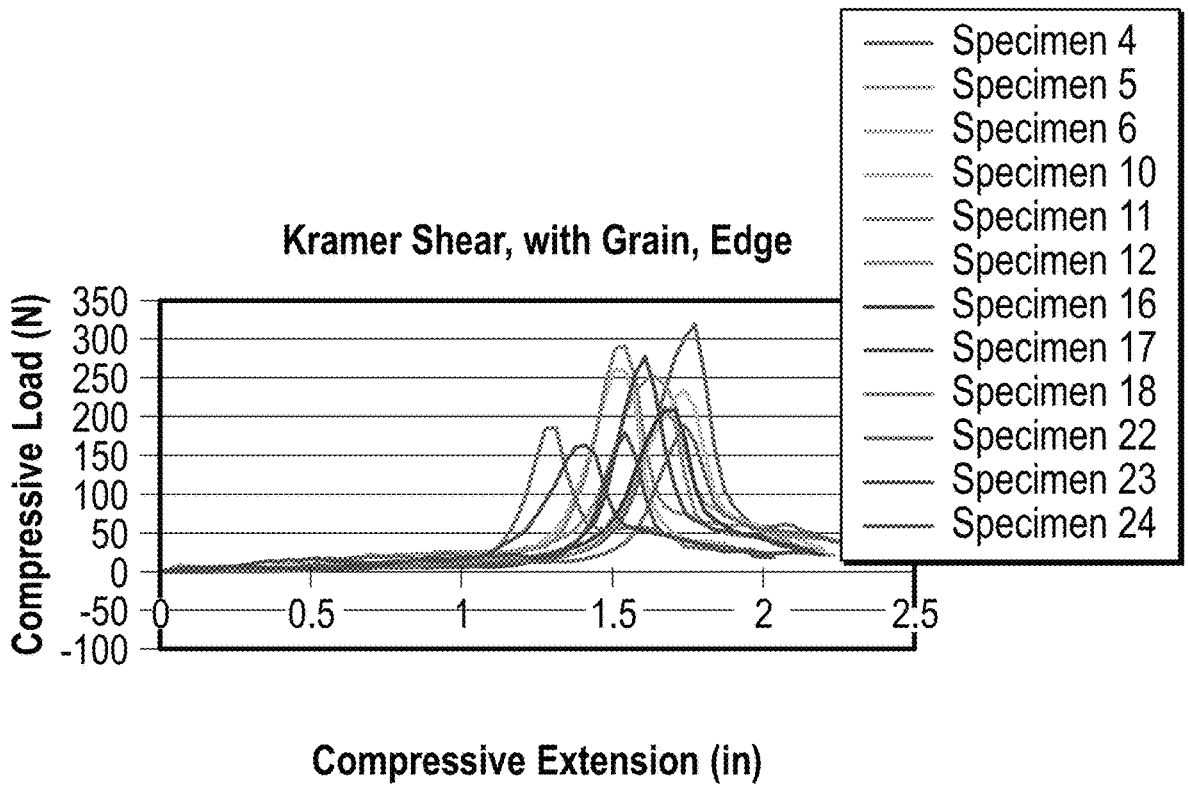

Fresh panel specimens sheared in the dimension substantially parallel to the direction of aerial mycelial growth ("with grain"; specimens 1 to 24) exhibited Kramer shear force values ranging from 1.95 to 5.04 kg/g, and a mean Kramer shear force of 2.83 kg/g. The subset of specimens cut from the center of the panel (specimens 1 to 3, 7 to 9, 13 to 15 and 19 to 21) exhibited Kramer shear force values ranging from 1.95 to 3.73 kg/g, and a mean Kramer shear force of 2.42 kg/g [FIG. 10A]. The subset of specimens cut from the edge of the panel (specimens 4 to 6, 10 to 12, 16 to 18 and 22 to 24) exhibited Kramer shear force values ranging from 2.26 to 5.04 kg/g, and a mean Kramer shear force of 3.23 kg/g [FIG. 10B]. Additional Kramer shear force test results measured on fresh panels "with grain" are described in Example 32. [See FIG. 10C.]

Figure 11:
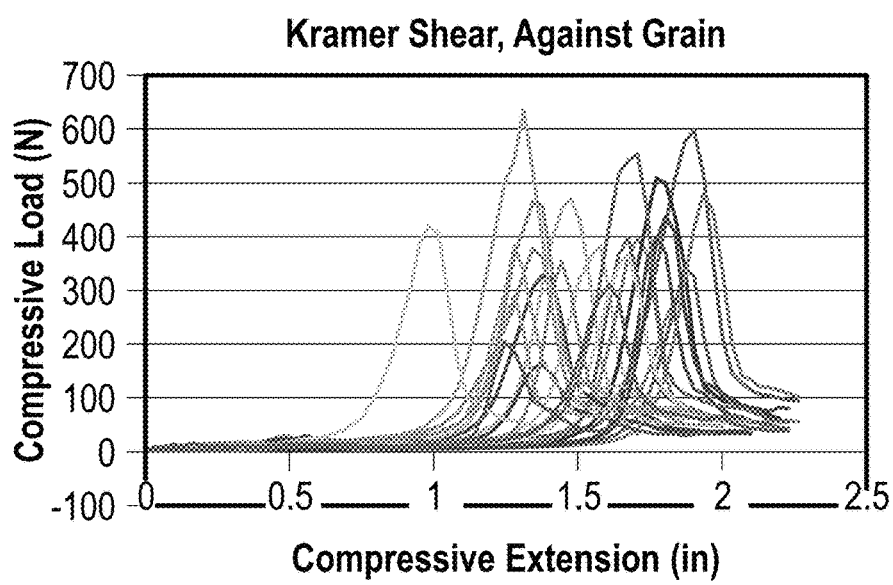
FIG. 11 shows graphs of compressive load (Newtons; N) versus compressive extension (inches) obtained during Kramer shear force testing of aerial mycelia upon shearing in the dimension substantially perpendicular to the direction of aerial mycelial growth, according to Example 28.

Fresh panel specimens sheared in the dimension substantially perpendicular to the direction of aerial mycelial growth ("against grain"; specimens 25 to 48), exhibited Kramer shear force values ranging from 3.04 to 8.40 kg/g, and a mean Kramer shear force of 5.85 kg/g. The subset of specimens cut from the center of the panel (specimens 25 to 27, 31 to 33, 37 to 39 and 43 to 45) exhibited Kramer shear force values ranging from 3.44 to 8.40 kg/g, and a mean Kramer shear force of 6.13 kg/g. The subset of specimens cut from the edge of the panel (specimens 28 to 38, 34 to 36, 40 to 42 and 46 to 48) exhibited Kramer shear force values ranging from 3.04 to 7.94 kg/g, and a mean Kramer shear force of 5.57 kg/g. [See FIG. 11.]

The "rise behavior" in the front half of the curves for the fresh aerial mycelia (FIG. 10 and FIG. 11) reflect the light load required to densify the material (almost "like a marshmallow"), followed by a significantly stronger load to ultimately tear (or "bite") through it.

Figure 12:
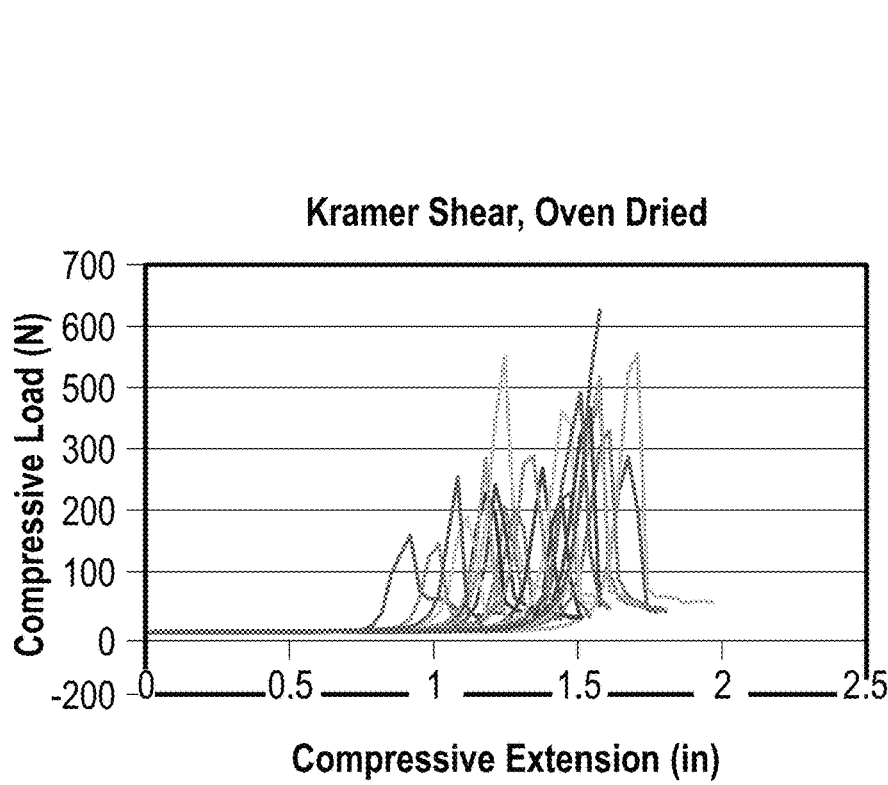
FIG. 12 shows graphs of compressive load (Newtons; N) versus compressive extension (inches) obtained during Kramer shear force testing of oven dried aerial mycelia upon shearing in the dimension substantially parallel to the direction of aerial mycelial growth, according to Example 28.

Kramer shear force values for oven-dried materials were determined as follows. Fresh panels were oven dried in an electric dryer at 110° F. for approximately 24 hours to a final moisture content of about 17%. Specimens were cut from the center and edge of the panels to provide 24 specimens. Kramer shear force testing was performed essentially as described above, shearing in the dimension substantially parallel to the direction of aerial mycelial growth ("with grain"). The specimens (specimens 144 to 167) exhibited Kramer shear force values ranging from 56.6 to 116.6 kg/g, and a mean Kramer shear force of 83.6 kg/g. [See FIG. 12.]

B. Kramer Shear Force Testing for *Ganoderma sessile* Aerial Mycelia.

Panels of aerial mycelium grown from *Ganoderma sessile* were prepared essentially as described in Example 6. At the end of the incubation time period, the resulting extra-particle aerial mycelial growth was removed from the chamber and mechanically extracted from the growth matrix as a single panel of aerial mycelium having a moisture content of at least about 80% (w/w). The panels were then allowed to acclimate to ambient atmospheric conditions (room temperature and relative humidity) for about 24 hours, but not dried in an oven or desiccated.

Aerial mycelial samples were cut from each panel and weighed, and then analyzed via the Kramer shear cell test, essentially as described for Example 28 A. Briefly, after each sample was placed in the cell, attempts were made to shear the samples through the 1.75 inch by 1.75 inch cross-section extrusion grate. These efforts overloaded the 1 kN load cell capacity, indicating that the Kramer shear force of each sample was greater than 100 kg/g of aerial mycelium.

Example 29

Open volume (volume fraction). Aerial mycelia were obtained essentially as described in Example 6. After extraction from the growth matrix, the mycelium was dried for 18 hours at 110° F., after which the residual moisture content was less than about 10% (w/w) of the total mass of the mycelium. The open volume fraction) of the dried mycelium was measured by a variety of methods.

In one experiment, sections of the aerial mycelium were sliced along its thickness and analyzed by fluid saturation. The open volume of the aerial mycelium was determined to be between 84% and 93% (v/v).

In another experiment, the aerial mycelium was embedded with a clear epoxy resin and was ground to a thin section using common thin sectioning techniques. This section was then imaged on a light microscope and the images were analyzed for open volume percentage. The open volume of the aerial mycelium was determined to be about 80% to 99% (v/v).

In yet other experiments, the aerial mycelium was inspected either by scanning electron microscopy (SEM), confocal or micro-computed tomography (CT) scanning techniques and analyzed for open volume percentage. The aerial mycelium open volume was determined to be about 80% to about 88% (v/v). Additional volume fraction experiments and data are disclosed in Example 39.

Example 30

Aerial mycelium was prepared as described in Example 7, with the following exceptions. The growth media was inoculated with *Pleurotus ostreatus* ATCC 56761 white millet feed grain. The ultrasonic mister was supplied with reverse osmosis filtered water having a conductivity of between 20 and 40 microsiemens/cm.

At the end of the incubation time period, the Pyrex dish with growth matrix and resulting extra-particle aerial mycelial growth was removed from the growth chamber, and the extra-particle aerial mycelial growth was manually extracted from the growth matrix using a hand saw affixed with a scalloped blade as a contiguous mat of negatively gravitropic, bulbous, floccose to sub-cottony, aerial mycelium (63 g) having a moisture content of about 91% (w/w), a mean thickness of 20.8 mm, a maximum thickness of 36.8 mm, and a mean native density of 3.49 pcf. The harvested mycelium mat was desiccated at room temperature for 24 hours to a final moisture content of 9.4% (w/w), after which the mean dry density of the panel was 1.74 pcf.

Example 31

Aerial mycelium was prepared as described in Example 7, with the following exceptions. The ultrasonic mister was supplied with reverse osmosis filtered water having a conductivity of between 20 and 40 microsiemens/cm.

At the end of the incubation time period, the Pyrex dish with growth matrix and resulting extra-particle aerial mycelial growth was removed from the growth chamber, and the extra-particle aerial mycelial growth was manually extracted from the growth matrix using a hand saw affixed with a scalloped blade as a contiguous mat of negatively gravitropic, bulbous, floccose to sub-cottony, aerial mycelium (63 g) having a moisture content of about 91% (w/w), a mean thickness of 22.6 mm, a maximum thickness of 36.3 mm, and a mean native density of 4.01 pcf. The harvested mycelium mat was desiccated at room temperature for 24 hours to a final moisture content of 6.9% (w/w), after which the mean dry density of the panel was 1.37 pcf.

Example 32

A batch of 24 aerial mycelial panels was prepared as follows. To prepare each panel of the batch, growth media was prepared by machine mixing in a sterile vessel oak pellet substrate (680 g; approximate particle size 2.0 to 4.0 mm) with soybean hull pellets (680 g). The mixture was hydrated to a final moisture content of 60 to 65% (w/w), sterilized at 265° F. at 20 psi for 30 minutes, and cooled. The resulting growth media was then inoculated with fungal inoculum containing *Pleurotus ostreatus* spawn and white millet feed grain.

The resulting growth matrix was placed in an uncovered Cambro food pan with a volume of 560 cubic inches (11.5 in wide×19.5 in long×2.5 in deep) and incubated for a time period of 13 days in a growth chamber having a growth atmosphere of 5% (v/v) $CO_2$ and 99% relative humidity. Throughout the incubation period, the temperature was maintained within the range of 65 to 70° F. The incubation was performed entirely in the dark. The growth chamber was equipped with a fan, which provided a flow of air (the air containing the same components as the growth chamber atmosphere described above) directed substantially parallel to the surface of the growth matrix at a rate within a range of about 80 to 90 linear feet per minute throughout the incubation period. The growth chamber was further equipped with a submersible misting puck apparatus operated at 100% duty cycle over a 60 second cycle period. Mist was deposited onto the surface of the growth matrix and the resulting extra-particle mycelial growth at a mean mist deposition rate within a range of about 0.30 to about 0.35 microliters/$cm^2$/hour throughout the incubation time period.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium.

Each of the 24 panels of aerial mycelium, prepared as described above, was weighed post-extraction. The maximum wet (native) mass was 1080 g, and the mean native mass was 819 g.

One of the 24 panels of aerial mycelium, prepared as described above and having been positioned near the top, center and front region of the growth chamber throughout the incubation time period, was pulled for further analysis. The panel (667 g) had a moisture content of 90.4% (w/w), a thickness of about 40 to 60 mm and an estimated mean native density of about 4.6 pounds per cubic foot. This panel, without any further processing, was sampled for physical testing as described below.

Figure 10C:
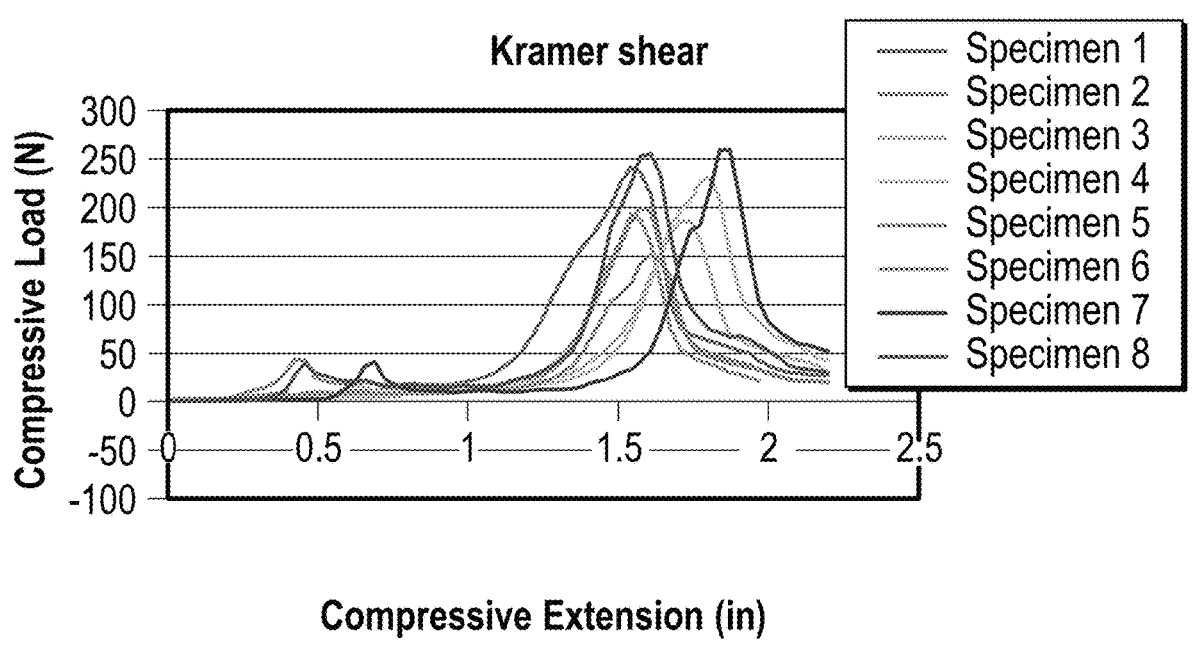

Kramer shear force. Aerial mycelial specimens (8) were sliced from the panel and then analyzed via Kramer shear cell testing. Briefly, each specimen was weighed, placed in the 1.75 inch by 1.75 inch Kramer shear cell, and sheared through the 1.75 inch by 1.75 inch cross-section extrusion grate. The maximum kilograms of force value was taken from the peak of the load-extension curve recorded from the load cell. The grams of material was taken from the specimen weight obtained prior to being placed in the 1.75"× 1.75" Kramer shear cell. The maximum kilograms of force value was divided by the mass of the specimen in grams to yield a kg/g ratio. The mean Kramer shear force for the aerial mycelial specimens (specimens 1 to 8; FIG. 10C) was 2.08+/−0.432 kg/g of material.

Tensile Strength. ASTM D638-10: Standard Test Method for Tensile Properties of Plastics was used to determine ultimate tensile strength in the dimension substantially perpendicular to the direction of aerial mycelial growth. Test samples were prepared by slicing the mycelia into 4 mm thick layers and using a CNC laser cutter to trim out testing samples having dimensions consistent with ASTM D638-10 Type IV specifications. This test was modified to accommodate wet panels, which do not cut neatly; accordingly, a rectangular block was cut, the cross-sectional area was measured (by assuming a regular width and thickness and finding the product), and the pounds per square inch at peak measured. Ultimate tensile strength was measured using on an Instron 3345 with a 5 kN load cell, and in the dimension substantially perpendicular to the direction of aerial mycelial growth ("against grain"). A single sample showed a tensile strength of 0.37 psi.

ASTM D1623 was used to determine the ultimate tensile strength in the dimension substantially parallel to the direction of mycelial growth for four samples obtained from the same panel. Ultimate tensile strength was measured using an Instron 3345 instrument with a 5 kN load cell in the dimension substantially parallel to the direction of aerial mycelial growth ("with grain"). This test as well was done with the same modification to the ASTM as described in the previous paragraph; with a larger cross-sectional area cut and assumed to be regular in geometry. A single sample showed a tensile strength of 1.1 psi.

Compression. ASTM C165-07 was used to determine the compressive properties of the samples. Specimens were cut from the center of the panel of aerial mycelium. A rectangular-prism section was measured in all three directions (width, length, height) and placed on a set of compression platens on the Instron 3345 machine (with 1 kN load cell capacity). The part was then compressed to 10% strain, and the data over the course of the compression showed a linear relationship between stress and strain. The slope of this line (the compressive modulus) was outputted and recorded. The results of this test showed a compressive modulus at 10% strain of 0.61+/−0.02 psi and a compressive stress at 10% strain of 0.11 psi.

Example 33

A batch of 24 aerial mycelial panels was prepared as follows. To prepare each panel in the batch, growth media was prepared by machine mixing in a sterile vessel oak pellet substrate (680 g; approximate particle size 2.0 to 4.0 mm) with soybean hull pellets (680 g). The mixture was hydrated to a final moisture content of 60 to 65% (w/w), sterilized at 265° F. at 20 psi for 30 minutes, and cooled. The resulting growth media was then inoculated with fungal inoculum containing *Pleurotus ostreatus* spawn and white millet feed grain.

The resulting growth matrix was placed in an uncovered Cambro food pan with a volume of 560 cubic inches and incubated for a time period of 13 days in a growth chamber having a growth atmosphere of 5% (v/v) $CO_2$ and 99% relative humidity. Throughout the incubation period, the temperature was maintained at 70° F. The incubation was performed entirely in the dark. The growth chamber was equipped with a fan, which provided a flow of air (the air containing the same components as the growth chamber atmosphere described above) directed substantially parallel to the surface of the growth matrix at a rate within a range of about 15 to 40 linear feet per minute throughout the incubation period. The growth chamber was further equipped with an AKIMist® Dry Fog Humidifier, which delivers a mean droplet diameter of 7 microns, and which was operated at 14.5% duty cycle over a 60 second cycle period. Mist was deposited onto the surface of the growth matrix and the resulting extra-particle mycelial growth at mean mist deposition rate within a range of about 0.3 to about 0.35 microliters/$cm^2$/hour throughout the incubation time period.

Figure 8:
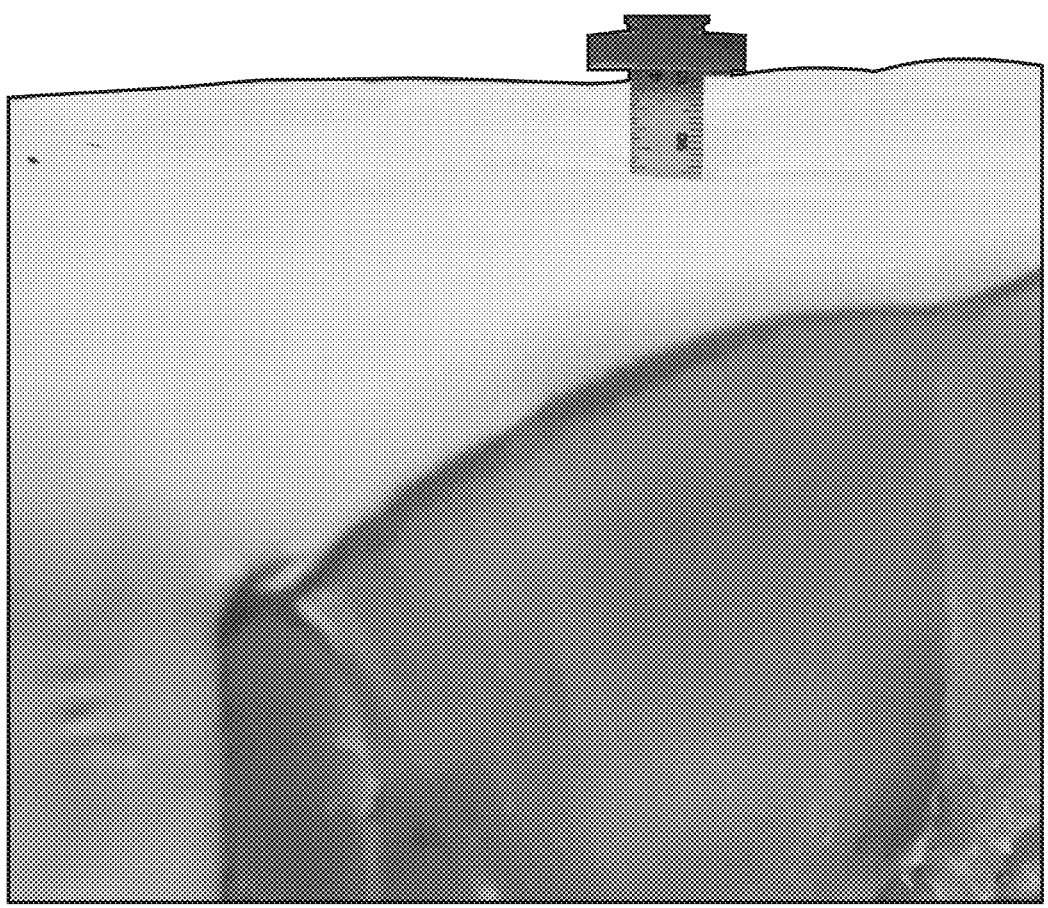
FIG. 8 shows an image of extra-particle aerial mycelium prepared according to Example 33 after removal from the growth chamber and prior to extraction from the growth matrix. The inserted ruler shows the thickness of the aerial mycelium and excludes the height of the growth matrix beneath it.

At the end of the incubation time period, the food pan containing the growth matrix and the resulting extra-particle aerial mycelial growth was removed from the growth chamber. Prior to extraction, a metal ruler was inserted into a panel (but not into the growth matrix beneath the panel) to measure the panel thickness, which was about 84 mm (FIG. 8). Additional panels in the batch were similarly measured, revealing a panel thickness within a range of about 63 to about 84 mm across the batch of aerial mycelia.

Example 34

Five (5) batches of aerial mycelia were prepared as described below, from which nine (9) panels of aerial mycelia were analyzed for their nutritional content.

Growth media was prepared by machine mixing in a sterile vessel maple flake substrate (1250 g; approximate particle size 2.0 mm) with defatted soy flour (150 g), Batch 1; maple flour substrate (1545 g; approximate particle size 0.5 mm), poppy seed (180 g), maltodextrin (32 g) and calcium sulfate (10 g), Batches 2 and 5; or oak pellet substrate (680 g; approximate particle size 2.0 to 4.0 mm) with soybean hull pellets (680 g), Batches 3 and 4. Each mixture was hydrated to a final moisture content of 60 to 65% (w/w), pasteurized at 212° F. at 0-5 psi for 30 minutes or sterilized at 265° F. at 20 psi for 30 minutes, and cooled. The resulting growth media was then inoculated with fungal inoculum containing *Pleurotus ostreatus* spawn and feed grain.

The resulting growth matrix was placed in an uncovered Cambro food pan with a volume of 560 cubic inches and incubated for a time period of 9 to 13 days in a growth chamber having a growth atmosphere of 5% (v/v) $CO_2$ and 99% relative humidity. Throughout the incubation period, the temperature was maintained within the range of 65 to 70° F. The incubation was performed entirely in the dark. The growth chamber was equipped with an airflow box or a fan, which provided a flow of air directed substantially parallel to the surface of the growth matrix throughout the incubation period. The growth chamber was further equipped with a misting apparatus, which was operated at a 100% duty cycle, with the directed flow of air provided at a rate within a range of about 80 to 90 linear feet per minute (Batches 1, 2 and 3); operated at a 43% duty cycle, with the directed flow of air provided at a rate within a range of about 15 to 40 linear feet per minute (Batch 4); or operated at a rate of 61% duty cycle, with the directed flow of air provided at a rate within a range of about 125 to 275 linear feet per minute (Batch 5). Mist was deposited onto the surface of the growth matrix and the resulting extra-particle mycelial growth at a mean mist deposition rate of about 0.3 to about 0.35 microliters/cm$^2$/hour throughout the incubation time period.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium.

Aerial mycelial panels prepared as described above (two panels from each of Batches 1, 3, 4 and 5, and one panel from Batch 2) were weighed post-extraction and further analyzed for nutritional and inorganics content according to the methods described below. The 24 panels from Batch 4 had wet (native) masses within a range of 710 g to 1044 g, with a mean mass of 894 g.

Nutritional content of aerial mycelia. All nutritional parameters were first determined on a wet (native) weight basis and then converted to a dry weight basis according to the following equation:

$$[100*(\text{Wet weight basis}/(100-\text{moisture content})] = \text{Dry weight basis};$$

wherein the moisture content includes volatiles and is determined according to Example 34A.

A. Moisture content (including volatiles) of mycelia was determined using the Official Method of Analysis (AOAC) 925.09. Briefly, a native (undried) mycelial sample is weighed and placed into a 100° C. vacuum oven for a specific amount of time, based on sample matrix. After drying, the sample is removed from the oven and cooled in a desiccator. When cool, the weight of the dried sample is determined. The moisture content (including volatiles) is the difference between the weight of the undried sample and the weight of the sample after drying.

B. Protein content. Protein content of aerial mycelia was determined using reference methods AOAC 990.03 and AOAC 992.15. Briefly, a sample of aerial mycelium is placed into a protein analyzer combustion chamber. Following combustion, the resulting gas is analyzed for nitrogen content. Crude protein is calculated by multiplying the nitrogen content by a protein conversion factor. The standard protein conversion factor is 6.25, however, as mushrooms contain a significant amount of non-protein nitrogen as chitin, a conversion factor of 4.38 is used. [See: Organization for Economic Co-operation and Development (OECD) Environment, Health and Safety Publications Series on the Safety of Novel Foods and Feeds, No. 26, *Consensus Document on Compositional Considerations for New Varieties of OYSTER MUSHROOM [Pleurotus ostreatus]: Key Food and Feed Nutrients, Anti-nutrients and Toxicants*; Paris 2013; the entire content of which is hereby incorporated by reference in its entirety.]

C. Fat content. Total fat content for aerial mycelia is reported based on total triglycerides, as determined using reference method AOAC 996.06 mod. Briefly, a fat extraction method is performed. Sample or extracted fat from sample is reacted with boron-trifluoride/methanol reagent to convert fatty acids present in any form into their corresponding methyl ester forms, which are then extracted into hexanes and injected onto a capillary column gas chromatograph. Standards of known composition are used to identify the fatty acids present, and the percentage of each fatty acid as a part of the entire sample is calculated.

D. Dietary Fiber. Dietary fiber content for aerial mycelia was determined using reference method AOAC 991.43. Briefly, fat and sugar are extracted from the sample, then dried samples undergo enzymatic digestion to remove starch and protein, leaving dietary fiber.

E. Carbohydrates. Carbohydrate content of aerial mycelia was calculated using the standard CFR 21 calculation. [See: 21CFR101.9. Code of Federal Regulations, Title 21, Volume 2, Revised Apr. 1, 2019; the entire content of which is hereby incorporated by reference in its entirety.] As such, carbohydrates are calculated as follows:

$$\text{Total carbohydrates}=[100-(\text{crude protein}+\text{total fat}+ \text{total moisture (including volatiles)}+\text{ash})].$$

F. Ash. Ash content, also referred to herein as "inorganic content," is determined using reference method AOAC 942.05. Briefly, unaltered fresh sample is weighed and placed into a temperature-controlled furnace. Set temperature is maintained for a specified amount of time, typically 600° C. for 2 hours. Dried sample is transferred to a desiccator, cooled, and weighed immediately.

G. Potassium. Potassium content of aerial mycelia was determined using reference AOAC methods 984.27 mod, 927.02 mod, 985.01 mod, 965.17 mod. Briefly, samples are digested, and the resultant digest is analyzed by Inductively Coupled Plasma Optical Emission Spectrophotometry against a set of ISO certified standards.

Figure 13:
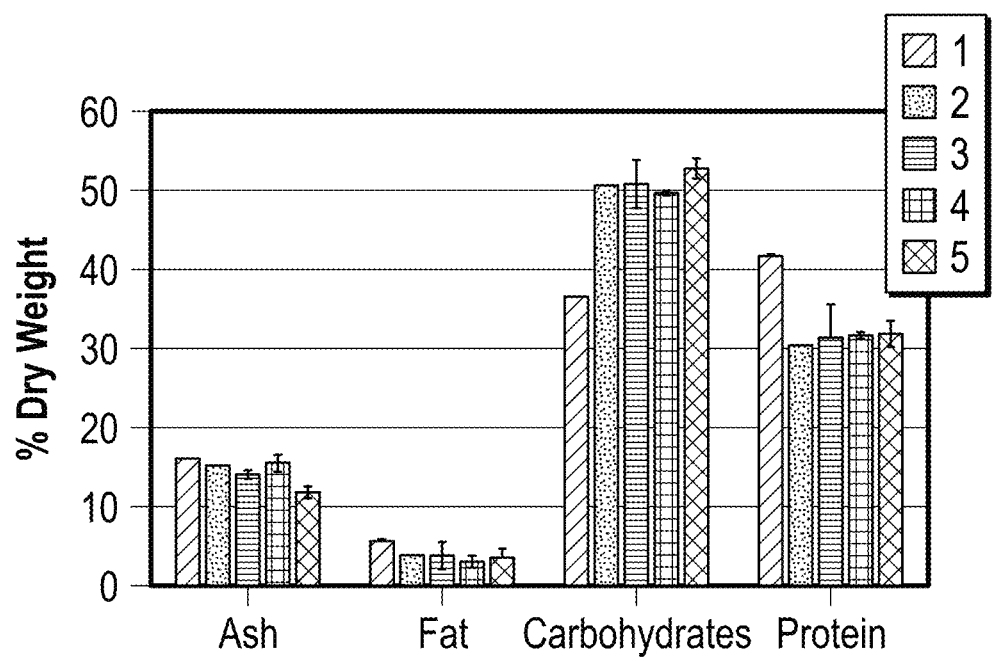
FIG. 13 shows a bar graph of protein, fat, ash, and carbohydrate content for aerial mycelial panels obtained following growth on 5 variations of substrate and conditions produced according to Example 34 [0366]. (Batch 1: maple flake substrate mixed with defatted soy flour; Batches 2 and 5: maple flour substrate, poppy seed, maltodextrin and calcium sulfate; Batches 3 and 4 oak pellet substrate with soybean hull pellets.)

Results. The mean protein content ranged from 30.38% to 41.67% (w/w); the mean fat content ranged from 3.10% to 5.74% (w/w); the mean ash content ranged from 11.76% to 16.04% (w/w); and the mean carbohydrate content ranged from 36.48% to 52.79% (w/w); wherein each percentage is reported on a dry weight basis, and wherein each mean value is an average obtained for the two representative panels from each of Batches 1, 3, 4 and 5, or a single value for the Batch 2 panel (FIG. 13). The mean dietary fiber content ranged from 17.5% (w/w) to 31.9% (w/w); wherein each percentage is reported on a dry weight basis, and wherein each mean value is an average obtained for the two representative panels from each of Batches 1, 4 and 5, or a single value for each of Batches 2 and 3. The potassium content ranged from 4883 to 6044 mg potassium per 100 g of dry aerial mycelium.

Example 35

Heavy metals. Heavy metal content of aerial mycelia was determined using reference methods from the Journal of AOAC Int'l 94(4): 1240-1252, and AOAC 993.1; the entire content of which is hereby incorporated by reference in its entirety. Briefly, samples of aerial mycelia are digested with nitric acid in an open- or closed-vessel microwave digestion system. Analysis is performed using an Inductively Coupled Plasma with Mass Spectrometric detection. The digested samples are compared to standards of known concentration.

Panels prepared according to Example 34 were analyzed as described above and showed less than 100 ppb lead, less than 50 ppb arsenic, less than 200 ppb cadmium and less than 500 ppb mercury.

Example 36

Five aerial mycelial panels were obtained as follows. Growth media was prepared by hand mixing maple flour substrate with an approximate particle size of 0.5 mm (800 g) with poppy seed (90 g), maltodextrin (14 g), and water to about 65% moisture content (w/w) in polypropylene bags. The resulting growth media was pretreated by sterilization at 121° C. at 15 psi for 60 minutes, cooled to room temperature, then inoculated with *Pleurotus ostreatus* white millet feed grain spawn under aseptic conditions.

The resulting growth media (i.e., growth matrix) was placed in an uncovered Pyrex food dish with a volume of 59 cubic inches to a density of 32 pcf and incubated for a time period of 7 days in a growth chamber having an atmosphere maintained at >99% relative humidity via evaporative moisture, and at a $CO_2$ setpoint of either 5% (v/v) $CO_2$ (three (3) control panels) or 0.1% (v/v) $CO_2$ (two (2) test panels), throughout the incubation time period. More particularly, for each control panel, growth chamber atmospheric content was maintained at the 5% (v/v) $CO_2$ setpoint via $CO_2$ and fresh air injection; as such, $O_2$ and other atmospheric components were maintained indirectly and fluctuated as a function of fungal respiration. For the first test panel, $CO_2$ and fresh air injection and increased ventilation were employed to maintain the target 0.1% (v/v) $CO_2$ content; the observed $CO_2$ content was less than 0.2% (v/v) (mean 0.04% (v/v) (400 ppm)) over the course of the incubation period. For the second test panel, progressive metabolic accumulation was allowed to occur during growth, and the $CO_2$ content reached a maximum of 3% (v/v) (mean 2% (v/v)) over the course of the incubation period.

Throughout the incubation period, the temperature was maintained at 75° F. The incubation was performed entirely in the dark. The growth chamber was equipped with a fan, which provided a flow of air (the air containing the same components as the growth chamber atmosphere described above) directed substantially parallel to the surface of the growth matrix at a rate within a range of about 70 to 100 linear feet per minute throughout the incubation period. The growth chamber was further equipped with a commercial ultrasonic mister supplied with reverse osmosis filtered water having a conductivity of between 20 and 40 microsiemens/cm. The ultrasonic mister was placed beneath an acrylic box with a ¾" opening from which, when the mister was in operation, mist was emitted. The ultrasonic mister was operated at a 45% duty cycle over a 360 second cycle period. The mist was circulated within the growth chamber via the directed airflow resulting in mist deposition onto the surface of the growth matrix and the resulting extra-particle mycelial growth at a mist deposition rate of 0.59 microliters/$cm^2$/hour, and a mean mist deposition rate of 0.26 microliters/$cm^2$/hour throughout the incubation time period.

At the end of the incubation time period, each Pyrex dish with growth matrix and resulting extra-particle aerial mycelial growth was removed from the growth chamber, and the extra-particle aerial mycelial growth was manually extracted from the growth matrix using a hand saw affixed with a scalloped blade. Each panel presented as a contiguous mat of negatively gravitropic, bulbous, floccose to sub-cottony, aerial mycelium with no visible stipe, cap, or spores. Yield, mean thickness (within a range of 13 to 23 mm), dry density (1 to 2 pcf) and morphology was consistent between the three positive controls and the two test panels.

Example 37

Four aerial mycelial panels were obtained as follows. Growth media was prepared by hand mixing maple flour substrate with an approximate particle size of 0.5 mm (800 g) with poppy seed (90 g), maltodextrin (14 g), and water to about 65% moisture content (w/w) in polypropylene bags. The resulting growth media was pretreated by sterilization at 121° C. at 15 psi for 60 minutes, cooled to room temperature, then inoculated with *Pleurotus ostreatus* white millet feed grain spawn under aseptic conditions.

The resulting growth matrix was placed in an uncovered Pyrex food dish with a volume of 59 cubic inches to a density of 32 pcf and incubated for a time period of 7 days in a growth chamber having an atmosphere maintained at >99% relative humidity via evaporative moisture and at a $CO_2$ setpoint of 5% (v/v) $CO_2$, and a temperature maintained at 75° F., throughout the incubation time period. The growth chamber was equipped with a fan, which provided a flow of air (the air containing the same components as the growth chamber atmosphere described above) directed substantially parallel to the surface of the growth matrix at a rate within a range of about 70 to 100 linear feet per minute throughout the incubation period. The growth chamber was further equipped with a commercial ultrasonic mister supplied with reverse osmosis filtered water having a conductivity of between 20 and 40 microsiemens/cm. The ultrasonic mister was placed beneath an acrylic box with a ¾" opening from which, when the mister was in operation, mist was emitted. The ultrasonic mister was operated at a 45% duty cycle over a 360 second cycle period. The mist was circulated within the growth chamber via the directed airflow resulting in mist deposition onto the surface of the growth matrix and the resulting extra-particle mycelial growth at a mist deposition rate of 0.59 microliters/$cm^2$/hour, and a mean mist deposition rate of 0.26 microliters/$cm^2$/hour throughout the incubation time period.

The growth chamber was further equipped with white LED strip lights. For three (3) control panels, the incubation was performed in the dark throughout the incubation time period; for one (1) test panel, the incubation was performed with white light exposure via the LED strip light throughout the incubation time period.

At the end of the incubation time period, each Pyrex dish with growth matrix and resulting extra-particle aerial mycelial growth was removed from the growth chamber, and the extra-particle aerial mycelial growth was manually extracted from the growth matrix using a hand saw affixed with a scalloped blade. Each panel presented as a contiguous mat of negatively gravitropic, bulbous, floccose to sub-cottony, aerial mycelium. Neither the control aerial mycelial panels (grown in the dark) nor the test aerial mycelial panel (grown with exposure to white light, which includes light in the red, blue, and green spectral ranges) showed any visible stipe, cap, or spores. Thus, while exposing fungi to white light (and especially blue light) has been associated with the induction of fruiting and the enhancement of production efficiency of oyster mushrooms (Roshita & Goh, AIP Conference Proceedings 2030, 020110 (2018)), no fruiting bodies were observed on the test aerial mycelial panel. Yield, mean thickness (within a range of 12.5 to 23 mm), dry density (1 to 2 pcf) and morphology was consistent between the three positive controls and the one test panel.

Example 38

Four aerial mycelia and one appressed mycelium were obtained as described follows. Growth media was prepared by hand mixing maple flour substrate with an approximate particle size of 0.5 mm (800 g) with poppy seed (90 g), maltodextrin (14 g), and water to about 65% moisture content (w/w) in polypropylene bags. The resulting growth media was pretreated by sterilization at 121° C. at 15 psi for 60 minutes, cooled to room temperature, then inoculated with *Pleurotus ostreatus* white millet feed grain spawn under aseptic conditions.

The resulting growth matrix was placed in an uncovered Pyrex food dish with a volume of 59 cubic inches to a density of 32 pcf and incubated for a time period of 7 days in a growth chamber having an atmosphere maintained at >99% relative humidity via evaporative moisture and at a $CO_2$ setpoint of 5% (v/v) $CO_2$, and a temperature maintained at 75° F., throughout the incubation time period. The incubation was performed in the dark throughout the incubation time period. The growth chamber was equipped with a fan, which provided a flow of air (the air containing the same components as the growth chamber atmosphere described above) directed substantially parallel to the surface of the growth matrix at a rate within a range of about 70 to 100 linear feet per minute throughout the incubation period.

The growth chamber was further equipped with a commercial ultrasonic mister supplied with reverse osmosis filtered water having a conductivity of between 20 and 40 microsiemens/cm. The ultrasonic mister was placed beneath an acrylic box with a ¾" opening from which, when the mister was in operation, mist was emitted. For three (3) control samples, the mister was operated at a 45% duty cycle over a 360 second cycle period throughout the entire incubation time period. For a first test sample, the mister was not operated (0% duty cycle) during days 1 to 3 of the incubation time period and was subsequently operated at a 45% duty cycle over a 360 second cycle period throughout the remainder of the incubation time period. For a second test sample, the mister was not operated (0% duty cycle) at any time during the incubation time period. When in operation, the ultrasonic mister was used to circulate mist within the growth chamber via the directed airflow resulting in mist deposition onto the surface of the growth matrix and the resulting extra-particle mycelial growth at a mist deposition rate of 0.59 microliters/$cm^2$/hour, and a mean mist deposition rate of 0.26 microliters/$cm^2$/hour.

At the end of the incubation time period, each Pyrex dish with growth matrix and resulting mycelial growth was removed from the growth chamber, and the mycelial growth was manually extracted from the growth matrix using a hand saw affixed with a scalloped blade. Each control sample (obtained with mist deposition throughout the incubation time period) and the first test sample (obtained with mist drop-out during days 1 to 3 only) presented as a contiguous mat of negatively gravitropic, bulbous, floccose to sub-cottony, aerial mycelium. Yield, mean thickness (within a range of 13 to 23 mm), dry density (1 to 2 pcf) and morphology was consistent between the three positive controls and the first test sample. In contrast, the second test sample (obtained without mist deposition) presented as an appressed mycelium having a mean thickness of 2.5 mm.

For the positive controls, a laser rangefinder was used to measure vertical expansion kinetics of mycelia over the course of the incubation time period. Overall, the kinetic characteristics captured were exceptionally consistent between replicate growth cycles, including a flat region representing the primary myceliation phase, and a linear vertical region representing a vertical expansion phase. Calculated velocities were also highly consistent between cycles with differences in time of inflection and area under the curve of the linear region fitting rationally with yield. The primary myceliation phase included days 1 to 3 of the incubation time period. Thus, misting throughout the vertical expansion phase was sufficient to produce aerial mycelium having substantially similar characteristics to aerial mycelia obtained by depositing mist throughout the entire incubation period.

Example 39

A batch of 6 aerial mycelial panels was prepared as follows. To prepare each panel in the batch, growth media was prepared by machine mixing in a sterile vessel oak pellet substrate (680 g; approximate particle size 2.0 to 4.0 mm) with soybean hull pellets (680 g). The mixture was hydrated to a final moisture content of 60 to 65% (w/w), sterilized at 265° F. at 20 psi for 30 minutes, and cooled. The resulting growth media was then inoculated with fungal inoculum containing *Pleurotus ostreatus* spawn and white millet feed grain.

The resulting growth matrix was placed in an uncovered Cambro food pan with a volume of 560 cubic inches and incubated for a time period of 13 days in a growth chamber having a growth atmosphere of 5% (v/v) $CO_2$ and 99.9% relative humidity. Throughout the incubation period, the temperature was maintained at 70° F. The incubation was performed entirely in the dark. The growth chamber was equipped with a fan, which provided a flow of air (the air containing the same components as the growth chamber atmosphere described above) directed substantially parallel to the surface of the growth matrix at a rate within a range of about 15 to 40 linear feet per minute throughout the incubation period. The growth chamber was further equipped with an AKIMist® Dry Fog Humidifier, which delivers a mean droplet diameter of 7 microns, and which was operated at 14.5% duty cycle over a 60 second cycle period. Mist was deposited onto the surface of the growth matrix and the resulting extra-particle mycelial growth at mean mist deposition rate within a range of about 0.3 to about 0.35 microliters/$cm^2$/hour throughout the incubation time period.

At the end of the incubation time period, the food pan containing the growth matrix and the resulting extra-particle aerial mycelial growth was removed from the growth chamber, and the extra-particle aerial mycelial growth was mechanically extracted from the growth matrix as a single panel of aerial mycelium.

The six panels of aerial mycelium prepared as described above, identified as panels A, D, G, J, P and S, were weighed post-extraction and analyzed for physical properties. The six panels of aerial mycelium had native masses within a range of 706 to 810 g (mean 743 g), native volumes within a range of 0.31 to 0.34 cubic feet (mean 0.32 cubic feet), native moisture contents of about −90% (w/w), and native densities within a range of 4.7 pcf to 5.6 pcf (mean 5.1 pcf).

The aerial mycelial panels were then dried at 110° F. to a final moisture content of less than 10% (w/w). The dry densities were within the range of 0.47 pcf to 0.56 pcf (mean 0.51 pcf; n=6), as calculated based on the mass of the dried mycelium over the measured volume of the mycelium prior to drying, and within the range of 0.93 pcf to 1.09 pcf (mean 1.01 pcf; n=6), as calculated based on the mass of the dried mycelium over the measured volume of the mycelium after drying. Dried mycelia exhibited about 50% contraction. The skeletal density of the dried mycelium as determined via helium pycnometry was within the range of 11.7 to 23.2 pcf (mean 17.9 pcf; n=3). The percent volume fraction and median pore diameter of the dried mycelium as determined via liquid extrusion porosimetry was within the range of 62.2% to 78.2% (n=3) and 24.5 micron to 31.2 micron (n=3), respectively.

The thickness of each panel is reported in Table 1, including the thickness of the first and third quartiles and the mean, median and maximum thickness over the entire volume of each panel.

TABLE 1

Mean and median thickness of each aerial mycelial panel.

| Panel thickness | Panel A | Panel D | Panel G | Panel J | Panel P | Panel S |
|---|---|---|---|---|---|---|
| First quartile (mm) | 53.78 | 51.76 | 53.75 | 56.27 | 48.77 | 52.12 |
| Mean (mm) | 60.00 | 58.94 | 60.01 | 61.37 | 58.73 | 59.96 |
| Median (mm) | 65.97 | 65.33 | 65.99 | 65.60 | 66.73 | 67.80 |
| Third quartile (mm) | 69.31 | 69.09 | 69.33 | 70.03 | 70.36 | 70.55 |
| Maximum (mm) | 77.15 | 77.89 | 77.17 | 77.12 | 82.65 | 77.93 |

Thus, each panel in the batch had a thickness of at least 48 mm over 75% of the panel volume, a thickness of at least 65 mm over 50% of the panel volume, a thickness of at least 69 mm over 25% of the panel volume, a maximum thickness of at least 77 mm, and a mean thickness of at least 58 mm. Moreover, 100% of the panels in the batch met these same criteria.

Twelve (12) aerial mycelial specimens were cut from each of panels A, G, and J, with six specimens cut from the edge of each panel (three of insufficient quantity for further analysis), and six specimens cut from the center of each panel (about 5 inches from the panel edge). The resulting 33 specimens were split into two groups of 15 and 18 specimens each.

Compressive modulus with compression to 10% strain. The first group of 15 specimens was analyzed using method ASTM C165-07, essentially as described in Example 32. Briefly, eight specimens were analyzed by applying compressive force (load) in the direction parallel to the direction of mycelial growth; these specimens showed a mean compressive modulus at 10% strain of 1.48±0.77 psi, and a compressive stress at 10% strain of 0.15±0.06 psi. Seven specimens were analyzed by applying compressive force (load) in the direction perpendicular to the direction of mycelial growth; these specimens showed a mean compressive modulus at 10% strain of 0.33±0.17 psi and a compressive stress at 10% strain of 0.05±0.02 psi. When taking all specimens (center and edge-cut) into consideration, the results of compressive testing in the parallel and perpendicular directions showed a mean compressive modulus at 10% strain of 0.95±0.82 psi and a compressive stress at 10% strain of 0.11±0.07 psi.

When the edge-cut specimens were analyzed by applying compressive force (load) in the direction parallel to the direction of mycelial growth, these specimens showed a mean compressive modulus at 10% strain of 0.86±0.20 psi and a compressive stress at 10% strain of 0.10±0.02 psi. When the edge-cut specimens were analyzed by applying compressive force (load) in the direction perpendicular to the direction of mycelial growth, these specimens showed a mean compressive modulus at 10% strain of 0.30±0.03 psi and a compressive stress at 10% strain of 00.049±0.004 psi.

The results for center-cut specimens are shown in Tables 2 and 3 for parallel and perpendicular compression, respectively.

TABLE 2

Compressive testing to 10% strain with compression parallel to the direction of growth for center-cut specimens.

| Panel-specimen number-cut | Compressive modulus at 10% strain, PSI | Compressive stress at 10% strain, PSI |
|---|---|---|
| A-5-Center | 2.04 | 0.20 |
| G-4-Center | 1.16 | 0.12 |

TABLE 2-continued

Compressive testing to 10% strain with compression parallel to the direction of growth for center-cut specimens.

| Panel-specimen number-cut | Compressive modulus at 10% strain, PSI | Compressive stress at 10% strain, PSI |
|---|---|---|
| G-6-Center | 1.43 | 0.14 |
| J-1-Center | 3.08 | 0.27 |
| J-3-Center | 1.56 | 0.16 |
| mean | 1.85 | 0.18 |
| standard deviation | 0.76 | 0.06 |

TABLE 3

Compressive testing to 10% strain with compression perpendicular to the direction of growth for center-cut specimens.

| Panel-specimen number-cut | Compressive modulus at 10% strain, PSI | Compressive stress at 10% strain, PSI |
|---|---|---|
| A-4-Center | 0.69 | 0.09 |
| A-6-Center | 0.21 | 0.04 |
| G-5-Center | 0.17 | 0.04 |
| J-2-Center | 0.34 | 0.06 |
| mean | 0.35 | 0.06 |
| standard deviation | 0.23 | 0.02 |

For center-cut specimens compressed to 10% strain, the mean compressive modulus upon compression in the direction parallel to the direction of mycelial growth was over 5-fold greater than the mean compressive modulus upon compression in the direction perpendicular to mycelial growth; and the mean compressive stress upon compression in the direction parallel to the direction of mycelial growth was 3-fold greater than the mean compressive stress upon compression in the dimension perpendicular to mycelial growth.

Compression to 80% strain. The second set of 18 specimens was analyzed by a modified method, as follows. A rectangular-prism section was measured in all three directions (width, length, height) and placed within a rigid high-density polyethylene (HDPE) lower platen on an Instron 3345 machine (with 1 kN load cell capacity). The upper platen was affixed to the screw attenuated actuator having a dual clevis joint to enable self-alignment within the lower platen. The specimen was preloaded with 0.5 lbF (pounds-force) which initiated the test. The specimen was then compressed to 80% strain, measured by extension, and the data over the course of the compression was plotted to provide a relationship between stress and strain (extension) and load and strain (extension). Compressive stress to about 65% strain were further extrapolated from the data.

For all specimens (cut from edge and center of panels), the compressive stress at 65% strain, upon compression in the direction perpendicular to mycelial growth, was 0.12 psi±0.08 psi. For edge specimens, the compressive stress at 65% strain, upon compression in the direction perpendicular to mycelial growth, was 0.14 psi±0.10 psi; for center specimens, the compressive stress at 65% strain, in the direction perpendicular to mycelial growth, was 0.10±0.04 psi.

Compressive stress at 80% strain for edge and center-cut samples tested by compression in the direction parallel and perpendicular to mycelial growth showed the following results: panel A: mean 7.7 psi±15 psi; panel G: mean 1.7 psi±1.8 psi; panel J: mean 3.1 psi±3.4 psi.

Example 40

Four (4) batches of growth substrate were prepared by machine mixing in a ratio of 1:1 w/w in a sterile vessel oak pellet substrate with soybean hull pellets. The mixture was hydrated to a final moisture content of 60 to 65% (w/w), sterilized at 265° F. at 20 psi for 30 minutes, and cooled. The resulting growth media was then inoculated with fungal inoculum containing *Pleurotus ostreatus* white millet feed grain spawn to provide four sets of growth matrix. Three (3) sets of growth matrix were stored in perforated bags at ambient room temperature and relative humidity for 4 days to allow for precolonization of the substrate, and then stored in 4° C. cold storage for 0, 3 or 7 days; the resulting substrate colonized with fungal mycelium was subsequently fragmented into discrete particles. The fourth set of growth matrix did not undergo precolonization.

The four sets of growth matrix were each distributed into uncovered Cambro food pans (n=5 per set), each pan having a volume of 560 cubic inches (11.5 in wide×19.5 in long×2.5 in deep), and incubated for a time period of 13 days in a growth chamber. The growth chamber atmosphere, which was maintained at 99% relative humidity though steam injection, allowed for passive $CO_2$ accumulation with fungal respiration (without $CO_2$ injection) over the course of the incubation time period, during which the $CO_2$ content did not exceed 1.64% (v/v). Throughout the incubation period, the temperature was maintained at 70° F. The incubation was performed entirely in the dark. The growth chamber was equipped with an air handler, which provided a flow of air directed substantially parallel to the surface of the growth matrix at a rate within a range of about 15 to 30 linear feet per minute throughout the incubation period. The growth chamber was further equipped with an AKIMist® Dry Fog Humidifier supplied with filtered municipal tap water, with introduction of mist commencing on day 3 of the incubation time period and continuing through the remainder of the incubation time period, throughout which mist was deposited onto the surface of the growth matrix and the resulting extra-particle mycelial growth.

At the end of the incubation time period, each food pan containing the growth matrix and the resulting extra-particle aerial mycelial growth was removed from the growth chamber, and the extra-particle aerial mycelial growth was mechanically extracted from each growth matrix as a single panel of aerial mycelium.

Across the first set of 5 aerial mycelial panels obtained from growth matrix that underwent precolonization and zero days of refrigeration, the mean thickness was 77.5 mm, the mean moisture content was 90.8%, the mean native density was 2.8 pcf, the mean dry density was 0.25 pcf, and the mean native mass was 681 g.

Across the second set of 5 aerial mycelial panels obtained from growth matrix that underwent precolonization and 3 days of refrigeration, the mean thickness was 71 mm, the mean moisture content was 87.6%, the mean native density was 3.2 pcf, the mean dry density was 0.39 pcf, and the mean native mass was 663 g.

Across the third set of 5 aerial mycelial panels obtained from growth matrix that underwent precolonization and 7 days of refrigeration, the mean thickness was 77 mm, the mean moisture content was 90.1%, the mean native density was 2.9 pcf, the mean dry density was 0.28 pcf, and the mean native mass was 681 g.

Across the fourth set of 5 aerial mycelial panels obtained from growth matrix that did not undergo precolonization or refrigeration, the mean thickness was 80 mm, the mean moisture content was 87.4%, the mean native density was 3.2 pcf, the mean dry density was 0.41 pcf, and the mean native mass was 818 g.

The compressive properties of native aerial mycelium obtained without precolonization were assessed using ASTM C165-07. Specimens were cut from the center of three freshly extracted panels (6 samples per panel). A rectangular-prism section was measured in all three directions (width, length, height) and placed on a set of compression platens on the Instron 3345 machine (with 1 kN load cell capacity). The part was then compressed at 0.1 inch/minute and analyzed at 10% strain, and the data over the course of the compression showed a linear relationship between stress and strain. The slope of this line (the compressive modulus) was outputted and recorded. Six of the specimens were analyzed by applying compressive force (load) in the direction parallel to the direction of mycelial growth; these specimens showed a mean compressive modulus of 1.47±0.32 psi and a mean compressive stress at 10% strain of 0.11±0.02 psi. Six other specimens were analyzed by applying compressive force (load) in the direction perpendicular to the direction of mycelial growth; these specimens showed a mean compressive modulus of 0.14±0.05 psi and a mean compressive stress at 10% strain of 0.02±0.004 psi. The mean compressive modulus upon compression in the direction parallel to the direction of mycelial growth was 10-fold greater than the mean compressive modulus upon compression in the dimension perpendicular to mycelial growth. The mean compressive stress upon compression in the direction parallel to the direction of mycelial growth was 5.5-fold greater than the mean compressive stress upon compression in the dimension perpendicular to mycelial growth.

Example 41

Aerial mycelia were obtained essentially as described in Example 6, except that the airflow rate was within a range of 150 to 250 linear feet per minute. After removal from the growth matrix, the aerial mycelia were oven dried at 100° F. for 24 hours to a final moisture content of less than 10% (w/w), and then acclimated for 24 hours to room conditions of relative humidity and temperature. The resulting materials were then prepared as test samples for tensile strength testing.

ASTM D1623 was used to determine the ultimate tensile strength of aerial mycelia in the dimension substantially parallel to the direction of aerial mycelial growth. Test samples were prepared by cutting specimens having dimensions of 2-inch×2-inch, with a thickness of no less than 1-inch. The top and bottom faces of the specimens were cut on a deli slicer to square the surfaces. Ultimate tensile strength was measured in the dimension substantially parallel to the direction of aerial mycelial growth using an Instron 4411 or 3345 instrument with a 5 kN load cell and a crosshead extension rate of 0.1 inches per minute. The ultimate tensile strength for all samples fell within a range of 13 psi to 22 psi.

Example 42

1. Mycelial tissue is cut parallel to the growth grain into 0.25 to 1-inch strips.
2. Cut strips are compressed to 15-75% original height, antiparallel to the growth grain.
3. Compressed strips are then needle-punched, to disrupt tissue network.

4. Tenderized strips are then boiled for 5 minutes in a salt brine to impart flavor and modify texture.
5. Boiled strips are then baked or pan-fried in oil at 275 to 400° F. until crispy.

Example 43

1. Mycelial tissue is compressed to disrupt fiber alignment.
2. 0.75 to 1.25-inch strips are then cut from the compressed tissue, parallel to the growth grain.
3. Compressed strips are then needle-punched to disrupt tissue network
4. Tenderized strips are then boiled for 5 minutes in a salt brine to impart flavor and modify texture.
5. Boiled strips are then pan-fried in oil at 275 to 400° F. until crispy.

Example 44

1. Mycelial tissue is cut parallel to the growth grain into 0.25 to 1-inch strips.
2. Cut strips are compressed to 15-75% original height, antiparallel to the growth grain.
3. Compressed strips are then needle-injected, to disrupt tissue network, and the tissue matrix is injected with brine, fats, flavors, proteins, or the like.
4. Tenderized and injected strips are then cooked at 275 to 400° F. until crispy.

Example 45

1. Mycelial tissue is cut parallel to the growth grain into 0.25 to 1-inch strips.
2. Cut strips are compressed to 15-75% original height, antiparallel to the growth grain.
3. Compressed strips are then stacked and needle-punched, to disrupt tissue network, and entangle multiple strips into one contiguous unit of material.
4. Tenderized strips are then boiled for 5 minutes in a salt brine to impart flavor and modify texture.
5. Boiled strips are then cooked at 275 to 400° F. until crispy.

Example 46

1. Mycelial tissue is cut parallel to the growth grain into 0.25 to 1-inch strips.
2. Cut strips are compressed to 15-75% original height, antiparallel to the growth grain.
3. Compressed strips are then stacked and needle-punched, where the needle punching, density, intensity, and shape, is varied across the matrix to disrupt tissue network, and create sections that cook at different rates than others, modifying finished texture.
4. Tenderized strips are then boiled for 5 minutes in a salt brine to impart flavor and modify texture.
5. Boiled strips are then cooked at 275 to 400° F. until crispy.

Example 47

A. Five (5) aerial mycelia were prepared as follows.

Growth media was prepared by hand mixing oak pellet substrate with soybean hull pellets and water to about 65% moisture content (w/w) in polypropylene bags. The resulting growth media was pretreated by sterilization at 121° C. at 15 psi for 60 minutes, cooled to room temperature, then inoculated with *Pleurotus ostreatus* white millet feed grain spawn (9.9 g) under aseptic conditions.

The resulting growth matrix was placed in an uncovered Pyrex food dish with a volume of 15.5 cubic inches to a dry density of 11 pcf per dish and incubated for a time period of 7 days in a growth chamber having an atmosphere maintained at 5% (v/v) $CO_2$ and >99% relative humidity via evaporative moisture, throughout the incubation time period. Growth chamber atmospheric content was maintained based on $CO_2$ and fresh air injection to maintain the given $CO_2$ setpoint, as such $O_2$ and other atmospheric components were maintained indirectly and fluctuated as a function of fungal respiration. Throughout the incubation period, the temperature was maintained at 75° F. The incubation was performed entirely in the dark. The growth chamber was equipped with a fan, which provided a flow of air (the air containing the same components as the growth chamber atmosphere described above) directed substantially parallel to the surface of the growth matrix at a rate within a range of about 70 to 100 linear feet per minute throughout the incubation period. The growth chamber was further equipped with a commercial ultrasonic mister supplied with reverse osmosis water having a conductivity of between 20 and 40 microsiemens/cm. The ultrasonic mister was placed beneath an acrylic box with a ¾" opening from which, when the mister was in operation, mist was emitted thus reducing the mist output from the ultrasonic mister into the growth environment by >90% compared to mist emission without the acrylic box. Throughout the incubation time period, the ultrasonic mister was operated at a 25% or 45% duty cycle over a 360 second cycle period. The mist was circulated within the growth chamber via the directed airflow resulting in mist deposition onto the surface of the growth matrix and the resulting extra-particle mycelial growth. Mist deposition rates were determined according to Example 8, with reported rates based on corresponding abiotic runs. Across the five panels, the mist deposition ranged from 0.14 to 0.56 microliter/cm$^2$/hour, and the mean mist deposition rate ranged from 0.03 to 0.25 microliter/cm$^2$/hour.

At the end of the incubation time period, each Pyrex dish with growth matrix and resulting extra-particle aerial mycelial growth was removed from the growth chamber, and the extra-particle aerial mycelial growth was manually extracted from each growth matrix using a hand saw affixed with a scalloped blade as a contiguous mat of negatively gravitropic aerial mycelium having a slightly bulbous morphology, comprising a few large and diffuse bulbous features forming a substantially homogeneous mat. Across the five panels, the native moisture content ranged from 86.8% to 90.3% (w/w); the mean thickness ranged from 17.2 to 19.1 mm; the maximum thickness ranged from 45.1 to 47.5 mm; the native density ranged from 1.15 to 1.53 pcf, with four of the five panels having a native density within a range of 1.43 to 1.53 pcf); the density based on bone-dry mass over wet (native) volume ranged from 0.14 to 0.18 pcf; and the volume of each panel was about 0.03 cubic feet. The biological efficiency as calculated based on the dry mass of the aerial tissue and the dry mass of the growth matrix ranged from 4.03% to 4.6% (w/w).

B. A set of three (3) aerial mycelial test panels was prepared as described in Example 47A, with the following exceptions. Across the three test panels, the mist deposition ranged from 0.24 to 0.52 microliter/cm$^2$/hour, and the mean mist deposition rate ranged from 0.14 to 0.27 microliter/cm$^2$/hour. The growth chamber atmosphere had an actively controlled $CO_2$ content setpoint of 0.1% over the course of the incubation time period. A set of three control panels was prepared under the foregoing conditions, except that the growth chamber atmosphere had a 5% $CO_2$ content; this allowed for a direct comparison of each of the three test panels that were prepared at 0.1% $CO_2$ content.

Across the three test panels, the native moisture content ranged from 84.7% to 89.1% (w/w); the mean thickness ranged from 16 to 20.9 mm; the maximum thickness ranged from 37.6 to 43 mm; the native density ranged from 1.42 to 2.14 pcf; the density based on bone-dry mass over wet (native) volume ranged from 0.19 to 0.23 pcf; and the volume of each panel was from 0.019 to 0.028 cubic feet. The biological efficiency as calculated based on the dry mass of the aerial tissue and the dry mass of the growth matrix ranged from 3.73% to 5.63% (w/w). These test panels (grown at 0.1% $CO_2$ content) showed substantially the same overall growth quality as the control panels (grown at 5% $CO_2$ content), based on native moisture content, mean thickness, maximum thickness, native and bone-dry density, volume, morphology, and biological efficiency.

The overall growth quality of the extracted mycelial test and control panels, based on native moisture content, mean thickness, maximum thickness, native and bone-dry density, volume, morphology, and biological efficiency, were most similar to the extracted mycelial panels of Example 47A, compared to the extracted mycelial panels of Examples 47 to 52.

C. Two (2) aerial mycelia were prepared as described in Example 47A, with the following exceptions. For the two panels, the mist deposition rates were 0.39 or 0.5 microliter/$cm^2$/hour, and the mean mist deposition rate was 0.27 microliter/$cm^2$/hour for each panel. The growth chamber atmosphere allowed for passive $CO_2$ accumulation with fungal respiration (without $CO_2$ injection) over the course of the incubation time period, during which the $CO_2$ content did not exceed 1.5% (v/v), with a mean $CO_2$ content of 0.6% (v/v), and misting commenced on day 3 of the incubation time period. The extracted mycelia showed substantially the same overall growth quality, based on native moisture content, mean thickness, maximum thickness, native and bone-dry density, volume, morphology, and biological efficiency, as the extracted mycelia described in Example 47A.

Example 48

A. Two (2) aerial mycelia were prepared as described in Example 47A, except that the ultrasonic mister was operated at a 5% duty for a first panel and a 10% duty cycle for a second panel, each over the 360 second cycle period. The mist deposition rate was below the limit of detection of Example 8.

The extra-particle aerial mycelial growth extracted from each growth matrix each presented as a contiguous mat of negatively gravitropic aerial mycelium having a slightly bulbous morphology comprising a few large and diffuse bulbous features forming a substantially homogeneous mat, and further characterized as having a slight rippled morphology that occurs perpendicular to the direction of growth. For the two extracted panels, the moisture content ranged from 82.6% to 84.8% (w/w); the mean thickness ranged from 17.6 to 19.9 mm; the maximum thickness ranged from 39.4 to 42.3 mm; the native density ranged from 1.27 to 1.28 pcf; the density based on bone-dry mass over wet (native) volume ranged from 0.20 to 0.22 pcf; and the volume of each panel was about 0.02 cubic feet. The biological efficiency as calculated based on the dry mass of the aerial tissue and the dry mass of the growth matrix ranged from 3.65% to 4.06% (w/w).

B. An aerial mycelium was prepared as described in Example 48A, with the following exceptions. The mister duty cycle was 15%, and the growth chamber atmosphere allowed for passive $CO_2$ accumulation with fungal respiration (without $CO_2$ injection) over the course of the incubation time period, during which the $CO_2$ content did not exceed 1.5% (v/v), with a mean $CO_2$ content of 0.43% (v/v), and misting commenced on day 3 of the incubation time period. The extracted mycelia showed substantially the same overall growth quality, based on native moisture content, mean thickness, maximum thickness, native and bone-dry density, volume, morphology, and biological efficiency, as the extracted mycelia described in Example 48A.

Example 49

An aerial mycelium was prepared as described in Example 47A, except that the ultrasonic mister was operated at a 10% duty cycle over a 360 second cycle period, and three holes were punched in the acrylic box in order to introduce more mist into the growth environment. The mist was circulated within the growth chamber via the directed airflow resulting in mist deposition onto the surface of the growth matrix and the resulting extra-particle mycelial growth at a mist deposition rate of 1.7 microliter/$cm^2$/hour, and a mean mist deposition rate of 0.17 microliter/$cm^2$/hour throughout the incubation time period.

The extra-particle aerial mycelial growth that was extracted from the growth matrix presented as a contiguous mat of negatively gravitropic bulbous to diffusely bulbous aerial mycelium, and while substantially homogenous, it was slightly more bulbous than the mycelia obtained according to Examples 47 and 48. The aerial mycelium had a native moisture content of 88.8% (w/w), a mean thickness of 18.4 mm, a maximum thickness of 37.3 mm, a native density of 1.46 pcf; a density based on bone-dry mass over wet (native) volume of 0.16 pcf; and a volume of 0.02 cubic feet. The biological efficiency as calculated based on the dry mass of the aerial tissue and the dry mass of the growth matrix was 3.11% (w/w).

Example 50

A. Five (5) aerial mycelia were prepared as described in Example 47A, with the following exceptions. The ultrasonic mister was operated at a 25% (1 sample), 45% (1 sample), 75% (2 samples) or 100% (one sample) duty cycle, each over a 360 second cycle period. For the mycelium grown using a 25% duty cycle, three holes were punched in the acrylic box, and for one of the mycelia grown using a 75% duty cycle, two holes were punched in the acrylic box. Across the five samples, the mist deposition rate ranged from 0.65 to 2.38 microliter/$cm^2$/hour, and the mean mist deposition rate ranged from 0.42 to 0.74 microliter/$cm^2$/hour.

The extra-particle aerial mycelial growth extracted from each growth matrix each presented as a contiguous mat of negatively gravitropic and distinctly bulbous, heterogeneous aerial mycelium. Across the five extracted panels, the native moisture content ranged from 89.0% to 92.3% (w/w); the mean thickness ranged from 12.3 to 15.1 mm; the maximum thickness ranged from 37.3 to 40.6 mm; the native density ranged from 1.81 to 2.71 pcf; the density based on bone-dry mass over wet (native) volume ranged from 0.19 to 0.24 pcf;

and the volume ranged from 0.022 to 0.026 cubic feet. The biological efficiency as calculated based on the dry mass of the aerial tissue and the dry mass of the growth matrix ranged from 4.21% to 4.89% (w/w).

B. Two (2) aerial mycelia were prepared as described in Example 50A, with the following exceptions. The growth chamber atmosphere allowed for passive $CO_2$ accumulation with fungal respiration (without $CO_2$ injection) over the course of the incubation time period, during which the $CO_2$ content did not exceed 1.5% (v/v), the mean $CO_2$ content was 0.29% or 0.53% (v/v), and misting commenced on day 3 of the incubation time period. The instantaneous mist deposition rates were 0.76 and 0.53 microliter/cm$^2$/hour, and the mean mist deposition rates were 0.77 and 0.53 microliter/cm$^2$/hour. In each case, the mister duty cycle was 100%.

The extracted mycelia showed substantially the same overall growth quality, based on native moisture content, mean thickness, maximum thickness, native and bone-dry density, volume, morphology, and biological efficiency, as the extracted mycelia described in Example 50A.

Example 51

An aerial mycelium was prepared as described in Example 47A, with the following exceptions. The ultrasonic mister was operated at a 20% duty cycle over a 360 second cycle period, and three holes were punched in the acrylic box in order to introduce more mist into the growth environment. The mist deposition rate was 5.1 microliter/cm$^2$/hour, and the mean mist deposition rate was 1.0 microliter/cm$^2$/hour.

The extra-particle aerial mycelial growth that was extracted from the growth matrix presented as a contiguous mat of negatively gravitropic and distinctly bulbous, heterogeneous aerial mycelium having a native moisture content of 92.2% (w/w), a mean thickness of 8.8 mm, a maximum thickness of 33.8 mm, a native density of 3.02 pcf; a density based on bone-dry mass over wet (native) volume of 0.24 pcf; and a volume of 0.02 cubic feet. The biological efficiency as calculated based on the dry mass of the aerial tissue and the dry mass of the growth matrix was 4.3% (w/w).

Example 52

A. Three (3) aerial mycelia were prepared as described in Example 47A, with the following exceptions. The ultrasonic mister was operated at a 45% (1 sample), 75% (1 sample) or 95% (one sample) duty cycle, each over a 360 second cycle period. For the mycelia grown using the 45% or 75% duty cycle, three holes were punched in the acrylic box, and for the mycelium grown using the 95% duty cycle, two holes were punched in the acrylic box. Across the three samples, the mist deposition rate ranged from 1.74 to 5.04 microliter/cm$^2$/hour, and the mean mist deposition rate ranged from 1.67 to 2.71 microliter/cm$^2$/hour The extra-particle aerial mycelial growth extracted from each growth matrix each presented as a contiguous mat of negatively gravitropic and heavily bulbous, heterogeneous aerial mycelium. Across the five extracted panels, the native moisture content ranged from 92.9% to 94.0% (w/w); the mean thickness ranged from 3.2 to 5.91 mm; the maximum thickness ranged from 28.2 to 29.3 mm; the native density ranged from 4.46 to 5.76 pcf; the density based on bone-dry mass over wet (native) volume ranged from 0.26 to 0.4 pcf; and the volume ranged from 0.01 to 0.02 cubic feet. The biological efficiency as calculated based on the dry mass of the aerial tissue and the dry mass of the growth matrix ranged from 3.15% to 5.88% (w/w).

B. An aerial mycelium was prepared as described in Example 52A, with the following exceptions. The growth chamber atmosphere allowed for passive $CO_2$ accumulation with fungal respiration (without $CO_2$ injection) over the course of the incubation time period, during which the $CO_2$ content did not exceed 1.5% (v/v), with a mean $CO_2$ content of 0.41% (v/v), and misting commenced on day 3 of the incubation time period. The instantaneous mist deposition rate was 2.27 microliter/cm$^2$/hour, and the mean mist deposition rates was 2.04 microliter/cm$^2$/hour. The mister duty cycle was 90%.

The extracted mycelia showed substantially the same overall growth quality, based on native moisture content, mean thickness, maximum thickness, native and bone-dry density, volume, morphology, and biological efficiency, as the extracted mycelia described in Example 52A.

Example 53

An aerial mycelium was prepared as described in Example 47A, with the following exceptions. The ultrasonic mister was operated at a 100% duty cycle over a 360 second cycle period, and three holes were punched in the acrylic box. The mist and mean mist deposition rates were each 5.4 microliter/cm$^2$/hour.

The extra-particle aerial mycelial growth that was extracted from the growth matrix presented as a discontiguous mat of negatively gravitropic, highly bulbous, heterogeneous aerial mycelium, with a higher frequency of smaller bulbous features compared to aerial mycelia generated as described in Examples 47 to 52. The aerial mycelium had a native moisture content of 95.3% (w/w), a mean thickness of 1.5 mm, a maximum thickness of 27.1 mm, a native density of 7.62 pcf; a density based on bone-dry mass over wet (native) volume of 0.36 pcf; and a volume of 0.01 cubic feet. The biological efficiency as calculated based on the dry mass of the aerial tissue and the dry mass of the growth matrix was 2.97% (w/w).

Example 54

A. An aerial mycelium was prepared as described in Example 47A, except that the ultrasonic mister was operated at a 2.5% duty cycle over a 360 second cycle period. The mist deposition rate was below the limit of detection of Example 8. The Pyrex dish with growth matrix and resulting extra-particle aerial mycelial growth was removed from the growth chamber, and the extra-particle aerial mycelial growth was manually extracted from the growth matrix using a hand saw affixed with a scalloped blade as a contiguous mat of negatively gravitropic, homogenous, distinctly non-bulbous aerial mycelium with a shallow rippled morphology occurring perpendicular to the direction of airflow. The aerial mycelium had a native moisture content of 76.4% (w/w), a mean thickness of 11 mm, a maximum thickness of 22.5 mm, a mean native density of 0.72 pcf; a density based on bone-dry mass over wet (native) volume of 0.17 pcf; and a volume of 0.007 cubic feet. The biological efficiency as calculated based on the dry mass of the aerial tissue and the dry mass of the growth matrix was 1.07% (w/w).

B. An aerial mycelium was prepared as described in Example 54A, except that the growth chamber atmosphere allowed for passive $CO_2$ accumulation with fungal respiration (without $CO_2$ injection) over the course of the incubation time period, during which the $CO_2$ content did not exceed 1.5% (v/v), with a mean $CO_2$ content of 0.25% (v/v), and misting commenced on day 3 of the incubation time period. The extracted mycelia showed substantially the same native moisture content, mean thickness, maximum thickness, native and bone-dry density, volume, morphology, and biological efficiency as described in Example 54A.

Example 55

Four (4) batches of growth substrate were prepared by machine mixing in a ratio of 1:1 w/w in a sterile vessel oak pellet substrate with soybean hull pellets. The mixture was hydrated to a final moisture content of 60 to 65% (w/w), sterilized at 265° F. at 20 psi for 30 minutes, and cooled. The resulting growth media was then inoculated with fungal inoculum containing *Pleurotus ostreatus* white millet feed grain spawn to provide four sets of growth matrix. Three (3) sets of growth matrix were stored in perforated bags at ambient room temperature and relative humidity for 4 days to allow for precolonization of the substrate, and then stored in 4° C. cold storage for 0, 3 or 7 days; the resulting substrate colonized with fungal mycelium was subsequently fragmented into discrete particles. The fourth set of growth matrix did not undergo precolonization.

The four sets of growth matrix were each distributed into uncovered Cambro food pans (n=5 per set), each pan having a volume of 560 cubic inches (11.5 in wide×19.5 in long×2.5 in deep), and incubated for a time period of 13 days in a growth chamber. The growth chamber atmosphere, which was maintained at 99% relative humidity though steam injection, allowed for passive $CO_2$ accumulation with fungal respiration (without $CO_2$ injection) over the course of the incubation time period, during which the $CO_2$ content did not exceed 1.64% (v/v). Throughout the incubation period, the temperature was maintained at 70° F. The incubation was performed entirely in the dark. The growth chamber was equipped with an air handler, which provided a flow of air directed substantially parallel to the surface of the growth matrix at a rate within a range of about 15 to 30 linear feet per minute throughout the incubation period. The growth chamber was further equipped with an AKIMist® Dry Fog Humidifier supplied with filtered municipal tap water having a conductivity of 392 microsiemens/cm, which was operated at 11.25% duty cycle over a 60 second cycle period, with introduction of mist commencing on day 3 of the incubation time period and continuing through the remainder of the incubation time period, throughout which mist was deposited onto the surface of the growth matrix and the resulting extra-particle mycelial growth at mean mist deposition rate of about 0.15 microliters/cm$^2$/hour.

At the end of the incubation time period, each food pan containing the growth matrix and the resulting extra-particle aerial mycelial growth was removed from the growth chamber, and the extra-particle aerial mycelial growth was mechanically extracted from each growth matrix as a single panel of aerial mycelium.

Across the first set of 5 aerial mycelial panels obtained from growth matrix that underwent precolonization and zero days of refrigeration, the mean thickness was 77.5 mm, the mean moisture content was 90.8%, the mean native density was 2.8 pcf, the mean dry density was 0.25 pcf, and the mean native mass was 681 g.

Across the second set of 5 aerial mycelial panels obtained from growth matrix that underwent precolonization and 3 days of refrigeration, the mean thickness was 71 mm, the mean moisture content was 87.6%, the mean native density was 3.2 pcf, the mean dry density was 0.39 pcf, and the mean native mass was 663 g.

Across the third set of 5 aerial mycelial panels obtained from growth matrix that underwent precolonization and 7 days of refrigeration, the mean thickness was 77 mm, the mean moisture content was 90.1%, the mean native density was 2.9 pcf, the mean dry density was 0.28 pcf, and the mean native mass was 681 g.

Across the fourth set of 5 aerial mycelial panels obtained from growth matrix that did not undergo precolonization or refrigeration, the mean thickness was 80 mm, the mean moisture content was 87.4%, the mean native density was 3.2 pcf, the mean dry density was 0.41 pcf, and the mean native mass was 818 g.

The compressive properties of native aerial mycelium obtained without precolonization were assessed using ASTM C165-07. Specimens were cut from the center of three freshly extracted panels (6 samples per panel). A rectangular-prism section was measured in all three directions (width, length, height) and placed on a set of compression platens on the Instron 3345 machine (with 1 kN load cell capacity). The part was then compressed at 0.1 inch/minute and analyzed at 10% strain, and the data over the course of the compression showed a linear relationship between stress and strain. The slope of this line (the compressive modulus) was outputted and recorded. Six of the specimens were analyzed by applying compressive force (load) in the direction parallel to the direction of mycelial growth; these specimens showed a mean compressive modulus of 1.47±0.32 psi and a mean compressive stress at 10% strain of 0.11±0.02 psi. Six other specimens were analyzed by applying compressive force (load) in the direction perpendicular to the direction of mycelial growth; these specimens showed a mean compressive modulus of 0.14±0.05 psi and a mean compressive stress at 10% strain of 0.02±0.004 psi. The mean compressive modulus upon compression in the direction parallel to the direction of mycelial growth was 10-fold greater than the mean compressive modulus upon compression in the dimension perpendicular to mycelial growth. The mean compressive stress upon compression in the direction parallel to the direction of mycelial growth was 5.5-fold greater than the mean compressive stress upon compression in the dimension perpendicular to mycelial growth.

Example 56

Aerial mycelia were obtained essentially as described in Example 6, except that the airflow rate was within a range of 150 to 250 linear feet per minute. After removal from the growth matrix, the aerial mycelia were oven dried at 100° F. for 24 hours to a final moisture content of less than 10% (w/w), and then acclimated for 24 hours to room conditions of relative humidity and temperature. The resulting materials were then prepared as test samples for tensile strength testing.

ASTM D1623 was used to determine the ultimate tensile strength of aerial mycelia in the dimension substantially parallel to the direction of aerial mycelial growth. Test samples were prepared by cutting specimens having dimensions of 2-inch×2-inch, with a thickness of no less than 1-inch. The top and bottom faces of the specimens were cut on a deli slicer to square the surfaces. Ultimate tensile strength was measured in the dimension substantially parallel to the direction of aerial mycelial growth using an Instron 4411 or 3345 instrument with a 5 kN load cell and a crosshead extension rate of 0.1 inches per minute. The ultimate tensile strength for all samples fell within a range of 13 psi to 22 psi.

Additional Embodiments

A1. A method of making an aerial mycelium, comprising:
providing a growth matrix comprising a substrate and a fungus;
incubating the growth matrix as a solid-state culture in a growth environment for an incubation time period; and
introducing aqueous mist into the growth environment throughout the incubation time period, or a portion thereof,
wherein the aqueous mist has a mist deposition rate and a mean mist deposition rate, and the mean mist deposition rate is less than or equal to about 10 microliter/cm2/hour; thereby producing extra-particle aerial mycelial growth from the growth matrix;
wherein the growth matrix comprises the substrate and a fungal inoculum, said fungal inoculum comprising said fungus; or
wherein the growth matrix comprises a colonized substrate, said colonized substrate comprising the substrate, wherein said substrate is previously colonized with mycelium of said fungus.

A2. The method of embodiment A1, wherein: the growth environment comprises a growth atmosphere having a relative humidity, an oxygen (O2) content and a carbon dioxide (CO2) content, wherein the CO2 content is at least about 0.02% (v/v) and less than about 8% (v/v); the mist deposition rate is less than or equal to about 150 microliter/cm2/hour; and the mean mist deposition rate is less than or equal to about 5 microliter/cm2/hour, or less than or equal to about 3 microliter/cm2/hour.

A3. The method of embodiment A1 or A2, further comprising removing the extra-particle aerial mycelial growth from the growth matrix, thereby providing an aerial mycelium.

A4. The method of embodiment A1, A2 or A3, wherein:
(a) the carbon dioxide content is within a range of about 0.2% to about 7% (v/v), and the aerial mycelium does not contain a visible fruiting body; or
(b) the carbon dioxide content is within a range of about 0.02% to about 7% (v/v), and
(i) the incubation time period ends no later than when a visible fruiting body forms;
(ii) the incubation time period ends when a visible fruiting body forms; or
(iii) the aerial mycelium does not contain a visible fruiting body.

A5. The method of any one of embodiments A1 to A4, wherein the growth matrix comprises a nutrient source, wherein the nutrient source is the same or different than the substrate.

A6. The method of embodiment A5, wherein the nutrient source is different than the substrate.

A7. The method of any one of embodiments A1 to A6, wherein introducing the aqueous mist into the growth environment comprises depositing the aqueous mist onto the growth matrix, the extra-particle aerial mycelial growth, or both.

A8. The method of any one of embodiments A1 to A7, wherein the mist deposition rate is less than about 100 microliter/cm2/hour, is less than about 75 microliter/cm2/hour, is less than about 50 microliter/cm2/hour, or is less than about 25 microliter/cm2/hour.

A9. The method of embodiment A8, wherein the mist deposition rate is less than about 10 microliter/cm2/hour, is less than about 5 microliter/cm2/hour, is less than about 4 microliter/cm2/hour, is less than about 3 microliter/cm2/hour, is less than about 2 microliter/cm2/hour, or is less than about 1 microliter/cm2/hour.

A10. The method of any one of embodiments A1 to A9, wherein the CO2 content is within a range of about 0.2% (v/v) to about 7% (v/v).

A11. The method of any one of embodiments A1 to A10, wherein the CO2 content is greater than about 2% (v/v).

A12. The method of embodiment A11, wherein the CO2 content is within a range of about 3% (v/v) to about 7% (v/v).

A13. The method of any one of embodiments A1 to A12, wherein the O2 content is within a range of about 14% to about 21% (v/v).

A14. The method of any one of embodiments A1 to A13, wherein the relative humidity is at least about 95%, is at least about 96% or is at least about 97%.

A15. The method of embodiment A14, wherein the relative humidity is at least about 98%, is at least about 99%, or is about 100%.

A16. The method of any one of embodiments A1 to A15, wherein the fungus is a filamentous fungus.

A17. The method of any one of embodiments A1 to A16, wherein the incubation time period is up to about 3 weeks.

A18. The method of embodiment A17, wherein the incubation time period is within a range of about 4 days to about 17 days.

A19. The method of embodiment A17, wherein the incubation time period is within a range of about 7 days to about 16 days, is within a range of about 8 days to about 15 days, is within a range of about 9 days to about 15 days, or is within a range of about 9 days to about 14 days.

A20. The method of embodiment A17, wherein the incubation time period is about 7 days, is about 8 days, is about 9 days, is about 10 days, is about 11 days, is about 12 days, is about 13 days, is about 14 days, is about 15 days or is about 16 days.

A21. The method of any one of embodiments A1 to A20, wherein the growth environment is a dark environment.

A22. The method of any one of embodiments A1 to A21, wherein the growth environment has a temperature within a range of about 55° F. to about 100° F., or within a range of about 60° F. to about 95° F.

A23. The method of embodiment A22, wherein the growth environment temperature is within a range of about 60° F. to about 75° F., is within a range of about 65° F. to about 75° F., or is within a range of about 65° F. to about 70° F.

A24. The method of embodiment A22, wherein the growth environment temperature is within a range of about 80° F. to about 95° F., or is within a range of about 85° F. to about 90° F.

A25. The method of any one of embodiments A21 to A24, wherein the growth environment further comprises an airflow.

A26. The method of any one of embodiments A1 to A25, further comprising directing an airflow through the growth environment.

A27. The method of embodiment A25 or A26, wherein the airflow is a substantially horizontal airflow.

A28. The method of embodiment A27, wherein the substantially horizontal airflow has a velocity of no greater than about 275 linear feet per minute, has a velocity of no greater than about 175 linear feet per minute, or has a velocity of no greater than about 150 linear feet per minute.

A29. The method of embodiment A27, wherein the substantially horizontal airflow has a velocity of no greater than about 125 linear feet per minute, has a velocity of no greater than about 110 linear feet per minute, has a velocity of no greater than about 100 linear feet per minute, or has a velocity of no greater than about 90 linear feet per minute.

A30. The method of any one of embodiments A27 to A29, wherein the substantially horizontal airflow has a velocity of at least about 5, 10, 15, 20, 25, 30, 35, 40, 45 or 50 linear feet per minute.

A31. The method of any one of embodiments A6 to A30, wherein the substrate and the nutrient source each have a particle size, and wherein the substrate particle size and the nutrient particle size have a ratio within a range of about 200:1 to about 1:1, within a range of about 100:1 to about 1:1, within a range of about 50:1 to about 1:1, within a range of about 10:1 to about 1:1, or within a range of about 5:1 to about 1:1.

A32. The method of any one of embodiments A1 to A31, wherein at least a portion of the aerial mycelium has a native thickness of at least about 10 mm.

A33. The method of embodiment A32, wherein at least a portion of the aerial mycelium has a native thickness of at least about 15 mm.

A34. The method of embodiment A32 or A33, wherein the portion is at least about 10% of the aerial mycelium.

A35. The method of embodiment A32 or A33, wherein the portion is at least about 25% of the aerial mycelium.

A36. The method of embodiment A32 or A33, wherein the portion is at least about 50% of the aerial mycelium.

A37. The method of embodiment A32 or A33, wherein the portion is at least about 70% of the aerial mycelium.

A38. The method of any one of embodiments A3 to A37, wherein the aerial mycelium has a mean native density of at least about 1 pound per cubic foot (pcf) and a native moisture content of at least about 80% (w/w).

A39. The method of embodiment A38, wherein the aerial mycelium has a mean native density of at least about 2 pcf.

A40. The method of embodiment A38, wherein the aerial mycelium has a mean native density of no greater than about 70 pcf, no greater than about 60 pcf, no greater than about 50 pcf, no greater than about 40 pcf, no greater than about 30 pcf, no greater than about 20 pcf or no greater than about 15 pcf.

A41. The method of any one of embodiments A1 to A40, wherein the aerial mycelium has an open volume of at least about 50% (v/v), at least about 60% (v/v) or at least about 70% (v/v).

A42. The method of embodiment A41, wherein the mist deposition rate is less than about 2 microliter/cm2/hour, the mean mist deposition rate is less than about 1 microliter/cm2/hour, or both.

A43. The method of embodiment A42, wherein the mean mist deposition rate is within a range of about 0.2 to about 0.8 microliter/cm2/hour.

A44. The method of embodiment A42 or A43, wherein the mist deposition rate is less than about 1 microliter/cm2/hour, the mean mist deposition rate is less than about 0.5 microliter/cm2/hour, or both.

A45. The method of any one of embodiments A1 to A41 and A42 to A44, wherein the mist deposition rate is at least about 0.05 microliter/cm2/hour, and the mean mist deposition rate is at least about 0.02 microliter/cm2/hour.

A46. The method of any one of embodiments A42 to A45, wherein the ratio of the mist deposition rate and the mean mist deposition rate is within a range of about 3:1 to about 1:1.

A47. The method of any one of embodiments A42 to A46, wherein the aerial mycelium has: a mean native density of at least about 1 pcf; a mean native density of no greater than about 45 pcf; and a native moisture content of at least about 75% (w/w), or at least about 80% (w/w).

A48. The method of embodiment A47, wherein the aerial mycelium has a Kramer shear force of greater than about 100 kilogram per gram of aerial mycelium.

A49. The method of embodiment A47, wherein the aerial mycelium has a Kramer shear force of no greater than about 15 kilogram per gram of aerial mycelium, of no greater than about 10 kilogram/gram of aerial mycelium, or within a range of about 2 kilogram per gram to about 10 kilogram per gram of aerial mycelium.

A50. The method of any one of embodiments A42 to A48, wherein the method further comprises drying the aerial mycelium to provide a dry aerial mycelium having a moisture content of no greater than about 10% (v/v); and wherein the dry aerial mycelium has a dry density of less than about 3 pcf, less than about 2 cf or less than about 1 pcf.

A51. The method of any one of embodiments A3 to A51, further comprising terminating the incubation prior to removing the extra-particle aerial mycelial growth from the growth matrix.

A52. The method of any one of embodiments A3 to A51, further comprising terminating the incubation prior to formation of a visible fruiting body.

A53. The method of any one of embodiments A1 to A52, wherein the method further comprises terminating the incubation during a decline in aerial mycelial growth rate.

A54. The method of any one of embodiments A1 to A53, wherein the method further comprises terminating the incubation during a stationary phase of aerial mycelial growth.

A55. The method of any one of embodiments A1 to A54, wherein the method further comprises terminating the incubation prior to necrosis or death of the fungus.

A56. The method of any one of embodiments A1 to A55, wherein the method further comprises terminating the incubation after the mycelial thickness fails to substantially increase over a period of 1 day.

A57. The method of any one of embodiments A1 to A56, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces, Wolfiporia, Ceriporiopsis, Chlorociboria, Daedalea, Daedaleopsis, Daldinia, Ganoderma, Hypoxylon, Inonotus, Lenzites, Omphalotus, Oxyporus, Phanerochaete, Phellinus, Polyporellus, Porodaedalea, Pycnoporus, Scytalidium, Stereum, Trametes* or *Xylaria*; or wherein the fungus is a species of the genus *Bondarzewia, Ceriporiopsis, Daedalea, Daedaleopsis, Fomitopsis, Ganoderma, Inonotus, Lenzites, Omphalotus, Oxyporus, Phellinus, Polyporellus, Polyporus, Porodaedalea, Pycnoporus, Stereum, Trametes* or *Xylaria*.

A58. The method of any one of embodiments A1 to A57, wherein the fungus is selected from the group consisting of *Bondarzewia berkleyii, Daedalea quercina, Daedaleopsis* spp., *Daedaleopsis confragosa, Daedaleopsis septentriona-*

*lis, Fomitopsis* spp., *Fomitopsis cajanderi, Fomitopsis pinicola, Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Inonotus* spp., *Inonotus obliqus, Inonotus hispidus, Inonotus dryadeus, Inonotus tomentosus, Lenzites betulina, Phellinus* spp., *Phellinus ignarius, Phellinus gilvus, Polyporus* spp., *Polyporus squamosus, Polyporus badius, Polyporus umbellatus, Polyporus squamosus, Polyporus tuberaster, Polyporus arcularius, Polyporus albeolaris, Polyporus radicatus, Porodaedalea pini, Pycnoporus* spp., *Pycnoporus* spp., *Pycnoporus sanguineus, Pycnoporus cinnabarinus, Stereum* spp., *Stereum ostea, Stereum hirsutum, Trametes* spp., *Trametes versicolor, Trametes elegans, Trametes suaveolens, Trametes hirsute, Trametes gibbosa, Trametes ochraceae, Trametes villosa, Trametes cubensis* and *Trametes pubescens*.

A59. The method of any one of embodiments A1 to A57, wherein the fungus is a pigment-producing fungus of a genus selected from the group consisting of *Chlorociboria, Daldinia, Hypoxylon, Phanerochaete* and *Scytalidium*.

A60. The method of any one of embodiments A1 to A57, wherein the fungus is a species of the genus *Ganoderma* or *Trametes*.

A61. The method of embodiment A60, wherein the fungus is *Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum* or *Ganoderma weberianum*.

A62. The method of embodiment A61, wherein the fungus is *Ganoderma resinaceum*.

A63. The method of embodiment A61, wherein the fungus is *Ganoderma sessile*.

A64. The method of embodiment A61, wherein the fungus is *Ganoderma tsugae*.

A65. The method of any one of embodiments A1 to A64, wherein the aqueous mist comprises one or more solutes.

A66. The method of any one of embodiments A1 to A65, wherein the aqueous mist has a conductivity of no greater than about 1,000 microsiemens/cm, no greater than about 800 microsiemens/cm, no greater than about 500 microsiemens/cm, no greater than about 400 microsiemens/cm, no greater than about 300 microsiemens/cm, no greater than about 200 microsiemens/cm, no greater than about 100 microsiemens/cm, or no greater than about 50 microsiemens/cm.

A67. The method of any one of embodiments A1 to A65, wherein the aqueous mist has a conductivity of less than 300 microsiemens/cm.

A68. The method of any one of embodiments A1 to A65, wherein the aqueous mist has a conductivity of no greater than about 25 microsiemens/cm, has a conductivity of no greater than about 10 microsiemens/cm, has a conductivity of no greater than about 5 microsiemens/cm, or has a conductivity of no greater than about 3 microsiemens/cm.

A69. The method of any one of embodiments A1 to A67, further comprising removing the extra-particle aerial mycelium from the growth matrix as a single contiguous object, thereby obtaining the aerial mycelium as a single contiguous object having a contiguous volume.

A70. The method of embodiment A68 or A69, wherein the single contiguous object is characterized as having a contiguous volume of at least about 15 cubic inches.

A71. The method of embodiment A68, A69 or A70, wherein the single contiguous object is characterized as having a series of linked hyphae over the contiguous volume.

A72. An aerial mycelium obtained from the method of any one of embodiments A1 to A71.

A73. An aerial mycelium obtained from the method of any one of embodiments A42 to A71.

A74. A system for growing an aerial mycelium, comprising: a growth matrix comprising a substrate and a fungus; a growth environment configured to incubate the growth matrix as a solid-state culture for an incubation time period; and an atmospheric control system with an electronic controller configured to maintain a carbon dioxide ($CO_2$) content within the growth environment between at least about 0.02% (v/v) and less than about 8% (v/v) and to introduce aqueous mist into the growth environment throughout the incubation time period, or a portion thereof, at a mist deposition rate of less than or equal to about 150 microliter/cm2/hour, and a mean mist deposition rate over the incubation time period of less than or equal to about 3 microliter/cm2/hour; wherein the growth matrix comprises the substrate and a fungal inoculum, said fungal inoculum comprising said fungus; or wherein the growth matrix comprises a colonized substrate, said colonized substrate comprising the substrate, wherein said substrate is previously colonized with mycelium of said fungus.

A75. The system of embodiment A74, wherein the growth environment is maintained at a relative humidity of at least about 95%.

A76. The system of embodiment A74 or A75, wherein the growth environment comprises a misting apparatus.

A77. The system of embodiment A74, A75 or A76, wherein the system is configured to provide a substantially horizontal airflow across the growth matrix.

A78. A method of making an aerial mycelium, comprising:
  incubating a growth matrix in a growth environment for an incubation time period, wherein the growth matrix comprises a substrate and a fungus;
  introducing aqueous mist into the growth environment throughout the incubation time period, or a portion thereof; and
  producing extra-particle aerial mycelial growth from the growth matrix;
  wherein introducing comprises introducing the aqueous mist into the growth environment resulting in a mean mist deposition rate of at most about 0.45 microliter/cm2/hour.

A79. The method of A78, wherein the introducing comprises introducing the aqueous mist into the growth environment resulting in an instantaneous mist deposition rate and the mean mist deposition rate, wherein the ratio of the instantaneous mist deposition rate to the mean mist deposition rate is at most about 20 to about 1.

A80. The method of A79, wherein the ratio of the instantaneous mist deposition rate to the mean mist deposition rate is at most about 10 to about 1.

A81. The method of A80, wherein the ratio of the instantaneous mist deposition rate to the mean mist deposition rate is at most about 5 to about 1.

A82. The method of A78, wherein:
the growth environment comprises a misting apparatus; and
introducing comprises introducing the aqueous mist into the growth environment via the misting apparatus, resulting in the mean mist deposition rate;
wherein the misting apparatus is operated at a duty cycle, and wherein the duty cycle is at least about 5%.

A83. The method of A82, wherein the duty cycle is at least about 10%.

A84. The method of A83, wherein the duty cycle is at least about 20%.

A85. The method of any one of A78 to A84, wherein introducing further comprises introducing the aqueous mist into the growth environment resulting in an instantaneous mist deposition rate of at most about 2 microliter/cm2/hour.

A86. The method of embodiment A57, wherein the fungus is a species of the genus *Flammulina, Lentinula, Morchella* or *Pleurotus*.

A87. The method of embodiment A86, wherein the fungus is a species of the genus *Pleurotus*.

A88. The method of any one of embodiments A1 to A57, wherein the fungus is an edible fungus selected from the group consisting of: *Agaricus* spp., *Agaricus bisporus, Agaricus arvensis, Agaricus campestris, Agaricus bitorquis, Agaricus brasiliensis, Albatrellus* spp., *Bondarzewia berkleyii, Cantharellus* spp., *Cantharellus cibarius, Cerioporus squamosus, Climacodon* spp., *Cordyceps* spp., *Cordyceps militaris, Fistulina hepatica, Flammulina velutipes, Fomes* spp., *Fomitopsis* spp., *Fusarium* spp., *Grifola frondosa, Herecium* spp., *Herecium erinaceus, Herecium americanum, Herecium abietis, Hydnum* spp., *Hydnum repandum, Hydnum umbellatum, Hypomyces lactifuorum, Hypomyces* spp., *Hypsizygus* spp., *Ischnoderma resinosum, Laetiporus* spp., *Laetiporus sulphureus, Laetiporus cinncinatus, Laetiporus gilbertsonii, Laetiporus conifericola, Laetiporus huroniensis, Laricifomes officinalis, Lepista nuda, Meripilus* spp., *Meripilus gigantea, Meripilus sumstinei, Morchella* spp., *Morchella esculenta, Morchella angusticeps, Morchella rufobrunnea, Morchella importuna, Morchella tomentosa, Morchella elata, Morchella semilibera, Morchella Americana, Morchella punctipes, Morchella deliciosa, Morchella conica, Ophiocordyceps sinensis, Panellus* spp., *Panellus serotinus, Piptoporus betulina, Pleurotus* spp., *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuber-regium, Polyporus* spp., *Polyporus umbellatus, Polyporus squamosus, Pycnoporellus* spp., *Rhizopus oligosporus, Rhizopus oryzae, Schizophyllum commune, Stropharia rugoso-annulata, Tyromyces* spp., and *Wolfiporia extensa*.

A89. The method of any one of embodiments A1 to A88, wherein the aerial mycelium is an edible aerial mycelium.

A90. The method of embodiment A88 or A89, wherein the fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuber-regium*.

A91. The method of embodiment A90, wherein the fungus is *Pleurotus ostreatus*.

A92 The method of embodiment A91, wherein the fungus is *Pleurotus ostreatus* (Jacquin: Fries) strain ATCC 58753 NRRL 2366 or *Pleurotus ostreatus* ATCC 56761.

A93. The method of any one of embodiments A1 to A92, wherein the aqueous mist comprises one or more solutes.

A94. The method of any one of embodiments A1 to A93, wherein the aqueous mist has a conductivity of no greater than about 1,000 microsiemens/cm, no greater than about 800 microsiemens/cm, no greater than about 500 microsiemens/cm, no greater than about 100 microsiemens/cm, or has a conductivity of no greater than about 50 microsiemens/cm.

A95. The method of any one of embodiments A1 to A93, wherein the aqueous mist has a conductivity of less than 300 microsiemens/cm.

A95. The method of any one of embodiments A1 to A93, wherein the aqueous mist has a conductivity of no greater than about 25 microsiemens/cm, has a conductivity of no greater than about 10 microsiemens/cm, has a conductivity of no greater than about 5 microsiemens/cm, or has a conductivity of no greater than about 3 microsiemens/cm.

A96. The method of any one of embodiments A1 to A95, further comprising removing the extra-particle aerial mycelium from the growth matrix as a single contiguous object, thereby obtaining the aerial mycelium as a single contiguous object having a contiguous volume.

A97. The method of embodiment A95 or A96, wherein the single contiguous object is characterized as having a contiguous volume of at least about 15 cubic inches.

A98. The method of embodiment A95, A96 A97, wherein the single contiguous object is characterized as having a series of linked hyphae over the contiguous volume.

A99. An edible aerial mycelium obtained from the method of any one of embodiments A1 to A98.

A100. An edible aerial mycelium obtained from the method of any one of embodiments A42 to A98.

A101. A system for growing an edible aerial mycelium, comprising:
a growth matrix comprising a substrate and a fungus;
a growth environment configured to incubate the growth matrix as a solid-state culture for an incubation time period; and an atmospheric control system with an electronic controller configured to maintain a carbon dioxide (CO2) content within the growth environment between at least about 0.02% (v/v) and less than about 8% (v/v) and to introduce aqueous mist into the growth environment throughout the incubation time period, or a portion thereof, at a mist deposition rate of less than or equal to about 150 microliter/cm2/hour, and a mean mist deposition rate over the incubation time period of less than or equal to about 3 microliter/cm2/hour;
wherein the growth matrix comprises the substrate and a fungal inoculum, said fungal inoculum comprising said fungus; or wherein the growth matrix comprises a colonized substrate, said colonized substrate comprising the substrate, wherein said substrate is previously colonized with mycelium of said fungus.

A102. The system of embodiment A101, wherein the growth environment is maintained at a relative humidity of at least about 95%.

A103. The system of embodiment A101 or A102, wherein the growth environment comprises a misting apparatus.

A104. The system of embodiment A101, A102 or A103, wherein the system is configured to provide a substantially horizontal airflow across the growth matrix.

A105. An edible product comprising an edible aerial mycelium, wherein: the aerial mycelium is an edible aerial mycelium having: a mean native density within a range of about 1 to about 70 pounds per cubic foot (pcf); a native moisture content of at least about 80% (w/w); and a Kramer shear force of no greater than about 15 kilogram per gram of edible aerial mycelium; wherein at least a portion of the aerial mycelium has a native thickness of at least about 10 mm.

A106. The edible product of embodiment A105, wherein the aerial mycelium does not contain a fruiting body.

A107. The edible product of embodiment A105 or A106, wherein at least a portion of the aerial mycelium has a native thickness of at least about 15 mm.

A108. The edible product of embodiment A105 or A106, wherein at least a portion of the aerial mycelium has a native thickness of at least about 20 mm.

A109. The edible product of any one of embodiments A105 to A108, wherein the portion is at least about 10% of the aerial mycelium.

A110. The edible product of embodiment A109, wherein the portion is at least about 25% of the aerial mycelium.

A111. The edible product of embodiment A109, wherein the portion is at least about 50%, is at least about 60%, or is at least about 70% of the aerial mycelium.

A112. The method of any one of A78 to A85, wherein the mean mist deposition rate is at least about 0.01 microliter/cm2/hour.

A113. The method of any one of A78 to A85, wherein introducing comprises introducing the aqueous mist into the growth environment resulting in a mean mist deposition rate of at most about 0.40 microliter/cm2/hour, or resulting in a mean mist deposition rate of at most about 0.35 microliter/cm2/hour.

A114. The method of any one of A78 to A113, wherein the mean mist deposition rate is at least about 0.01 microliter/cm2/hour.

A115. The method of A78, wherein introducing comprises introducing the aqueous mist into the growth environment resulting in a mean mist deposition rate that is below about 0.01 microliter/cm2/hour.

A116. The method of A115, wherein introducing comprises introducing the aqueous mist into the growth environment resulting in a mean mist deposition rate that does not result in a detectable quantity of deposited mist in the growth environment.

A117. The method of A116, wherein introducing comprises introducing the aqueous mist into the growth environment resulting in a mean mist deposition rate that does not result in a visible quantity of deposited mist in the growth environment.

A118. The method of A117, wherein introducing comprises introducing the aqueous mist into the growth environment resulting in a mean mist deposition rate that does not result in a measurable quantity of deposited mist in the growth environment.

A119. The method of A118, wherein introducing comprises introducing the aqueous mist into the growth environment resulting in a mean mist deposition rate that does not result in detectable quantities of deposited mist in the growth environment on the growth matrix, the extra-particle aerial mycelial growth, or both.

A120. A method of making an aerial mycelium, comprising:

incubating a growth matrix in a growth environment for an incubation time period, wherein the growth matrix comprises a substrate and a fungus;

introducing aqueous mist into the growth environment throughout the incubation time period, or a portion thereof; and producing extra-particle aerial mycelial growth from the growth matrix;

wherein the total quantity of aqueous mist resulting from the introducing aqueous mist that is deposited on the growth matrix, the resulting extra-particle aerial mycelial growth, or both, is negligible.

A121. A method of making an aerial mycelium, comprising:

providing a growth environment, the growth environment comprising an amount of aqueous mist;

incubating a growth matrix in the growth environment for an incubation time period, wherein the growth matrix comprises a substrate and a fungus, wherein incubating comprises exposing the growth matrix to the aqueous mist during at least a portion of the incubation time period; and producing extra-particle aerial mycelial growth from the growth matrix;

wherein a mean mist deposition rate resulting from the amount of aqueous mist during the at least a portion of the incubation time period is below about 0.01 microliter/cm2/hour.

A122. The method of A121, wherein the mean mist deposition rate is below an amount that results in a detectable quantity of deposited mist in the growth environment.

A123. The method of A121 or A122, further comprising introducing the aqueous mist into the growth environment.

A124. A method of making an aerial mycelium, comprising:

introducing aqueous mist into a growth environment;

incubating a growth matrix in a growth environment for an incubation time period, wherein the growth matrix comprises a substrate and a fungus, and wherein incubating comprises exposing the growth matrix to the aqueous mist; and producing extra-particle aerial mycelial growth from the growth matrix;

wherein introducing comprises introducing the aqueous mist into the growth environment resulting in a mean mist deposition rate that is below about 0.01 microliter/cm2/hour.

A125. The method of A124, wherein introducing comprises introducing the aqueous mist into the growth environment resulting in a mean mist deposition rate that does not result in a detectable quantity of deposited mist in the growth environment.

A126. The method of any one of A78 to A125, wherein the growth matrix comprises the substrate and a fungal inoculum, said fungal inoculum comprising said fungus.

A127. The method of any one of A78 to A125, wherein the growth matrix comprises a colonized substrate, said colonized substrate comprising the substrate, wherein said substrate is previously colonized with mycelium of said fungus.

A128. The method of A127, wherein the colonized substrate is a fragmented colonized substrate.

A129. The method of any one of A78 to A128, wherein said growth environment comprises a growth atmosphere, said growth atmosphere having a carbon dioxide content, wherein said carbon dioxide content is no greater than about 7% (v/v) over the course of the incubation time period.

A130. The method of any one of A78 to A129, wherein said growth environment comprises a growth atmosphere, said growth atmosphere having a carbon dioxide content, wherein said carbon dioxide content is no greater than about 5% (v/v) over the course of the incubation time period.

A131. The method of any one of A78 to A130, wherein said growth environment comprises a growth atmosphere, said growth atmosphere having a carbon dioxide content, wherein said carbon dioxide content is less than about 3% (v/v) over the course of the incubation time period.

A132. The method of any one of A78 to A131, wherein said growth environment comprises a growth atmosphere, said growth atmosphere having a carbon dioxide content, wherein said carbon dioxide content is less than 2.5% (v/v) over the course of the incubation time period.

A133. The method of any one of A78 to A132, wherein said growth environment comprises a growth atmosphere, said growth atmosphere having a mean carbon dioxide content, wherein said mean carbon dioxide content is no greater than about 2% (v/v) over the course of the incubation time period.

A134. The method of any one of A78 to A133, wherein said growth environment comprises a growth atmosphere, said growth atmosphere having a carbon dioxide content, wherein said carbon dioxide content is at least about 0.02% (v/v), is at least about 0.03% (v/v) or is at least about 0.04% (v/v).

A135. The method of any one of A78 to A134, wherein said growth environment comprises a growth atmosphere, said growth atmosphere having a carbon dioxide content, wherein said carbon dioxide content modulates with fungal respiration over the course of the incubation time period.

A136. The method of any one of A78 to A135, wherein said growth environment comprises a growth atmosphere, said growth atmosphere having a carbon dioxide content, wherein said carbon dioxide content is not a preselected carbon dioxide content.

A137. The method of any one of A78 to A136, wherein introducing comprises introducing aqueous mist into the growth environment throughout a portion of the incubation time period, wherein the portion of the incubation time period comprises a mycelial vertical expansion phase.

A138. The method of any one of the A78 to A137, wherein introducing comprises introducing aqueous mist into the growth environment throughout a portion of the incubation time period, wherein the portion of the incubation time period begins during a second day, a third day or a fourth day of the incubation time period.

A139. The method of any one of A78 to A137, wherein introducing comprises introducing aqueous mist into the growth environment throughout the incubation time period.

A140. The method of any one of A78 to A139, wherein:
 (i) the incubation time period ends no later than when a visible fruiting body forms;
 (ii) the incubation time period ends when a visible fruiting body forms; or
 (iii) the extra-particle aerial mycelial growth does not contain a visible fruiting body.

A141. The method of any one of A78 to A140, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces, Wolfiporia, Ceriporiopsis, Chlorociboria, Daedalea, Daedaleopsis, Daldinia, Ganoderma, Hypoxylon, Inonotus, Lenzites, Omphalotus, Oxyporus, Phanerochaete, Phellinus, Polyporellus, Porodaedalea, Pycnoporus, Scytalidium, Stereum, Trametes* or *Xylaria*.

A142. The method of A141, wherein the fungus is a species of the genus *Bondarzewia, Ceriporiopsis, Daedalea, Daedaleopsis, Fomitopsis, Ganoderma, Inonotus, Lenzites, Omphalotus, Oxyporus, Phellinus, Polyporellus, Polyporus, Porodaedalea, Pycnoporus, Stereum, Trametes* or *Xylaria*.

A143. The method of A142, wherein the fungus is selected from the group consisting of *Bondarzewia berkleyii, Daedalea quercina, Daedaleopsis* spp., *Daedaleopsis confragosa, Daedaleopsis septentrionalis, Fomitopsis* spp., *Fomitopsis cajanderi, Fomitopsis pinicola, Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Inonotus* spp., *Inonotus obliqus, Inonotus hispidus, Inonotus dryadeus, Inonotus tomentosus, Lenzites betulina, Phellinus* spp., *Phellinus ignarius, Phellinus gilvus, Polyporus* spp., *Polyporus squamosus, Polyporus badius, Polyporus umbellatus, Polyporus squamosus, Polyporus tuberaster, Polyporus arcularius, Polyporus albeolaris, Polyporus radicatus, Porodaedalea pini, Pycnoporus* spp., *Pycnoporus* spp., *Pycnoporus sanguineus, Pycnoporus cinnabarinus, Stereum* spp., *Stereum ostea, Stereum hirsutum, Trametes* spp., *Trametes versicolor, Trametes elegans, Trametes suaveolens, Trametes hirsute, Trametes gibbosa, Trametes ochraceae, Trametes villosa, Trametes cubensis* and *Trametes pubescens*.

A144. The method of A141, wherein the fungus is a species of the genus *Ganoderma*.

A145. The method of A144, wherein the fungus is *Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum* or *Ganoderma weberianum*.

A146. The method of A145, wherein the fungus is *Ganoderma sessile*.

A147. The method of A141, wherein the fungus is a species of the genus *Trametes*.

A148. The method of A147, wherein the fungus is *Trametes* spp., *Trametes versicolor, Trametes elegans, Trametes suaveolens, Trametes hirsute, Trametes gibbosa, Trametes ochraceae, Trametes villosa, Trametes cubensis* or *Trametes pubescens*.

A149. The method of A141, wherein the fungus is a pigment-producing fungus of a genus selected from the group consisting of *Chlorociboria, Daldinia, Hypoxylon, Phanerochaete* and *Scytalidium*.

A150. The method of any one of A78 to A149, wherein the growth environment comprises a growth atmosphere, and wherein the growth atmosphere relative humidity is at least about 70%.

A151. The method of A150, wherein the growth atmosphere relative humidity is at least about 90%, or is at least about 95%.

A152. The method of A151, wherein the growth atmosphere relative humidity is at least about 97%, is at least about 98% or is at least about 99%.

A153. The method of any one of A78 to A149, wherein the growth environment comprises a growth atmosphere, and wherein the growth atmosphere is a saturated atmosphere.

A154. The method of any one of A78 to A149, wherein the growth environment comprises a growth atmosphere, and wherein the growth atmosphere is a supersaturated atmosphere.

A155. The method of A78 to A154, wherein the mist comprises a solute.

A156. The method of any one of embodiments A78 to A155, wherein the aqueous mist conductivity is no greater than about 1,000 microsiemens/cm, no greater than about 800 microsiemens/cm, no greater than about 500 microsiemens/cm, no greater than about 400 microsiemens/cm, or no greater than about 300 microsiemens/cm.

A157. The method of any one of embodiments A78 to A155, wherein the aqueous mist conductivity is less than 300 microsiemens/cm.

A158. The method of any one of embodiments A78 to A155, wherein the aqueous mist conductivity is no greater than about 250 microsiemens/cm, no greater than about 200 microsiemens/cm, no greater than about 150 microsiemens/cm or no greater than about 100 microsiemens/cm.

A159. The method of any one of embodiments A78 to A155, wherein the aqueous mist conductivity is no greater than about 50 microsiemens/cm.

A160. The method of any one of embodiments A78 to A155, wherein the aqueous mist conductivity is no greater than about 25 microsiemens/cm, no greater than about 10 microsiemens/cm, no greater than about 5 microsiemens/cm, or no greater than about 3 microsiemens/cm.

A161. The method of any one of embodiments A78 to A160, wherein the growth environment comprises an airflow.

A162. The method of A161, wherein the airflow has a velocity, and the airflow velocity is greater than about 250 linear feet per minute (lfm).

A163. The method of A161, wherein the airflow has a velocity, and the airflow velocity is less than about 150 lfm, less than about 125 lfm, less than about 100 lfm or less than about 75 lfm.

A164. The method of A163, wherein the airflow velocity is less than about 50 lfm, less than about 40 lfm, less than about 30 lfm or less than about 25 lfm.

A165. The method of A161 to A164, wherein the airflow is a substantially horizontal airflow.

A166. The method of any one of A78 to A165, wherein the growth environment is not a dark environment.

A167. The method of any one of A78 to A165, wherein the growth environment does not exclude light.

A168. The method of any one of A78 to A165, wherein the growth environment comprises natural light.

A168. The method of any one of A78 to A165, wherein the growth environment comprises a growing light.

A169. The method of any one of A78 to A168, further comprising removing the extra-particle aerial mycelial growth from the growth matrix, thereby providing an aerial mycelium.

A170. The method of A169, wherein:

the aerial mycelium comprises a growth grain; and said method further comprises compressing the aerial mycelium in a dimension which is substantially parallel with respect to the growth grain, thereby providing a compressed aerial mycelium.

A171. The method of any one of A78 to A168, wherein the extra-particle aerial mycelial growth comprises a growth grain, said method further comprising compressing the extra-particle aerial mycelial growth in a dimension which is substantially parallel with respect to the growth grain, thereby providing a compressed extra-particle mycelial growth product.

A172. The method of AA171, further comprising removing the compressed extra-particle aerial mycelial growth product from the growth matrix, thereby providing a compressed aerial mycelium.

A173. An aerial mycelium obtained by a method of any one of A78 to A169.

A174. The aerial mycelium of A173, wherein the aerial mycelium is suitable for use in the manufacture of a textile.

A175. The aerial mycelium of A173, wherein the aerial mycelium is for use in the manufacture of a textile.

A176. The aerial mycelium of A174 or A175, wherein the textile is a leather-like material.

A177. A compressed aerial mycelium obtained by a method of A170 or A172.

A178. The compressed aerial mycelium of A177, wherein the compressed aerial mycelium is suitable for use in the manufacture of a textile.

A179. The compressed aerial mycelium of A177, wherein the compressed aerial mycelium is for use in the manufacture of a textile.

A180. The compressed aerial mycelium of A177 or A179, wherein the textile is a leather-like material.

A181. The aerial mycelium of A173, wherein the aerial mycelium is suitable for use in the manufacture of a petroleum-based product alternative.

A182. The aerial mycelium of A173, wherein the aerial mycelium is for use in the manufacture of a petroleum-based product alternative.

A183. The aerial mycelium of A181 or A182, wherein the petroleum-based product alternative is a foam.

A184. The compressed aerial mycelium of A177, wherein the compressed aerial mycelium is suitable for use in the manufacture of petroleum-based product alternative.

A185. The compressed aerial mycelium of A177, wherein the compressed aerial mycelium is for use in the manufacture of petroleum-based product alternative.

A185. The compressed aerial mycelium of A184 or A185, wherein the petroleum-based product alternative is a foam.

A186. The method of any one of embodiments A1 to A71 and A78 to A172, wherein the growth matrix further comprises at least one additive.

A187. The method of embodiment A186, wherein the additive is a component of the nutrient source.

A188. The method of embodiment A186 or A187, wherein the additive is the nutrient source.

A189. The method of embodiment A186 or A187, wherein the additive is a micronutrient, a mineral, an amino acid, a peptide, a protein, allicin or a combination thereof.

A190. The method of any one of embodiments A1 to A71 and A78 to A172, further comprising adding at least one additive to the mycelium or to the extra-particle mycelial growth.

A191. The method of embodiment A190, wherein adding the additive occurs during the incubation time period.

A192. The method of embodiment A190, wherein adding the additive occurs after the incubation time period.

A193. The method of embodiment A192, wherein adding the additive occurs after removing the extra-particle mycelium from the growth matrix.

A194. The method of any one of embodiments A190 to A193, wherein the additive is a colorant.

A195. An aerial mycelium obtained from a method of any one of embodiments A186 to A194.

A196. The edible product of embodiment A109, wherein the portion is at least about 80% of the aerial mycelium.

A197. The edible product of any one of embodiments A105 to A196, wherein the aerial mycelium has a mean hyphal width of at most about 20 microns, at most about 15 microns, or within a range of about 0.2 to about 15 microns.

A198. The edible product of any one of embodiments A105 to A197, wherein the aerial mycelium has a mean native density of at least about 1 pound per cubic foot (pcf), at least about 2 pcf, at least about 3 pcf, at least about 4 pcf or about 5 pcf.

A199. The edible product of any one of embodiments A105 to A198, wherein the aerial mycelium has a mean native density of at least about 10 pcf.

A200. The edible product of any one of embodiments A105 to A199, wherein the aerial mycelium has a mean native density of no greater than about 60 pcf, no greater than about 50 pcf, no greater than about 40 pcf, no greater than about 30 pcf, no greater than about 20 pcf or no greater than about 15 pcf.

A201. The edible product of any one of embodiments A105 to A200, wherein the aerial mycelium has an open volume of at least about 50% (v/v), at least about 60% (v/v) or at least about 70% (v/v).

A202. The edible product of any one of embodiments A105 to A201, wherein the aerial mycelium is a growth product of an edible fungus.

A203. The edible product of embodiment A202, wherein the edible fungus is a species of the genus *Agrocybe, Albatrellus, Amillaria, Agaricus, Bondarzewia, Cantharellus, Cerioporus, Climacodon, Cordyceps, Fistulina, Flammulina, Fomes, Fomitopsis, Fusarium, Grifola, Herecium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Trametes, Tuber, Tyromyces* or *Wolfiporia.*

A204. The edible product of embodiment A203, wherein the edible fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuber-regium.*

A205. The edible product of embodiment A204, wherein the edible fungus is *Pleurotus ostreatus.*

A206. The edible product of embodiment A205, wherein the fungus is *Pleurotus ostreatus* (Jacquin: Fries) strain ATCC 58753 NRRL 2366 or *Pleurotus ostreatus* ATCC 56761.

A207. The edible product of any one of embodiments A105 to A206, wherein the edible product consists of the edible aerial mycelium.

A208. The edible product of any one of embodiments A105 to A207, wherein the edible product further comprises one or more additives.

A209. The edible product of embodiment A208, wherein the additive is a fat, a protein, an amino acid, a flavorant, an aromatic agent, a mineral, a vitamin, a micronutrient, a colorant or a preservative; or a combination thereof.

A210. The edible product of embodiment A209, wherein the fat is almond oil, animal fat, avocado oil, butter, canola oil, coconut oil, corn oil, grapeseed oil, hempseed oil, lard, mustard oil, olive oil, palm oil, peanut oil, rice bran oil, safflower oil, soybean oil, sunflower seed oil, vegetable oil, vegetable shortening or animal fat; or a combination thereof; and wherein the animal fat is optionally pork fat, chicken fat or duck fat; optionally, each said oil is a refined oil.

A211. The edible product of embodiment A210, wherein the protein is a heme protein.

A212. The edible product of embodiment A209, wherein the amino acid is alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine or valine; or a combination thereof.

A213. The edible product of embodiment A209, wherein the flavorant is a smoke flavorant, umami, maple, a salt, a sweetener, a spice, or a combination thereof.

A214. The edible product of embodiment A213, wherein the umami is a glutamate; optionally, the glutamate is sodium glutamate.

A215. The edible product of embodiment A213, wherein the salt is sea salt.

A216. The edible product of embodiment A213, wherein the spice is jalapeno, capsaicin or paprika, or a combination thereof.

A217. The edible product of embodiment A213, wherein the smoke flavorant is a liquid smoke flavorant, a natural hickory smoke or an artificial hickory smoke, or a combination thereof.

A218. The edible product of embodiment A209, wherein the aromatic agent is allicin.

A219. The edible product of embodiment A209, wherein the mineral is iron, magnesium, manganese, selenium, zinc, calcium, sodium, potassium, molybdenum, iodine or phosphorus, or a combination thereof.

A220. The edible product of embodiment A209, wherein the vitamin is a ascorbic acid (vitamin C), biotin, a retinoid, a carotene, vitamin A, thiamine (vitamin B1), riboflavin (vitamin B2), pantothenic acid (vitamin B5), pyridoxine (vitamin B6), folate, folic acid (vitamin B9), cobalamine (vitamin B12), choline, calciferol (vitamin D), alpha-tocopherol (vitamin E) or phylloquinone (menadione, vitamin K), or a combination thereof.

A221. The edible product of embodiment A209, wherein the colorant is beet extract or paprika, or a combination thereof.

A222. The edible product of any one of embodiments A105 to A221, wherein the product contains substantially no amount of an artificial preservative.

A223. The edible product of any one of embodiments A105 to A222, wherein the product contains substantially no amount of an artificial colorant.

A224. The edible product of any one of embodiments A105 to A223, wherein the aerial mycelium has a protein content within a range of about 21% to about 41% (w/w), a fat content of less than about 7% (w/w), a carbohydrate content within a range of about 37% to about 70% (w/w), and a total dietary fiber content within a range of about 15% to about 28% (w/w); wherein each said percentage is based on a dry mass of the aerial mycelium.

A225. The edible product of embodiments A224, wherein the protein content is within a range of about 25% to about 33% (w/w), the fat content is within a range of about 2.5% and about 6.5% (w/w), the carbohydrate content is within a range of about 43% to about 65% (w/w), and the total dietary fiber content within a range of about 17% to about 26% (w/w).

A226. The edible product of any one of embodiments A105 to A225, wherein the edible product is a food product.

A227. The edible product of embodiment A226, wherein the food product is a mycelium-based food product.

A228. The edible product of embodiment A226 or A227, wherein the food product is a whole muscle meat alternative.

A229. The edible product of embodiment A226, A227 or A228, wherein the food product is a mycelium-based bacon product.

A230. The edible product of embodiment A226, wherein the food product is a food ingredient.

A231. The edible product of embodiment A230, wherein the food ingredient is suitable for use in manufacturing a mycelium-based food product, or wherein the food ingredient is for use in manufacturing a mycelium-based food product.

A232. The edible product of embodiment A231, wherein the mycelium-based food product is a whole muscle meat alternative.

A233. The edible product of embodiment A231, wherein the mycelium-based food product is a mycelium-based bacon product.

A234. The edible product of any one of embodiments A1 to A233, wherein the aerial mycelium is a single contiguous object having a contiguous volume.

A235. The edible product of embodiment A234, wherein the contiguous object is characterized as having a contiguous volume of at least about 15 cubic inches.

A236. The edible product of embodiment A234 or A235, wherein the contiguous object is characterized as having series of linked hyphae over the contiguous volume.

A237. The edible product of embodiment A226, wherein the food product is a structured alternative for carbohydrate or animal protein structures; optionally, the food product is mycelium-based eggs, mycelium-based pasta or mycelium-based confections.

A238. The edible product of any one of embodiments A105 to A237, provided that the aerial mycelium is not a growth product of a fungal species of the genus *Ganoderma*.

A239. A method of making an aerial mycelium, comprising:

incubating a growth matrix in a growth environment for an incubation time period, wherein the growth matrix comprises a substrate and a fungus;

introducing aqueous mist into the growth environment throughout the incubation time period, or a portion thereof; and producing extra-particle aerial mycelial growth from the growth matrix;

wherein introducing comprises introducing the aqueous mist into the growth environment resulting in a mean mist deposition rate of at most about 0.45 microliter/cm2/hour.

A240. The method of A239, wherein the introducing comprises introducing the aqueous mist into the growth environment resulting in an instantaneous mist deposition rate and the mean mist deposition rate, wherein the ratio of the instantaneous mist deposition rate to the mean mist deposition rate is at most about 20 to about 1.

A241. The method of A240, wherein the ratio of the instantaneous mist deposition rate to the mean mist deposition rate is at most about 10 to about 1.

A242. The method of A241, wherein the ratio of the instantaneous mist deposition rate to the mean mist deposition rate is at most about 5 to about 1.

A243. The method of A239, wherein:

the growth environment comprises a misting apparatus; and introducing comprises introducing the aqueous mist into the growth environment via the misting apparatus, resulting in the mean mist deposition rate;

wherein the misting apparatus is operated at a duty cycle, and wherein the duty cycle is at least about 5%.

A244. The method of A243, wherein the duty cycle is at least about 10%.

A245. the method of A244, wherein the duty cycle is at least about 20%.

A246. The method of any one of A239 to A245, wherein introducing further comprises introducing the aqueous mist into the growth environment resulting in an instantaneous mist deposition rate of at most about 2 microliter/cm2/hour.

A247. The method of any one of A239 to A246 wherein introducing comprises introducing the aqueous mist into the growth environment resulting in a mean mist deposition rate of at most about 0.40 microliter/cm2/hour, or resulting in a mean mist deposition rate of at most about 0.35 microliter/cm2/hour.

A248. The method of any one of A239 to A247, wherein the mean mist deposition rate is at least about 0.01 microliter/cm2/hour.

A249. The method of A239, wherein introducing comprises introducing the aqueous mist into the growth environment resulting in a mean mist deposition rate that is below about 0.01 microliter/cm2/hour.

A250. The method of A249, wherein introducing comprises introducing the aqueous mist into the growth environment resulting in a mean mist deposition rate that does not result in a detectable quantity of deposited mist in the growth environment.

A251. The method of A250, wherein introducing comprises introducing the aqueous mist into the growth environment resulting in a mean mist deposition rate that does not result in a visible quantity of deposited mist in the growth environment.

A252. The method of A251, wherein introducing comprises introducing the aqueous mist into the growth environment resulting in a mean mist deposition rate that does not result in a measurable quantity of deposited mist in the growth environment.

A253. The method of A252, wherein introducing comprises introducing the aqueous mist into the growth environment resulting in a mean mist deposition rate that does not result in detectable quantities of deposited mist in the growth environment on the growth matrix, the extra-particle aerial mycelial growth, or both.

A254. A method of making an aerial mycelium, comprising:
- incubating a growth matrix in a growth environment for an incubation time period, wherein the growth matrix comprises a substrate and a fungus;
- introducing aqueous mist into the growth environment throughout the incubation time period, or a portion thereof; and
- producing extra-particle aerial mycelial growth from the growth matrix;
- wherein the total quantity of aqueous mist resulting from the introducing aqueous mist that is deposited on the growth matrix, the resulting extra-particle aerial mycelial growth, or both, is negligible.

A255. A method of making an aerial mycelium, comprising:
- providing a growth environment, the growth environment comprising an amount of aqueous mist;
- incubating a growth matrix in the growth environment for an incubation time period, wherein the growth matrix comprises a substrate and a fungus, wherein incubating comprises exposing the growth matrix to the aqueous mist during at least a portion of the incubation time period; and
- producing extra-particle aerial mycelial growth from the growth matrix;
- wherein a mean mist deposition rate resulting from the amount of aqueous mist during the at least a portion of the incubation time period is below about 0.01 microliter/cm2/hour.

A256. The method of A255, wherein the mean mist deposition rate is below an amount that results in a detectable quantity of deposited mist in the growth environment.

A257. The method of A255 or A256, further comprising introducing the aqueous mist into the growth environment.

A258. A method of making an aerial mycelium, comprising:
- introducing aqueous mist into a growth environment;
- incubating a growth matrix in a growth environment for an incubation time period, wherein the growth matrix comprises a substrate and a fungus, and wherein incubating comprises exposing the growth matrix to the aqueous mist; and
- producing extra-particle aerial mycelial growth from the growth matrix;
- wherein introducing comprises introducing the aqueous mist into the growth environment resulting in a mean mist deposition rate that is below about 0.01 microliter/cm2/hour.

A259. The method of A258, wherein introducing comprises introducing the aqueous mist into the growth environment resulting in a mean mist deposition rate that does not result in a detectable quantity of deposited mist in the growth environment.

A260. The method of any one of A239 to A259, wherein the growth matrix comprises the substrate and a fungal inoculum, said fungal inoculum comprising said fungus.

A261. The method of any one of A239 to A259, wherein the growth matrix comprises a colonized substrate, said colonized substrate comprising the substrate, wherein said substrate is previously colonized with mycelium of said fungus.

A262. The method of A261, wherein the colonized substrate is a fragmented colonized substrate.

A263. The method of any one of A239 to A262, wherein said growth environment comprises a growth atmosphere, said growth atmosphere having a carbon dioxide content, wherein said carbon dioxide content is no greater than about 7% (v/v) over the course of the incubation time period.

A264. The method of any one of A239 to A263, wherein said growth environment comprises a growth atmosphere, said growth atmosphere having a carbon dioxide content, wherein said carbon dioxide content is no greater than about 5% (v/v) over the course of the incubation time period.

A265. The method of any one of A239 to A264, wherein said growth environment comprises a growth atmosphere, said growth atmosphere having a carbon dioxide content, wherein said carbon dioxide content is less than about 3% (v/v) over the course of the incubation time period.

A266. The method of any one of A239 to A256, wherein said growth environment comprises a growth atmosphere, said growth atmosphere having a carbon dioxide content, wherein said carbon dioxide content is less than 2.5% (v/v) over the course of the incubation time period.

A267. The method of any one of A239 to A266, wherein said growth environment comprises a growth atmosphere, said growth atmosphere having a mean carbon dioxide content, wherein said mean carbon dioxide content is no greater than about 2% (v/v) over the course of the incubation time period.

A268. The method of any one of A239 to A267, wherein said growth environment comprises a growth atmosphere, said growth atmosphere having a carbon dioxide content, wherein said carbon dioxide content is at least about 0.02% (v/v), is at least about 0.03% (v/v) or is at least about 0.04% (v/v).

A269. The method of any one of A239 to A268, wherein said growth environment comprises a growth atmosphere, said growth atmosphere having a carbon dioxide content, wherein said carbon dioxide content modulates with fungal respiration over the course of the incubation time period.

A270. The method of any one of A239 to A269, wherein said growth environment comprises a growth atmosphere, said growth atmosphere having a carbon dioxide content, wherein said carbon dioxide content is not a preselected carbon dioxide content.

A271. The method of any one of A239 to A270, wherein introducing comprises introducing aqueous mist into the growth environment throughout a portion of the incubation time period, wherein the portion of the incubation time period comprises a mycelial vertical expansion phase.

A272. The method of any one of A239 to A271, wherein introducing comprises introducing aqueous mist into the growth environment throughout a portion of the incubation time period, wherein the portion of the incubation time period begins during a second day, a third day or a fourth day of the incubation time period.

A273. The method of any one of A239 to A271, wherein introducing comprises introducing aqueous mist into the growth environment throughout the incubation time period.

A274. The method of any one of A239 to A273, wherein:
(i) the incubation time period ends no later than when a visible fruiting body forms;

(ii) the incubation time period ends when a visible fruiting body forms; or
(iii) the extra-particle aerial mycelial growth does not contain a visible fruiting body.

A275. The method of any one of A239 to A274, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces* or *Wolfiporia*.

A276. The method of A245, wherein the fungus is a species of the genus *Pleurotus*.

A277. The method of A276, wherein the fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuberregium*.

A278. The method of any one of A239 to A277, wherein the fungus is an edible filamentous fungus.

A279. The method of A278, wherein the edible filamentous fungus is *Pleurotus ostreatus*.

A280. The method of A239 to A279, further comprising removing the extra-particle aerial mycelial growth from the growth matrix, thereby providing an aerial mycelium.

A281. The method of any one of A239 to A280, wherein said aerial mycelium comprises a growth grain and a mean native density.

A282. The method of A281, further comprising compressing the aerial mycelium in a dimension which is substantially non-parallel with respect to the growth grain, thereby providing a compressed aerial mycelium.

A283. The method of A282, wherein the compressed aerial mycelium has a mean density, wherein the mean density of the compressed aerial mycelium is at least about 2-fold greater than the mean native density of the aerial mycelium.

A284. The method of any one of A239 to A283, wherein the growth environment comprises a growth atmosphere, and wherein the growth atmosphere relative humidity is at least about 70%.

A285. The method of A284, wherein the growth atmosphere relative humidity is at least about 90%, or is at least about 95%.

A286. The method of A285, wherein the growth atmosphere relative humidity is at least about 97%, is at least about 98% or is at least about 99%.

A287. The method of any one of A239 to A283, wherein the growth environment comprises a growth atmosphere, and wherein the growth atmosphere is a saturated atmosphere or a supersaturated atmosphere.

A288. The method of any one of embodiments A239 to A287, wherein the mist comprises a solute.

A289. The method of any one of embodiments A239 to A288, wherein the aqueous mist conductivity is no greater than about 1,000 microsiemens/cm, no greater than about 800 microsiemens/cm, no greater than about 500 microsiemens/cm, no greater than about 400 microsiemens/cm, or no greater than about 300 microsiemens/cm.

A290. The method of any one of embodiments A239 to A289, wherein the aqueous mist conductivity is less than 300 microsiemens/cm.

A291. The method of any one of embodiments A239 to A290, wherein the aqueous mist conductivity is no greater than about 250 microsiemens/cm, no greater than about 200 microsiemens/cm, no greater than about 150 microsiemens/cm or no greater than about 100 microsiemens/cm.

A292. The method of any one of embodiments A239 to A291, wherein the aqueous mist conductivity is no greater than about 50 microsiemens/cm.

A293. The method of any one of embodiments A239 to A292, wherein the aqueous mist conductivity is no greater than about 25 microsiemens/cm, no greater than about 10 microsiemens/cm, no greater than about 5 microsiemens/cm, or no greater than about 3 microsiemens/cm.

A294. An aerial mycelium prepared according to a method of any one of A239 to A293.

A295. The method of any one of embodiments A1 to A98 and A239 to A293, wherein the growth matrix further comprises at least one additive.

A296. The method of embodiment A295, wherein the additive is a component of the nutrient source.

A297. The method of embodiment A295 or A296, wherein the additive is the nutrient source.

A298. The method of embodiment A295 or A296 wherein the additive is a micronutrient, a mineral, an amino acid, a peptide, a protein, allicin or a combination thereof.

A299. The method of any one of embodiments A1 to A98 and A239 to A293, further comprising adding at least one additive to the mycelium or to the extra-particle mycelial growth.

A300. The method of embodiment A299, wherein adding the additive occurs during the incubation time period.

A301. The method of embodiment A299, wherein adding the additive occurs after the incubation time period.

A302. The method of embodiment A301, wherein adding the additive occurs after removing the extra-particle mycelium from the growth matrix.

A303. The method of any one of embodiments A299 to A303, wherein the additive is a fat, a protein, an amino acid, a flavorant, an aromatic agent, a mineral, a vitamin, a micronutrient, a colorant or a preservative; or a combination thereof.

A304. The method of embodiment A302, wherein the additive is the additive of any one of embodiments A210 to A221, or any additive as disclosed herein.

A305. The method of any one of embodiments A1 to A304, wherein the method excludes grinding the mycelium.

A306. The method of any one of embodiments A1 to A304 wherein the method excludes mincing the mycelium.

A307. The method of any one of embodiments A1 to A306, wherein the method excludes extruding the mycelium.

A308. An edible mycelium obtained from a method of any one of embodiments A295 to A307.

A309. A method of preparing edible mycelium-based bacon, the method comprising: providing an edible aerial mycelium having: a mean density within a range of about 1 to about 45 pcf; a moisture content of at least about 80% (w/w); and a Kramer shear force of no greater than about 15 kilogram per gram of the edible aerial mycelium; wherein at least a portion of the edible aerial mycelium has a thickness of at least about 15 mm; and cutting the edible aerial mycelium into a plurality of strips.

A310. The method of embodiment A309, wherein the mean density is a mean native density, the moisture content is a native moisture content, and the thickness is a native thickness.

A311. The method of embodiment A309 or A310, wherein the portion is at least about 10% of the aerial mycelium, or is at least about 25% of the aerial mycelium.

A312. The method of embodiment A309 or A310, wherein the portion is at least about 50% of the aerial mycelium, or is at least about 70% of the aerial mycelium.

A313. The method of any one of embodiments A309 to A312, wherein cutting the edible aerial mycelium into the plurality of strips comprises cutting the edible aerial mycelium in a direction substantially parallel to the direction of aerial mycelial growth.

A314. The method of any one of embodiments A309 to A313, wherein the method further comprises compressing the plurality of strips.

A315. The method of embodiment A314, wherein compressing the plurality of strips comprises applying pressure to at least one strip, thereby providing at least one compressed strip.

A316. The method of embodiment A315, wherein the method further comprises perforating the at least one compressed strip.

A317. The method of any one of embodiments A309 to A316, wherein the aerial mycelium further comprises an additive.

A318. The method of embodiment A317, wherein the additive is a fat, a protein, an amino acid, a flavorant, an aromatic agent, a mineral, a vitamin, a micronutrient, a colorant or a preservative; or a combination thereof; or the additive is as described in any one of embodiments A210 to A221.

A319. A method of making an edible aerial mycelium, comprising: providing a growth matrix comprising a substrate and a filamentous fungus; incubating the growth matrix as a solid-state culture in a growth environment for an incubation time period of up to about 3 weeks, wherein the growth environment comprises a growth atmosphere having a carbon dioxide ($CO_2$) content within a range of about 0.2% (v/v) to about 7% (v/v), and a relative humidity of at least about 95%; introducing aqueous mist into the growth environment throughout the incubation time period, or a portion thereof, wherein the aqueous mist has a mist deposition rate of no greater than about 2 microliter/cm2/hour, and a mean mist deposition rate of no greater than about 1 microliter/cm2/hour, thereby producing extra-particle aerial mycelial growth from the growth matrix; and removing the extra-particle aerial mycelial growth from the growth matrix, thereby providing an edible aerial mycelium; wherein the growth matrix comprises the substrate and a fungal inoculum, said fungal inoculum comprising said filamentous fungus; or wherein the growth matrix comprises a colonized substrate, said colonized substrate comprising the substrate, wherein said substrate is previously colonized with mycelium of said filamentous fungus; and wherein the filamentous fungus is an edible species of fungus.

A320. The method of embodiment A319, wherein introducing the aqueous mist into the growth environment comprises depositing the aqueous mist onto an exposed surface of the growth matrix, an exposed surface of the aerial mycelial growth, or both.

A321. The method of embodiment A319 or A320, wherein the carbon dioxide content is within a range of about 3% (v/v) to about 7% (v/v).

A322. The method of any one of embodiments A319 to A321, wherein the $O_2$ content is within a range of about 14% to about 21% (v/v).

A323. The method of any one of embodiments A319 to A322, wherein the relative humidity is at least about 98%, is at least about 99%, or is about 100%.

A324. The method of any one of embodiments A319 to A323, further comprising removing the extra-particle aerial mycelium from the growth matrix as a single contiguous object, thereby obtaining the edible aerial mycelium as a single contiguous object having a contiguous volume, wherein the contiguous volume is at least about 15 cubic inches.

A325. The method of embodiment A324, wherein the single contiguous object is characterized as having a series of linked hyphae over the contiguous volume.

A326. The method of any one of embodiments A319 to A325, further comprising directing a substantially horizontal airflow through the growth environment.

A327. The method of embodiment A326, wherein the substantially horizontal airflow has a velocity of no greater than about 175 linear feet per minute, no greater than about 125 linear feet per minute, has a velocity of no greater than about 110 linear feet per minute, has a velocity of no greater than about 100 linear feet per minute, or has a velocity of no greater than about 90 linear feet per minute.

A328. The method of any one of embodiments A326 to A327, wherein the substantially horizontal airflow has a velocity of at least about 5, 10, 15, 20, 25, 30, 35, 40, 45 or 50 linear feet per minute.

A329. The method of any one of embodiments A319 to A328, wherein the substrate and the nutrient source each have a particle size, and wherein the substrate particle size and the nutrient particle size have a ratio within a range of about 200:1 to about 1:1, within a range of about 100:1 to about 1:1, within a range of about 50:1 to about 1:1, within a range of about 10:1 to about 1:1, or within a range of about 5:1 to about 1:1.

A330. The method of any one of embodiments A319 to A329, wherein the mean mist deposition rate is within a range of about 0.2 to about 0.8 microliter/cm2/hour.

A331. The method of any one of embodiments A319 to A330, wherein the mist deposition rate is less than about 1 microliter/cm2/hour, the mean mist deposition rate is less than about 0.5 microliter/cm2/hour, or both.

A332. The method of any one of embodiments A319 to A331, wherein the mist deposition rate is at least about 0.05 microliter/cm2/hour, and the mean mist deposition rate is at least about 0.02 microliter/cm2/hour.

A333. The method of any one of embodiments A319 to A332, wherein the mist deposition rate and the mean mist deposition rate have a ratio within a range of about 3:1 to about 1:1.

A334. The method of any one of embodiments A319 to A333, wherein the edible fungal species is a species of the genus *Flammulina*, *Lentinula*, *Morchella* or *Pleurotus*.

A335. The method of any one of embodiments A319 to A334, wherein the fungus is a species of the genus *Pleurotus*.

A336. The method of embodiment A335, wherein the fungus is *Pleurotus albidus*, *Pleurotus citrinopilleatus*, *Pleurotus columbinus*, *Pleurotus cornucopiae*, *Pleurotus dryinus*, *Pleurotus djamor*, *Pleurotus eryngii*, *Pleurotus floridanus*, *Pleurotus nebrodensis*, *Pleurotus ostreatus*, *Pleurotus populinus*, *Pleurotus pulmonarius*, *Pleurotus sajor-caju*, *Pleurotus salmoneo-stramineus*, *Pleurotus salmonicolor* or *Pleurotus tuber-regium*.

A337. The method of embodiment A336, wherein the fungus is *Pleurotus ostreatus*.

A338. The method of any one of embodiments A319 to A337 wherein the aqueous mist comprises at least one solute.

A339. The method of any one of embodiments A319 to A338, wherein the aqueous mist has a conductivity of no greater than about 1,000 microsiemens/cm, has a conductivity of no greater than about 800 microsiemens/cm, has a conductivity of no greater than about 500 microsiemens/cm, has a conductivity of no greater than about 100 microsiemens/cm, or has a conductivity of no greater than about 50 microsiemens/cm.

A340. The method of any one of embodiments A319 to A339, wherein the aqueous mist has a conductivity of no greater than about 25 microsiemens/cm, has a conductivity of no greater than about 10 microsiemens/cm, has a conductivity of no greater than about 5 microsiemens/cm, or has a conductivity of no greater than about 3 microsiemens/cm.

A341. The method of any one of embodiments A319 to A340, wherein the incubation time period is within a range of about 4 days to about 17 days, or is within a range of about 4 to about 14 days.

A342. The method of any one of embodiments A319 to A340, wherein the incubation time period is within a range of about 7 days to about 17 days, is within a range of about 7 days to about 16 days, is within a range of about 8 days to about 15 days, is within a range of about 9 days to about 15 days, or is within a range of about 9 days and about 14 days.

A343. The method of any one of embodiments A319 to A340, wherein the incubation time period is about 7 days, is about 8 days, is about 9 days, is about 10 days, is about 11 days, is about 12 days, is about 13 days, is about 14 days, is about 15 days or is about 16 days.

A344. The method of any one of embodiments A319 to A340, wherein the incubation time period is within a range of about 8 to about 14 days.

A345. The method of embodiment A344, wherein the incubation time period is 13 or 14 days.

A346. The method of embodiment A345, wherein the incubation time period is 9 days.

A347. The method of any one of embodiments A319 to A346, wherein the carbon dioxide content is within a range of about 4% (v/v) to about 6% (v/v).

A348. The method of any one of embodiments A319 to A347, wherein the carbon dioxide content is about 5% (v/v).

A349. The method of any one of embodiments A319 to A348, wherein the growth environment is a dark environment.

A350. The method of any one of embodiments A319 to A349, wherein the growth environment has a temperature within a range of about 60° F. to about 95° F., is within a range of about 60° F. to about 75° F., is within a range of about 65° F. to about 75° F., or is within a range of about 65° F. to about 70° F.

A351. The method of any one of embodiments A319 to A349, wherein the growth environment has a temperature within a range of about 80° F. to about 95° F., or is within a range of about 85° F. to about 90° F.

A352. An edible aerial mycelium obtained from a method of any one of embodiments A319 to A351.

A353. An edible mycelium-based product comprising an edible aerial mycelium, wherein the edible aerial mycelium has: a mean native density within a range of about 1 to about 50 pounds per cubic foot (pcf), about 2 pcf to about 50 pcf, about 3 pcf to about 50 pcf, about 4 pcf to about 50 pcf or about 5 pcf to about 50 pcf; a native moisture content of at least about 80% (w/w); a Kramer shear force of no greater than about 15 kilogram per gram of aerial mycelium; and a native thickness of at least about 20 mm over at least about 90% of the aerial mycelium; wherein the aerial mycelium does not contain a fruiting body.

A354. The edible mycelium-based product of embodiment A353, wherein the aerial mycelium is a growth product of a fungal species of the genus *Pleurotus*.

A355. The edible mycelium-based product of embodiment A354, wherein the fungal species is *Pleurotus ostreatus*.

A356. The edible mycelium-based product of embodiment A355, wherein the fungal species is *Pleurotus ostreatus* (Jacquin: Fries) strain ATCC 58753 NRRL 2366 or *Pleurotus ostreatus* ATCC 56761.

A357. The edible mycelium-based product of any one of embodiments A353 to A248 having a protein content within a range of about 25% to about 33% (w/w), a fat content within a range of about 2.5% and about 6.5% (w/w), a carbohydrate content within a range of about 43% to about 65% (w/w), and a total dietary fiber content within a range of about 17% to about 26% (w/w).

A358. The edible mycelium-based product of any one of embodiments A357 to A357, wherein the product consists of the edible aerial mycelium.

A359. The edible mycelium-based product of any one of embodiments A353 to A358, wherein the edible aerial mycelium is a food ingredient suitable for the manufacture of an edible mycelium-based meat alternative product.

A360. The edible mycelium-based product of any one of embodiments A353 to A358, wherein the edible aerial mycelium is a food ingredient for the manufacture of an edible mycelium-based meat alternative product.

A361. The edible mycelium-based product of any one of embodiments A353 to A358, wherein the edible aerial mycelium is a food ingredient suitable for the manufacture of an edible mycelium-based bacon product.

A362. The edible mycelium-based product of any one of embodiments A353 to A358, wherein the edible aerial mycelium is a food ingredient for the manufacture of an edible mycelium-based bacon product.

A363. The edible aerial mycelium-based product of any one of embodiments A353 to A362, wherein the aerial mycelium has a Kramer shear force of no greater than about 10 kilogram per gram of aerial mycelium.

A364. The edible aerial mycelium-based product of any one of embodiments A353 to A363, wherein the aerial mycelium has a Kramer shear force within a range of about 2 kilogram per gram to about 10 kilogram per gram of aerial mycelium.

B1. The method of any one of embodiments A1 to A71, A78 to A172 and A186 to A194, wherein introducing the mist into the growth environment comprises releasing the mist from a misting apparatus.

B2. The method of embodiment B1, wherein the growth environment comprises a misting apparatus.

B3. The method of embodiment B1 or B2, wherein the misting apparatus is a high pressure misting pump, a nebulizer, an aerosol generator or aerosolizer, a mist generator, an ultrasonic nebulizer, an ultrasonic aerosol generator or aerosolizer, an ultrasonic mist generator, a dry fog humidifier, an ultrasonic humidifier or an atomizer misting system (including but not limited to a "misting puck"), essentially as described in WO 2019/099474 A1, the entire content of which is hereby incorporated by reference in its entirety, or a print head configured to deposit mist, such as a 3D printer, essentially as described in U.S. patent application Ser. No. 16/688,699, the entire content of which is hereby incorporated by reference in its entirety.

B4. The method of embodiment B1 or B2, wherein the mist is introduced into the growth environment via modulation of growth environment atmospheric pressure, temperature and/or relative humidity, or via modulation of the growth atmosphere dew point.

B5. The method of embodiment B1 or B2, wherein the misting apparatus is the same or different than an apparatus that controls relative humidity of the growth environment.

B6. The method of any one of embodiments B1 to B5, wherein the total volume of aqueous mist introduced into the growth environment throughout the incubation period is less about 200 microliters/cm2.

B7. The method of any one of embodiments B1 to B6, wherein the total volume of aqueous mist introduced into the growth environment throughout the incubation period is less than or equal to about 100 microliters/cm2.

B8. The method of any one of embodiments B1 to B6, wherein the total volume of aqueous mist introduced into the growth environment throughout the incubation period is at least about 5 microliters/cm2.

B9. The method of any one of embodiments B1 to B8, wherein the growth atmosphere has an atmospheric pressure within a range of about 27 to about 31 inches of mercury (Hg), within a range of about 29 to about 31 inches Hg, or of about 29.9 inches Hg.

B10. The method of any one of embodiments B1 to B9, wherein the method comprises terminating the incubation.

B11. The method of embodiment B10, wherein terminating the incubation comprises exposing the aerial mycelium to a terminal environment, wherein the terminal environment is different from the growth environment.

B12. The method of embodiment B11, wherein said terminal environment has one or more conditions that differ from corresponding conditions of the growth environment.

B13. The method of embodiment B12, wherein the one or more terminal environmental conditions is selected from the group consisting of relative humidity, misting condition, temperature, carbon dioxide content and oxygen content; and combinations thereof; wherein the terminal environmental misting condition is an absence of mist or a reduction in a mist deposition rate.

B14. The method of any one of embodiments B11 to B13, wherein exposing the growth matrix to the terminal environment comprises physically moving the aerial mycelium from the growth environment to the terminal environment.

B15. The method of any one of embodiments B11 to B13, wherein exposing aerial mycelium to the terminal environment comprises modifying one or more conditions of the growth environment, thereby providing the terminal environment.

B16. The method of embodiment B10, wherein terminating the incubation comprises restoring the growth environment to ambient environmental conditions.

B17. The method of any one of embodiments B1 to B16, further comprising placing the growth matrix inside a tool.

B18. The method of embodiment B17, wherein the tool has a base having a surface area and a wall having a height.

B19. The method of embodiment B18, wherein the base has a surface area of at least about 1 square inch.

B20. The method of embodiment B18 or B19, wherein the tool has a volume of at least about 1 cubic inch.

B21. The method of embodiment B20, wherein the tool has a volume of at least about 100 cubic inches, at least about 200 cubic inches, at least about 300 cubic inches, at least about 400 cubic inches or at least about 500 cubic inches.

B22. The method of any one of embodiments B17 to B21, wherein the tool has a base having a surface area of at most about 2000 square feet.

B23. The method of any one of embodiments B1 to B16, further comprising placing the growth matrix on a planar surface.

B24. The method of embodiment B23, wherein the planar surface is a tray, a sheet, a table or a conveyer belt.

B25. The method of embodiment B24, wherein the planar surface has a surface area, and wherein the surface area is at most about 2000 square feet.

B26. The method of any one of embodiments B1 to B25, wherein the growth environment is an enclosed growth chamber.

B27. The method of any one of embodiments B1 to B26, wherein the substrate contains moisture.

B28. The method of embodiment B27, wherein the substrate has a moisture content within a range of about 45% to about 75% (w/w).

B29. The method of embodiment B28, wherein the moisture content is within a range of about 60% to about 65% (w/w).

B30. The method of any one of embodiments B1 to B29, wherein the method further comprises sterilizing or pasteurizing the substrate (a) prior to providing the growth matrix, or (b) prior to inoculating the substrate or a growth media with the fungal inoculum, wherein said growth media comprises said substrate.

B31. The method of embodiment B30, wherein the sterilization or pasteurization comprises heat sterilization, steam sterilization, or irradiation with electromagnetic radiation; optionally, the electromagnetic radiation comprises gamma rays, X-rays, UV or UV-visible radiation.

B32. The method of any one of embodiments B1 to B31, wherein the substrate is a solid or a gel.

B33. The method of embodiment B32, wherein the substrate is a natural substrate.

B34. The method of embodiment B33, wherein the natural substrate comprises a lignocellulosic material; optionally, the natural substrate consists essentially of a lignocellulosic substrate, or consists of a lignocellulosic substrate.

B35. The method of embodiment B34, wherein the lignocellulosic material comprises a plant or wood material.

B36. The method of embodiment B34 or B35, wherein the lignocellulosic substrate is an agricultural waste product.

B37. The method of embodiment B36, wherein the agricultural waste product is selected from the group consisting of corn stover, kenaf pith, canola straw and wheat straw.

B38. The method of embodiment B35, wherein the plant or wood material is purposefully harvested for use in the production of a mycelium.

B39. The method of embodiment B34 or B35, wherein the lignocellulosic material is not an agricultural waste product.

B40. The method of any one of embodiments B34 to B40, wherein the lignocellulosic material comprises hemp, maple, oak, oak pellets, corn, kenaf, canola, soy straw, soy flour, soybean hull pellets, wheat straw, seed or seed husk material; or a combination thereof.

B41. The method of embodiment B39 or B40, wherein the lignocellulosic material is not corn stover.

B42. The method of embodiment B40, wherein the seed is selected from the group consisting of sunflower seed, walnut and poppy seed; and combinations thereof.

B43. The method of embodiment B35, wherein the lignocellulosic material is a wood material, and wherein the wood material comprises a hardwood or a softwood material.

B44. The method of embodiment B43, wherein the hardwood or the softwood is of the genus *Acer, Quercus, Populus, Abies* or *Pinus*.

B45. The method of embodiment B35, B43 or B44, wherein the lignocellulosic material comprises wood flour, plant flour, wood chips, wood flakes, wood shavings, wood pellets or plant shavings.

B46. The method of embodiment B45, wherein the wood flour is maple wood flour.

B47. The method of embodiment B45, wherein the wood chips are maple wood chips, the wood flakes are maple wood flakes, and the wood shavings are maple wood shavings.

B48. The method of embodiment B45, wherein the plant flour is soy flour.

B49. The method of embodiment B33, wherein the natural substrate comprises a cellulosic material.

B50. The method of embodiment B49, wherein the cellulosic material is a lignin-free material.

B51. The method of embodiment B49 or B50, wherein the cellulosic material comprises plant fiber.

B52. The method of embodiment B51, wherein the plant fiber is a fiber obtained from cotton (*Gossypium* sp.), hemp (*Cannabis* sp.), flax (*Linum* sp.) or jute (*Corchorus* sp.).

B53. The method of embodiment B49, B50, B51 or B52, wherein the cellulosic material comprises pet bedding, paper, cardboard, card stock, cotton, linen or textile; or a combination thereof.

B54. The method of embodiment B33, wherein the natural substrate comprises an inorganic material; optionally, the natural substrate consists essentially of an inorganic material, or consists of an inorganic material.

B55. The method of embodiment B54, wherein the inorganic material is a mineral or mineral-based material.

B56. The method of embodiment B55, wherein the mineral or mineral-based material selected from the group consisting of vermiculite, perlite, soil, chalk, gypsum, clay, sand, rockwool and growstones; and combinations thereof.

B57. The method of embodiment B56, wherein the clay is expanded clay or clay in the form of beads.

B58. The method of embodiment B55, wherein the mineral or mineral-based material is a lignin-free material.

B59. The method of embodiment B32, wherein the substrate comprises a synthetic material.

B60. The method of embodiment B59, wherein the synthetic material is a plastic.

B61. The method of embodiment B59, wherein the synthetic material is a synthetic polymer.

B62. The method of embodiment B61, wherein the synthetic polymer is a synthetic organic polymer.

B63. The method of embodiment B62, wherein the synthetic organic polymer is selected from the group consisting of a polyethylene, a polypropylene, a polyvinyl chloride, a polystyrene, a polyacrylate, a nylon, a polytetrafluoroethylene (e.g., Teflon™), a polyamide, a polyester, a polysulfide, a polycarbonate, a polythene or a polyurethane.

B64. The method of embodiment B62 or B63, wherein the synthetic organic polymer contains one or more heteroatoms.

B65. The method of embodiment B64, wherein the synthetic organic polymer containing one or more heteroatoms is selected from the group consisting of a polyamide, a polyester, a polyurethane, a polysulfide and a polycarbonate; optionally, the synthetic organic polymer is a polyurethane, which is optionally a thermoplastic polyurethane.

B66. The method of any one of embodiments B59 to B65, wherein the synthetic material is obtained from a recycled material.

B67. The method of embodiment B32, wherein the substrate comprises an artificial material.

B68. The method of embodiment B67, wherein the artificial material comprises alginate, rayon, agar or agar-agar; optionally the rayon is rayon fiber, such as viscose.

B69. The method of embodiment B68, wherein the alginate is sodium alginate.

B71. The method of any one of embodiments B1 to B69, wherein the substrate is provided as a particles, said particles characterized as having a particle size.

B72. The method of embodiment B71, wherein the particle size is at most about 0.25 inch in diameter.

B73. The method of embodiment B72, wherein the particle size is less than 0.25 inch in diameter.

B74. The method of embodiment B71, wherein the particle size is at most about 0.125 inch in diameter.

B75. The method of embodiment B71, wherein the particle size is less than about 0.125 inch in diameter.

B76. The method of embodiment B71, wherein the particle size is at most about 0.01 inches in diameter.

B77. The method of embodiment B71, wherein the particle size is less than about 0.01 inch in diameter, optionally, at most about 0.007 inch in diameter.

B78. The method of embodiment B71, wherein the particle size is at least about 0.25 inch, or is greater than 0.25 inch in diameter.

B79. The method of embodiment B78, wherein the particle size is at most about 2 inches in diameter.

B80. The method of any one of embodiments B1 to B79, wherein the method further comprises sizing the substrate to a predetermined particle size prior to providing the growth matrix.

B81. The method of any one of embodiments B1 to B44 and B49 to B69, wherein the substrate is a monolithic substrate.

B82. The method of embodiment B81, wherein the monolithic substrate is a contiguous porous solid.

B83. The method of embodiment B82, wherein the monolithic substrate is a log, a slab of wood, textile or a solidified porous gel medium; or a combination thereof.

B84. The method of embodiment B82, wherein the monolithic substrate is a contiguous woven textile or a contiguous non-woven textile.

B85. The method of embodiment B84, wherein the contiguous woven or non-woven textile comprises rockwool, cotton (including nonwoven cotton), wood fiber or polyester fiber, optionally, the contiguous textile is provided in the form of a mat.

B86. The method of embodiment B82, wherein the monolithic substrate comprises a combination of two or more monolithic substrates.

B87. The method of any one of embodiments B1 to B86, wherein the substrate is a non-toxic substrate.

B88. The method of any one of embodiments B1 to B87, wherein the nutrient source is a lignocellulosic material.

B89. The method of embodiment B88, wherein the lignocellulosic material comprises seed, seed husks or both.

B90. The method of embodiment B89, wherein the seed is sunflower seed, walnut, or poppy seed; or a combination thereof.

B91. The method of any one of embodiments B1 to B90, wherein providing the growth matrix further comprises inoculating the substrate with the fungal inoculum.

B92. The method of any one of embodiments B1 to B91, wherein providing the growth matrix comprises inoculating a blend containing the substrate and the nutrient source with the fungal inoculum, thereby providing the growth matrix.

B93. The method of any one of embodiments B1 to B92, wherein the fungal inoculum is a seed-supported fungal inoculum, a feed grain-supported fungal inoculum, a seed-saw dust mixture fungal inoculum, or another commercially available fungal inoculum (for example, a specialty proprietary spawn type provided by inoculum retailers).

B94. The method of embodiment B93, wherein the fungal inoculum has a density of about 0.1 gram per cubic inch to about 10 grams per cubic inch, or from about 1 gram per cubic inch to about 7 grams per cubic inch; optionally, the fungal inoculum is a seed-supported or a feed grain-supported fungal inoculum.

BB1. The method of any one of embodiments A1 to A98, A239 to A287 and A289 to A351, wherein introducing the mist into the growth environment comprises releasing the mist from a misting apparatus.

BB2. The method of embodiment BB1, wherein the growth environment comprises a misting apparatus.

BB3. The method of embodiment BB or BB2, wherein the misting apparatus is a high pressure misting pump, a nebulizer, an aerosol generator or aerosolizer, a mist generator, an ultrasonic nebulizer, an ultrasonic aerosol generator or aerosolizer, an ultrasonic mist generator, a dry fog humidifier, an ultrasonic humidifier or an atomizer misting system (including but not limited to a "misting puck"), essentially as described in WO 2019/099474 A1, the entire content of which is hereby incorporated by reference in its entirety, or a print head configured to deposit mist, such as a 3D printer, essentially as described in U.S. patent application Ser. No. 16/688,699, the entire content of which is hereby incorporated by reference in its entirety.

BB4. The method of embodiment BB or BB2, wherein the mist is introduced into the growth environment via modulation of growth environment atmospheric pressure, temperature and/or relative humidity, or via modulation of the growth atmosphere dew point.

BB5. The method of embodiment BB or BB2, wherein the misting apparatus is the same or different than an apparatus that controls relative humidity of the growth environment.

BB6. The method of any one of embodiments BB to BB5, wherein the total volume of aqueous mist introduced into the growth environment throughout the incubation period is less about 200 microliters/cm2.

BB7. The method of any one of embodiments BB to BB6, wherein the total volume of aqueous mist introduced into the growth environment throughout the incubation period is less than or equal to about 100 microliters/cm2.

BB8. The method of any one of embodiments BB to BB6, wherein the total volume of aqueous mist introduced into the growth environment throughout the incubation period is at least about 5 microliters/cm2.

BB9. The method of any one of embodiments BB to BB8, wherein the growth atmosphere has an atmospheric pressure within a range of about 27 to about 31 inches of mercury (Hg), within a range of about 29 to about 31 inches Hg, or of about 29.9 inches Hg.

BB10. The method of any one of embodiments BB1 to BB9, wherein the method comprises terminating the incubation.

BB11. The method of embodiment BB10, wherein terminating the incubation comprises exposing the aerial mycelium to a terminal environment, wherein the terminal environment is different from the growth environment.

BB12. The method of embodiment BB11, wherein said terminal environment has one or more conditions that differ from corresponding conditions of the growth environment.

BB13. The method of embodiment BB12, wherein the one or more terminal environmental conditions is selected from the group consisting of relative humidity, misting condition, temperature, carbon dioxide content and oxygen content; and combinations thereof; wherein the terminal environmental misting condition is an absence of mist or a reduction in a mist deposition rate.

BB14. The method of any one of embodiments BB 1 to BB13, wherein exposing the growth matrix to the terminal environment comprises physically moving the aerial mycelium from the growth environment to the terminal environment.

BB15. The method of any one of embodiments BB 1 to BB13, wherein exposing aerial mycelium to the terminal environment comprises modifying one or more conditions of the growth environment, thereby providing the terminal environment.

BB16. The method of embodiment BB10, wherein terminating the incubation comprises restoring the growth environment to ambient environmental conditions.

BB17. The method of any one of embodiments BB to BB16, further comprising placing the growth matrix inside a tool.

BB18. The method of embodiment BB17, wherein the tool has a base having a surface area and a wall having a height.

BB19. The method of embodiment BB18, wherein the base has a surface area of at least about 1 square inch.

BB20. The method of embodiment BB18 or BB19, wherein the tool has a volume of at least about 1 cubic inch.

BB21. The method of embodiment BB20, wherein the tool has a volume of at least about 100 cubic inches, at least about 200 cubic inches, at least about 300 cubic inches, at least about 400 cubic inches or at least about 500 cubic inches.

BB22. The method of any one of embodiments BB17 to BB21, wherein the tool has a base having a surface area of at most about 2000 square feet.

BB23. The method of any one of embodiments BB1 to BB16, further comprising placing the growth matrix on a planar surface.

BB24. The method of embodiment BB23, wherein the planar surface is a tray, a sheet, a table or a conveyer belt.

BB25. The method of embodiment BB24, wherein the planar surface has a surface area, and wherein the surface area is at most about 2000 square feet.

BB26. The method of any one of embodiments BB11 to BB25, wherein the growth environment is an enclosed growth chamber.

BB27. The method of any one of embodiments BB1 to BB26, wherein the substrate contains moisture.

BB28. The method of embodiment BB27, wherein the substrate has a moisture content within a range of about 45% to about 75% (w/w).

BB29. The method of embodiment BB28, wherein the moisture content is within a range of about 60% to about 65% (w/w).

BB30. The method of any one of embodiments BB1 to BB29, wherein the method further comprises sterilizing or pasteurizing the substrate (a) prior to providing the growth matrix, or (b) prior to inoculating the substrate or a growth media with the fungal inoculum, wherein said growth media comprises said substrate.

BB31. The method of embodiment BB30, wherein the sterilization or pasteurization comprises heat sterilization, steam sterilization, or irradiation with electromagnetic radiation; optionally, the electromagnetic radiation comprises gamma rays, X-rays, UV or UV-visible radiation.

BB32. The method of any one of embodiments BB1 to BB31, wherein the substrate is a solid or a gel.

BB33. The method of embodiment BB32, wherein the substrate is a natural substrate.

BB34. The method of embodiment BB33, wherein the natural substrate comprises a lignocellulosic material; optionally, the natural substrate consists essentially of a lignocellulosic substrate, or consists of a lignocellulosic substrate.

BB35. The method of embodiment BB34, wherein the lignocellulosic material comprises a plant or wood material.

BB36. The method of embodiment BB34 or BB35, wherein the lignocellulosic substrate is an agricultural waste product.

BB37. The method of embodiment BB36, wherein the agricultural waste product is selected from the group consisting of corn stover, kenaf pith, canola straw and wheat straw.

BB38. The method of embodiment BB35, wherein the plant or wood material is purposefully harvested for use in the production of a mycelium.

BB39. The method of embodiment BB34 or BB35, wherein the lignocellulosic material is not an agricultural waste product.

BB40. The method of any one of embodiments BB34 to BB40, wherein the lignocellulosic material comprises hemp, maple, oak, oak pellets, corn, kenaf, canola, soy straw, soy flour, soybean hull pellets, wheat straw, seed or seed husk material; or a combination thereof.

BB41. The method of embodiment BB39 or BB40, wherein the lignocellulosic material is not corn stover.

BB42. The method of embodiment BB40, wherein the seed is selected from the group consisting of sunflower seed, walnut and poppy seed; and combinations thereof.

BB43. The method of embodiment BB35, wherein the lignocellulosic material is a wood material, and wherein the wood material comprises a hardwood or a softwood material.

BB44. The method of embodiment BB43, wherein the hardwood or the softwood is of the genus *Acer, Quercus, Populus, Abies* or *Pinus*.

BB45. The method of embodiment BB35, BB43 or BB44, wherein the lignocellulosic material comprises wood flour, plant flour, wood chips, wood flakes, wood shavings, wood pellets or plant shavings.

BB46. The method of embodiment BB45, wherein the wood flour is maple wood flour.

BB47. The method of embodiment BB45, wherein the wood chips are maple wood chips, the wood flakes are maple wood flakes, and the wood shavings are maple wood shavings.

BB48. The method of embodiment BB45, wherein the plant flour is soy flour.

BB49. The method of embodiment BB33, wherein the natural substrate comprises a cellulosic material.

BB50. The method of embodiment BB49, wherein the cellulosic material is a lignin-free material.

BB51. The method of embodiment BB49 or BB50, wherein the cellulosic material comprises plant fiber.

BB52. The method of embodiment BB51, wherein the plant fiber is a fiber obtained from cotton (*Gossypium* sp.), hemp (*Cannabis* sp.), flax (*Linum* sp.) or jute (*Corchorus* sp.).

BB53. The method of embodiment BB49, BB50, BB51 or BB52, wherein the cellulosic material comprises pet bedding, paper, cardboard, card stock, cotton, linen or textile; or a combination thereof.

BB54. The method of embodiment BB33, wherein the natural substrate comprises an inorganic material; optionally, the natural substrate consists essentially of an inorganic material, or consists of an inorganic material.

BB55. The method of embodiment BB54, wherein the inorganic material is a mineral or mineral-based material.

BB56. The method of embodiment BB55, wherein the mineral or mineral-based material selected from the group consisting of vermiculite, perlite, soil, chalk, gypsum, clay, sand, rockwool and growstones; and combinations thereof.

BB57. The method of embodiment BB56, wherein the clay is expanded clay or clay in the form of beads.

BB58. The method of embodiment BB55, wherein the mineral or mineral-based material is a lignin-free material.

BB59. The method of embodiment BB32, wherein the substrate comprises a synthetic material.

BB60. The method of embodiment BB59, wherein the synthetic material is a plastic.

BB61. The method of embodiment BB59, wherein the synthetic material is a synthetic polymer.

BB62. The method of embodiment BB61, wherein the synthetic polymer is a synthetic organic polymer.

BB63. The method of embodiment BB62, wherein the synthetic organic polymer is selected from the group consisting of a polyethylene, a polypropylene, a polyvinyl chloride, a polystyrene, a polyacrylate, a nylon, a polytetrafluoroethylene (e.g., Teflon™), a polyamide, a polyester, a polysulfide, a polycarbonate, a polythene or a polyurethane.

BB64. The method of embodiment BB62 or BB63, wherein the synthetic organic polymer contains one or more heteroatoms.

BB65. The method of embodiment BB64, wherein the synthetic organic polymer containing one or more heteroatoms is selected from the group consisting of a polyamide, a polyester, a polyurethane, a polysulfide and a polycarbonate; optionally, the synthetic organic polymer is a polyurethane, which is optionally a thermoplastic polyurethane.

BB66. The method of any one of embodiments BB59 to BB65, wherein the synthetic material is obtained from a recycled material.

BB67. The method of embodiment BB32, wherein the substrate comprises an artificial material.

BB68. The method of embodiment BB67, wherein the artificial material comprises alginate, rayon, agar or agar-agar; optionally the rayon is rayon fiber, such as viscose.

BB69. The method of embodiment BB68, wherein the alginate is sodium alginate.

BB71. The method of any one of embodiments BB1 to BB69, wherein the substrate is provided as a particles, said particles characterized as having a particle size.

BB72. The method of embodiment BB71, wherein the particle size is at most about 0.25 inch in diameter.

BB73. The method of embodiment BB72, wherein the particle size is less than 0.25 inch in diameter.

BB74. The method of embodiment BB71, wherein the particle size is at most about 0.125 inch in diameter.

BB75. The method of embodiment BB71, wherein the particle size is less than about 0.125 inch in diameter.

BB76. The method of embodiment BB71, wherein the particle size is at most about 0.01 inches in diameter.

BB77. The method of embodiment BB71, wherein the particle size is less than about 0.01 inch in diameter, optionally, at most about 0.007 inch in diameter.

BB78. The method of embodiment BB71, wherein the particle size is at least about 0.25 inch, or is greater than 0.25 inch in diameter.

BB79. The method of embodiment BB78, wherein the particle size is at most about 2 inches in diameter.

BB80. The method of any one of embodiments BB to BB79, wherein the method further comprises sizing the substrate to a predetermined particle size prior to providing the growth matrix.

BB81. The method of any one of embodiments BB to BB44 and BB49 to BB69, wherein the substrate is a monolithic substrate.

BB82. The method of embodiment BB81, wherein the monolithic substrate is a contiguous porous solid.

BB83. The method of embodiment BB82, wherein the monolithic substrate is a log, a slab of wood, textile or a solidified porous gel medium; or a combination thereof.

BB84. The method of embodiment BB82, wherein the monolithic substrate is a contiguous woven textile or a contiguous non-woven textile.

BB85. The method of embodiment BB84, wherein the contiguous woven or non-woven textile comprises rockwool, cotton (including nonwoven cotton), wood fiber or polyester fiber, optionally, the contiguous textile is provided in the form of a mat.

BB86. The method of embodiment BB82, wherein the monolithic substrate comprises a combination of two or more monolithic substrates.

BB87. The method of any one of embodiments BB1 to BB86, wherein the substrate is a non-toxic substrate.

BB88. The method of any one of embodiments BB1 to BB87, wherein the nutrient source is a lignocellulosic material.

BB89. The method of embodiment BB88, wherein the lignocellulosic material comprises seed, seed husks or both.

BB90. The method of embodiment BB89, wherein the seed is sunflower seed, walnut, or poppy seed; or a combination thereof.

BB91. The method of any one of embodiments BB1 to BB90, wherein providing the growth matrix further comprises inoculating the substrate with the fungal inoculum.

BB92. The method of any one of embodiments BB to BB91, wherein providing the growth matrix comprises inoculating a blend containing the substrate and the nutrient source with the fungal inoculum, thereby providing the growth matrix.

BB93. The method of any one of embodiments BB to BB92, wherein the fungal inoculum is a seed-supported fungal inoculum, a feed grain-supported fungal inoculum, a seed-saw dust mixture fungal inoculum, or another commercially available fungal inoculum (for example, a specialty proprietary spawn type provided by inoculum retailers).

BB94. The method of embodiment BB93, wherein the fungal inoculum has a density of about 0.1 gram per cubic inch to about 10 grams per cubic inch, or from about 1 gram per cubic inch to about 7 grams per cubic inch; optionally, the fungal inoculum is a seed-supported or a feed grain-supported fungal inoculum.

BB95. An edible aerial mycelium, prepared by the method of any of embodiments BB to BB94, wherein the edible aerial mycelium exhibits at least one of the following physical characteristics: a mean thickness of at least about 10 mm; a moisture content of at least about 80% (w/w); a mean native density within a range of about 1.8 to about 42 pounds per cubic foot (pcf); a Kramer shear force of no greater than about 15 kg/g; and a mean hyphal width of at most about 20 microns, at most about 15 microns, or within a range of about 0.2 to about 15 microns.

BB96. An edible aerial mycelium, prepared by the process of any of embodiments BB1 to BB94, wherein the edible aerial mycelium exhibits at least two of the following physical characteristics: a mean thickness of at least about 10 mm; a moisture content of at least about 80% (w/w); a mean native density within a range of about 1.8 to about 42 pounds per cubic foot (pcf); a Kramer shear force of no greater than about 15 kg/g; and a mean hyphal width of at most about 20 microns, at most about 15 microns, or within a range of about 0.2 to about 15 microns.

C1. An aerial mycelium comprising:
a growth grain; and
at least three of the following properties:
i. a mean native density, wherein the mean native density is no greater than about 70 pounds per cubic foot (pcf);
ii. a native moisture content of at least about 75% (w/w);
iii. a native Kramer shear force in a dimension substantially parallel to the growth grain, wherein the native Kramer shear force in the dimension substantially parallel to the growth grain is at least about 100 kg/g;
iv. an ultimate tensile strength in a dimension substantially parallel to the growth grain after drying the aerial mycelium to a final moisture content of less than about 10% (w/w), wherein the ultimate tensile strength in the dimension substantially parallel to the growth grain after the drying of the aerial mycelium to a final moisture content of less than about 10% (w/w) is no greater than about 50 pounds per square inch (psi);
v. a modulus of elasticity of no greater than about 150 psi;
vi. a mean native thickness, wherein the mean native thickness is at least about 15 millimeters (mm); and
vii. a maximum native thickness, wherein the maximum native thickness is at least about 30 mm.

C2. The aerial mycelium of C1, wherein the aerial mycelium does not contain a visible fruiting body.

C3. The aerial mycelium of C1 or C2, wherein the aerial mycelium comprises at least four of said properties.

C4. The aerial mycelium of C1 or C2, wherein the aerial mycelium comprises at least five of said properties.

C5. The aerial mycelium of C1 or C2, wherein the aerial mycelium comprises at least six of said properties.

C6. The aerial mycelium of any one of C1 to C5, wherein the native moisture content is at most about 95% (w/w).

C7. The aerial mycelium of any one of C1 to C6, wherein the native moisture content is at least about 80% (w/w).

C8. The aerial mycelium of any one of C1 to C7, wherein the mean native density is no greater than about 50 pcf.

C9. The aerial mycelium of any one of C1 to C7, wherein the mean native density is no greater than about 40 pcf.

C10. The aerial mycelium of any one of C1 to C7, wherein the mean native density is no greater than about 30 pcf.

C11. The aerial mycelium of any one of C1 to C7, wherein the mean native density is no greater than about 20 pcf.

C12. The aerial mycelium of any one of C1 to C7, wherein the mean native density is no greater than about 10 pcf.

C13. The aerial mycelium of any one of C1 to C12, wherein the ultimate tensile strength in the dimension substantially parallel to the growth grain after the drying of the aerial mycelium to a final moisture content of less than about 10% (w/w) is no greater than about 40 pounds per square inch (psi).

C14. The aerial mycelium of any one of C1 to C13, wherein the modulus of elasticity is no greater than about 125 psi.

C15. The aerial mycelium of any one of C1 to C14, wherein the modulus of elasticity is no greater than about 100 psi.

C16. The aerial mycelium of any one of C1 to C15, wherein the aerial mycelium is a growth product of a fungus, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces, Wolfiporia, Ceriporiopsis, Chlorociboria, Daedalea, Daedaleopsis, Daldinia, Ganoderma, Hypoxylon, Inonotus, Lenzites, Omphalotus, Oxyporus, Phanerochaete, Phellinus, Polyporellus, Porodaedalea, Pycnoporus, Scytalidium, Stereum, Trametes* or *Xylaria*.

C17. The aerial mycelium of C16, wherein the fungus is a species of the genus *Bondarzewia, Ceriporiopsis, Daedalea, Daedaleopsis, Fomitopsis, Ganoderma, Inonotus, Lenzites, Omphalotus, Oxyporus, Phellinus, Polyporellus, Polyporus, Porodaedalea, Pycnoporus, Stereum, Trametes* or *Xylaria*.

C18. The aerial mycelium of C16, wherein the fungus is selected from the group consisting of *Bondarzewia berkleyii, Daedalea quercina, Daedaleopsis* spp., *Daedaleopsis confragosa, Daedaleopsis septentrionalis, Fomitopsis* spp., *Fomitopsis cajanderi, Fomitopsis pinicola, Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Inonotus* spp., *Inonotus obliqus, Inonotus hispidus, Inonotus dryadeus, Inonotus tomentosus, Lenzites betulina, Phellinus* spp., *Phellinus ignarius, Phellinus gilvus, Polyporus* spp., *Polyporus squamosus, Polyporus badius, Polyporus umbellatus, Polyporus squamosus, Polyporus tuberaster, Polyporus arcularius, Polyporus albeolaris, Polyporus radicatus, Porodaedalea pini, Pycnoporus* spp., *Pycnoporus* spp., *Pycnoporus sanguineus, Pycnoporus cinnabarinus, Stereum* spp., *Stereum ostea, Stereum hirsutum, Trametes* spp., *Trametes versicolor, Trametes elegans, Trametes suaveolens, Trametes hirsute, Trametes gibbosa, Trametes ochraceae, Trametes villosa, Trametes cubensis* and *Trametes pubescens*.

C19. The aerial mycelium of C16, wherein the fungus is a species of the genus *Ganoderma*.

C20. The aerial mycelium of C19, wherein the fungus is *Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum* or *Ganoderma weberianum*.

C21. The aerial mycelium of C20, wherein the fungus is *Ganoderma sessile*.

C22. The aerial mycelium of C16, wherein the fungus is a species of the genus *Trametes*.

C23. The aerial mycelium of C22, wherein the fungus is *Trametes* spp., *Trametes versicolor, Trametes elegans, Trametes suaveolens, Trametes hirsute, Trametes gibbosa, Trametes ochraceae, Trametes villosa, Trametes cubensis* or *Trametes pubescens*.

C24. The aerial mycelium of C16, wherein the fungus is a pigment-producing fungus of a genus selected from the group consisting of Chlorociboria, Daldinia, *Hypoxylon, Phanerochaete* and *Scytalidium*.

C25. An aerial mycelium of any one of C1 to C24, wherein the aerial mycelium is suitable for use in the manufacture of a textile.

C26. The aerial mycelium of any one of C1 to C24, wherein the aerial mycelium is for use in the manufacture of a textile.

C27. The aerial mycelium of C25 or C26, wherein the textile is a leather-like material.

C28. The aerial mycelium of any one of embodiments C1 to C24, wherein the aerial mycelium is suitable for use in the manufacture of a petroleum-based product alternative.

C29. The aerial mycelium of any one of C1 to C24, wherein the aerial mycelium is for use in the manufacture of a petroleum-based product alternative.

C30. The aerial mycelium of C28 or C29, wherein the petroleum-based product alternative is a foam.

C31. A batch of aerial mycelial panels, wherein greater than 50% of the panels in the batch comprises at least three of the properties recited in C1.

C32. A batch of aerial mycelial panels, wherein greater than 50% of the panels in the batch comprises at least four of the properties recited in C1.

C33. A batch of aerial mycelial panels, wherein greater than 50% of the panels in the batch comprises at least five of the properties recited in C1.

CC1. A foodstuff comprising an aerial mycelium, wherein the aerial mycelium exhibits at least one of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC2. A foodstuff comprising an edible aerial mycelium, wherein the edible aerial mycelium exhibits at least two of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC3. A foodstuff comprising an edible aerial mycelium, wherein the edible aerial mycelium exhibits at least three of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC4. A foodstuff comprising an edible aerial mycelium, wherein the edible aerial mycelium exhibits at least four of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC5. An edible aerial mycelium having at least one of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC6. An edible aerial mycelium having at least two of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC7. An edible aerial mycelium having at least three of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC8. An edible aerial mycelium having at least four of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC9. A manufactured edible aerial mycelium having at least one of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC10. A manufactured edible aerial mycelium having at least two of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC11. A manufactured edible aerial mycelium having at least three of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC12. A manufactured edible aerial mycelium having at least four of the following physical characteristics: a mean thickness of at least about 10 mm; a moisture content of at least about 80% (w/w); a mean native density within a range of about 1 to about 45 pounds per cubic foot (pcf); a Kramer shear force of no greater than about 15 kg/g; and a mean hyphal width of at most about 20 microns, at most about 15 microns, or within a range of about 0.2 to about 15 microns.

CC13. A method of using an edible aerial mycelium to form a foodstuff, comprising combining the aerial mycelium with at least one additive; thereby forming a foodstuff.

CC14. The method of embodiment CC13, wherein the additive is a fat, a protein, an amino acid, a flavorant, an aromatic agent, a mineral, a vitamin, a micronutrient, a colorant or a preservative; or a combination thereof.

CC15. The method of embodiment CC13 or CC15, wherein the foodstuff is a whole-muscle meat alternative, a seafood alternative, a poultry alternative or a carbohydrate-based food alternative.

CC16. The method of embodiment CC13 or CC15, wherein the foodstuff is a bacon alternative, a jerky alternative, a deli meat alternative, a steak alternative, a chicken alternative, a chicken nugget alternative, a fish filet alternative, a shellfish alternative, a clam alternative, an oyster alternative, a scallop alternative, a shrimp alternative, a smoked salmon alternative, a pulled pork alternative, a cheese alternative, a convenience food, a snack food, a pasta, a confection, a bread or a baked good.

CC17. The method of embodiment CC13 or CC15, wherein the foodstuff is a mycelium-based bacon product.

D1. An edible mycelium-based product comprising an edible aerial mycelium, wherein the edible aerial mycelium has at least two of the following properties:
  i. a mean native density of at least about 1 pcf;
  ii. a native moisture content of at least about 80% (w/w);
  iii. a native Kramer shear force in a dimension substantially parallel to the direction of aerial mycelial growth within a range of about 1.5 kilogram per gram (kg/g) of aerial mycelium to about 5.5 kg/g of aerial mycelium;
  iv. a native Kramer shear force in a dimension substantially perpendicular to the direction of aerial mycelial growth within a range of about 2.5 kg/g to about 9 kg/g of aerial mycelium;
  v. a native ultimate tensile strength in a dimension substantially parallel to the direction of aerial mycelial growth within a range of about 0.5 psi to about 1.6 psi;
  vi. a native ultimate tensile strength in a dimension substantially perpendicular to the direction of aerial mycelial growth within a range of about 0.3 psi to about 0.5 psi;
  vii. a native ultimate tensile strength in a dimension substantially parallel to the direction of aerial mycelial growth, and a native ultimate tensile strength in a dimension substantially perpendicular to the direction of aerial mycelial growth, in a ratio of about 2:1, about 2.5:1, about 3:1, about 3.5:1 or about 4:1;
  viii. a native compressive modulus at 10% strain of no greater than about 10 psi; and
  ix. a native thickness of at least about 20 mm over at least about 80% of the aerial mycelium; wherein the edible aerial mycelium does not contain a fruiting body.

D2. An edible mycelium-based product comprising an edible aerial mycelium, wherein the edible aerial mycelium has at least three of the following properties:
  i. a mean native density of at least about 1 pcf;
  ii. a native moisture content of at least about 80% (w/w);
  iii. a native Kramer shear force in a dimension substantially parallel to the direction of aerial mycelial growth within a range of about 1.5 kilogram per gram (kg/g) of aerial mycelium to about 5.5 kg/g of aerial mycelium;
  iv. a native Kramer shear force in a dimension substantially perpendicular to the direction of aerial mycelial growth within a range of about 2.5 kg/g to about 9 kg/g of aerial mycelium;
  v. a native ultimate tensile strength in a dimension substantially parallel to the direction of aerial mycelial growth within a range of about 0.5 psi to about 1.6 psi;
  vi. a native ultimate tensile strength in a dimension substantially perpendicular to the direction of aerial mycelial growth within a range of about 0.3 psi to about 0.5 psi;
  vii. a native ultimate tensile strength in a dimension substantially parallel to the direction of aerial mycelial growth, and a native ultimate tensile strength in a dimension substantially perpendicular to the direction of aerial mycelial growth, in a ratio of about 2:1, about 2.5:1, about 3:1, about 3.5:1 or about 4:1;
  viii. a native compressive modulus at 10% strain of no greater than about 10 psi; and
  ix. a native thickness of at least about 20 mm over at least about 80% of the aerial mycelium; wherein the edible aerial mycelium does not contain a fruiting body.

D3. An edible mycelium-based product comprising an edible aerial mycelium, wherein the edible aerial mycelium has at least four of the following properties:
  i. a mean native density of at least about 1 pcf;
  ii. a native moisture content of at least about 80% (w/w);
  iii. a native Kramer shear force in a dimension substantially parallel to the direction of aerial mycelial growth within a range of about 1.5 kilogram per gram (kg/g) of aerial mycelium to about 5.5 kg/g of aerial mycelium;
  iv. a native Kramer shear force in a dimension substantially perpendicular to the direction of aerial mycelial growth within a range of about 2.5 kg/g to about 9 kg/g of aerial mycelium;
  v. a native ultimate tensile strength in a dimension substantially parallel to the direction of aerial mycelial growth within a range of about 0.5 psi to about 1.6 psi;
  vi. a native ultimate tensile strength in a dimension substantially perpendicular to the direction of aerial mycelial growth within a range of about 0.3 psi to about 0.5 psi;
  vii. a native ultimate tensile strength in a dimension substantially parallel to the direction of aerial mycelial growth, and a native ultimate tensile strength in a dimension substantially perpendicular to the direction of aerial mycelial growth, in a ratio of about 2:1, about 2.5:1, about 3:1, about 3.5:1 or about 4:1;
  viii. a native compressive modulus at 10% strain of no greater than about 10 psi; and
  ix. a native thickness of at least about 20 mm over at least about 80% of the aerial mycelium;
  wherein the edible aerial mycelium does not contain a fruiting body.

D4. An edible mycelium-based product comprising an edible aerial mycelium, wherein the edible aerial mycelium has at least five, at least six, at least seven, at least eight, or has each and every one of the following properties:
  i. a mean native density of at least about 1 pcf;
  ii. a native moisture content of at least about 80% (w/w);
  iii. a native Kramer shear force in a dimension substantially parallel to the direction of aerial mycelial growth within a range of about 1.5 kilogram per gram (kg/g) of aerial mycelium to about 5.5 kg/g of aerial mycelium;
  iv. a native Kramer shear force in a dimension substantially perpendicular to the direction of aerial mycelial growth within a range of about 2.5 kg/g to about 9 kg/g of aerial mycelium;
  v. a native ultimate tensile strength in a dimension substantially parallel to the direction of aerial mycelial growth within a range of about 0.5 psi to about 1.6 psi;
  vi. a native ultimate tensile strength in a dimension substantially perpendicular to the direction of aerial mycelial growth within a range of about 0.3 psi to about 0.5 psi;
  vii. a native ultimate tensile strength in a dimension substantially parallel to the direction of aerial mycelial growth, and a native ultimate tensile strength in a dimension substantially perpendicular to the direction of aerial mycelial growth, in a ratio of about 2:1, about 2.5:1, about 3:1, about 3.5:1 or about 4:1;
  viii. a native compressive modulus at 10% strain of no greater than about 10 psi; and
  ix. a native thickness of at least about 20 mm over at least about 80% of the aerial mycelium;
  wherein the edible aerial mycelium does not contain a fruiting body.

D5. The edible mycelium-based product of any one of embodiments D1 to D4, wherein the edible aerial mycelial mean native density is within a range of about 1 pcf to about 15 pcf.

D6. The edible mycelium-based product of any one of embodiments D1 to D4, wherein the edible aerial mycelial mean native density is within a range of about 1 pcf to about 10 pcf.

D7. The edible mycelium-based product of embodiment D5 or D6, wherein the edible aerial mycelial mean native density is at least about 2 pcf, or is at least about 3 pcf.

D8. The edible mycelium-based product of any one of embodiments D1 to D4, wherein the edible aerial mycelial mean native density is within a range of about 3 pcf to about 6 pcf.

D9. The edible mycelium-based product of any one of embodiments D1 to D8, wherein the edible aerial mycelial native thickness is at least about 20 mm over at least about 90% of the aerial mycelium.

D10. The edible mycelium-based product of any one of embodiments D1 to D8, wherein the edible aerial mycelial native thickness is at least about 30 mm over at least about 80% of the aerial mycelium.

D11. The edible mycelium-based product of any one of embodiments D1 to D8, wherein the edible aerial mycelial native thickness is at least about 30 mm over at least about 90% of the aerial mycelium.

D12. The edible mycelium-based product of any one of embodiments D1 to D11, wherein the edible aerial mycelial native moisture content is at least about 90% (w/w).

D13. The edible mycelium-based product of any one of embodiments D1 to D12, wherein the ratio of the native ultimate tensile strength in the dimension substantially parallel to the direction of aerial mycelial growth, to the native ultimate tensile strength in the dimension substantially perpendicular to the direction of aerial mycelial growth, is about 3:1.

D14. The edible mycelium-based product of any one of embodiments D1 to D13, wherein the edible aerial mycelium exhibits a Kramer shear force in a dimension substantially parallel to the direction of aerial mycelial growth within a range of about 50 kg/g to about 120 kg/g after oven drying the edible aerial mycelium.

D15. The edible mycelium-based product of any one of embodiments D1 to D14, wherein the edible aerial mycelial native compressive modulus is within a range of about 0.58 psi to about 0.62 psi.

D16. The edible mycelium-based product of any one of embodiments D1 to D15, wherein the edible aerial mycelium has a native compressive stress at 10% compression within a range of about 0.05 psi to about 0.15 psi, or within a range of about 0.08 psi to about 0.13 psi.

D17. The edible mycelium-based product of any one of embodiments D1 to D16, wherein the edible aerial mycelium has a native protein content within a range of about 20% to about 50% (w/w), about 21% to about 49% (w/w), about 22% to about 48% (w/w), about 23% to about 47%, about 24% to about 46% (w/w), about 25% to about 45% (w/w), about 26% to about 44% (w/w), about 27% to about 43% (w/w) or about 28% to about 42% (w/w), on a dry weight basis.

D18. The edible mycelium-based product of any one of embodiments D1 to D17, wherein the edible aerial mycelium has a native potassium content of at least about 4000 mg per 100 grams of dry aerial mycelium.

D19. The edible mycelium-based product of embodiment D18, wherein the native potassium content is within a range of about 4000 mg to about 7000 mg potassium per 100 g dry aerial mycelium.

D20. The edible mycelium-based product of any one of embodiments D1 to D19, wherein the edible aerial mycelium has a native fat content of at most about 7% (w/w), or at most about 6% (w/w), on a dry weight basis.

D21. The edible mycelium-based product of any one of embodiments D1 to D20, wherein the edible aerial mycelium has a native carbohydrate content within a range of about 30% (w/w) to about 60% (w/w), about 35% (w/w) to about 55% (w/w), about 40% (w/w) to about 55% (w/w), about 40% (w/w) to about 50% (w/w), or about 45% (w/w) to about 55% (w/w), on a dry weight basis.

D22. The edible mycelium-based product of any one of embodiments D1 to D21, wherein the edible aerial mycelium has a native inorganic content within a range of about 5% (w/w) to about 20% (w/w), about 6% (w/w) to about 20% (w/w), about 7% (w/w) to about 20% (w/w), about 8% (w/w) to about 20% (w/w), about 9% (w/w) to about 20% (w/w), about 10% (w/w) to about 20% (w/w), or about 9% (w/w) to about 18% (w/w), on a dry weight basis.

D23. The edible mycelium-based product of any one of embodiments D1 to D22, wherein the edible aerial mycelium has a native dietary fiber content within a range of about 15% (w/w) to about 35% (w/w), on a dry weight basis.

D24. The edible mycelium-based product of any one of embodiments D1 to D23, wherein the edible aerial mycelium is white to off-white in color.

D25. The edible mycelium-based product of any one of embodiments D1 to D24, wherein the edible aerial mycelium is a growth product of a fungal species of the genus *Pleurotus*.

D26. The edible mycelium-based product of embodiment D25, wherein the fungal species is *Pleurotus ostreatus*.

D27. The edible mycelium-based product of any one of embodiments D1 to D26, wherein the edible mycelium-based product consists of the edible aerial mycelium.

D28. The edible mycelium-based product of any one of embodiments D1 to D26, wherein the edible aerial mycelium is a food ingredient suitable for use in the manufacture of a food product.

D29. The edible mycelium-based product of embodiment D28, wherein the edible aerial mycelium is a food ingredient for use in the manufacture of a food product.

D30. The edible aerial mycelium-based product of D28 or D29, wherein the food product is a whole-muscle meat alternative, a seafood alternative, a poultry alternative or a carbohydrate-based food alternative.

D31. The edible aerial mycelium-based product of D28 or D29, wherein the food product is a bacon alternative, a jerky alternative, a deli meat alternative, a steak alternative, a chicken alternative, a chicken nugget alternative, a fish filet alternative, a shellfish alternative, a clam alternative, an oyster alternative, a scallop alternative, a shrimp alternative, a smoked salmon alternative, a pulled pork alternative, a cheese alternative, a convenience food, a snack food, a pasta, a confection, a bread or a baked good.

D32. The edible mycelium-based product of any one of embodiments D1 to D26, wherein the edible aerial mycelium is a food ingredient for use in the manufacture of an edible mycelium-based meat alternative product.

D33. The edible mycelium-based product of any one of embodiments D1 to D26, wherein the edible aerial mycelium is a food ingredient suitable for use in the manufacture of an edible mycelium-based bacon product.

D34. The edible mycelium-based product of any one of embodiments D1 to D26, wherein the edible aerial mycelium is a food ingredient for use in the manufacture of an edible mycelium-based bacon product.

D35. The edible mycelium-based product of D1 to D34, wherein the food product is not a minced or extruded product.

E1. A batch of edible aerial mycelial panels, wherein greater than 50% of the edible aerial mycelial panels in the batch have at least two of the following properties:
  i. a mean native density of at least about 1 pcf;
  ii. a native moisture content of at least about 80% (w/w);
  iii. a native Kramer shear force in a dimension substantially parallel to the direction of aerial mycelial growth within a range of about 1.5 kilogram per gram (kg/g) of aerial mycelium to about 5.5 kg/g of aerial mycelium;
  iv. a native Kramer shear force in a dimension substantially perpendicular to the direction of aerial mycelial growth within a range of about 2.5 kg/g to about 9 kg/g of aerial mycelium;
  v. a native ultimate tensile strength in a dimension substantially parallel to the direction of aerial mycelial growth within a range of about 0.5 psi to about 1.6 psi;
  vi. a native ultimate tensile strength in a dimension substantially perpendicular to the direction of aerial mycelial growth within a range of about 0.3 psi to about 0.5 psi;
  vii. a native ultimate tensile strength in a dimension substantially parallel to the direction of aerial mycelial growth, and a native ultimate tensile strength in a dimension substantially perpendicular to the direction of aerial mycelial growth, in a ratio of about 2:1, about 2.5:1, about 3:1, about 3.5:1 or about 4:1;
  viii. a native compressive modulus within a range of about 0.5 psi to about 0.7 psi; and
  ix. a native thickness of at least about 20 mm over at least about 80% of the aerial mycelium;
  wherein the edible aerial mycelium does not contain a fruiting body.

E2. A batch of edible aerial mycelial panels, wherein greater than 50% of the edible aerial mycelial panels in the batch have at least three of the following properties:
i. a mean native density of at least about 1 pcf;
ii. a native moisture content of at least about 80% (w/w);
iii. a native Kramer shear force in a dimension substantially parallel to the direction of aerial mycelial growth within a range of about 1.5 kilogram per gram (kg/g) of aerial mycelium to about 5.5 kg/g of aerial mycelium;
iv. a native Kramer shear force in a dimension substantially perpendicular to the direction of aerial mycelial growth within a range of about 2.5 kg/g to about 9 kg/g of aerial mycelium;
v. a native ultimate tensile strength in a dimension substantially parallel to the direction of aerial mycelial growth within a range of about 0.5 psi to about 1.6 psi;
vi. a native ultimate tensile strength in a dimension substantially perpendicular to the direction of aerial mycelial growth within a range of about 0.3 psi to about 0.5 psi;
vii. a native ultimate tensile strength in a dimension substantially parallel to the direction of aerial mycelial growth, and a native ultimate tensile strength in a dimension substantially perpendicular to the direction of aerial mycelial growth, in a ratio of about 2:1, about 2.5:1, about 3:1, about 3.5:1 or about 4:1;
viii. a native compressive modulus within a range of about 0.5 psi to about 0.7 psi; and
ix. a native thickness of at least about 20 mm over at least about 80% of the aerial mycelium;
wherein the edible aerial mycelium does not contain a fruiting body.

E3. A batch of edible aerial mycelial panels, wherein greater than 50% of the edible aerial mycelial panels in the batch have at least four of the following properties:
i. a mean native density of at least about 1 pcf;
ii. a native moisture content of at least about 80% (w/w);
iii. a native Kramer shear force in a dimension substantially parallel to the direction of aerial mycelial growth within a range of about 1.5 kilogram per gram (kg/g) of aerial mycelium to about 5.5 kg/g of aerial mycelium;
iv. a native Kramer shear force in a dimension substantially perpendicular to the direction of aerial mycelial growth within a range of about 2.5 kg/g to about 9 kg/g of aerial mycelium;
v. a native ultimate tensile strength in a dimension substantially parallel to the direction of aerial mycelial growth within a range of about 0.5 psi to about 1.6 psi;
vi. a native ultimate tensile strength in a dimension substantially perpendicular to the direction of aerial mycelial growth within a range of about 0.3 psi to about 0.5 psi;
vii. a native ultimate tensile strength in a dimension substantially parallel to the direction of aerial mycelial growth, and a native ultimate tensile strength in a dimension substantially perpendicular to the direction of aerial mycelial growth, in a ratio of about 2:1, about 2.5:1, about 3:1, about 3.5:1 or about 4:1;
viii. a native compressive modulus within a range of about 0.5 psi to about 0.7 psi; and
ix. a native thickness of at least about 20 mm over at least about 80% of the aerial mycelium;
wherein the edible aerial mycelium does not contain a fruiting body.

E4. A batch of edible aerial mycelial panels, wherein greater than 50% of the edible aerial mycelial panels in the batch have at least five of the following properties:
i. a mean native density of at least about 1 pcf;
ii. a native moisture content of at least about 80% (w/w);
iii. a native Kramer shear force in a dimension substantially parallel to the direction of aerial mycelial growth within a range of about 1.5 kilogram per gram (kg/g) of aerial mycelium to about 5.5 kg/g of aerial mycelium;
iv. a native Kramer shear force in a dimension substantially perpendicular to the direction of aerial mycelial growth within a range of about 2.5 kg/g to about 9 kg/g of aerial mycelium;
v. a native ultimate tensile strength in a dimension substantially parallel to the direction of aerial mycelial growth within a range of about 0.5 psi to about 1.6 psi;
vi. a native ultimate tensile strength in a dimension substantially perpendicular to the direction of aerial mycelial growth within a range of about 0.3 psi to about 0.5 psi;
vii. a native ultimate tensile strength in a dimension substantially parallel to the direction of aerial mycelial growth, and a native ultimate tensile strength in a dimension substantially perpendicular to the direction of aerial mycelial growth, in a ratio of about 2:1, about 2.5:1, about 3:1, about 3.5:1 or about 4:1;
viii. a native compressive modulus within a range of about 0.5 psi to about 0.7 psi; and
ix. a native thickness of at least about 20 mm over at least about 80% of the aerial mycelium;
wherein the edible aerial mycelium does not contain a fruiting body.

E5. The batch of edible aerial mycelial panels of any one of embodiments E1 to E4, wherein the edible aerial mycelial panel mean native density is within a range of about 1 pcf to about 15 pcf.

E6. The batch of edible aerial mycelial panels of any one of embodiments E1 to E4, wherein the edible aerial mycelial panel mean native density is within a range of about 1 pcf to about 10 pcf.

E7. The batch of edible aerial mycelial panels of embodiment E5, wherein the edible aerial mycelial panel mean native density is at least about 2 pcf, or is at least about 3 pcf.

E8. The batch of edible aerial mycelial panels of any one of embodiments E1 to E4, wherein the edible aerial mycelial panel mean native density is within a range of about 3 pcf to about 6 pcf.

E9. The batch of edible aerial mycelial panels of any one of embodiments E1 to E8, wherein the edible aerial mycelial panel native thickness is at least about 20 mm over at least about 90% of the aerial mycelium.

E10. The batch of edible aerial mycelial panels of any one of embodiments E1 to E8, wherein the edible aerial mycelial panel native thickness is at least about 30 mm over at least about 80% of the aerial mycelium.

E11. The batch of edible aerial mycelial panels of any one of embodiments E1 to E8, wherein the edible aerial mycelial panel native thickness is at least about 30 mm over at least about 90% of the aerial mycelium.

E12. The batch of edible aerial mycelial panels of any one of embodiments E1 to E11, wherein the edible aerial mycelial panel native moisture content is at least about 90% (w/w).

E13. The batch of edible aerial mycelial panels of any one of embodiments E1 to E12, wherein the ratio of the native ultimate tensile strength in the dimension substantially parallel to the direction of aerial mycelial growth, to the native ultimate tensile strength in the dimension substantially perpendicular to the direction of aerial mycelial growth, is about 3:1.

E14. The batch of edible aerial mycelial panels of any one of embodiments E1 to E13, wherein the edible aerial mycelial panel has the following additional property: a Kramer shear force in a dimension substantially parallel to the direction of aerial mycelial growth within a range of about 50 kg/g to about 120 kg/g after oven drying the edible aerial mycelial panel.

E15. The batch of edible aerial mycelial panels of any one of embodiments E1 to E14, wherein the edible aerial mycelial panel native compressive modulus is within a range of about 0.58 psi to about 0.62 psi.

E16. The batch of edible aerial mycelial panels of any one of embodiments E1 to E15, wherein the edible aerial mycelial panel has the following additional property: a native compressive stress at 10% compression within a range of about 0.05 psi to about 0.15 psi, or within a range of about 0.08 psi to about 0.13 psi.

E17. The batch of edible aerial mycelial panels of any one of embodiments E1 to E16, wherein the edible aerial mycelial panel has the following additional property: a native protein content within a range of about 20% to about 50% (w/w), about 21% to about 49% (w/w), about 22% to about 48% (w/w), about 23% to about 47%, about 24% to about 46% (w/w), about 25% to about 45% (w/w), about 26% to about 44% (w/w), about 27% to about 43% (w/w) or about 28% to about 42% (w/w), on a dry weight basis.

E18. The batch of edible aerial mycelial panels of any one of embodiments E1 to E17, wherein the edible aerial mycelial panel has the following additional property: a native potassium content of at least about 4000 mg per 100 grams of dry aerial mycelium.

E19. The batch of edible aerial mycelial panels of embodiment E18, wherein the native potassium content is within a range of about 4000 mg to about 7000 mg potassium per 100 g dry aerial mycelium.

E20. The batch of edible aerial mycelial panels of any one of embodiments E1 to E19, wherein the edible aerial mycelial panel has the following additional property: a native fat content of at most about 7% (w/w), or at most about 6% (w/w), on a dry weight basis.

E21. The batch of edible aerial mycelial panels of any one of embodiments E1 to E20, wherein the edible aerial mycelial panel has the following additional property: a native carbohydrate content within a range of about 30% (w/w) to about 60% (w/w), about 35% (w/w) to about 55% (w/w), about 40% (w/w) to about 55% (w/w), about 40% (w/w) to about 50% (w/w), or about 45% (w/w) to about 55% (w/w), on a dry weight basis.

E22. The batch of edible aerial mycelial panels of any one of embodiments E1 to E21, wherein the edible aerial mycelial panel has the following additional property: a native inorganic content within a range of about 5% (w/w) to about 20% (w/w), about 6% (w/w) to about 20% (w/w), about 7% (w/w) to about 20% (w/w), about 8% (w/w) to about 20% (w/w), about 9% (w/w) to about 20% (w/w), about 10% (w/w) to about 20% (w/w), or about 9% (w/w) to about 18% (w/w), on a dry weight basis.

E23. The batch of edible aerial mycelial panels of any one of embodiments E1 to E22, wherein the edible aerial mycelial panel has the following additional property: a native dietary fiber content within a range of about 15% (w/w) to about 35% (w/w), on a dry weight basis.

E24. The batch of edible aerial mycelial panels of any one of embodiments E1 to E23, wherein the edible aerial mycelial panel has the following additional property: being white to off-white in color.

E25. The batch of edible aerial mycelial panels of any one of embodiments E1 to E24, wherein each edible aerial mycelial panel in the batch is a growth product of a fungal species of the genus *Pleurotus*.

E26. The batch of edible aerial mycelial panels of embodiment E25, wherein the fungal species is *Pleurotus ostreatus*.

E27. The batch of edible aerial mycelial panels of any one of embodiments E1 to E26, wherein at least 75% of the edible aerial mycelial panels in the batch have at least two, at least three, at least four or at least five of said properties.

E28. The batch of edible aerial mycelial panels of any one of embodiments E1 to E27, wherein the edible aerial mycelial panel is a food ingredient suitable for use in the manufacture of an edible mycelium-based meat alternative product.

E29. The batch of edible aerial mycelial panels of any one of embodiments E1 to E27, wherein the edible aerial mycelial panel is a food ingredient for use in the manufacture of an edible mycelium-based meat alternative product.

E30. The batch of edible aerial mycelial panels of any one of embodiments E1 to E27, wherein the edible aerial mycelial panel is a food ingredient suitable for use in the manufacture of an edible mycelium-based bacon product.

E31. The batch of edible aerial mycelial panels of any one of embodiments E1 to E27, wherein the edible aerial mycelial panel is a food ingredient for use in the manufacture of an edible mycelium-based bacon product.

E32. The batch of edible aerial mycelial panels of any one of embodiments E1 to E31, wherein the batch is a quantity of at least ten edible aerial mycelial panels.

E33. The batch of edible aerial mycelial panels of any one of embodiments E1 to E32, wherein the batch quantity is at most about 100 edible aerial mycelial panels.

F1. A method of processing an edible aerial mycelium, comprising:
  (a) providing a panel comprising an edible aerial mycelium, wherein the edible aerial mycelium is characterized as having a direction of mycelial growth along a first axis;
  (b) performing a physical method comprising:
  compressing the panel in a compressing direction which is substantially non-parallel with respect to the first axis to form a compressed panel;
  optionally, sectioning the compressed panel to form at least one compressed section;
  cutting the compressed panel, or optionally the at least one compressed section, in a cutting direction which is substantially parallel to the first axis to form at least one compressed strip; and
  optionally, perforating the at least one compressed strip to form at least one perforated strip;
  (c) boiling the at least one compressed strip, or optionally the at least one perforated strip, in a first aqueous saline solution to form at least one boiled strip;
  (d) brining the at least one boiled strip to provide at least one brined strip;
  (e) drying the at least one brined strip to provide at least one dried strip; and
  (f) adding fat to the at least one dried strip to provide at least one fattened strip.

F2. The method of F1, wherein the compressing comprises compressing the panel to about 15% to about 75% of the original panel length or width.

F3. The method of F2, wherein the compressing comprises compressing the panel to about 30% to about 40% of the original panel length or width.

F4. The method of any one of F1 to F3, wherein the compressing direction is within a range of greater than 45 degrees and less than 135 degrees, or greater than about 70 degrees and less than about 110 degrees, with respect to the first axis.

F5. The method of any one of F1 to F3, wherein the compressing direction is substantially orthogonal to the first axis.

F6. The method of any one of F1 to F5, wherein the cutting direction is within a range of plus or minus about 45 degrees with respect to the first axis, or is within a range of plus or minus about 30 degrees with respect to the first axis.

F7. The method of any one of F1 to F6, wherein the method further comprises sectioning the compressed panel to form at least one compressed section.

F8. The method of F7, wherein the sectioning comprises cutting the panel in the cutting direction to form the at least one compressed section.

F9. The method of any of F1 to F8, wherein the physical method comprises perforating the at least one compressed strip to form the at least one perforated strip.

F10. The method of F9, wherein the perforating comprises needling.

F11. The method of F10, wherein needling comprise inserting at least one needle into the outer surface of the at least one compressed strip.

F12. The method of F11, wherein the at least one needle is straight or barbed.

F13. The method of F10, F11 or F12, wherein the needling comprises inserting the at least one needle through entirely through the mycelial tissue of the at least one compressed strip.

F14. The method of any one of F1 to F13, wherein perforating the at least one compressed strip comprises a first perforation step forming a first perforation pattern, and a second perforation step forming a second perforation pattern.

F15. The method of F14, wherein at least one of the density, intensity and shape of the first perforation pattern is different from the density, intensity and shape of the second perforation pattern.

F16. The method of any one of F9 to F15, wherein the at least one edible strip comprises a plurality of strips stacked relative to each other.

F17. The method of any one of F1 to F16, wherein the first aqueous saline solution has a salt concentration within a range of about 0.1% (w/w) to about 26% (w/w), about 0.1% to about 15% (w/w), about 0.5% to about 10% (w/w), about 0.5% to about 5% (w/w) or about 1% to about 3%.

F18. The method of any one of F1 to F17, wherein the first aqueous saline solution further comprises at least one an additive.

F19. The method of any one of F1 to F18, wherein the brining comprises treating the at least one boiled strip with a brine fluid to provide the at least one brined strip.

F20. The method of F19, wherein the brine fluid is a second aqueous saline solution having a salt concentration within a range of about 0.1% (w/w) to about 26% (w/w), about 0.1% to about 15% (w/w), about 0.5% to about 10% (w/w), about 0.5% to about 5% (w/w) or about 1% to about 3%.

F21. The method of F19 or F20, wherein the brine fluid further comprises at least one additive.

F22. The method of F21, wherein the at least one additive is a flavorant, a colorant, or both.

F23. The method of any one of F19 to F22, wherein the brine fluid comprises a smoke flavorant, umami, maple, a salt, a sweetener, a spice, or a combination of any two or more of the foregoing.

F24. The method of any one of F19 to F23, wherein the brining comprises submerging the at least one boiled strip in the brine fluid.

F25. The method of any one of F19 to F24, wherein the brining further comprises simmering the at least one boiled strip in the brine fluid.

F26. The method of any one of F19 to F25, further comprising removing the at least one brined strip from the brine fluid.

F27. The method of F1 to F26, wherein the drying comprises heating the at least one brined strip.

F28. The method of any one of F1 to F27, wherein the method further comprises cooling the at least one fattened strip.

F29. The method of F28, wherein the cooling comprises cooling the at least one fattened strip until the fat is solidified.

F30. The method of F28 or F29, wherein the cooling comprises refrigerating the at least one fattened strip.

F31. The method of F28, F29 or F30, wherein the method provides at least one finished edible strip.

F32. The method of F1 to F31, further comprising packaging the at least one strip.

F33. The method of F1 to F32, wherein each said at least one strip is a plurality of strips.

F34. The method of F1 to F33, wherein the panel is characterized as having a mean native thickness of at least about 20 mm, at least about 30 mm, at least about 40 mm or at least about 50 mm.

F35. The method of any one of F1 to F34, wherein the edible aerial mycelium is the edible aerial mycelium of the present disclosure.

F36. The method of F1 to F35, wherein the panel consists essentially of the edible aerial mycelium.

F37. The method of F1 to F35, wherein the panel consists of the edible aerial mycelium.

F38. The method of F1 to F37, wherein the fat is almond oil, animal fat, avocado oil, butter, canola oil, coconut oil, corn oil, grapeseed oil, hempseed oil, lard, mustard oil, olive oil, palm oil, peanut oil, rice bran oil, safflower oil, soybean oil, sunflower seed oil, vegetable oil, vegetable shortening or animal fat; or a combination thereof.

F39. The method of F1 to F38, wherein the fat further comprises a colorant, flavorant, or both.

F40. The method of F39, wherein the flavorant is umami, maple, a salt, a sweetener, a spice, or a combination of any two or more of the foregoing.

G1. A method of making an aerial mycelium, comprising:
providing a growth matrix comprising a substrate and a fungus;
incubating the growth matrix as a solid-state culture in a growth environment for an incubation time period; and
introducing aqueous mist into the growth environment throughout the incubation time period, or a portion thereof, wherein the aqueous mist has a mist deposition rate and a mean mist deposition rate, wherein the mean mist deposition rate is less than or equal to about 10 microliter/cm2/hour,
thereby producing extra-particle aerial mycelial growth from the growth matrix;

wherein:
the growth matrix comprises the substrate and a fungal inoculum, said fungal inoculum comprising said fungus; or
the growth matrix comprises a colonized substrate, said colonized substrate comprising the substrate, wherein said substrate is previously colonized with mycelium of said fungus.

G2. The method of G1, wherein:
the growth environment comprises a growth atmosphere having a relative humidity, an oxygen (O2) content and a carbon dioxide (CO2) content, wherein the CO2 content is at least about 0.02% (v/v) and is less than about 8% (v/v);
the mist deposition rate is less than or equal to about 150 microliter/cm2/hour; and the mean mist deposition rate is less than or equal to about 5 microliter/cm2/hour.

G3. The method of G1 or G2, further comprising removing the extra-particle aerial mycelial growth from the growth matrix, thereby providing an aerial mycelium.

G4. The method of G3, wherein the aerial mycelium is an aerial mycelium that does not contain a visible fruiting body.

G5. The method of any one of G1 to G4, wherein introducing aqueous mist into the growth environment comprises introducing the aqueous mist into the growth environment throughout the incubation time period.

G6. The method of any one of G1 to G4, wherein introducing aqueous mist comprises introducing the aqueous mist into the growth environment throughout a portion of the incubation time period, wherein the portion of the incubation time period comprises a mycelial vertical expansion phase.

G7. The method of any one of G1 to G6, wherein introducing the aqueous mist into the growth environment comprises depositing the aqueous mist onto the growth matrix, the extra-particle aerial mycelial growth, or both.

G8. The method of any one G1 to G7, wherein the mist deposition rate is less than about 50 microliter/cm2/hour, or is less than about 25 microliter/cm2/hour.

G9. The method of G8, wherein the mist deposition rate is less than about 10 microliter/cm2/hour.

G10. The method of any one of G1 to G9, wherein the CO2 content is within a range of about 0.2% (v/v) to about 7% (v/v).

G11. The method of any one of G1 to G10, wherein the CO2 content is at least about 2% (v/v).

G12. The method of any one of G1 to G10, wherein the CO2 content is less than about 3% (v/v).

G13. The method of any one of G1 to G12, wherein the O2 content is within a range of about 14% (v/v) to about 21% (v/v).

G14. The method of any one of G1 to G13, wherein the relative humidity is at least about 95%, is at least about 96%, is at least about 97%, is at least about 98%, is at least about 99%, or is about 100%.

G15. The method of any one of G1 to G14, wherein the incubation time period is up to about 3 weeks.

G16. The method of G15, wherein the incubation time period is within a range of about 4 days to about 17 days.

G17. The method of any one of G1 to G16, wherein introducing aqueous mist comprises introducing aqueous mist into the growth environment throughout a portion of the incubation time period, wherein the portion of the incubation time period begins during a second day, a third day or a fourth day of the incubation time period.

G18. The method of any one of G1 to G17, wherein introducing aqueous mist excludes introducing the aqueous mist into the growth environment during a primary myceliation phase.

G19. The method of any one of G1 to G18, wherein the growth environment is a dark environment.

G20. The method of any one of G1 to G19, wherein the growth environment has a temperature within a range of about 55° F. to about 100° F., or within a range of about 60° F. to about 95° F.

G21. The method of G20, wherein the growth environment temperature is within a range of about 60° F. to about 75° F., is within a range of about 65° F. to about 75° F., or is within a range of about 65° F. to about 70° F.

G22. The method of any one of G1 to G21, wherein the growth environment further comprises an airflow.

G23. The method of any one of G1 to G22, further comprising directing an airflow through the growth environment.

G24. The method of G22 or G23, wherein the airflow is a substantially horizontal airflow.

G25. The method of G24, wherein the substantially horizontal airflow has a velocity of no greater than about 125 linear feet per minute, has a velocity of no greater than about 110 linear feet per minute, has a velocity of no greater than about 100 linear feet per minute, or has a velocity of no greater than about 90 linear feet per minute.

G26. The method of any one of G1 to G25, wherein the mist deposition rate is less than about 5 microliter/cm2/hour, is less than about 4 microliter/cm2/hour, is less than about 3 microliter/cm2/hour, is less than about 2 microliter/cm2/hour, or is less than about 1 microliter/cm2/hour.

G27. The method of G1 to G26, wherein the mean mist deposition rate is less than or equal to about 3 microliter/cm2/hour.

G28. The method of any one of G1 to G27, wherein the mist deposition rate is less than about 2 microliter/cm2/hour, the mean mist deposition rate is less than or equal to about 1 microliter/cm2/hour, or both.

G29. The method of any one of G1 to G28, wherein the mean mist deposition rate is at least about 0.01 microliter/cm2/hour.

G30. The method of any one of G1 to G29, wherein the mist deposition rate is less than about 1 microliter/cm2/hour, the mean mist deposition rate is less than or equal to about 0.8 microliter/cm2/hour, or both.

G31. The method of any one of G1 to G30, wherein the mist deposition rate is at most about 10-fold greater than the mean mist deposition rate, is at most about 5-fold greater than the mean mist deposition rate, or is at most about 4-fold greater than the mean mist deposition rate.

G32. The method of any one of embodiments G1 to G31, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces, Wolfiporia, Ceriporiopsis, Chlorociboria, Daedalea, Daedaleopsis, Daldinia, Ganoderma, Hypoxylon, Inonotus, Lenzites, Omphalotus, Oxyporus, Phanerochaete, Phellinus, Polyporellus, Porodaedalea, Pycnoporus, Scytalidium, Stereum, Trametes* or *Xylaria*.

G33. The method of embodiment G32, wherein the fungus is a species of the genus *Bondarzewia, Ceriporiopsis,*

*Daedalea, Daedaleopsis, Fomitopsis, Ganoderma, Inonotus, Lenzites, Omphalotus, Oxyporus, Phellinus, Polyporellus, Polyporus, Porodaedalea, Pycnoporus, Stereum, Trametes* or *Xylaria*.

G34. The method of embodiment G32, wherein the fungus is selected from the group consisting of *Bondarzewia berkleyii, Daedalea quercina, Daedaleopsis* spp., *Daedaleopsis confragosa, Daedaleopsis septentrionalis, Fomitopsis* spp., *Fomitopsis cajanderi, Fomitopsis pinicola, Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Inonotus* spp., *Inonotus obliqus, Inonotus hispidus, Inonotus dryadeus, Inonotus tomentosus, Lenzites betulina, Phellinus* spp., *Phellinus ignarius, Phellinus gilvus, Polyporus* spp., *Polyporus squamosus, Polyporus badius, Polyporus umbellatus, Polyporus squamosus, Polyporus tuberaster, Polyporus arcularius, Polyporus albeolaris, Polyporus radicatus, Porodaedalea pini, Pycnoporus* spp., *Pycnoporus* spp., *Pycnoporus sanguineus, Pycnoporus cinnabarinus, Stereum* spp., *Stereum ostea, Stereum hirsutum, Trametes* spp., *Trametes versicolor, Trametes elegans, Trametes suaveolens, Trametes hirsute, Trametes gibbosa, Trametes ochraceae, Trametes villosa, Trametes cubensis* and *Trametes pubescens*.

G35. The method of embodiment G32, wherein the fungus is a pigment-producing fungus of a genus selected from the group consisting of *Chlorociboria, Daldinia, Hypoxylon, Phanerochaete* and *Scytalidium*.

G36. The method of embodiment G32, wherein the fungus is a species of the genus *Ganoderma* or *Trametes*.

G37. The method of embodiment G36, wherein the fungus is *Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum* or *Ganoderma weberianum*.

G38. The method of embodiment G37, wherein the fungus is *Ganoderma resinaceum*.

G39. The method of embodiment G37, wherein the fungus is *Ganoderma sessile*.

G40. The method of embodiment G37, wherein the fungus is *Ganoderma tsugae*.

G41. The method of any one of G1 to G40, wherein the aqueous mist comprises one or more solutes.

G42. The method of G41, wherein the solute is an additive.

G43. The method of any one of G1 to G42, wherein the substrate is a lignocellulosic substrate.

G44. The method of any one of G1 to G43, wherein the growth matrix comprises a nutrient source, wherein the nutrient source is different than the substrate.

G45. The method of any one of embodiments G1 to G44, wherein the aqueous mist has a conductivity, wherein the conductivity is no greater than about 1,000 microsiemens/cm, no greater than about 800 microsiemens/cm, no greater than about 500 microsiemens/cm, no greater than about 400 microsiemens/cm, or no greater than about 300 microsiemens/cm.

G46. The method of any one of embodiments G1 to G44, wherein the aqueous mist conductivity is less than 300 microsiemens/cm.

G47. The method of any one of embodiments G1 to G44, wherein the aqueous mist conductivity is no greater than about 250 microsiemens/cm, no greater than about 200 microsiemens/cm, no greater than about 150 microsiemens/cm or no greater than about 100 microsiemens/cm.

G48. The method of any one of embodiments G1 to G44, wherein the aqueous mist conductivity is no greater than about 50 microsiemens/cm.

G49. The method of any one of embodiments G1 to G44, wherein the aqueous mist conductivity is no greater than about 25 microsiemens/cm, no greater than about 10 microsiemens/cm, no greater than about 5 microsiemens/cm, or no greater than about 3 microsiemens/cm.

G50. The method of any one of G3 to G49, wherein removing the extra-particle aerial mycelium from the growth matrix comprises removing the extra-particle aerial mycelium from the growth matrix as a single contiguous object.

G51. The method of G50, wherein the single contiguous object comprises a contiguous volume.

G52. The method of G50 or G51, wherein the single contiguous object is characterized as having a contiguous volume of at least about 15 cubic inches.

G53. The method of G52, wherein the single contiguous object is characterized as having a contiguous volume of at least about 150 cubic inches, or at least about 300 cubic inches.

G54. The method of any one of G50 to G53, wherein the single contiguous object is characterized as having a series of linked hyphae over the contiguous volume.

G55. An aerial mycelium obtained from a method of any one G1 to G54.

G56. The aerial mycelium of G55, wherein the aerial mycelium is suitable for use in the manufacture of a petroleum-based product alternative.

G57. The aerial mycelium of G55, wherein the aerial mycelium is for use in the manufacture of a petroleum-based product alternative.

G58. The aerial mycelium of G56 or G57, wherein the petroleum-based product alternative is a foam.

G59. The aerial mycelium of G55, wherein the aerial mycelium is suitable for use in the manufacture of a textile.

G60. The aerial mycelium of G55, wherein the aerial mycelium is for use in the manufacture of a textile.

G61. The aerial mycelium of G59 or G60, wherein the textile is a leather-like material.

GG1. A method of making an edible aerial mycelium, comprising:
  providing a growth matrix comprising a substrate and a fungus;
  incubating the growth matrix as a solid-state culture in a growth environment for an incubation time period; and
  introducing aqueous mist into the growth environment throughout the incubation time period, or a portion thereof, wherein the aqueous mist has a mist deposition rate and a mean mist deposition rate, wherein the mean mist deposition rate is less than or equal to about 10 microliter/cm2/hour, thereby producing extra-particle aerial mycelial growth from the growth matrix;

wherein the growth matrix comprises the substrate and a fungal inoculum, said fungal inoculum comprising said fungus; or wherein the growth matrix comprises a colonized substrate, said colonized substrate comprising the substrate, wherein said substrate is previously colonized with mycelium of said fungus.

GG2. The method of GG1, wherein:

the growth environment comprises a growth atmosphere having a relative humidity, an oxygen (O2) content and a carbon dioxide (CO2) content, wherein the CO2 content is at least about 0.02% (v/v) and is less than about 8% (v/v);

the mist deposition rate is less than or equal to about 150 microliter/cm2/hour; and the mean mist deposition rate is less than or equal to about 5 microliter/cm2/hour.

GG3. The method of GG1 or GG2, further comprising removing the extra-particle aerial mycelial growth from the growth matrix, thereby providing an edible aerial mycelium.

GG4. The method of GG3, wherein the aerial mycelium is an edible aerial mycelium that does not contain a visible fruiting body.

GG5. The method of any one of GG1 to GG4, wherein introducing aqueous mist into the growth environment comprises introducing the aqueous mist into the growth environment throughout the incubation time period.

GG6. The method of any one of GG1 to GG4, wherein introducing aqueous mist comprises introducing the aqueous mist into the growth environment throughout a portion of the incubation time period, wherein the portion of the incubation time period comprises a mycelial vertical expansion phase.

GG7. The method of any one of GG1 to GG6, wherein introducing the aqueous mist into the growth environment comprises depositing the aqueous mist onto the growth matrix, the extra-particle aerial mycelial growth, or both.

GG8. The method of any one GG1 to GG7, wherein the mist deposition rate is less than about 50 microliter/cm2/hour, or is less than about 25 microliter/cm2/hour.

GG9. The method of GG8, wherein the mist deposition rate is less than about 10 microliter/cm2/hour.

GG10. The method of any one of GG1 to GG9, wherein the CO2 content is within a range of about 0.2% (v/v) to about 7% (v/v).

GG11. The method of any one of GG1 to GG10, wherein the CO2 content is at least about 2% (v/v).

GG12. The method of any one of GG1 to GG10, wherein the CO2 content is less than about 3% (v/v).

GG13. The method of any one of GG1 to GG12, wherein the O2 content is within a range of about 14% (v/v) to about 21% (v/v).

GG14. The method of any one of GG1 to GG13, wherein the relative humidity is at least about 95%, is at least about 96%, is at least about 97%, is at least about 98%, is at least about 99%, or is about 100%.

GG15. The method of any one GG1 to GG14, wherein the incubation time period is up to about 3 weeks.

GG16. The method of GG15, wherein the incubation time period is within a range of about 4 days to about 17 days.

GG17. The method of any one of GG1 to GG16, wherein introducing aqueous mist comprises introducing aqueous mist into the growth environment throughout a portion of the incubation time period, wherein the portion of the incubation time period begins during a second day, a third day or a fourth day of the incubation time period.

GG18. The method of any one of GG1 to GG17, wherein introducing aqueous mist excludes introducing the aqueous mist into the growth environment during a primary myceliation phase.

GG19. The method of any one of GG1 to GG18, wherein the growth environment is a dark environment.

GG20. The method of any one of GG1 to GG19, wherein the growth environment has a temperature within a range of about 55° F. to about 100° F., or within a range of about 60° F. to about 95° F.

GG21. The method of GG20, wherein the growth environment temperature is within a range of about 60° F. to about 75° F., is within a range of about 65° F. to about 75° F., or is within a range of about 65° F. to about 70° F.

GG22. The method of any one of GG1 to GG21, wherein the growth environment further comprises an airflow.

GG23. The method of any one of GG1 to GG22, further comprising directing an airflow through the growth environment.

GG24. The method of GG22 or GG23, wherein the airflow is a substantially horizontal airflow.

GG25. The method of GG24, wherein the substantially horizontal airflow has a velocity of no greater than about 125 linear feet per minute, has a velocity of no greater than about 110 linear feet per minute, has a velocity of no greater than about 100 linear feet per minute, or has a velocity of no greater than about 90 linear feet per minute.

GG26. The method of any one of GG1 to GG25, wherein the mist deposition rate is less than about 5 microliter/cm2/hour, is less than about 4 microliter/cm2/hour, is less than about 3 microliter/cm2/hour, is less than about 2 microliter/cm2/hour, or is less than about 1 microliter/cm2/hour.

GG27. The method of GG1 to GG26, wherein the mean mist deposition rate is less than or equal to about 3 microliter/cm2/hour.

GG28. The method of any one of GG1 to GG27, wherein the mist deposition rate is less than about 2 microliter/cm2/hour, the mean mist deposition rate is less than or equal to about 1 microliter/cm2/hour, or both.

GG29. The method of any one of GG1 to GG28, wherein the mean mist deposition rate is at least about 0.01 microliter/cm2/hour.

GG30. The method of any one of GG1 to GG29, wherein the mist deposition rate is less than about 1 microliter/cm2/hour, the mean mist deposition rate is less than or equal to about 0.8 microliter/cm2/hour, or both.

GG31. The method of any one of GG1 to GG30, wherein the mist deposition rate is at most about 10-fold greater than the mean mist deposition rate, is at most about 5-fold greater than the mean mist deposition rate, or is at most about 4-fold greater than the mean mist deposition rate.

GG32. The method of any one of GG1 to GG31, wherein the fungus is not a fungus of the genus *Ganoderma*.

GG33. The method of any one of GG1 to GG32, wherein the fungus is an edible species of the genus *Agrocybe, Albatrellus, Amillaria, Agaricus, Bondarzewia, Cantharellus, Cerioporus, Climacodon, Cordyceps, Fistulina, Flammulina, Fomes, Fomitopsis, Fusarium, Grifola, Herecium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces* or *Wolfiporia*.

GG34. The method of GG33, wherein the fungus is an edible species of the genus *Flammulina, Lentinula, Morchella* or *Pleurotus*.

GG35. The method of GG1 to GG34, wherein the fungus is a species of the genus *Pleurotus*.

GG36. The method of GG35, wherein the fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuber-regium*.

GG37. The method of GG35 or GG36, wherein the fungus is *Pleurotus ostreatus*.

GG38. The method of any one of GG1 to GG37, wherein the aqueous mist comprises one or more solutes.

GG39. The method of GG38, wherein the solute is an additive.

GG40. The method of any one of GG1 to GG39, wherein the substrate is a lignocellulosic substrate.

GG41. The method of any one of GG1 to GG40, wherein the growth matrix comprises a nutrient source, wherein the nutrient source is different than the substrate.

GG42. The method of any one of GG1 to GG41, wherein the aqueous mist has a conductivity of no greater than about 1,000 microsiemens/cm, has a conductivity of no greater than about 800 microsiemens/cm, has a conductivity of no greater than about 500 microsiemens/cm, has a conductivity of no greater than about 100 microsiemens/cm, or has a conductivity of no greater than about 50 microsiemens/cm.

GG43. The method of any one of GG1 to GG42, wherein the aqueous mist has a conductivity of no greater than about 25 microsiemens/cm, has a conductivity of no greater than about 10 microsiemens/cm, has a conductivity of no greater than about 5 microsiemens/cm, or has a conductivity of no greater than about 3 microsiemens/cm.

GG44. The method of any one of GG2 to GG43, wherein removing the extra-particle aerial mycelium from the growth matrix comprises removing the extra-particle aerial mycelium from the growth matrix as a single contiguous object.

GG45. The method of GG44, wherein the single contiguous object comprises a contiguous volume.

GG46. The method of GG44 or GG45, wherein the single contiguous object is characterized as having a contiguous volume of at least about 15 cubic inches.

GG47. The method of GG46, wherein the single contiguous object is characterized as having a contiguous volume of at least about 150 cubic inches, or at least about 300 cubic inches.

GG48. The method of any one of GG44 to GG47, wherein the single contiguous object is characterized as having a series of linked hyphae over the contiguous volume.

GG49. The method of any one of GG1 to GG48, wherein the edible aerial mycelium has a mean native thickness of at least about 20 mm, at least about 30 mm, at least about 40 mm or at least about 50 mm.

GG50. The method of any one of GG1 to GG49, wherein the edible aerial mycelium has a moisture content of at least about 80% (w/w).

GG51. The method of any one of GG1 to GG50, wherein the method further comprises drying the aerial mycelium to provide a dried aerial mycelium having a moisture content of no greater than about 10% (v/v).

GG52. An edible aerial mycelium obtained from a method of any one GG1 to GG51.

GG53. The edible aerial mycelium of GG52, wherein the edible aerial mycelium is suitable for use in the manufacture of a food product.

GG54. The edible aerial mycelium of GG52, wherein the edible aerial mycelium is for use in the manufacture of a food product.

GG55. The edible aerial mycelium of GG53 or GG54, wherein the food product is a mycelium-based food product.

GG56. The edible aerial mycelium of GG55, wherein the mycelium-based food product is a whole muscle meat alternative.

GG57. The edible aerial mycelium of GG55 or GG56, wherein the mycelium-based food product is a mycelium-based bacon product.

GG58. The edible aerial mycelium of GG52, wherein the edible aerial mycelium is a food ingredient.

GG59. The edible aerial mycelium of any one of GG52 to GG58, wherein the aerial mycelium has a mean native density of no greater than about 70 pcf, no greater than about 50 pcf, no greater than about 45 pcf, no greater than about 40 pcf, no greater than about 35 pcf, no greater than about 30 pcf, no greater than about 25 pcf, no greater than about 20 pcf or no greater than about 15 pcf.

GG60. The edible aerial mycelium of any one of GG52 to GG59, wherein the edible aerial mycelium has a mean native density of at least about 1 pound per cubic foot (pcf).

GG61. An edible aerial mycelium, wherein the edible aerial mycelium comprises a growth grain, and wherein the edible aerial mycelium is characterized as having at least two of the following properties:
   i. a mean native density of no greater than about 70 pounds per cubic foot (pcf);
   ii. a native moisture content of at least about 80% (w/w);
   iii. a native Kramer shear force of no greater than about 5 kg/g;
   iv. a native ultimate tensile strength of no greater than about 5 psi;
   v. a native ultimate tensile strength in a dimension substantially parallel to the growth grain and a native ultimate tensile strength in a dimension substantially perpendicular to the growth grain, wherein the native ultimate tensile strength in the dimension substantially parallel to the growth grain is not more than about 5-fold greater than the native ultimate tensile strength in the dimension substantially perpendicular to the growth grain;
   vi. a native compressive modulus at 10% strain of no greater than about 10 psi;
   vii. a native compressive modulus at 10% strain in a dimension substantially parallel to the growth grain and a native compressive modulus at 10% strain in a dimension substantially perpendicular to the growth grain, wherein the native compressive modulus at 10% strain in the dimension substantially parallel to the growth grain is not more than about 20-fold greater than the native compressive modulus at 10% strain in the dimension substantially perpendicular to the growth grain;
   viii. a native compressive stress at 65% strain upon compression in a direction substantially perpendicular to the growth grain of no greater than about 10 psi;
   ix. a mean native thickness of at least about 20 mm;
   wherein the edible aerial mycelium does not contain a fruiting body.

GG62. The edible aerial mycelium of GG61, wherein the edible aerial mycelium is characterized as having at least three of said properties.

GG63. The edible aerial mycelium of GG61, wherein the edible aerial mycelium is characterized as having at least four of said properties.

GG64. The edible aerial mycelium of GG61, wherein the edible aerial mycelium is characterized as having at least five of said properties.

GG65. The edible aerial mycelium of GG61, wherein the edible aerial mycelium is characterized as having at least six of said properties.

GG66. The edible aerial mycelium of GG61, wherein the edible aerial mycelium is characterized as having at least seven of said properties.

GG67. The edible aerial mycelium of GG61, wherein the edible aerial mycelium is characterized as having at least eight of said properties.

GG68. The edible aerial mycelium of GG61, wherein the edible aerial mycelium is characterized as having all nine of said properties.

GG69. The edible aerial mycelium of any one of GG61 to GG68, wherein the edible aerial mycelium has a mean native density of at least about 1 pcf.

GG70. The edible aerial mycelium of any one of GG61 to GG69, wherein the edible aerial mycelium has a native moisture content of at least about 85% (w/w), or at least about 90% (w/w).

GG71. The edible aerial mycelium of any one of GG61 to GG70, wherein the edible aerial mycelium has a native Kramer shear force of no greater than about 3 kg/g.

GG72. The edible aerial mycelium of any one of GG61 to GG71, wherein the edible aerial mycelium has a native ultimate tensile strength of no greater than about 3 psi.

GG73. The edible aerial mycelium of any one of GG61 to GG72, wherein the edible aerial mycelium has a native compressive modulus at 10% strain of no greater than about 5 psi.

GG74. The edible aerial mycelium of any one of GG61 to GG73, wherein the native compressive modulus at 10% strain in the dimension substantially parallel to the growth grain is not more than about 10-fold greater than the native compressive modulus at 10% strain in the dimension substantially perpendicular to the growth grain.

GG75. The edible aerial mycelium of any one of GG61 to GG74, wherein the native compressive modulus at 10% strain in the dimension substantially parallel to the growth grain is at least about 2-fold greater than the native compressive modulus at 10% strain in the dimension substantially perpendicular to the growth grain.

GG76. The edible aerial mycelium of any one of GG61 to GG75, wherein the native compressive stress at 65% strain upon compression in a direction substantially perpendicular to the growth grain is no greater than about 1 psi, or no greater than about 0.5 psi.

GG77. The edible aerial mycelium of any one of GG61 to GG76, wherein the edible aerial mycelium has a mean native density of at least about 2 pcf.

GG78. The edible aerial mycelium of any one of GG61 to GG77, wherein the edible aerial mycelium has a mean native density of no greater than about 50 pcf, no greater than about 45 pcf, no greater than about 40 pcf, no greater than about 35 pcf or no greater than about 30 pcf.

GG79. The edible aerial mycelium of any one of GG61 to GG78, wherein the edible aerial mycelium has a mean native density of no greater than about 25 pcf, no greater than about 20 pcf or no greater than about 15 pcf.

GG80. The edible aerial mycelium of any one of GG61 to GG79, wherein the edible aerial mycelium has a mean native thickness of at least about 30 mm, at least about 40 m or at least about 50 mm.

GG81. The edible aerial mycelium of any one of GG61 to GG80, wherein the edible aerial mycelium has a median native thickness of at least about 30 mm, at least about 40 mm, or at least about 50 mm.

GG82. The edible aerial mycelium of any one of GG61 to GG81, wherein the edible aerial mycelium is a growth product of an edible fungus.

GG83. The edible aerial mycelium of GG82, wherein the edible fungus is a species of the genus *Agrocybe, Albatrellus, Amillaria, Agaricus, Bondarzewia, Cantharellus, Cerioporus, Climacodon, Cordyceps, Fistulina, Flammulina, Fomes, Fomitopsis, Fusarium, Grifola, Herecium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Trametes, Tuber, Tyromyces* or *Wolfiporia*.

GG84. The edible aerial mycelium of GG83, wherein the edible fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuber-regium*.

GG85. The edible aerial mycelium of GG84, wherein the edible fungus is *Pleurotus ostreatus*.

GG86. The edible aerial mycelium of any one of GG61 to GG81, wherein the edible aerial mycelium is not a growth product of a fungus of the genus *Ganoderma*.

GG87. The edible aerial mycelium of any one of GG61 to GG86, wherein the edible aerial mycelium has a native protein content within a range of about 20% to about 50% (w/w) on a dry weight basis.

GG88. The edible aerial mycelium of any one of GG61 to GG87, wherein the edible aerial mycelium has a native potassium content of at least about 4000 mg per 100 grams of dry aerial mycelium.

GG89. The edible aerial mycelium of GG88, wherein the native potassium content is within a range of about 4000 mg to about 7000 mg potassium per 100 g dry aerial mycelium.

GG90. The edible aerial mycelium of any one of GG61 to GG89, wherein the edible aerial mycelium has a native fat content of at most about 7% (w/w) on a dry weight basis.

GG91. The edible aerial mycelium of any one of GG61 to GG90, wherein the edible aerial mycelium has a native carbohydrate content within a range of about 30% (w/w) to about 60% (w/w) on a dry weight basis.

GG92. The edible aerial mycelium of any one of GG61 to GG91, wherein the edible aerial mycelium has a native inorganic content within a range of about 5% (w/w) to about 20% (w/w) on a dry weight basis.

GG93. The edible aerial mycelium of any one of GG61 to GG92, wherein the edible aerial mycelium has a native dietary fiber content within a range of about 15% (w/w) to about 35% (w/w) on a dry weight basis.

GG94. The edible aerial mycelium of any one of GG61 to GG93, wherein the edible aerial mycelium has an open volume of at least about 50% (v/v), at least about 60% (v/v) or at least about 70% (v/v).

GG95. The edible aerial mycelium of any one of GG61 to GG94, wherein the edible aerial mycelium has a mean hyphal width of at most about 20 microns, at most about 15 microns, or within a range of about 0.2 to about 15 microns.

GG96. The edible aerial mycelium of any one of GG61 to GG95, wherein the edible aerial mycelium is suitable for use in the manufacture of a food product.

GG97. The edible aerial mycelium of any one of GG61 to GG95, wherein the edible aerial mycelium is for use in the manufacture of a food product.

GG98. The edible aerial mycelium of GG96 or GG97, wherein the food product is a mycelium-based food product.

GG99. The edible aerial mycelium of GG98, wherein the mycelium-based food product is a whole muscle meat alternative.

GG100. The edible aerial mycelium of GG98 or GG99, wherein the mycelium-based food product is a mycelium-based bacon product.

GG101. An edible product comprising an edible aerial mycelium of any one of GG61 to GG95.

GG102. The edible product of GG101, wherein the edible product further comprises one or more additives.

GG103. The edible product of GG102, wherein the additive is a fat, a protein, an amino acid, a flavorant, an aromatic agent, a mineral, a vitamin, a micronutrient, a colorant or a preservative; or a combination thereof.

GG104. The edible product of GG103, wherein the fat is almond oil, animal fat, avocado oil, butter, canola oil, coconut oil, corn oil, grapeseed oil, hempseed oil, lard, mustard oil, olive oil, palm oil, peanut oil, rice bran oil, safflower oil, soybean oil, sunflower seed oil, vegetable oil, or vegetable shortening; or a combination thereof.

GG105. The edible product of GG104, wherein the fat is a plant-based oil or fat.

GG106. The edible product of GG105, wherein the plant-based oil is coconut oil or avocado oil.

GG107. The edible product of GG103, wherein the flavorant is a smoke flavorant, umami, maple, a salt, a sweetener, a spice, or a meat flavor; or a combination thereof.

GG108. The edible product of GG107, wherein the smoke flavorant is applewood flavor, hickory flavor, liquid smoke flavor, or a combination thereof.

GG109. The edible product of GG107, wherein the salt is sodium chloride, table salt, flaked salt, sea salt, rock salt, kosher salt or Himalayan salt; or a combination thereof.

GG110. The edible product of GG107, wherein the sweetener is sugar, cane sugar, brown sugar, honey, molasses, juice, nectar, or syrup (e.g., maple syrup), saccharin, aspartame, acesulfame potassium, sucralose, neotame, advantame, steviol glycosides, and extracts obtained from Siraitia grosvenorii Swingle fruit; or a combination thereof.

GG111. The edible product of GG107, wherein the spice is paprika, pepper, mustard, garlic, chili, jalapeno or capsaicin; or a combination thereof.

GG112. The edible product of GG103, wherein the colorant is beet extract, beet juice, or paprika; or a combination thereof.

GG113. The edible product of any one of GG101 to GG112, wherein the product contains substantially no amount of an artificial preservative.

GG114. The edible product of any one of GG101 to GG113, wherein the product contains substantially no amount of an artificial colorant.

GG115. The edible product of any one of GG101 to GG114, wherein the edible product is not a ground or minced product.

GG116. The edible product of any one of GG101 to GG115, wherein the edible product is not an extruded product.

GG117. The edible product of any one of GG101 to GG116, wherein the edible product is a food product.

GG118. The edible product of GG117, wherein the food product is a mycelium-based food product.

GG119. The edible product of GG118, wherein the mycelium-based food product is a whole muscle meat alternative.

GG120. The edible product of GG118 or GG119, wherein the mycelium-based food product is a mycelium-based bacon product.

GG121. A method of processing an edible aerial mycelium, comprising:
providing a panel comprising an edible aerial mycelium, wherein the edible aerial mycelium comprises a growth grain;
compressing at least a portion of the panel; and
cutting at least a portion of the panel in a direction substantially parallel to the growth grain.

GG122. The method of GG121, wherein cutting comprises cutting the panel to form at least one panel section.

GG123. The method of GG121 or GG122, wherein cutting comprises cutting at least one of the panel and the panel section to form at least one strip.

GG124. The method of any one of GG121 to GG123, wherein compressing comprises compressing at least one of the panel, the at least one panel section, and the at least one strip in a second direction which is substantially non-parallel with respect to the growth grain.

GG125. The method of GG124, wherein the substantially non-parallel direction is within a range of 45 degrees to 135 degrees with respect to the growth grain.

GG126. The method of GG125, wherein the substantially non-parallel direction is within a range of about 70 degrees to about 110 degrees with respect to the growth grain.

GG127. The method of GG126, wherein the substantially non-parallel direction is substantially orthogonal to the growth grain.

GG128. The method of any one of GG121 to GG127, wherein compressing comprises compressing at least one of the panel, the at least one section and the at least one strip, to about 15% to about 75% of the original panel length or width.

GG129. The method of GG128, wherein compressing comprises compressing at least one of the panel, the at least one section and the at least one strip, to about 30 to about 40% of the original panel length or width.

GG130. The method of any one of GG121 to GG129, wherein the compressing comprises at least one compressing step that occurs before at least one cutting step of the cutting.

GG131. The method of any one of GG121 to GG130, wherein the cutting comprises at least one cutting step that occurs before the at least one compressing step of the compressing.

GG132. The method of any one of GG121 to GG130, wherein:
compressing comprises compressing the panel to form a compressed panel; and cutting comprises cutting the compressed panel to form at least one compressed strip.

GG133. The method of any one of GG121 to GG130, wherein:
compressing comprises compressing the panel to form a compressed panel; and
cutting comprises:
first cutting the compressed panel to form at least one compressed section; and then cutting the at least one compressed section to form at least one compressed strip.

GG134. The method of any one of GG121 to GG131, wherein:
cutting comprises first cutting the panel to form at least one strip; and
compressing comprises compressing the at least one strip to form at least one compressed strip.

GG135. The method of any one of GG121 to GG132, wherein:
cutting comprises cutting the panel to form at least one section;
compressing comprises compressing the at least one section to form at least one compressed section; and
cutting further comprises cutting the at least one compressed section to form at least one compressed strip.

GG136. The method of any one of GG121 to GG132 and GG135, wherein:
cutting comprises first cutting the panel to form at least one section, then cutting the at least one section to form at least one strip; and compressing the at least one strip.

GG137. The method of any one of GG121 to GG136, wherein the compressing comprises applying force to the panel, to the at least one section or to the at least one strip.

GG138. The method of any one of GG121 to GG137, wherein the compressing comprises constraining the panel, the at least one section or the at least one strip during said compression.

GG139. The method of any one of GG121 to GG138, wherein each said panel, at least one section and at least one strip has a volume, and wherein compressing comprises reducing said volume by applying the force to the panel, to the at least one section or to the at least one strip.

GG140. The method of GG138 or GG139, wherein constraining the panel comprises constraining the panel, the at least one section or the at least one strip from movement in a first dimension that is substantially perpendicular to the growth grain, and further constraining the panel, the at least one section or the at least one strip from movement in a second dimension that is both substantially parallel to the growth grain and substantially perpendicular to the second direction.

GG141. The method of any one of GG121 to GG140, wherein compressing comprises applying a force that is less than the force required to shear the panel, the section or the strip.

GG142. The method of any one of GG121 to GG141, wherein compressing the panel, the at least one section or the at least one strip forms a compressed panel, at least one compressed section or at least one compressed strip, respectively, each having a compressive stress at 65% strain of less than about 10 psi.

GG143. The method of any of GG121 to GG142, further comprising perforating at least one of the panel, the compressed panel, the section, the compressed section, the strip and the compressed strip.

GG144. The method of GG143, wherein perforating comprises needling.

GG145. The method of GG144, wherein needling comprise inserting at least one needle into the outer surface of the panel, the compressed panel, the section, the compressed section, the strip or the compressed strip.

GG146. The method of GG145, wherein the at least one needle is straight or barbed.

GG147. The method of GG145 or GG146, wherein needling comprises inserting the at least one needle through an entire thickness of the panel, the compressed panel, the at least one section, the at least one compressed section, the at least one strip or the at least one compressed strip.

GG148. The method of any one of GG143 to GG147, wherein the at least one strip comprises a plurality of strips stacked relative to each other.

GG149. The method of any one of GG143 to GG148, wherein perforating the at least one strip comprises a first perforation step forming a first perforation pattern, and a second perforation step forming a second perforation pattern.

GG150. The method of GG149, wherein at least one of the density, intensity and shape of the first perforation pattern is different from the density, intensity and shape of the second perforation pattern.

GG151. The method of any one of GG121 to GG150, wherein the at least one strip is a plurality of strips.

GG152. The method of GG143, wherein the cutting, the compressing and the perforating occurs simultaneously.

GG153. The method of GG143, wherein the following steps are performed in the following sequence: the compressing, then the cutting, then the perforating.

GG154. The method of GG143, wherein the following steps are performed in the following sequence: the compressing, then the perforating, then the cutting.

GG155. The method of GG143, wherein the following steps are performed in the following sequence: the cutting, then the compressing, then the perforating.

GG156. The method of any of GG121 to GG155, further comprising at least one of pan frying and baking.

GG157. The method of GG156, wherein the at least one of pan frying and baking comprises a temperature within a range of about 275° F. to about 400° F.

GG158. The method of any of GG121 to GG157, further comprising incorporating at least one additive into at least one of the panel, the at least one section, and the at least one strip.

GG159. The method of GG158, wherein the at least one additive is a fat, a protein, an amino acid, a flavorant, an aromatic agent, a mineral, a vitamin, a micronutrient, a colorant or a preservative; or a combination thereof.

GG160. The method of any one of GG121 to GG159, wherein the at least one strip is at least one edible mycelium-based bacon strip.

GG161. A method of processing an edible aerial mycelium, comprising:
(a) providing a panel comprising an edible aerial mycelium, wherein the edible aerial mycelium is characterized as having a direction of mycelial growth along a first axis;
(b) performing a physical method comprising:
compressing the panel in a compressing direction which is substantially non-parallel with respect to the first axis to form a compressed panel;
optionally, sectioning the compressed panel to form at least one compressed section;
cutting the compressed panel, or optionally the at least one compressed section, in a cutting direction which is substantially parallel to the first axis to form at least one compressed strip; and
optionally, perforating the at least one compressed strip to form at least one perforated strip;
(c) boiling the at least one compressed strip, or optionally the at least one perforated strip, in a first aqueous saline solution to form at least one boiled strip;
(d) brining the at least one boiled strip to provide at least one brined strip;
(e) drying the at least one brined strip to provide at least one dried strip; and (f) adding fat to the at least one dried strip to provide at least one fattened strip.

GG162. The method of GG161, wherein the compressing comprises compressing the panel to about 15% to about 75% of the original panel length or width.

GG163. The method of GG162, wherein the compressing comprises compressing the panel to about 30% to about 40% of the original panel length or width.

GG164. The method of any one of GG161 to GG163, wherein the compressing direction is within a range of greater than 45 degrees and less than 135 degrees, or greater than about 70 degrees and less than about 110 degrees, with respect to the first axis.

GG165. The method of any one of GG161 to GG163, wherein the compressing direction is substantially orthogonal to the first axis.

GG166. The method of any one of GG161 to GG165, wherein the cutting direction is within a range of plus or minus about 45 degrees with respect to the first axis, or is within a range of plus or minus about 30 degrees with respect to the first axis.

GG167. The method of any one of GG161 to GG166, wherein the method further comprises sectioning the compressed panel to form at least one compressed section.

GG168. The method of GG167, wherein the sectioning comprises cutting the panel in the cutting direction to form the at least one compressed section.

GG169. The method of any of GG161 to GG168, wherein the physical method comprises perforating the at least one compressed strip to form the at least one perforated strip.

GG170. The method of any one of GG161 to GG169, wherein the first aqueous saline solution has a salt concentration within a range of about 0.1% (w/w) to about 26% (w/w), about 0.1% to about 15% (w/w), about 0.5% to about 10% (w/w), about 0.5% to about 5% (w/w) or about 1% to about 3%.

GG171. The method of any one of GG161 to GG170, wherein the first aqueous saline solution further comprises at least one an additive.

GG172. The method of anyone of GG161 to GG171, wherein the brining comprises treating the at least one boiled strip with a brine fluid to provide the at least one brined strip.

GG173. The method of GG172, wherein the brine fluid is a second aqueous saline solution having a salt concentration within a range of about 0.1% (w/w) to about 26% (w/w), about 0.1% to about 15% (w/w), about 0.5% to about 10% (w/w), about 0.5% to about 5% (w/w) or about 1% to about 3%.

GG174. The method of GG172 or GG173, wherein the brine fluid further comprises at least one additive.

GG175. The method of GG174, wherein the at least one additive is a flavorant, a colorant, or both.

GG176. The method of any one of GG172 to GG175, wherein the brine fluid comprises a smoke flavorant, umami, maple, a salt, a sweetener, a spice, or a combination of any two or more of the foregoing.

GG177. The method of any one of GG161 to GG176, wherein the drying comprises heating the at least one brined strip.

GG178. The method of any one of GG161 to GG176, wherein the method further comprises cooling the at least one fattened strip.

GG179. The method of GG178, wherein the cooling comprises cooling the at least one fattened strip until the fat is solidified.

GG180. The method of GG178 or GG179, wherein the method provides at least one finished edible strip.

GG181. The method of any one of GG161 to GG180, wherein each said at least one strip is a plurality of strips.

GG182. The method of any one of GG161 to GG181, wherein the at least one strip is at least one edible mycelium-based bacon strip.

GG183. The method of any one of GG121 to GG182, wherein the edible aerial mycelium is the edible aerial mycelium of any one of GG61 to GG95.

GG184. The method of any one of GG121 to GG183, further comprising packaging the at least one strip.

GG185. A batch of edible aerial mycelial panels, wherein each edible aerial mycelial panel in the batch comprises a growth grain, and wherein greater than 50% of the panels in the batch is characterized as having at least two of the following properties:

x. a mean native density of no greater than about 70 pounds per cubic foot (pcf);

xi. a native moisture content of at least about 80% (w/w);

xii. a native Kramer shear force of no greater than about 5 kg/g;

xiii. a native ultimate tensile strength of no greater than about 5 psi;

xiv. a native ultimate tensile strength in a dimension substantially parallel to the growth grain and a native ultimate tensile strength in a dimension substantially perpendicular to the growth grain, wherein the native ultimate tensile strength in the dimension substantially parallel to the growth grain is not more than about 5-fold greater than the native ultimate tensile strength in the dimension substantially perpendicular to the growth grain;

xv. a native compressive modulus at 10% strain of no greater than about 10 psi;

xvi. a native compressive modulus at 10% strain in a dimension substantially parallel to the growth grain and a native compressive modulus at 10% strain in a dimension substantially perpendicular to the growth grain, wherein the native compressive modulus at 10% strain in the dimension substantially parallel to the growth grain is not more than about 20-fold greater than the native compressive modulus at 10% strain in the dimension substantially perpendicular to the growth grain;

xvii. a native compressive stress at 65% strain upon compression in a direction substantially perpendicular to the growth grain of no greater than about 10 psi;

xviii. a mean native thickness of at least about 20 mm; wherein the edible aerial mycelium does not contain a fruiting body.

GG186. A batch of edible aerial mycelial panels, wherein greater than 50% of the panels in the batch is an edible aerial mycelium according to any one of GG61 to GG95.

GG187. The batch of edible aerial mycelial panels of GG185 or GG186, wherein greater than 50% of the panels in the batch are suitable for use in the manufacture of a food product.

GG188. The batch of edible aerial mycelial panels of GG185 or GG186, wherein greater than 50% of the panels in the batch are for use in the manufacture of a food product.

GG189. The batch of edible aerial mycelial panels of GG188, wherein the food product is a mycelium-based food product.

GG190. The batch of edible aerial mycelial panels of GG188, wherein the mycelium-based food product is a whole muscle meat alternative or a mycelium-based bacon product.

GG191. An edible strip of mycelium-based bacon comprising:
a strip of edible aerial mycelium, wherein the edible aerial mycelium is the edible aerial mycelium of any one of GG61 to GG95, and wherein the strip of edible aerial mycelium contains at least one additive.

GG192. The edible strip of mycelium-based bacon of GG191, wherein the strip of edible aerial mycelium is a brined strip.

GG193. The edible strip of mycelium-based bacon of GG191 or GG192, wherein the strip of edible aerial mycelium is a brined, fatted strip.

GG194. The edible strip of mycelium-based bacon of GG191, GG192 or GG193, wherein the strip of edible aerial mycelium is a boiled, brined and fatted strip.

GG195. The edible strip of mycelium-based bacon of any one of GG191 to GG194, wherein the strip of edible aerial mycelium is a boiled, brined, compressed and fatted strip.

GG196. The edible strip of mycelium-based bacon of GG191 to GG195, wherein the strip of edible aerial mycelium is a boiled, brined, compressed, perforated and fatted strip.

GG197. The edible strip of mycelium-based bacon of GG191, wherein the strip is the at least one finished edible strip of GG180.

GG198. The edible strip of mycelium-based bacon of any one of GG191 to GG197, wherein the edible strip has a moisture content within a range of about 10% to about 90% (w/w).

GG199. The edible strip of mycelium-based bacon of any one of GG191 to GG198, wherein the at least one additive comprises a flavorant, a colorant, a fat, or a combination thereof.

GG200. The edible strip of mycelium-based bacon of GG199, wherein the at least one additive is coconut oil, sugar, salt, natural flavors and beet juice.

GG201. The edible strip of mycelium-based bacon of any one of GG191 to GG200, wherein the strip has a length within a range of about 6 to about 10 inches, a width within a range of about 1 to about 2 inches, and a height of no greater than about 0.25 inches.

GG202. The edible strip of mycelium-based bacon of any one of GG191 to GG201, characterized as having a nutritional content comprising:
a fat content within a range of about 5% (w/w) to about 15% (w/w);
a total carbohydrate content within a range of about 5% to about 20% (w/w); and
a protein content within a range of about 3% to about 15% (w/w).

GG203. The edible strip of mycelium-based bacon of GG202, wherein the total carbohydrate content includes about 50% (w/w) dietary fiber.

GG204. The edible strip of mycelium-based bacon of GG202 or GG203, further comprising potassium in an amount within a range of about 0.1% and about 1% (w/w).

GG205. The edible strip of mycelium-based bacon of GG202, GG203 or GG204, further comprising sodium in an amount within a range of about 0.5% and about 2% (w/w).

GG206. The edible strip of mycelium-based bacon of any one of GG202 to GG205, further characterized as containing substantially no amount of cholesterol.

GG207. The edible strip of mycelium-based bacon of any one of GG202 to GG206, comprising sodium in an amount of about 1% (w/w); total carbohydrate in an amount of about 10% to about 15% (w/w); protein in an amount of about 4% to about 7% (w/w); and potassium within a range of about 0.1% to about 0.5% (w/w).

GG208. The edible strip of mycelium-based bacon of any one of GG191 to GG207, wherein the edible aerial mycelium is *Pleurotus* mycelium.

GG209. The edible strip of mycelium-based bacon of GG208, wherein the edible aerial mycelium is *Pleurotus ostreatus* mycelium.

GG210. The edible strip of mycelium-based bacon of any one of GG191 to GG209, wherein the strip of mycelium-based bacon is not a ground, minced or extruded strip of mycelium-based bacon.

GG211. A packaged mycelium-based bacon product, comprising:
a package, comprising:
at least one edible strip of any one of GG191 to GG210; and
a label, wherein the label comprises nutritional information and cooking instructions for said mycelium-based bacon product.

GG212. The packaged mycelium-based bacon product of GG211, wherein the at least one edible strip is a plurality of strips.

H1. A method of making an aerial mycelium, comprising:
incubating a growth matrix in a growth environment for an incubation time period, wherein the growth matrix comprises a substrate and a fungus;
introducing aqueous mist into the growth environment throughout the incubation time period, or a portion thereof; and
producing extra-particle aerial mycelial growth from the growth matrix;
wherein introducing comprises introducing the aqueous mist into the growth environment resulting in a mean mist deposition rate within a range of about 0.3 microliter/cm2/hour to about 1.5 microliter/cm2/hour.

H2. The method of H1, wherein the introducing comprises introducing the aqueous mist into the growth environment resulting in an instantaneous mist deposition rate and the mean mist deposition rate, wherein the ratio of the instantaneous mist deposition rate to the mean mist deposition rate is at most about 10 to about 1.

H3. The method of H2, wherein the ratio of the instantaneous mist deposition rate to the mean mist deposition rate is at most about 5 to about 1.

H4. The method of H1, H2 or H3, wherein introducing comprises introducing the aqueous mist into the growth environment resulting in a mean mist deposition rate of at least about 0.35 microliter/cm2/hour.

H5. The method of H4, wherein introducing comprises introducing the aqueous mist into the growth environment resulting in a mean mist deposition rate of at least about 0.40 microliter/cm2/hour.

H6. The method of any one of H1 to H5, wherein introducing further comprises introducing the aqueous mist into the growth environment resulting in an instantaneous mist deposition rate of at most about 3 microliter/cm2/hour.

I1. A method of making an aerial mycelium, comprising:

incubating a growth matrix in a growth environment for an incubation time period, wherein the growth matrix comprises a substrate and a fungus;

introducing aqueous mist into the growth environment throughout the incubation time period, or a portion thereof; and producing extra-particle aerial mycelial growth from the growth matrix;

wherein introducing comprises introducing the aqueous mist into the growth environment resulting in a mean mist deposition rate within a range of about 1 microliter/cm2/hour to about 5 microliter/cm2/hour.

I2. The method of I1, wherein the introducing comprises introducing the aqueous mist into the growth environment resulting in an instantaneous mist deposition rate and the mean mist deposition rate, and wherein the ratio of the instantaneous mist deposition rate to the mean mist deposition rate is at most about 5 to about 1.

I3. The method of I2, wherein the ratio of the instantaneous mist deposition rate to the mean mist deposition rate is at most about 3 to about 1.

I4. The method of I1, I2 or I3, wherein introducing comprises introducing the aqueous mist into the growth environment resulting in a mean mist deposition rate within a range of about 1 microliter/cm2/hour and about 3 microliter/cm2/hour.

J1. The method of any one H1 to H6 or I1 to I4, wherein the growth matrix comprises the substrate and a fungal inoculum, said fungal inoculum comprising said fungus.

J2. The method of any one of H1 to H6 or I1 to I4, wherein the growth matrix comprises a colonized substrate, said colonized substrate comprising the substrate, wherein said substrate is previously colonized with mycelium of said fungus.

J3. The method of J2, wherein the colonized substrate is a fragmented colonized substrate.

J4. The method of any one of J1 to J3, wherein said growth environment comprises a growth atmosphere, said growth atmosphere having a carbon dioxide content, wherein said carbon dioxide content is no greater than about 7% (v/v) over the course of the incubation time period.

J5. The method of any one of J1 to J4, wherein said growth environment comprises a growth atmosphere, said growth atmosphere having a carbon dioxide content, wherein said carbon dioxide content is no greater than about 5% (v/v) over the course of the incubation time period.

J6. The method of any one of J1 to J5, wherein said growth environment comprises a growth atmosphere, said growth atmosphere having a carbon dioxide content, wherein said carbon dioxide content is less than about 3% (v/v) over the course of the incubation time period.

J7. The method of any one of J1 to J6, wherein said growth environment comprises a growth atmosphere, said growth atmosphere having a carbon dioxide content, wherein said carbon dioxide content is less than 2.5% (v/v) over the course of the incubation time period.

J8. The method of any one of J1 to J7, wherein said growth environment comprises a growth atmosphere, said growth atmosphere having a mean carbon dioxide content, wherein said mean carbon dioxide content is no greater than about 2% (v/v) over the course of the incubation time period.

J9. The method of any one of J1 to J8, wherein said growth environment comprises a growth atmosphere, said growth atmosphere having a carbon dioxide content of at least about 0.02% (v/v), at least about 0.03% (v/v) or at least about 0.04% (v/v).

J10. The method of any one of J1 to J9, wherein said growth environment comprises a growth atmosphere, said growth atmosphere having a carbon dioxide content that modulates with fungal respiration over the course of the incubation time period.

J11. The method of any one of J1 to J10, wherein said growth environment comprises a growth atmosphere, said growth atmosphere having a carbon dioxide content that is not a preselected carbon dioxide content.

J12. The method of any one of J1 to J11, wherein introducing comprises introducing aqueous mist into the growth environment throughout a portion of the incubation time period, wherein the portion of the incubation time period comprises a mycelial vertical expansion phase.

J13. The method of any one of J1 to J12, wherein introducing comprises introducing aqueous mist into the growth environment throughout a portion of the incubation time period, wherein the portion of the incubation time period begins during a second day, a third day or a fourth day of the incubation time period.

J14. The method of any one of J1 to J11, wherein introducing comprises introducing aqueous mist into the growth environment throughout the incubation time period.

J15. The method of any one of J1 to J14, wherein:
(i) the incubation time period ends no later than when a visible fruiting body forms;
(ii) the incubation time period ends when a visible fruiting body forms; or
(iii) the extra-particle aerial mycelial growth does not contain a visible fruiting body.

J16. The method of any one of J1 to J15, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces* or *Wolfiporia*.

J17. The method of J16, wherein the fungus is a species of the genus *Pleurotus*.

J18. The method of J17, wherein the fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuberregium*.

J19. The method of any one of J1 to J18, further comprising removing the extra-particle aerial mycelial growth from the growth matrix, thereby providing an aerial mycelium.

Some other nonlimiting embodiments of the present disclosure are listed below.

J20. The method of any one of J1 to J15, further comprising removing the extra-particle aerial mycelial growth from the growth matrix, thereby providing an aerial mycelium.

K1. An aerial mycelium comprising:
a growth grain; and
at least three of the following properties:
i. a mean native density, wherein the mean native density is within a range of about 0.1 pounds per cubic foot (pcf) to about 15 pcf;
ii. a native moisture content, wherein the native moisture content is within a range of about 75% (w/w) to about 95% (w/w);
iii. a native Kramer shear force in a dimension substantially parallel to the growth grain, wherein the native Kramer shear force in the dimension substantially parallel to the growth grain is within a range of about 1 kilogram/gram (kg/g) to about 3 kg/g;
iv. a native ultimate tensile strength in a dimension substantially parallel to the growth grain, wherein the native ultimate tensile strength in the dimension substantially parallel to the growth grain is no greater than about 3 pounds per square inch (psi);
v. a native ultimate tensile strength in a dimension substantially parallel to the growth grain and a native ultimate tensile strength in a dimension substantially perpendicular to the growth grain, wherein the native ultimate tensile strength in the dimension substantially parallel to the growth grain is at least about 2-fold greater than the native ultimate tensile strength in the dimension substantially perpendicular to the growth grain;
vi. a native compressive modulus at 10% strain in a dimension substantially parallel to the growth grain, wherein the native compressive modulus at 10% strain in the dimension substantially parallel to the growth grain is at most about 5 psi;
vii. a native compressive modulus at 10% strain in a dimension substantially parallel to the growth grain and a native compressive modulus at 10% strain in a dimension substantially perpendicular to the growth grain, wherein the native compressive modulus at 10% strain in the dimension substantially parallel to the growth grain is at least about 2-fold greater than the native compressive modulus at 10% strain in the dimension substantially perpendicular to the growth grain;
viii. a native compressive stress at 10% strain in a dimension substantially parallel to the growth grain, wherein the native compressive stress at 10% strain in the dimension substantially parallel to the growth grain is at most about 1 psi;
ix. a native compressive stress at 10% strain in a dimension substantially parallel to the growth grain and a native compressive stress at 10% strain in a dimension substantially perpendicular to the growth grain, wherein the native compressive stress at 10% strain in the dimension substantially parallel to the growth grain is at least about 2-fold greater than the native compressive stress at 10% strain in the dimension substantially perpendicular to the growth grain;
x. a mean native thickness, wherein the mean native thickness is at least about 15 millimeters (mm); and
xi. a maximum native thickness, wherein the maximum native thickness is at least about 30 mm.

K2. The aerial mycelium of K1, wherein the aerial mycelium does not contain a visible fruiting body.

K3. The aerial mycelium of K1 or K2, wherein the aerial mycelium comprises at least four of said properties.

K4. The aerial mycelium of K1 or K2, wherein the aerial mycelium comprises at least five of said properties.

K5. The aerial mycelium of K1 or K2, wherein the aerial mycelium comprises at least six of said properties.

K6. The aerial mycelium of K1 or K2, wherein the aerial mycelium comprises at least seven of said properties.

K7. The aerial mycelium of K1 or K2, wherein the aerial mycelium comprises at least eight of said properties.

K8. The aerial mycelium of K1 or K2, wherein the aerial mycelium comprises at least nine of said properties.

K9. The aerial mycelium of K1 or K2, wherein the aerial mycelium comprises ten or eleven of said properties.

K10. The aerial mycelium of K1 to K9, wherein the aerial mycelium comprises a perimeter, wherein each said native compressive modulus and each said native compressive stress is at least about 1 inch from the perimeter.

K11. The aerial mycelium of any one of K1 to K10, wherein the native moisture content is at least about 80% (w/w).

K12. The aerial mycelium of any one of K1 to K11, wherein the native moisture content is at most about 93% (w/w).

K13. The aerial mycelium of any one of K1 to K12, wherein the native compressive modulus at 10% strain in the dimension substantially parallel to the growth grain is at most about 20-fold greater than the native compressive modulus at 10% strain in the dimension substantially perpendicular to the growth grain.

K14. The aerial mycelium of any one of K1 to K13, wherein the native compressive stress at 10% strain in the dimension substantially parallel to the growth grain is at most about 10-fold greater than the native compressive stress at 10% strain in the dimension substantially perpendicular to the growth grain.

K15. The aerial mycelium of any one of K1 to K14, wherein the native compressive modulus at 10% strain in the dimension substantially parallel to the growth grain is at most about 15-fold greater than the native compressive modulus at 10% strain in the dimension substantially perpendicular to the growth grain.

K16. The aerial mycelium of any one of K1 to K15, wherein the native compressive modulus at 10% strain in the dimension substantially parallel to the growth grain is at least about 3-fold greater than the native compressive modulus at 10% strain in the dimension substantially perpendicular to the growth grain.

K17. The aerial mycelium of any one of K1 to K16, wherein the native ultimate tensile strength in the dimension substantially parallel to the growth grain is at most about 10-fold greater than the native ultimate tensile strength in the dimension substantially perpendicular to the growth grain.

K18. The aerial mycelium of any one of K1 to K17, wherein the native ultimate tensile strength in the dimension substantially parallel to the growth grain is at most about 5-fold greater than the native ultimate tensile strength in the dimension substantially perpendicular to the growth grain.

K19. The aerial mycelium of any one of K1 to K18, wherein the native compressive modulus at 10% strain in the dimension substantially parallel to the growth grain is no greater than about 4 psi.

K20. The aerial mycelium of any one of K1 to K19, wherein the mean native density is at most about 10 pcf.

K21. The aerial mycelium of any one of K1 to K20, wherein the native Kramer shear force is at most about 2.5 kg/g.

K22. The aerial mycelium of any one of K1 to K21, wherein the native ultimate tensile strength in the dimension substantially parallel to the growth grain is at most about 2 psi.

K23. The aerial mycelium any one of K1 to K22, wherein the native compressive modulus at 10% strain in the dimension substantially parallel to the growth grain is at most about 3 psi.

K24. The aerial mycelium of any one of K1 to K23, wherein the native Kramer shear force is at most about 2 kg/g.

K25. The aerial mycelium of any one of K1 to K24, wherein the native compressive stress at 10% strain in the dimension substantially parallel to the growth grain is at most about 0.5 psi.

K26. The aerial mycelium of any one of K1 to K25, further comprising a native compressive stress at 65% strain in a dimension substantially parallel to the growth grain, wherein the native compressive stress at 65% strain upon compression in the dimension substantially parallel to the growth grain is at most about 1 psi.

K27. The aerial mycelium of any one of K1 to K26, wherein the mean native density is at most about 5 pcf.

K28. The aerial mycelium of any one of K1 to K27, wherein the native compressive stress at 65% strain upon compression in the dimension substantially parallel to the growth grain is at most about 0.5 psi.

K29. The aerial mycelium of any one of K1 to K28, wherein the aerial mycelium comprises a perimeter, wherein each said native compressive modulus and each said native compressive stress is at least about 2 inches from the perimeter.

K30. The aerial mycelium of any one of K1 to K29, wherein the aerial mycelium comprises a perimeter, wherein each said native ultimate tensile strength is at least about 1 inch from the perimeter.

K31. The aerial mycelium of any one of K1 to K30, wherein the mean native thickness is at least about 30 mm, at least about 40 mm or at least about 50 mm.

K32. The aerial mycelium of any one of K1 to K31, wherein the aerial mycelium is a growth product of a fungus of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces* or *Wolfiporia*.

K33. The aerial mycelium of K32, wherein the aerial mycelium is a growth product of a fungus of the genus *Pleurotus*.

K34. The aerial mycelium of K33, wherein the fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuber-regium*.

K35. The aerial mycelium of any one of K1 to K34, wherein the aerial mycelium is a growth product of an edible filamentous fungus.

K36. The aerial mycelium of K35, wherein the edible filamentous fungus is *Pleurotus ostreatus*.

K37. The aerial mycelium of any one of K1 to K36, wherein the aerial mycelium is suitable for use in the manufacture of a food product.

K38. The aerial mycelium of any one of K1 to K37, wherein the aerial mycelium is for use in the manufacture of a food product.

K39. The aerial mycelium of K37 or K38, wherein the food product is a mycelium-based food product.

K40. The aerial mycelium of K37, K38 or K39, wherein the food product is a whole muscle meat alternative, a seafood alternative or a poultry alternative.

K41. The aerial mycelium of K37, K38 or K39, wherein the food product is a bacon alternative, a jerky alternative or a deli meat alternative.

K42. The aerial mycelium of K37, K38 or K39, wherein the food product is a carbohydrate alternative.

K43. The aerial mycelium of K42, wherein the carbohydrate alternative is a pasta, a confection, a snack food, a bread or a baked good.

K44. A food product comprising an aerial mycelium of any one of K1 to K43.

K45. A food product, wherein the food product is produced using an aerial mycelium of any one of K1 to K43.

K46. A batch of aerial mycelia, wherein each aerial mycelium in the batch is an aerial mycelium of any one of K1 to K43.

K47. A batch of aerial mycelial panels, wherein each aerial mycelial panel in the batch has a growth grain, and wherein greater than 50% of the panels in the batch comprises at least three of the properties recited in K1.

K48. The batch of aerial mycelial panels of K47, wherein greater than 50% of the aerial mycelial panels in the batch comprise at least four of the properties recited in K1.

K49. The batch of aerial mycelial panels of K47, wherein greater than 50% of the aerial mycelial panels in the batch comprise at least five of the properties recited in K1.

K50. The batch of aerial mycelial panels of K47, wherein greater than 50% of the aerial mycelial panels in the batch comprise at least six of the properties recited in K1.

K51. The batch of aerial mycelial panels of K47, wherein greater than 50% of the aerial mycelial panels in the batch comprise at least seven of the properties recited in K1.

K52. The batch of aerial mycelial panels of K47, wherein greater than 50% of the aerial mycelial panels in the batch comprise at least eight of the properties recited in K1.

K53. The batch of aerial mycelial panels of K47, wherein greater than 50% of the aerial mycelial panels in the batch comprise at least nine of the properties recited in K1.

K54. The batch of aerial mycelial panels of K47, wherein greater than 50% of the aerial mycelial panels in the batch comprise at least ten of the properties recited in K1.

K55. The batch of aerial mycelial panels of any one of K47 to K54, wherein greater than 50% of the aerial mycelial panels in the batch does not contain a visible fruiting body.

K56. The batch of aerial mycelial panels of K55, wherein each aerial mycelial panel of the batch does not contain a visible fruiting body.

L1. An aerial mycelium comprising:
  a growth grain; and
  at least three of the following properties:
  i. a mean native density, wherein the mean native density is no greater than about 70 pounds per cubic foot (pcf);
  ii. a native moisture content of at least about 75% (w/w);
  iii. a native Kramer shear force in a dimension substantially parallel to the growth grain, wherein the native Kramer shear force in the dimension substantially parallel to the growth grain is at least about 100 kg/g;
  iv. an ultimate tensile strength in a dimension substantially parallel to the growth grain after drying the aerial mycelium to a final moisture content of less than about 10% (w/w), wherein the ultimate tensile strength in the dimension substantially parallel to the growth grain after the drying of the aerial mycelium to a final moisture content of less than about 10% (w/w) is no greater than about 50 pounds per square inch (psi);
  v. a modulus of elasticity of no greater than about 150 psi;
  vi. a mean native thickness, wherein the mean native thickness is at least about 15 millimeters (mm); and
  vii. a maximum native thickness, wherein the maximum native thickness is at least about 30 mm.

L2. The aerial mycelium of embodiment L1, wherein the aerial mycelium does not contain a visible fruiting body.

L3. The aerial mycelium of embodiment L1 or L2, wherein the aerial mycelium comprises at least four of said properties.

L4. The aerial mycelium of embodiment L1 or L2, wherein the aerial mycelium comprises at least five of said properties.

L5. The aerial mycelium of embodiment L1 or L2, wherein the aerial mycelium comprises at least six of said properties.

L6. The aerial mycelium of any one of embodiments L1 to L5, wherein the native moisture content is at most about 95% (w/w).

L7. The aerial mycelium of any one of embodiments L1 to L6, wherein the native moisture content is at least about 80% (w/w).

L8. The aerial mycelium of any one of embodiments L1 to L7, wherein the mean native density is no greater than about 50 pcf.

L9. The aerial mycelium of any one of embodiments L1 to L7, wherein the mean native density is no greater than about 40 pcf.

L10. The aerial mycelium of any one of embodiments L1 to L7, wherein the mean native density is no greater than about 30 pcf.

L11. The aerial mycelium of any one of embodiments L1 to L7, wherein the mean native density is no greater than about 20 pcf.

L12. The aerial mycelium of any one of embodiments L1 to L7, wherein the mean native density is no greater than about 10 pcf.

L13. The aerial mycelium of any one of embodiments L1 to L12, wherein the ultimate tensile strength in the dimension substantially parallel to the growth grain after the drying of the aerial mycelium to a final moisture content of less than about 10% (w/w) is no greater than about 40 pounds per square inch (psi).

L14. The aerial mycelium of any one of embodiments L1 to L13, wherein the modulus of elasticity is no greater than about 125 psi.

L15. The aerial mycelium of any one of embodiments L1 to L14, wherein the modulus of elasticity is no greater than about 100 psi.

L16. The aerial mycelium of any one of embodiments L1 to L15, wherein the aerial mycelium is a growth product of a fungus, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces, Wolfiporia, Ceriporiopsis, Chlorociboria, Daedalea, Daedaleopsis, Daldinia, Ganoderma, Hypoxylon, Inonotus, Lenzites, Omphalotus, Oxyporus, Phanerochaete, Phellinus, Polyporellus, Porodaedalea, Pycnoporus, Scytalidium, Stereum, Trametes* or *Xylaria*.

L17. The aerial mycelium of embodiment L16, wherein the fungus is a species of the genus *Bondarzewia, Ceriporiopsis, Daedalea, Daedaleopsis, Fomitopsis, Ganoderma, Inonotus, Lenzites, Omphalotus, Oxyporus, Phellinus, Polyporellus, Polyporus, Porodaedalea, Pycnoporus, Stereum, Trametes* or *Xylaria*.

L17. The aerial mycelium of embodiment L16, wherein the fungus is selected from the group consisting of *Bondarzewia berkleyii, Daedalea quercina, Daedaleopsis* spp., *Daedaleopsis confragosa, Daedaleopsis septentrionalis, Fomitopsis* spp., *Fomitopsis cajanderi, Fomitopsis pinicola, Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Inonotus* spp., *Inonotus obliqus, Inonotus hispidus, Inonotus dryadeus, Inonotus tomentosus, Lenzites betulina, Phellinus* spp., *Phellinus ignarius, Phellinus gilvus, Polyporus* spp., *Polyporus squamosus, Polyporus badius, Polyporus umbellatus, Polyporus squamosus, Polyporus tuberaster, Polyporus arcularius, Polyporus albeolaris, Polyporus radicatus, Porodaedalea pini, Pycnoporus* spp., *Pycnoporus* spp., *Pycnoporus sanguineus, Pycnoporus cinnabarinus, Stereum* spp., *Stereum ostea, Stereum hirsutum, Trametes* spp., *Trametes versicolor, Trametes elegans, Trametes suaveolens, Trametes hirsute, Trametes gibbosa, Trametes ochraceae, Trametes villosa, Trametes cubensis* and *Trametes pubescens*.

L19. The aerial mycelium of embodiment L16, wherein the fungus is a species of the genus *Ganoderma*.

L20. The aerial mycelium of embodiment L19, wherein the fungus is *Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum* or *Ganoderma weberianum*.

L21. The aerial mycelium of embodiment L20, wherein the fungus is *Ganoderma sessile*.

L22. The aerial mycelium of embodiment L16, wherein the fungus is a species of the genus *Trametes*.

L23. The aerial mycelium of embodiment L22, wherein the fungus is *Trametes* spp., *Trametes versicolor, Trametes elegans, Trametes suaveolens, Trametes hirsute, Trametes gibbosa, Trametes ochraceae, Trametes villosa, Trametes cubensis* or *Trametes pubescens*.

L24. The aerial mycelium of embodiment L16, wherein the fungus is a pigment-producing fungus of a genus selected from the group consisting of *Chlorociboria, Daldinia, Hypoxylon, Phanerochaete* and *Scytalidium*.

L25. An aerial mycelium of any one of embodiments L1 to L24, wherein the aerial mycelium is suitable for use in the manufacture of a textile.

L26. The aerial mycelium of any one of embodiments L1 to L24, wherein the aerial mycelium is for use in the manufacture of a textile.

L47. The aerial mycelium of embodiment L25 or L26, wherein the textile is a leather-like material.

L38. The aerial mycelium of any one of embodiments L1 to L24, wherein the aerial mycelium is suitable for use in the manufacture of a petroleum-based product alternative.

L29. The aerial mycelium of any one of embodiments L1 to L24, wherein the aerial mycelium is for use in the manufacture of a petroleum-based product alternative.

L30. The aerial mycelium of embodiment L28 or L29, wherein the petroleum-based product alternative is a foam.

L31. A batch of aerial mycelial panels, wherein greater than 50% of the panels in the batch comprises at least three of the properties recited in embodiment L1.

L32. A batch of aerial mycelial panels, wherein greater than 50% of the panels in the batch comprises at least four of the properties recited in embodiment L1.

L33. A batch of aerial mycelial panels, wherein greater than 50% of the panels in the batch comprises at least five of the properties recited in embodiment L1.

LL1. A method of making an aerial mycelium, comprising:
  incubating a growth matrix in a growth environment for an incubation time period, wherein the growth matrix comprises a substrate and a fungus;
  introducing aqueous mist into the growth environment throughout the incubation time period, or a portion thereof; and
  producing extra-particle aerial mycelial growth from the growth matrix;
  wherein introducing comprises introducing the aqueous mist into the growth environment resulting in a mean mist deposition rate of at most about 0.45 microliter/cm2/hour.

LL2. The method of embodiment LL1, wherein the introducing comprises introducing the aqueous mist into the growth environment resulting in an instantaneous mist deposition rate and the mean mist deposition rate, wherein the ratio of the instantaneous mist deposition rate to the mean mist deposition rate is at most about 20 to about 1.

LL3. The method of embodiment LL2, wherein the ratio of the instantaneous mist deposition rate to the mean mist deposition rate is at most about 10 to about 1.

LL4. The method of embodiment LL3, wherein the ratio of the instantaneous mist deposition rate to the mean mist deposition rate is at most about 5 to about 1.

LL5. The method of embodiment LL1, wherein:
  the growth environment comprises a misting apparatus; and
  introducing comprises introducing the aqueous mist into the growth environment via the misting apparatus, resulting in the mean mist deposition rate;
  wherein the misting apparatus is operated at a duty cycle, and wherein the duty cycle is at least about 5%.

LL6. The method of embodiment LL5, wherein the duty cycle is at least about 10%.

LL7. the method of embodiment LL6, wherein the duty cycle is at least about 20%.

LL8. The method of any one of embodiments LL1 to LL7, wherein introducing further comprises introducing the aqueous mist into the growth environment resulting in an instantaneous mist deposition rate of at most about 2 microliter/cm2/hour.

LL9. The method of any one of embodiments LL1 to LL8, wherein introducing comprises introducing the aqueous mist into the growth environment resulting in a mean mist deposition rate of at most about 0.40 microliter/cm2/hour, or resulting in a mean mist deposition rate of at most about 0.35 microliter/cm2/hour.

LL10. The method of any one of embodiments LL1 to LL9, wherein the mean mist deposition rate is at least about 0.01 microliter/cm2/hour.

LL11. The method of embodiment LL1, wherein introducing comprises introducing the aqueous mist into the growth environment resulting in a mean mist deposition rate that is below about 0.01 microliter/cm2/hour.

LL12. The method of embodiment LL11, wherein introducing comprises introducing the aqueous mist into the growth environment resulting in a mean mist deposition rate that does not result in a detectable quantity of deposited mist in the growth environment.

LL13. The method of embodiment LL12, wherein introducing comprises introducing the aqueous mist into the growth environment resulting in a mean mist deposition rate that does not result in a visible quantity of deposited mist in the growth environment.

LL14. The method of embodiment LL13, wherein introducing comprises introducing the aqueous mist into the growth environment resulting in a mean mist deposition rate that does not result in a measurable quantity of deposited mist in the growth environment.

LL15. The method of embodiment LL14, wherein introducing comprises introducing the aqueous mist into the growth environment resulting in a mean mist deposition rate that does not result in detectable quantities of deposited mist in the growth environment on the growth matrix, the extra-particle aerial mycelial growth, or both.

LL16. A method of making an aerial mycelium, comprising:
  incubating a growth matrix in a growth environment for an incubation time period, wherein the growth matrix comprises a substrate and a fungus;
  introducing aqueous mist into the growth environment throughout the incubation time period, or a portion thereof; and
  producing extra-particle aerial mycelial growth from the growth matrix;
  wherein the total quantity of aqueous mist resulting from the introducing aqueous mist that is deposited on the growth matrix, the resulting extra-particle aerial mycelial growth, or both, is negligible.

LL17. A method of making an aerial mycelium, comprising:
  providing a growth environment, the growth environment comprising an amount of aqueous mist;
  incubating a growth matrix in the growth environment for an incubation time period, wherein the growth matrix comprises a substrate and a fungus, wherein incubating comprises exposing the growth matrix to the aqueous mist during at least a portion of the incubation time period; and
  producing extra-particle aerial mycelial growth from the growth matrix;
  wherein a mean mist deposition rate resulting from the amount of aqueous mist during the at least a portion of the incubation time period is below about 0.01 microliter/cm2/hour.

LL18. The method of embodiment LL17, wherein the mean mist deposition rate is below an amount that results in a detectable quantity of deposited mist in the growth environment.

LL19. The method of embodiment LL17 or LL18, further comprising introducing the aqueous mist into the growth environment.

LL20. A method of making an aerial mycelium, comprising:

introducing aqueous mist into a growth environment;

incubating a growth matrix in a growth environment for an incubation time period, wherein the growth matrix comprises a substrate and a fungus, and wherein incubating comprises exposing the growth matrix to the aqueous mist; and producing extra-particle aerial mycelial growth from the growth matrix;

wherein introducing comprises introducing the aqueous mist into the growth environment resulting in a mean mist deposition rate that is below about 0.01 microliter/cm2/hour.

LL21. The method of embodiment LL20, wherein introducing comprises introducing the aqueous mist into the growth environment resulting in a mean mist deposition rate that does not result in a detectable quantity of deposited mist in the growth environment.

LL22. The method of any one of embodiments LL1 to LL21, wherein the growth matrix comprises the substrate and a fungal inoculum, said fungal inoculum comprising said fungus.

LL23. The method of any one of embodiments LL1 to LL21, wherein the growth matrix comprises a colonized substrate, said colonized substrate comprising the substrate, wherein said substrate is previously colonized with mycelium of said fungus.

LL24. The method of embodiment LL23, wherein the colonized substrate is a fragmented colonized substrate.

LL25. The method of any one of embodiments LL1 to LL24, wherein said growth environment comprises a growth atmosphere, said growth atmosphere having a carbon dioxide content, wherein said carbon dioxide content is no greater than about 7% (v/v) over the course of the incubation time period.

LL26. The method of any one of embodiments LL1 to LL26, wherein said growth environment comprises a growth atmosphere, said growth atmosphere having a carbon dioxide content, wherein said carbon dioxide content is no greater than about 5% (v/v) over the course of the incubation time period.

LL27. The method of any one of embodiments LL1 to LL26, wherein said growth environment comprises a growth atmosphere, said growth atmosphere having a carbon dioxide content, wherein said carbon dioxide content is less than about 3% (v/v) over the course of the incubation time period.

LL28. The method of any one of embodiments LL1 to LL27, wherein said growth environment comprises a growth atmosphere, said growth atmosphere having a carbon dioxide content, wherein said carbon dioxide content is less than 2.5% (v/v) over the course of the incubation time period.

LL29. The method of any one of embodiments LL1 to LL28, wherein said growth environment comprises a growth atmosphere, said growth atmosphere having a mean carbon dioxide content, wherein said mean carbon dioxide content is no greater than about 2% (v/v) over the course of the incubation time period.

LL30. The method of any one of embodiments LL1 to LL29, wherein said growth environment comprises a growth atmosphere, said growth atmosphere having a carbon dioxide content, wherein said carbon dioxide content is at least about 0.02% (v/v), is at least about 0.03% (v/v) or is at least about 0.04% (v/v).

LL31. The method of any one of embodiments LL1 to LL30, wherein said growth environment comprises a growth atmosphere, said growth atmosphere having a carbon dioxide content, wherein said carbon dioxide content modulates with fungal respiration over the course of the incubation time period.

LL32. The method of any one of embodiments LL1 to LL31, wherein said growth environment comprises a growth atmosphere, said growth atmosphere having a carbon dioxide content, wherein said carbon dioxide content is not a preselected carbon dioxide content.

LL33. The method of any one of embodiments LL1 to LL32, wherein introducing comprises introducing aqueous mist into the growth environment throughout a portion of the incubation time period, wherein the portion of the incubation time period comprises a mycelial vertical expansion phase.

LL34. The method of any one of the embodiments LL1 to LL33, wherein introducing comprises introducing aqueous mist into the growth environment throughout a portion of the incubation time period, wherein the portion of the incubation time period begins during a second day, a third day or a fourth day of the incubation time period.

LL35. The method of any one of embodiments LL1 to LL32, wherein introducing comprises introducing aqueous mist into the growth environment throughout the incubation time period.

LL36. The method of any one of embodiments LL1 to LL35, wherein:

(i) the incubation time period ends no later than when a visible fruiting body forms;

(ii) the incubation time period ends when a visible fruiting body forms; or (iii) the extra-particle aerial mycelial growth does not contain a visible fruiting body.

LL37. The method of any one of embodiments LL1 to LL36, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces* or *Wolfiporia.*

LL38. The method of embodiment LL37, wherein the fungus is a species of the genus *Pleurotus.*

LL39. The method of embodiment LL38, wherein the fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuber-regium.*

LL40. The method of any one of embodiments LL1 to LL39, wherein the fungus is an edible filamentous fungus.

LL41. The method of embodiment LL40, wherein the edible filamentous fungus is *Pleurotus ostreatus.*

LL42. The method of any one of embodiments LL1 to LL41, further comprising removing the extra-particle aerial mycelial growth from the growth matrix, thereby providing an aerial mycelium.

LL43. The method of embodiment LL42, wherein:

the aerial mycelium comprises a growth grain and a mean native density; and said method further comprises compressing the aerial mycelium in a dimension which is substantially non-parallel with respect to the growth grain, thereby providing a compressed aerial mycelium.

LL44. The method of embodiment LL43, wherein the compressed aerial mycelium has a mean density, wherein the mean density of the compressed aerial mycelium is at least about 2-fold greater than the mean native density of the aerial mycelium.

LL45. An aerial mycelium comprising:
a growth grain; and
at least three of the following properties:
i. a mean native density, wherein the mean native density is within a range of about 0.1 pounds per cubic foot (pcf) to about 15 pcf;
ii. a native moisture content, wherein the native moisture content is within a range of about 75% (w/w) to about 95% (w/w);
iii. a native Kramer shear force in a dimension substantially parallel to the growth grain, wherein the native Kramer shear force in the dimension substantially parallel to the growth grain is within a range of about 1 kilogram/gram (kg/g) to about 3 kg/g;
iv. a native ultimate tensile strength in a dimension substantially parallel to the growth grain, wherein the native ultimate tensile strength in the dimension substantially parallel to the growth grain is no greater than about 3 pounds per square inch (psi);
v. a native ultimate tensile strength in a dimension substantially parallel to the growth grain and a native ultimate tensile strength in a dimension substantially perpendicular to the growth grain, wherein the native ultimate tensile strength in the dimension substantially parallel to the growth grain is at least about 2-fold greater than the native ultimate tensile strength in the dimension substantially perpendicular to the growth grain;
vi. a native compressive modulus at 10% strain in a dimension substantially parallel to the growth grain, wherein the native compressive modulus at 10% strain in the dimension substantially parallel to the growth grain is at most about 5 psi;
vii. a native compressive modulus at 10% strain in a dimension substantially parallel to the growth grain and a native compressive modulus at 10% strain in a dimension substantially perpendicular to the growth grain, wherein the native compressive modulus at 10% strain in the dimension substantially parallel to the growth grain is at least about 2-fold greater than the native compressive modulus at 10% strain in the dimension substantially perpendicular to the growth grain;
viii. a native compressive stress at 10% strain in a dimension substantially parallel to the growth grain, wherein the native compressive stress at 10% strain in the dimension substantially parallel to the growth grain is at most about 1 psi;
ix. a native compressive stress at 10% strain in a dimension substantially parallel to the growth grain and a native compressive stress at 10% strain in a dimension substantially perpendicular to the growth grain, wherein the native compressive stress at 10% strain in the dimension substantially parallel to the growth grain is at least about 2-fold greater than the native compressive stress at 10% strain in the dimension substantially perpendicular to the growth grain;
x. a mean native thickness, wherein the mean native thickness is at least about 15 millimeters (mm); and
xi. a maximum native thickness, wherein the maximum native thickness is at least about 30 mm.

LL46. The aerial mycelium of embodiment LL45, wherein the aerial mycelium does not contain a visible fruiting body.

LL47. The aerial mycelium of embodiment LL45 or LL46, wherein the aerial mycelium comprises at least four of said properties.

LL48. The aerial mycelium of embodiment LL45 or LL46, wherein the aerial mycelium comprises at least five of said properties.

LL49. The aerial mycelium of embodiment LL45 or LL46, wherein the aerial mycelium comprises at least six of said properties.

LL50. The aerial mycelium of embodiment LL45 or LL46, wherein the aerial mycelium comprises at least seven of said properties.

LL51. The aerial mycelium of embodiment LL45 or LL46, wherein the aerial mycelium comprises at least eight of said properties.

LL52. The aerial mycelium of embodiment LL45 or LL46, wherein the aerial mycelium comprises at least nine of said properties.

LL53. The aerial mycelium of embodiment LL45 or LL46, wherein the aerial mycelium comprises ten or eleven of said properties.

LL54. The aerial mycelium of any one of embodiments LL45 to LL53, wherein the aerial mycelium comprises a perimeter, wherein:
each said native compressive modulus and each said native compressive stress is at least about 1 inch from the perimeter.

LL55. The aerial mycelium of any one of embodiments LL45 to LL54, wherein the native moisture content is at least about 80% (w/w).

LL56. The aerial mycelium of any one of embodiments LL45 to LL55, wherein the native moisture content is at most about 93% (w/w).

LL57. The aerial mycelium of any one of embodiments LL45 to LL56, wherein the native compressive modulus at 10% strain in the dimension substantially parallel to the growth grain is at most about 20-fold greater than the native compressive modulus at 10% strain in the dimension substantially perpendicular to the growth grain.

LL58. The aerial mycelium of any one of embodiments LL45 to LL57, wherein the native compressive stress at 10% strain in the dimension substantially parallel to the growth grain is at most about 10-fold greater than the native compressive stress at 10% strain in the dimension substantially perpendicular to the growth grain.

LL59. The aerial mycelium of any one of embodiments LL45 to LL58, wherein the native compressive modulus at 10% strain in the dimension substantially parallel to the growth grain is at most about 15-fold greater than the native compressive modulus at 10% strain in the dimension substantially perpendicular to the growth grain.

LL60. The aerial mycelium of any one of embodiments LL45 to LL59, wherein the native compressive modulus at 10% strain in the dimension substantially parallel to the growth grain is at least about 3-fold greater than the native compressive modulus at 10% strain in the dimension substantially perpendicular to the growth grain.

LL61. The aerial mycelium of any one of embodiments LL45 to LL60, wherein the native ultimate tensile strength in the dimension substantially parallel to the growth grain is at most about 10-fold greater than the native ultimate tensile strength in the dimension substantially perpendicular to the growth grain.

LL62. The aerial mycelium of any one of embodiments LL45 to LL61, wherein the native ultimate tensile strength in the dimension substantially parallel to the growth grain is at most about 5-fold greater than the native ultimate tensile strength in the dimension substantially perpendicular to the growth grain.

LL63. The aerial mycelium of any one of embodiments LL45 to LL62, wherein the native compressive modulus at 10% strain in the dimension substantially parallel to the growth grain is no greater than about 4 psi.

LL64. The aerial mycelium of any one of embodiments LL45 to LL63, wherein the mean native density is at most about 10 pcf.

LL65. The aerial mycelium of any one of embodiments LL45 to LL64, wherein the native Kramer shear force is at most about 2.5 kg/g.

LL66. The aerial mycelium of any one of embodiments LL45 to LL65, wherein the native ultimate tensile strength in the dimension substantially parallel to the growth grain is at most about 2 psi.

LL67. The aerial mycelium any one of embodiments LL45 to LL66, wherein the native compressive modulus at 10% strain in the dimension substantially parallel to the growth grain is at most about 3 psi.

LL68. The aerial mycelium of any one of embodiments LL45 to LL67, wherein the native Kramer shear force is at most about 2 kg/g.

LL69. The aerial mycelium of any one of embodiments LL45 to LL68, wherein the native compressive stress at 10% strain in the dimension substantially parallel to the growth grain is at most about 0.5 psi.

LL70. The aerial mycelium of any one of embodiments LL45 to LL69, further comprising a native compressive stress at 65% strain in a dimension substantially parallel to the growth grain, wherein the native compressive stress at 65% strain upon compression in the dimension substantially parallel to the growth grain is at most about 1 psi.

LL71. The aerial mycelium of any one of embodiments LL45 to LL70, wherein the mean native density is at most about 5 pcf.

LL72. The aerial mycelium of any one of embodiments LL45 to LL71, wherein the native compressive stress at 65% strain upon compression in the dimension substantially parallel to the growth grain is at most about 0.5 psi.

LL73. The aerial mycelium of any one of embodiments LL45 to LL72, wherein the aerial mycelium comprises a perimeter, wherein: each said native compressive modulus and each said native compressive stress is at least about 2 inches from the perimeter.

LL74. The aerial mycelium of any one of embodiments LL45 to LL73, wherein the aerial mycelium comprises a perimeter, wherein:
each said native ultimate tensile strength is at least about 1 inch from the perimeter.

LL75. The aerial mycelium of any one of embodiments LL45 to LL74, wherein the mean native thickness is at least about 30 mm, at least about 40 mm or at least about 50 mm.

LL76. The aerial mycelium of any one of embodiments LL45 to LL75, wherein the aerial mycelium is a growth product of a fungus of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces* or *Wolfiporia*.

LL77. The aerial mycelium of embodiment LL76, wherein the aerial mycelium is a growth product of a fungus of the genus *Pleurotus*.

LL78. The aerial mycelium of embodiment LL77, wherein the fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuber-regium*.

LL79. The aerial mycelium of any one of embodiments LL45 to LL78, wherein the aerial mycelium is a growth product of an edible filamentous fungus.

LL80. The aerial mycelium of embodiment LL79, wherein the edible filamentous fungus is *Pleurotus ostreatus*.

LL81. The aerial mycelium of any one of embodiments LL45 to LL80, wherein the aerial mycelium is suitable for use in the manufacture of a food product.

LL82. The aerial mycelium of any one of embodiments LL45 to LL81, wherein the aerial mycelium is for use in the manufacture of a food product.

LL83. The aerial mycelium of embodiment LL81 or LL82, wherein the food product is a mycelium-based food product.

LL84. The aerial mycelium of embodiment LL81, LL82 or LL83, wherein the food product is a whole muscle meat alternative, a seafood alternative or a poultry alternative.

LL85. The aerial mycelium of embodiment LL81, LL82 or LL83, wherein the food product is a bacon alternative, a jerky alternative or a deli meat alternative.

LL86. The aerial mycelium of embodiment LL81, LL82 or LL83, wherein the food product is a carbohydrate alternative.

LL87. The aerial mycelium of embodiment LL86, wherein the carbohydrate alternative is a pasta, a confection, a snack food, a bread or a baked good.

LL88. A food product comprising an aerial mycelium of any one of embodiments LL45 to LL87.

LL89. A food product, wherein the food product is produced using an aerial mycelium of any one of embodiments LL45 to LL87.

LL90. A batch of aerial mycelia, wherein each aerial mycelium in the batch is an aerial mycelium of any one of embodiments LL45 to LL87.

LL91. A batch of aerial mycelial panels, wherein each aerial mycelial panel in the batch has a growth grain, and wherein greater than 50% of the panels in the batch comprises at least three of the properties recited in embodiment LL45.

LL92. The batch of aerial mycelial panels of embodiment LL91, wherein greater than 50% of the aerial mycelial panels in the batch comprise at least four of the properties recited in embodiment LL45.

LL93. The batch of aerial mycelial panels of embodiment LL91, wherein greater than 50% of the aerial mycelial panels in the batch comprise at least five of the properties recited in embodiment LL45.

LL94. The batch of aerial mycelial panels of embodiment LL91, wherein greater than 50% of the aerial mycelial panels in the batch comprise at least six of the properties recited in embodiment LL45.

LL95. The batch of aerial mycelial panels of embodiment LL91, wherein greater than 50% of the aerial mycelial panels in the batch comprise at least seven of the properties recited in embodiment LL45.

LL96. The batch of aerial mycelial panels of embodiment LL91, wherein greater than 50% of the aerial mycelial panels in the batch comprise at least eight of the properties recited in embodiment LL45.

LL97. The batch of aerial mycelial panels of embodiment LL91, wherein greater than 50% of the aerial mycelial panels in the batch comprise at least nine of the properties recited in embodiment LL45.

LL98. The batch of aerial mycelial panels of embodiment LL91, wherein greater than 50% of the aerial mycelial panels in the batch comprise at least ten of the properties recited in embodiment LL45.

LL99. The batch of aerial mycelial panels of any one of embodiments LL91 to LL98, wherein greater than 50% of the aerial mycelial panels in the batch does not contain a visible fruiting body.

LL100. The batch of aerial mycelial panels of embodiment LL99, wherein each aerial mycelial panel of the batch does not contain a visible fruiting body.

Embodiment(s) M

1. A method of making an aerial mycelium, comprising:
incubating a growth matrix in a growth environment for an incubation time period, wherein the growth matrix comprises a substrate and a fungus; introducing aqueous mist into the growth environment throughout the incubation time period, or a portion thereof; and
producing extra-particle aerial mycelial growth from the growth matrix;
wherein introducing comprises introducing the aqueous mist into the growth environment resulting in a mean mist deposition rate of at most about 0.45 microliter/cm2/hour.

2. The method of embodiment 1, wherein the introducing comprises introducing the aqueous mist into the growth environment resulting in an instantaneous mist deposition rate and the mean mist deposition rate, wherein the ratio of the instantaneous mist deposition rate to the mean mist deposition rate is at most about 20 to about 1.

3. The method of embodiment 2, wherein the ratio of the instantaneous mist deposition rate to the mean mist deposition rate is at most about 10 to about 1.

4. The method of embodiment 3, wherein the ratio of the instantaneous mist deposition rate to the mean mist deposition rate is at most about 5 to about 1.

5. The method of embodiment 1, wherein:
the growth environment comprises a misting apparatus; and
introducing comprises introducing the aqueous mist into the growth environment via the misting apparatus, resulting in the mean mist deposition rate;
wherein the misting apparatus is operated at a duty cycle, and wherein the duty cycle is at least about 5%.

6. The method of embodiment 5, wherein the duty cycle is at least about 10%.

7. The method of embodiment 6, wherein the duty cycle is at least about 20%.

8. The method of any one of embodiments 1 to 7, wherein introducing further comprises introducing the aqueous mist into the growth environment resulting in an instantaneous mist deposition rate of at most about 2 microliter/cm2/hour.

9. The method of any one of embodiments 1 to 8, wherein introducing comprises introducing the aqueous mist into the growth environment resulting in a mean mist deposition rate of at most about 0.40 microliter/cm2/hour, at most about 0.35 microliter/cm2/hour, at most about 0.30 microliter/cm2/hour, at most about 0.25 microliter/cm2/hour, or at most about 0.20 microliter/cm2/hour.

10. The method of any one of embodiments 1 to 9, wherein the mean mist deposition rate is at least about 0.01 microliter/cm2/hour.

11. The method of embodiment 1, wherein introducing comprises introducing the aqueous mist into the growth environment resulting in a mean mist deposition rate that is below about 0.01 microliter/cm2/hour.

12. The method of embodiment 11, wherein introducing comprises introducing the aqueous mist into the growth environment resulting in a mean mist deposition rate that does not result in a detectable quantity of deposited mist in the growth environment.

13. The method of embodiment 12, wherein introducing comprises introducing the aqueous mist into the growth environment resulting in a mean mist deposition rate that does not result in a visible quantity of deposited mist in the growth environment.

14. The method of embodiment 13, wherein introducing comprises introducing the aqueous mist into the growth environment resulting in a mean mist deposition rate that does not result in a measurable quantity of deposited mist in the growth environment.

15. The method of embodiment 14, wherein introducing comprises introducing the aqueous mist into the growth environment resulting in a mean mist deposition rate that does not result in detectable quantities of deposited mist in the growth environment on the growth matrix, the extra-particle aerial mycelial growth, or both.

16. A method of making an aerial mycelium, comprising:
incubating a growth matrix in a growth environment for an incubation time period, wherein the growth matrix comprises a substrate and a fungus;
introducing aqueous mist into the growth environment throughout the incubation time period, or a portion thereof; and
producing extra-particle aerial mycelial growth from the growth matrix;
wherein the total quantity of aqueous mist resulting from the introducing aqueous mist that is deposited on the growth matrix, the resulting extra-particle aerial mycelial growth, or both, is negligible.

17. A method of making an aerial mycelium, comprising:
providing a growth environment, the growth environment comprising an amount of aqueous mist;
incubating a growth matrix in the growth environment for an incubation time period, wherein the growth matrix comprises a substrate and a fungus, wherein incubating comprises exposing the growth matrix to the aqueous mist during at least a portion of the incubation time period; and
producing extra-particle aerial mycelial growth from the growth matrix;
wherein a mean mist deposition rate resulting from the amount of aqueous mist during the at least a portion of the incubation time period is below about 0.01 microliter/cm2/hour.

18. The method of embodiment 17, wherein the mean mist deposition rate is below an amount that results in a detectable quantity of deposited mist in the growth environment.

19. The method of embodiment 17 or 18, further comprising introducing the aqueous mist into the growth environment.

20. A method of making an aerial mycelium, comprising:
introducing aqueous mist into a growth environment;
incubating a growth matrix in a growth environment for an incubation time period, wherein the growth matrix comprises a substrate and a fungus, and wherein incubating comprises exposing the growth matrix to the aqueous mist; and
producing extra-particle aerial mycelial growth from the growth matrix;
wherein introducing comprises introducing the aqueous mist into the growth environment resulting in a mean mist deposition rate that is below about 0.01 microliter/cm2/hour.

21. The method of embodiment 20, wherein introducing comprises introducing the aqueous mist into the growth environment resulting in a mean mist deposition rate that does not result in a detectable quantity of deposited mist in the growth environment.

22. The method of any one of embodiments 1 to 21, wherein the growth matrix comprises the substrate and a fungal inoculum, said fungal inoculum comprising said fungus.

23. The method of any one of embodiments to 21, wherein the growth matrix comprises a colonized substrate, said colonized substrate comprising the substrate, wherein said substrate is previously colonized with mycelium of said fungus.

24. The method of embodiment 23, wherein the colonized substrate is a fragmented colonized substrate.

25. The method of any one of embodiments 1 to 24, wherein said growth environment comprises a growth atmosphere, said growth atmosphere having a carbon dioxide content, wherein said carbon dioxide content is no greater than about 7% (v/v) over the course of the incubation time period.

26. The method of any one of embodiments 1 to 25, wherein said growth environment comprises a growth atmosphere, said growth atmosphere having a carbon dioxide content, wherein said carbon dioxide content is no greater than about 5% (v/v) over the course of the incubation time period.

27. The method of any one of embodiments 1 to 26, wherein said growth environment comprises a growth atmosphere, said growth atmosphere having a carbon dioxide content, wherein said carbon dioxide content is less than about 3% (v/v) over the course of the incubation time period.

28. The method of any one of embodiments 1 to 27, wherein said growth environment comprises a growth atmosphere, said growth atmosphere having a carbon dioxide content, wherein said carbon dioxide content is less than 2.5% (v/v) over the course of the incubation time period.

29. The method of any one of embodiments 1 to 28, wherein said growth environment comprises a growth atmosphere, said growth atmosphere having a mean carbon dioxide content, wherein said mean carbon dioxide content is no greater than about 2% (v/v) over the course of the incubation time period.

30. The method of any one of embodiments 1 to 29, wherein said growth environment comprises a growth atmosphere, said growth atmosphere having a carbon dioxide content, wherein said carbon dioxide content is at least about 0.02% (v/v), is at least about 0.03% (v/v) or is at least about 0.04% (v/v).

31. The method of any one of embodiments 1 to 30, wherein said growth environment comprises a growth atmosphere, said growth atmosphere having a carbon dioxide content, wherein said carbon dioxide content modulates with fungal respiration over the course of the incubation time period.

32. The method of any one of embodiments 1 to 31, wherein said growth environment comprises a growth atmosphere, said growth atmosphere having a carbon dioxide content, wherein said carbon dioxide content is not a preselected carbon dioxide content.

33. The method of any one of embodiments 1 to 32, wherein introducing comprises introducing aqueous mist into the growth environment throughout a portion of the incubation time period, wherein the portion of the incubation time period comprises a mycelial vertical expansion phase.

34. The method of any one of the embodiments 1 to 33, wherein introducing comprises introducing aqueous mist into the growth environment throughout a portion of the incubation time period, wherein the portion of the incubation time period begins during a second day, a third day or a fourth day of the incubation time period.

35. The method of any one of embodiments 1 to 32, wherein introducing comprises introducing aqueous mist into the growth environment throughout the incubation time period.

36. The method of any one of embodiments 1 to 35, wherein:
 (i) the incubation time period ends no later than when a visible fruiting body forms;
 (ii) the incubation time period ends when a visible fruiting body forms; or
 (iii) the extra-particle aerial mycelial growth does not contain a visible fruiting body.

37. The method of any one of embodiments 1 to 36, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces, Wolfiporia, Ceriporiopsis, Chlorociboria, Daedalea, Daedaleopsis, Daldinia, Ganoderma, Hypoxylon, Inonotus, Lenzites, Omphalotus, Oxyporus, Phanerochaete, Phellinus, Polyporellus, Porodaedalea, Pycnoporus, Scytalidium, Stereum, Trametes* or *Xylaria.*

38. The method of embodiment 37, wherein the fungus is a species of the genus *Bondarzewia, Ceriporiopsis, Daedalea, Daedaleopsis, Fomitopsis, Ganoderma, Inonotus, Lenzites, Omphalotus, Oxyporus, Phellinus, Polyporellus, Polyporus, Porodaedalea, Pycnoporus, Stereum, Trametes* or *Xylaria.*

39. The method of embodiment 38, wherein the fungus is selected from the group consisting of *Bondarzewia berkleyii, Daedalea quercina, Daedaleopsis* spp., *Daedaleopsis confragosa, Daedaleopsis septentrionalis, Fomitopsis* spp., *Fomitopsis cajanderi, Fomitopsis pinicola, Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma* lingzhi, *Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Inonotus* spp., *Inonotus obliqus, Inonotus hispidus, Inonotus dryadeus, Inonotus tomentosus, Lenzites betulina, Phellinus* spp., *Phellinus ignarius, Phellinus gilvus, Polyporus* spp., *Polyporus squamosus, Polyporus badius, Polyporus umbellatus, Polyporus squamosus, Polyporus tuberaster, Polyporus arcularius, Polyporus albeolaris, Polyporus radicatus, Porodaedalea pini, Pycnoporus* spp., *Pycnoporus* spp., *Pycnoporus sanguineus, Pycnoporus cinnabarinus, Stereum* spp., *Stereum ostea, Stereum hirsutum, Trametes* spp., *Trametes versicolor, Trametes elegans, Trametes suaveolens, Trametes hirsute, Trametes gibbosa, Trametes ochraceae, Trametes villosa, Trametes cubensis* and *Trametes pubescens*.

40. The method of embodiment 37, wherein the fungus is a species of the genus *Ganoderma*.

41. The method of embodiment 40, wherein the fungus is *Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum* or *Ganoderma weberianum*.

42. The method of embodiment 41, wherein the fungus is *Ganoderma sessile*.

43. The method of embodiment 37, wherein the fungus is a species of the genus *Trametes*.

44. The method of embodiment 43, wherein the fungus is *Trametes* spp., *Trametes versicolor, Trametes elegans, Trametes suaveolens, Trametes hirsute, Trametes gibbosa, Trametes ochraceae, Trametes villosa, Trametes cubensis* or *Trametes pubescens*.

45. The method of embodiment 37, wherein the fungus is a pigment-producing fungus of a genus selected from the group consisting of *Chlorociboria, Daldinia, Hypoxylon, Phanerochaete* and *Scytalidium*.

46. The method of any one of embodiments 1 to 45, wherein the mist comprises a solute.

47. The method of any one of embodiments 1 to 46, wherein the aqueous mist conductivity is no greater than about 1,000 microsiemens/cm, no greater than about 800 microsiemens/cm, no greater than about 500 microsiemens/cm, no greater than about 400 microsiemens/cm, or no greater than about 300 microsiemens/cm.

48. The method of any one of embodiments 1 to 47, wherein the aqueous mist conductivity is less than 300 microsiemens/cm.

49. The method of any one of embodiments 1 to 48, wherein the aqueous mist conductivity is no greater than about 250 microsiemens/cm, no greater than about 200 microsiemens/cm, no greater than about 150 microsiemens/cm or no greater than about 100 microsiemens/cm.

50. The method of any one of embodiments 1 to 49, wherein the aqueous mist conductivity is no greater than about 50 microsiemens/cm.

51. The method of any one of embodiments 1 to 50, wherein the aqueous mist conductivity is no greater than about 25 microsiemens/cm, no greater than about 10 microsiemens/cm, no greater than about 5 microsiemens/cm, or no greater than about 3 microsiemens/cm.

52. The method of any one of embodiments 1 to 51, wherein the growth environment is not a dark environment.

53. The method of any one of embodiments 1 to 52, wherein the growth environment does not exclude light.

54. The method of any one of embodiments 1 to 52, wherein the growth environment comprises natural light.

55. The method of any one of embodiments 1 to 52, wherein the growth environment comprises a growing light.

56. The method of any one of embodiments 1 to 55, wherein the growth environment comprises an airflow.

57. The method of embodiment 56, wherein the airflow has a velocity, and wherein the airflow velocity is greater than about 250 linear feet per minute (lfm).

58. The method of embodiment 56, wherein the airflow has a velocity, and wherein the airflow velocity is less than about 150 lfm, is less than about 125 lfm, is less than about 100 lfm, or is less than about 75 lfm.

59. The method of embodiment 58, wherein the airflow velocity is less than about 50 lfm, is less than about 40 lfm, is less than about 30 lfm or is less than about 25 lfm.

60. The method of any one of embodiments 56 to 59, wherein the airflow is a substantially horizontal airflow.

61. The method of any one of embodiments 1 to 60, further comprising removing the extra-particle aerial mycelial growth from the growth matrix, thereby providing an aerial mycelium.

62. The method of embodiment 61, wherein:
the aerial mycelium comprises a growth grain; and
said method further comprises compressing the aerial mycelium in a dimension which is substantially parallel with respect to the growth grain, thereby providing a compressed aerial mycelium.

63. The method of any one of embodiments 1 to 60, wherein the extra-particle aerial mycelial growth comprises a growth grain, said method further comprising compressing the extra-particle aerial mycelial growth in a dimension which is substantially parallel with respect to the growth grain, thereby providing a compressed extra-particle mycelial growth product.

64. The method of embodiment 63, further comprising removing the compressed extra-particle aerial mycelial growth product from the growth matrix, thereby providing a compressed aerial mycelium.

65. An aerial mycelium obtained by a method of any one of embodiments 1 to 61.

66. The aerial mycelium of embodiment 65, wherein the aerial mycelium is suitable for use in the manufacture of a textile.

67. The aerial mycelium of embodiment 65, wherein the aerial mycelium is for use in the manufacture of a textile.

68. The aerial mycelium of embodiment 66 or 67, wherein the textile is a leather-like material.

69. The aerial mycelium of embodiment 65, wherein the aerial mycelium is suitable for use in the manufacture of a petroleum-based product alternative.

70. The aerial mycelium of embodiment 65, wherein the aerial mycelium is for use in the manufacture of a petroleum-based product alternative.

71. The aerial mycelium of embodiment 69 or 70, wherein the petroleum-based product alternative is a foam.

72. A compressed aerial mycelium obtained by a method of any one of embodiments 62 and 64B.

73. The compressed aerial mycelium of embodiment 72, wherein the compressed aerial mycelium is suitable for use in the manufacture of a textile.

74. The compressed aerial mycelium of embodiment 72, wherein the compressed aerial mycelium is for use in the manufacture of a textile.

75. The compressed aerial mycelium of embodiment 73 or 74, wherein the textile is a leather-like material.

76. The compressed aerial mycelium of embodiment 72, wherein the compressed aerial mycelium is suitable for use in the manufacture of petroleum-based product alternative.

77. The compressed aerial mycelium of embodiment 72, wherein the compressed aerial mycelium is for use in the manufacture of petroleum-based product alternative.

78. The compressed aerial mycelium of embodiment 76 or 77, wherein the petroleum-based product alternative is a foam.

Embodiment N

1. A method of making an aerial mycelium, comprising:
incubating a growth matrix in a growth environment for an incubation time period, wherein the growth matrix comprises a substrate and a fungus;
introducing aqueous mist into the growth environment during the incubation time period, or a portion thereof; and
producing extra-particle aerial mycelial growth from the growth matrix;
wherein:
the growth environment comprises a growth atmosphere characterized as having a carbon dioxide content, wherein the carbon dioxide content is less than about 3% (v/v) over the course of the incubation time period; and
(i) the incubation time period ends no later than when a visible fruiting body forms;
(ii) the incubation time period ends when a visible fruiting body forms; or
(iii) the extra-particle aerial mycelial growth does not contain a visible fruiting body.

2. The method of embodiment 1, wherein the carbon dioxide content is less than 2.5% (v/v) over the course of the incubation time period.

3. The method of embodiment 1 or 2, wherein the mean carbon dioxide content over the course of the incubation time period is no greater than about 2.5% (v/v).

4. The method of embodiment 3, wherein the mean carbon dioxide content over the course of the incubation time period is no greater than about 2% (v/v).

5. The method of any one of embodiments 1 to 4, wherein the carbon dioxide content is at least about 0.02% (v/v), is at least about 0.03% (v/v) or is at least about 0.04% (v/v).

6. The method of any one of embodiments 1 to 5, wherein the carbon dioxide content modulates with fungal respiration over the course of the incubation time period.

7. The method of any one of embodiments 1 to 6, wherein the carbon dioxide content is not a preselected carbon dioxide content.

8. The method of any one of embodiments 1 to 7, wherein the extra-particle aerial mycelial growth does not contain a visible fruiting body.

9. The method of any one of embodiments 1 to 8, wherein introducing comprises introducing aqueous mist into the growth environment throughout the incubation time period, or a portion thereof.

10. The method of any one of embodiments 1 to 9, wherein introducing comprises introducing the aqueous mist into the growth environment resulting in an instantaneous mist deposition rate and a mean mist deposition rate.

11. The method of embodiment 1, wherein the ratio of the instantaneous mist deposition rate to the mean mist deposition rate is at most about 20 to about 1.

12. The method of embodiment 11, wherein the ratio of the instantaneous mist deposition rate to the mean mist deposition rate is at most about 10 to about 1.

13. The method of embodiment 12, wherein the ratio of the instantaneous mist deposition rate to the mean mist deposition rate is at most about 5 to about 1.

14. The method of any one of embodiments 1 to 10, wherein:
the growth environment comprises a misting apparatus; and
introducing comprises introducing the aqueous mist into the growth environment via the misting apparatus, resulting in the mean mist deposition rate;
wherein the misting apparatus is operated at a duty cycle, and wherein the duty cycle is at least about 5%.

15. The method of embodiment 14, wherein the duty cycle is at least about 10%.

16. the method of embodiment 15, wherein the duty cycle is at least about 20%.

17. The method of any one of the preceding embodiments, wherein introducing comprises introducing the aqueous mist into the growth environment resulting in a mean mist deposition rate of at most about 10 microliter/cm2/hour.

18. The method of any one of the preceding embodiments, wherein introducing comprises introducing the aqueous mist into the growth environment resulting in a mean mist deposition rate of at most about 5 microliter/cm2/hour.

19. The method of any one of the preceding embodiments, wherein introducing comprises introducing the aqueous mist into the growth environment resulting in a mean mist deposition rate of at most about 3 microliter/cm2/hour.

20. The method of any one of the preceding embodiments, wherein introducing comprises introducing the aqueous mist into the growth environment resulting in a mean mist deposition rate of at most about 2 microliter/cm2/hour.

21. The method of any one of the preceding embodiments, wherein introducing comprises introducing the aqueous mist into the growth environment resulting in a mean mist deposition rate of at most about 1 microliter/cm2/hour, is at most about 0.8 microliter/cm2/hour, or is at most about 0.5 microliter/cm2/hour.

22. A method of making an aerial mycelium, comprising:
incubating a growth matrix in a growth environment for an incubation time period, wherein the growth matrix comprises a substrate and a fungus;
introducing aqueous mist into the growth environment during the incubation time period, or a portion thereof, wherein the aqueous mist comprises a conductivity, wherein the conductivity is no greater than about 50 microsiemens/cm; and
producing extra-particle aerial mycelial growth from the growth matrix;
wherein:
the growth environment comprises a growth atmosphere characterized as having a carbon dioxide content, wherein the carbon dioxide content is less than about 7% (v/v) over the course of the incubation time period; and
(i) the incubation time period ends no later than when a visible fruiting body forms;

(ii) the incubation time period ends when a visible fruiting body forms; or (iii) the extra-particle aerial mycelial growth does not contain a visible fruiting body.

23. The method of embodiment 22, wherein the growth environment comprises a growth atmosphere characterized as having a carbon dioxide content, wherein the carbon dioxide content is less than about 3% (v/v) over the course of the incubation time period.

24. The method of embodiment 22 or 23, wherein the aqueous mist conductivity is no greater than about 25 microsiemens/cm, is no greater than about 10 microsiemens/cm, is no greater than about 5 microsiemens/cm, or is no greater than about 3 microsiemens/cm.

25. The method of any one of the preceding embodiments, wherein introducing further comprises introducing the aqueous mist into the growth environment resulting in an instantaneous mist deposition rate of at most about 2 microliter/cm2/hour.

26. The method of any one of the preceding embodiments, wherein introducing comprises introducing the aqueous mist into the growth environment resulting in a mean mist deposition rate of at most about 0.50 microliter/cm2/hour, at most about 0.45 microliter/cm2/hour, at most about 0.40 microliter/cm2/hour, or at most about 0.35 microliter/cm2/hour.

27. The method of any one of the preceding embodiments, wherein the mean mist deposition rate is at least about 0.01 microliter/cm2/hour.

28. The method of any one of embodiments 1 to 16, wherein introducing comprises introducing the aqueous mist into the growth environment resulting in a mean mist deposition rate that is below about 0.01 microliter/cm2/hour.

29. The method of embodiment 28, wherein introducing comprises introducing the aqueous mist into the growth environment resulting in a mean mist deposition rate that does not result in a detectable quantity of deposited mist in the growth environment.

30. The method of embodiment 29, wherein introducing comprises introducing the aqueous mist into the growth environment resulting in a mean mist deposition rate that does not result in a visible quantity of deposited mist in the growth environment.

31. The method of embodiment 30, wherein introducing comprises introducing the aqueous mist into the growth environment resulting in a mean mist deposition rate that does not result in a measurable quantity of deposited mist in the growth environment.

32. The method of embodiments 31, wherein introducing comprises introducing the aqueous mist into the growth environment resulting in a mean mist deposition rate that does not result in detectable quantities of deposited mist in the growth environment on the growth matrix, the extra-particle aerial mycelial growth, or both.

33. The method of any one of embodiments 1 to 32, wherein the growth matrix comprises the substrate and a fungal inoculum, said fungal inoculum comprising said fungus.

34. The method of any one of embodiments 1 to 32, wherein the growth matrix comprises a colonized substrate, said colonized substrate comprising the substrate, wherein said substrate is previously colonized with mycelium of said fungus.

35. The method of embodiment 34, wherein the colonized substrate is a fragmented colonized substrate.

36. The method of any one of embodiments 1 to 35, wherein introducing comprises introducing aqueous mist into the growth environment during a portion of the incubation time period, wherein the portion of the incubation time period comprises a mycelial vertical expansion phase.

37. The method of any one of the embodiments 1 to 36, wherein introducing comprises introducing aqueous mist into the growth environment during a portion of the incubation time period, wherein the portion of the incubation time period begins during a second day, a third day or a fourth day of the incubation time period.

38. The method of embodiment 36 or 37, wherein introducing comprises introducing the aqueous mist throughout the portion of the incubation time period.

39. The method of any one of embodiments 1 to 36, wherein introducing comprises introducing aqueous mist into the growth environment throughout the incubation time period.

40. The method of any one of embodiments 1 to 39, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces, Wolfiporia, Ceriporiopsis, Chlorociboria, Daedalea, Daedaleopsis, Daldinia, Ganoderma, Hypoxylon, Inonotus, Lenzites, Omphalotus, Oxyporus, Phanerochaete, Phellinus, Polyporellus, Porodaedalea, Pycnoporus, Scytalidium, Stereum, Trametes* or *Xylaria.*

41. The method of embodiment 40, wherein the fungus is a species of the genus *Bondarzewia, Ceriporiopsis, Daedalea, Daedaleopsis, Fomitopsis, Ganoderma, Inonotus, Lenzites, Omphalotus, Oxyporus, Phellinus, Polyporellus, Polyporus, Porodaedalea, Pycnoporus, Stereum, Trametes* or *Xylaria.*

42. The method of embodiment 41, wherein the fungus is selected from the group consisting of *Bondarzewia berkleyii, Daedalea quercina, Daedaleopsis* spp., *Daedaleopsis confragosa, Daedaleopsis septentrionalis, Fomitopsis* spp., *Fomitopsis cajanderi, Fomitopsis pinicola, Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Inonotus* spp., *Inonotus obliqus, Inonotus hispidus, Inonotus dryadeus, Inonotus tomentosus, Lenzites betulina, Phellinus* spp., *Phellinus ignarius, Phellinus gilvus, Polyporus* spp., *Polyporus squamosus, Polyporus badius, Polyporus umbellatus, Polyporus squamosus, Polyporus tuberaster, Polyporus arcularius, Polyporus albeolaris, Polyporus radicatus, Porodaedalea pini, Pycnoporus* spp., *Pycnoporus* spp., *Pycnoporus sanguineus, Pycnoporus cinnabarinus, Stereum* spp., *Stereum ostea, Stereum hirsutum, Trametes* spp., *Trametes versicolor, Trametes elegans, Trametes suaveolens, Trametes hirsute, Trametes gibbosa, Trametes ochraceae, Trametes villosa, Trametes cubensis* and *Trametes pubescens.*

43. The aerial mycelium of embodiment 42, wherein the fungus is a species of the genus *Ganoderma* or *Trametes*

44. The aerial mycelium of embodiment 43, wherein the fungus is *Ganoderma* spp., *Ganoderma amboinense*, *Ganoderma applanatum*, *Ganoderma atrum*, *Ganoderma australe*, *Ganoderma brownii*, *Ganoderma capense*, *Ganoderma carnosum*, *Ganoderma cochlear*, *Ganoderma colossus*, *Ganoderma curtisii*, *Ganoderma donkii*, *Ganoderma formosanum*, *Ganoderma gibbosum*, *Ganoderma hainanense*, *Ganoderma hoehnelianum Ganoderma japonicum*, *Ganoderma lingzhi*, *Ganoderma lobatum*, *Ganoderma lucidum*, *Ganoderma multipileum*, *Ganoderma oregonense*, *Ganoderma pfeifferi*, *Ganoderma resinaceum*, *Ganoderma sessile*, *Ganoderma sichuanense*, *Ganoderma sinense*, *Ganoderma tropicum*, *Ganoderma tsugae*, *Ganoderma tuberculosum*, *Ganoderma weberianum*, *Trametes* spp., *Trametes versicolor*, *Trametes elegans*, *Trametes suaveolens*, *Trametes hirsute*, *Trametes gibbosa*, *Trametes ochraceae*, *Trametes villosa*, *Trametes cubensis* or *Trametes pubescens*.

45. The aerial mycelium of embodiment 44, wherein the fungus is *Ganoderma sessile*.

46. The aerial mycelium of embodiment 40, wherein the fungus is a pigment-producing fungus of a genus selected from the group consisting of *Chlorociboria*, *Daldinia*, *Hypoxylon*, *Phanerochaete* and *Scytalidium*.

47. The method of any one of embodiments 1 to 46, wherein the aerial mycelium does not contain a visible fruiting body.

48. The method of any one of embodiments 1 to 47, wherein the growth environment is not a dark environment.

49. The method of any one of embodiments 1 to 47, wherein the growth environment does not exclude light.

50. The method of any one of embodiments 1 to 47, wherein the growth environment comprises natural light.

50. The method of any one of embodiments 1 to 47, wherein the growth environment comprises a growing light.

51. The method of any one of embodiments 1 to 50, wherein the growth environment comprises an airflow.

52. The method of embodiment 51, wherein the airflow has a velocity, and wherein the airflow velocity is less than about 150 lfm, is less than about 125 lfm, is less than about 100 lfm, or is less than about 75 lfm.

53. The method of embodiment 51 or 52, wherein the airflow is a substantially horizontal airflow.

54. The method of any one of embodiments 1 to 53, further comprising removing the extra-particle aerial mycelial growth from the growth matrix, thereby providing an aerial mycelium.

55. The method of any one of embodiments 1 to 54, wherein:
the aerial mycelium comprises a growth grain; and
said method further comprises compressing the aerial mycelium in a dimension which is substantially parallel with respect to the growth grain, thereby providing a compressed aerial mycelium.

56. The method of any one of embodiments 1 to 53, wherein the extra-particle aerial mycelial growth comprises a growth grain, said method further comprising compressing the extra-particle aerial mycelial growth in a dimension which is substantially parallel with respect to the growth grain, thereby providing a compressed extra-particle mycelial growth product.

57. The method of embodiment 56, further comprising removing the compressed extra-particle aerial mycelial growth product from the growth matrix, thereby providing a compressed aerial mycelium.

58. An aerial mycelium obtained by a method of any one of embodiments 1 to 54.

59. The aerial mycelium of embodiment 58, wherein the aerial mycelium is suitable for use in the manufacture of a textile.

60. The aerial mycelium of embodiment 58, wherein the aerial mycelium is for use in the manufacture of a textile.

61. The aerial mycelium of embodiment 59 or 60, wherein the textile is a leather-like material.

62. The aerial mycelium of embodiment 58, wherein the aerial mycelium is suitable for use in the manufacture of a petroleum-based product alternative.

63. The aerial mycelium of embodiment 58, wherein the aerial mycelium is for use in the manufacture of a petroleum-based product alternative.

64. The aerial mycelium of embodiment 62 or 63, wherein the petroleum-based product alternative is a foam.

65. A compressed aerial mycelium obtained by a method of embodiment 55 or 57.

66. The compressed aerial mycelium of embodiment 65, wherein the compressed aerial mycelium is suitable for use in the manufacture of a textile.

67. The compressed aerial mycelium of embodiment 65, wherein the compressed aerial mycelium is for use in the manufacture of a textile.

68. The compressed aerial mycelium of embodiment 66 or 67, wherein the textile is a leather-like material.

69. The compressed aerial mycelium of embodiment 65, wherein the compressed aerial mycelium is suitable for use in the manufacture of petroleum-based product alternative.

70. The compressed aerial mycelium of embodiment 65, wherein the compressed aerial mycelium is for use in the manufacture of petroleum-based product alternative.

71. The compressed aerial mycelium of embodiment 69 or 70, wherein the petroleum-based product alternative is a foam.

72. The method of any one of embodiments 1 to 39, wherein the fungus is a species of the genus *Agrocybe*, *Albatrellus*, *Armillaria*, *Agaricus*, *Bondarzewia*, *Cantharellus*, *Cerioporus*, *Climacodon*, *Cordyceps*, *Fistulina*, *Flammulina*, *Fomes*, *Fomitopsis*, *Fusarium*, *Grifola*, *Hericium*, *Hydnum*, *Hypomyces*, *Hypsizygus*, *Ischnoderma*, *Laetiporus*, *Laricifomes*, *Lentinula*, *Lentinus*, *Lepista*, *Meripilus*, *Morchella*, *Ophiocordyceps*, *Panellus*, *Piptoporus*, *Pleurotus*, *Polyporus*, *Pycnoporellus*, *Rhizopus*, *Schizophyllum*, *Stropharia*, *Tuber*, *Tyromyces* or *Wolfiporia*.

73. The method of embodiment 72, wherein the fungus is a species of the genus *Pleurotus*.

74. The method of embodiment 73, wherein the fungus is *Pleurotus albidus*, *Pleurotus citrinopilleatus*, *Pleurotus columbinus*, *Pleurotus cornucopiae*, *Pleurotus dryinus*, *Pleurotus djamor*, *Pleurotus eryngii*, *Pleurotus floridanus*, *Pleurotus nebrodensis*, *Pleurotus ostreatus*, *Pleurotus populinus*, *Pleurotus pulmonarius*, *Pleurotus sajor-caju*, *Pleurotus salmoneo-stramineus*, *Pleurotus salmonicolor* or *Pleurotus tuber-regium*.

75. The method of any one of embodiments 1 to 74, wherein the fungus is an edible filamentous fungus.

76. The method of embodiment 75, wherein the edible filamentous fungus is *Pleurotus ostreatus*.

77. The method of any one of embodiments 1 to 76, further comprising removing the extra-particle aerial mycelial growth from the growth matrix, thereby providing an aerial mycelium.

78. The method of embodiment 77, wherein:
the aerial mycelium comprises a growth grain and a mean native density; and said method further comprises compressing the aerial mycelium in a dimension which is substantially non-parallel with respect to the growth grain, thereby providing a compressed aerial mycelium.

79. The method of embodiment 78, wherein the compressed aerial mycelium has a mean density, wherein the mean density of the compressed aerial mycelium is at least about 2-fold greater than the mean native density of the aerial mycelium.

80. The method of any one of embodiments 1 to 79, wherein the aerial mycelium does not contain a visible fruiting body.

81. An aerial mycelium obtained by a method of any one of embodiments 1 to 80.

82. The aerial mycelium of embodiment 81, wherein the aerial mycelium is suitable for use in the manufacture of a food product.

83. The aerial mycelium of embodiment 81, wherein the aerial mycelium is for use in the manufacture of a food product.

84. The aerial mycelium of embodiment 82 or 83, wherein the food product is a mycelium-based food product.

85. The aerial mycelium of embodiment 82, 83 or 84, wherein the food product is a whole muscle meat alternative, a seafood alternative or a poultry alternative.

86. The aerial mycelium of embodiment 82, 83 or 84, wherein the food product is a bacon alternative, a jerky alternative or a deli meat alternative.

87. The aerial mycelium of embodiment 82, 83 or 84, wherein the food product is a carbohydrate alternative.

88. The aerial mycelium of embodiment 87, wherein the carbohydrate alternative is a pasta, a confection, a snack food, a bread or a baked good.

89. A food product comprising an aerial mycelium of any one of embodiments 81 to 88.

90. A food product, wherein the food product is produced using an aerial mycelium of any one of embodiments 81 to 88.

Embodiment(s) O

1. A method of making an aerial mycelium, comprising:
incubating a growth matrix in a growth environment for an incubation time period, wherein the growth matrix comprises a substrate and a fungus;
introducing aqueous mist into the growth environment during the incubation time period, or a portion thereof; and
producing extra-particle aerial mycelial growth from the growth matrix;
wherein:
the growth environment comprises a growth atmosphere characterized as having a carbon dioxide content, wherein the carbon dioxide content is less than about 3% (v/v) over the course of the incubation time period; and
(i) the incubation time period ends no later than when a visible fruiting body forms;
(ii) the incubation time period ends when a visible fruiting body forms; or
(iii) the extra-particle aerial mycelial growth does not contain a visible fruiting body.

2. The method of embodiment 1, wherein the carbon dioxide content is less than 2.5% (v/v) over the course of the incubation time period.

3. The method of embodiment 1 or 2, wherein the mean carbon dioxide content over the course of the incubation time period is no greater than about 2.5% (v/v).

4. The method of embodiment 3, wherein the mean carbon dioxide content over the course of the incubation time period is no greater than about 2% (v/v).

5. The method of any one of embodiments 1 to 4, wherein the carbon dioxide content is at least about 0.02% (v/v), is at least about 0.03% (v/v) or is at least about 0.04% (v/v).

6. The method of any one of embodiments 1 to 5, wherein the carbon dioxide content modulates with fungal respiration over the course of the incubation time period.

7. The method of any one of embodiments 1 to 6, wherein the carbon dioxide content is not a preselected carbon dioxide content.

8. The method of any one of embodiments 1 to 7, wherein the extra-particle aerial mycelial growth does not contain a visible fruiting body.

9. The method of any one of embodiments 1 to 8, wherein introducing comprises introducing aqueous mist into the growth environment throughout the incubation time period, or a portion thereof.

10. The method of any one of embodiments 1 to 9, wherein introducing comprises introducing the aqueous mist into the growth environment resulting in an instantaneous mist deposition rate and a mean mist deposition rate.

11. The method of embodiment 1, wherein the ratio of the instantaneous mist deposition rate to the mean mist deposition rate is at most about 20 to about 1.

12. The method of embodiment 11, wherein the ratio of the instantaneous mist deposition rate to the mean mist deposition rate is at most about 10 to about 1.

13. The method of embodiment 12, wherein the ratio of the instantaneous mist deposition rate to the mean mist deposition rate is at most about 5 to about 1.

14. The method of any one of embodiments 1 to 10, wherein:
the growth environment comprises a misting apparatus; and
introducing comprises introducing the aqueous mist into the growth environment via the misting apparatus, resulting in the mean mist deposition rate;
wherein the misting apparatus is operated at a duty cycle, and wherein the duty cycle is at least about 5%.

15. The method of embodiment 14, wherein the duty cycle is at least about 10%.

16. the method of embodiment 15, wherein the duty cycle is at least about 20%.

17. The method of any one of the preceding embodiments, wherein introducing comprises introducing the aqueous mist into the growth environment resulting in a mean mist deposition rate of at most about 10 microliter/cm2/hour.

18. The method of any one of the preceding embodiments, wherein introducing comprises introducing the aqueous mist into the growth environment resulting in a mean mist deposition rate of at most about 5 microliter/cm2/hour.

19. The method of any one of the preceding embodiments, wherein introducing comprises introducing the aqueous mist into the growth environment resulting in a mean mist deposition rate of at most about 3 microliter/cm2/hour.

20. The method of any one of the preceding embodiments, wherein introducing comprises introducing the aqueous mist into the growth environment resulting in a mean mist deposition rate of at most about 2 microliter/cm2/hour.

21. The method of any one of the preceding embodiments, wherein introducing comprises introducing the aqueous mist into the growth environment resulting in a mean mist deposition rate of at most about 1 microliter/cm2/hour, is at most about 0.8 microliter/cm2/hour, or is at most about 0.5 microliter/cm2/hour.

22. The method of any one of the preceding embodiments, wherein introducing further comprises introducing the aqueous mist into the growth environment resulting in an instantaneous mist deposition rate of at most about 2 microliter/cm2/hour.

23. The method of any one of the preceding embodiments, wherein introducing comprises introducing the aqueous mist into the growth environment resulting in a mean mist deposition rate of at most about 0.50 microliter/cm2/hour, at most about 0.45 microliter/cm2/hour, at most about 0.40 microliter/cm2/hour, or at most about 0.35 microliter/cm2/hour.

24. The method of any one of the preceding embodiments, wherein the mean mist deposition rate is at least about 0.01 microliter/cm2/hour.

25. The method of any one of embodiments 1 to 23, wherein introducing comprises introducing the aqueous mist into the growth environment resulting in a mean mist deposition rate that is below about 0.01 microliter/cm2/hour.

26. The method of embodiment 25, wherein introducing comprises introducing the aqueous mist into the growth environment resulting in a mean mist deposition rate that does not result in a detectable quantity of deposited mist in the growth environment.

27. The method of embodiment 25 or 26, wherein introducing comprises introducing the aqueous mist into the growth environment resulting in a mean mist deposition rate that does not result in a visible quantity of deposited mist in the growth environment.

28. The method of embodiment 25, 26 or 27, wherein introducing comprises introducing the aqueous mist into the growth environment resulting in a mean mist deposition rate that does not result in a measurable quantity of deposited mist in the growth environment.

29. The method of embodiment 25, 26, 27 or 28, wherein introducing comprises introducing the aqueous mist into the growth environment resulting in a mean mist deposition rate that does not result in detectable quantities of deposited mist in the growth environment on the growth matrix, the extra-particle aerial mycelial growth, or both.

30. A method of making an aerial mycelium, comprising:
- incubating a growth matrix in a growth environment for an incubation time period, wherein the growth matrix comprises a substrate and a fungus;
- introducing aqueous mist into the growth environment during the incubation time period, or a portion thereof, wherein the aqueous mist comprises a conductivity, wherein the conductivity is no greater than about 50 microsiemens/cm; and
- producing extra-particle aerial mycelial growth from the growth matrix;

wherein:
- the growth environment comprises a growth atmosphere characterized as having a carbon dioxide content, wherein the carbon dioxide content is less than about 7% (v/v) over the course of the incubation time period; and
- (i) the incubation time period ends no later than when a visible fruiting body forms;
- (ii) the incubation time period ends when a visible fruiting body forms; or
- (iii) the extra-particle aerial mycelial growth does not contain a visible fruiting body.

31. The method of embodiment 30, wherein the growth environment comprises a growth atmosphere characterized as having a carbon dioxide content, wherein the carbon dioxide content is less than about 3% (v/v) over the course of the incubation time period.

32. The method of embodiment 30 or 31, wherein the aqueous mist conductivity is no greater than about 25 microsiemens/cm, is no greater than about 10 microsiemens/cm, is no greater than about 5 microsiemens/cm, or is no greater than about 3 microsiemens/cm.

33. The method of any one of embodiments 1 to 32, wherein the growth matrix comprises the substrate and a fungal inoculum, said fungal inoculum comprising said fungus.

34. The method of any one of embodiments 1 to 32, wherein the growth matrix comprises a colonized substrate, said colonized substrate comprising the substrate, wherein said substrate is previously colonized with mycelium of said fungus.

35. The method of embodiment 34, wherein the colonized substrate is a fragmented colonized substrate.

36. The method of any one of embodiments 1 to 35, wherein introducing comprises introducing aqueous mist into the growth environment during a portion of the incubation time period, wherein the portion of the incubation time period comprises a mycelial vertical expansion phase.

37. The method of any one of the embodiments 1 to 34, wherein introducing comprises introducing aqueous mist into the growth environment during a portion of the incubation time period, wherein the portion of the incubation time period begins during a second day, a third day or a fourth day of the incubation time period.

38. The method of embodiment 36 or 37, wherein introducing comprises introducing the aqueous mist throughout the portion of the incubation time period.

39. The method of any one of embodiments 1 to 36, wherein introducing comprises introducing aqueous mist into the growth environment throughout the incubation time period.

40. The method of any one of embodiments 1 to 39, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces, Wolfiporia, Ceriporiopsis, Chlorociboria, Daedalea, Daedaleopsis, Daldinia, Ganoderma, Hypoxylon, Inonotus, Lenzites, Omphalotus, Oxyporus, Phanerochaete, Phellinus, Polyporellus, Porodaedalea, Pycnoporus, Scytalidium, Stereum, Trametes* or *Xylaria.*

41. The method of embodiment 40, wherein the fungus is a species of the genus *Bondarzewia, Ceriporiopsis, Daedalea, Daedaleopsis, Fomitopsis, Ganoderma, Inonotus, Lenzites, Omphalotus, Oxyporus, Phellinus, Polyporellus, Polyporus, Porodaedalea, Pycnoporus, Stereum, Trametes* or *Xylaria.*

42. The method of embodiment 41, wherein the fungus is selected from the group consisting of *Bondarzewia berkleyii, Daedalea quercina, Daedaleopsis* spp., *Daedaleopsis confragosa, Daedaleopsis septentrionalis, Fomitopsis* spp., *Fomitopsis cajanderi, Fomitopsis pinicola, Ganoderma* spp., *Ganoderma amboinense, Ganoderma applanatum, Ganoderma atrum, Ganoderma australe, Ganoderma brownii, Ganoderma capense, Ganoderma carnosum,*

*Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Inonotus* spp., *Inonotus obliquus, Inonotus hispidus, Inonotus dryadeus, Inonotus tomentosus, Lenzites betulina, Phellinus* spp., *Phellinus ignarius, Phellinus gilvus, Polyporus* spp., *Polyporus squamosus, Polyporus badius, Polyporus umbellatus, Polyporus squamosus, Polyporus tuberaster, Polyporus arcularius, Polyporus albeolaris, Polyporus radicatus, Porodaedalea pini, Pycnoporus* spp., *Pycnoporus* spp., *Pycnoporus sanguineus, Pycnoporus cinnabarinus, Stereum* spp., *Stereum ostea, Stereum hirsutum, Trametes* spp., *Trametes versicolor, Trametes elegans, Trametes suaveolens, Trametes hirsute, Trametes gibbosa, Trametes ochraceae, Trametes villosa, Trametes cubensis* and *Trametes pubescens*.

43. The aerial mycelium of embodiment 42, wherein the fungus is a species of the genus *Ganoderma* or *Trametes*

44. The aerial mycelium of embodiment 43, wherein the fungus is *Ganoderma* spp., *Ganoderma amboinense, Ganoderma applanatum, Ganoderma atrum, Ganoderma australe, Ganoderma brownii, Ganoderma capense, Ganoderma carnosum, Ganoderma cochlear, Ganoderma colossus, Ganoderma curtisii, Ganoderma donkii, Ganoderma formosanum, Ganoderma gibbosum, Ganoderma hainanense, Ganoderma hoehnelianum Ganoderma japonicum, Ganoderma lingzhi, Ganoderma lobatum, Ganoderma lucidum, Ganoderma multipileum, Ganoderma oregonense, Ganoderma pfeifferi, Ganoderma resinaceum, Ganoderma sessile, Ganoderma sichuanense, Ganoderma sinense, Ganoderma tropicum, Ganoderma tsugae, Ganoderma tuberculosum, Ganoderma weberianum, Trametes* spp., *Trametes versicolor, Trametes elegans, Trametes suaveolens, Trametes hirsute, Trametes gibbosa, Trametes ochraceae, Trametes villosa, Trametes cubensis* or *Trametes pubescens*.

45. The aerial mycelium of embodiment 44 wherein the fungus is *Ganoderma sessile*.

46. The aerial mycelium of embodiment 40, wherein the fungus is a pigment-producing fungus of a genus selected from the group consisting of *Chlorociboria, Daldinia, Hypoxylon, Phanerochaete* and *Scytalidium*.

47. The method of any one of embodiments 1 to 46 wherein the aerial mycelium does not contain a visible fruiting body.

48. The method of any one of embodiments 1 to 47, wherein the growth environment is not a dark environment.

49. The method of any one of embodiments 1 to 45, further comprising removing the extra-particle aerial mycelial growth from the growth matrix, thereby providing an aerial mycelium.

50. The method of any one of embodiments 1 to 47, wherein the growth environment does not exclude light.

51. The method of any one of embodiments 1 to 47, wherein the growth environment comprises natural light.

52. The method of any one of embodiments 1 to 47, wherein the growth environment comprises a growing light.

53. The method of any one of embodiments 1 to 52, wherein the growth environment comprises an airflow.

54. The method of embodiment 53, wherein the airflow has a velocity, and wherein the airflow velocity is less than about 150 lfm, is less than about 125 lfm, is less than about 100 lfm, or is less than about 75 lfm.

55. The method of embodiment 53 or 54, wherein the airflow is a substantially horizontal airflow.

56. The method of any one of embodiments 1 to 55, further comprising removing the extra-particle aerial mycelial growth from the growth matrix, thereby providing an aerial mycelium.

57. The method of any one of embodiments 1 to 56, wherein:
the aerial mycelium comprises a growth grain; and
said method further comprises compressing the aerial mycelium in a dimension which is substantially parallel with respect to the growth grain, thereby providing a compressed aerial mycelium.

58. The method of any one of embodiments 1 to 55, wherein the extra-particle aerial mycelial growth comprises a growth grain, said method further comprising compressing the extra-particle aerial mycelial growth in a dimension which is substantially parallel with respect to the growth grain, thereby providing a compressed extra-particle mycelial growth product.

59. The method of embodiment 58, further comprising removing the compressed extra-particle aerial mycelial growth product from the growth matrix, thereby providing a compressed aerial mycelium.

60. An aerial mycelium obtained by a method of any one of embodiments 1 to 56.

61. The aerial mycelium of embodiment 60, wherein the aerial mycelium is suitable for use in the manufacture of a textile.

62. The aerial mycelium of embodiment 60, wherein the aerial mycelium is for use in the manufacture of a textile.

63. The aerial mycelium of embodiment 61 or 62, wherein the textile is a leather-like material.

64. The aerial mycelium of embodiment 60, wherein the aerial mycelium is suitable for use in the manufacture of a petroleum-based product alternative.

65. The aerial mycelium of embodiment 60, wherein the aerial mycelium is for use in the manufacture of a petroleum-based product alternative.

66. The aerial mycelium of embodiment 64 or 65, wherein the petroleum-based product alternative is a foam.

67. A compressed aerial mycelium obtained by a method of embodiment 57 or 59.

68. The compressed aerial mycelium of embodiment 67, wherein the compressed aerial mycelium is suitable for use in the manufacture of a textile.

69. The compressed aerial mycelium of embodiment 67, wherein the compressed aerial mycelium is for use in the manufacture of a textile.

70. The compressed aerial mycelium of embodiment 68 or 69, wherein the textile is a leather-like material.

71. The compressed aerial mycelium of embodiment 67, wherein the compressed aerial mycelium is suitable for use in the manufacture of petroleum-based product alternative.

72. The compressed aerial mycelium of embodiment 67, wherein the compressed aerial mycelium is for use in the manufacture of petroleum-based product alternative.

73. The compressed aerial mycelium of embodiment 71 or 72, wherein the petroleum-based product alternative is a foam.

Embodiment(s) P

1. A method of making an aerial mycelium, comprising:
incubating a growth matrix in a growth environment for an incubation time period, wherein the growth matrix comprises a substrate and a fungus;
introducing aqueous mist into the growth environment during the incubation time period, or a portion thereof; and
producing extra-particle aerial mycelial growth from the growth matrix;
wherein:
the growth environment comprises a growth atmosphere characterized as having a carbon dioxide content, wherein the carbon dioxide content is less than about 3% (v/v) over the course of the incubation time period; and
(i) the incubation time period ends no later than when a visible fruiting body forms;
(ii) the incubation time period ends when a visible fruiting body forms; or
(iii) the extra-particle aerial mycelial growth does not contain a visible fruiting body.

2. The method of embodiment 1, wherein the carbon dioxide content is less than 2.5% (v/v) over the course of the incubation time period.

3. The method of embodiment 1 or 2, wherein the mean carbon dioxide content over the course of the incubation time period is no greater than about 2.5% (v/v).

4. The method of embodiment 3, wherein the mean carbon dioxide content over the course of the incubation time period is no greater than about 2% (v/v).

5. The method of any one of embodiments 1 to 4, wherein the carbon dioxide content is at least about 0.02% (v/v), is at least about 0.03% (v/v) or is at least about 0.04% (v/v).

6. The method of any one of embodiments 1 to 5, wherein the carbon dioxide content modulates with fungal respiration over the course of the incubation time period.

7. The method of any one of embodiments 1 to 6, wherein the carbon dioxide content is not a preselected carbon dioxide content.

8. The method of any one of embodiments 1 to 7, wherein the extra-particle aerial mycelial growth does not contain a visible fruiting body.

9. The method of any one of embodiments 1 to 8, wherein introducing comprises introducing aqueous mist into the growth environment throughout the incubation time period, or a portion thereof.

10. The method of any one of embodiments 1 to 9, wherein introducing comprises introducing the aqueous mist into the growth environment resulting in an instantaneous mist deposition rate and a mean mist deposition rate.

11. The method of embodiment 1, wherein the ratio of the instantaneous mist deposition rate to the mean mist deposition rate is at most about 20 to about 1.

12. The method of embodiment 11, wherein the ratio of the instantaneous mist deposition rate to the mean mist deposition rate is at most about 10 to about 1.

13. The method of embodiment 12, wherein the ratio of the instantaneous mist deposition rate to the mean mist deposition rate is at most about 5 to about 1.

14. The method of any one of embodiments 1 to 10, wherein:
the growth environment comprises a misting apparatus; and
introducing comprises introducing the aqueous mist into the growth environment via the misting apparatus, resulting in the mean mist deposition rate;
wherein the misting apparatus is operated at a duty cycle, and wherein the duty cycle is at least about 5%.

15. The method of embodiment 14, wherein the duty cycle is at least about 10%.

16. the method of embodiment 15, wherein the duty cycle is at least about 20%.

17. The method of any one of the preceding embodiments, wherein introducing further comprises introducing the aqueous mist into the growth environment resulting in an instantaneous mist deposition rate of at most about 2 microliter/cm2/hour.

18. The method of any one of the preceding embodiments, wherein introducing comprises introducing the aqueous mist into the growth environment resulting in a mean mist deposition rate of at most about 0.50 microliter/cm2/hour, at most about 0.45 microliter/cm2/hour, at most about 0.40 microliter/cm2/hour, or at most about 0.35 microliter/cm2/hour.

19. The method of any one of the preceding embodiments, wherein the mean mist deposition rate is at least about 0.01 microliter/cm2/hour.

20. The method of any one of embodiments 1 to 16, wherein introducing comprises introducing the aqueous mist into the growth environment resulting in a mean mist deposition rate that is below about 0.01 microliter/cm2/hour.

21. The method of embodiment 20, wherein introducing comprises introducing the aqueous mist into the growth environment resulting in a mean mist deposition rate that does not result in a detectable quantity of deposited mist in the growth environment.

22. The method of embodiment 21, wherein introducing comprises introducing the aqueous mist into the growth environment resulting in a mean mist deposition rate that does not result in a visible quantity of deposited mist in the growth environment.

23. The method of embodiment 22, wherein introducing comprises introducing the aqueous mist into the growth environment resulting in a mean mist deposition rate that does not result in a measurable quantity of deposited mist in the growth environment.

24. The method of embodiment 23, wherein introducing comprises introducing the aqueous mist into the growth environment resulting in a mean mist deposition rate that does not result in detectable quantities of deposited mist in the growth environment on the growth matrix, the extra-particle aerial mycelial growth, or both.

25. The method of any one of embodiments 1 to 24, wherein the growth matrix comprises the substrate and a fungal inoculum, said fungal inoculum comprising said fungus.

26. The method of any one of embodiments 1 to 24, wherein the growth matrix comprises a colonized substrate, said colonized substrate comprising the substrate, wherein said substrate is previously colonized with mycelium of said fungus.

27. The method of embodiment 26, wherein the colonized substrate is a fragmented colonized substrate.

28. The method of any one of embodiments 1 to 27, wherein introducing comprises introducing aqueous mist into the growth environment during a portion of the incubation time period, wherein the portion of the incubation time period comprises a mycelial vertical expansion phase.

29. The method of any one of the embodiments 1 to 28, wherein introducing comprises introducing aqueous mist into the growth environment during a portion of the incubation time period, wherein the portion of the incubation time period begins during a second day, a third day or a fourth day of the incubation time period.

30. The method of embodiment 28 or 29, wherein introducing comprises introducing the aqueous mist throughout the portion of the incubation time period.

31. The method of any one of embodiments 1 to 28, wherein introducing comprises introducing aqueous mist into the growth environment throughout the incubation time period.

32. The method of any one of embodiments 1 to 31, wherein the fungus is a species of the genus *Agrocybe, Albatrellus, Armillaria, Agaricus, Bondarzewia, Cantharellus, Cerioporus, Climacodon, Cordyceps, Fistulina, Flammulina, Fomes, Fomitopsis, Fusarium, Grifola, Hericium, Hydnum, Hypomyces, Hypsizygus, Ischnoderma, Laetiporus, Laricifomes, Lentinula, Lentinus, Lepista, Meripilus, Morchella, Ophiocordyceps, Panellus, Piptoporus, Pleurotus, Polyporus, Pycnoporellus, Rhizopus, Schizophyllum, Stropharia, Tuber, Tyromyces* or *Wolfiporia.*

33. The method of embodiment 32, wherein the fungus is a species of the genus *Pleurotus.*

34. The method of embodiment 33, wherein the fungus is *Pleurotus albidus, Pleurotus citrinopilleatus, Pleurotus columbinus, Pleurotus cornucopiae, Pleurotus dryinus, Pleurotus djamor, Pleurotus eryngii, Pleurotus floridanus, Pleurotus nebrodensis, Pleurotus ostreatus, Pleurotus populinus, Pleurotus pulmonarius, Pleurotus sajor-caju, Pleurotus salmoneo-stramineus, Pleurotus salmonicolor* or *Pleurotus tuber-regium.*

35. The method of any one of embodiments 1 to 34, wherein the fungus is an edible filamentous fungus.

36. The method of embodiment 35, wherein the edible filamentous fungus is *Pleurotus ostreatus.*

37. The method of any one of embodiments 1 to 36, further comprising removing the extra-particle aerial mycelial growth from the growth matrix, thereby providing an aerial mycelium.

38. The method of embodiment 37, wherein:
the aerial mycelium comprises a growth grain and a mean native density; and
said method further comprises compressing the aerial mycelium in a dimension which is substantially non-parallel with respect to the growth grain, thereby providing a compressed aerial mycelium.

39. The method of embodiment 38, wherein the compressed aerial mycelium has a mean density, wherein the mean density of the compressed aerial mycelium is at least about 2-fold greater than the mean native density of the aerial mycelium.

40. The method of any one of embodiments 1 to 39, wherein the aerial mycelium does not contain a visible fruiting body.

41. An aerial mycelium obtained by a method of any one of embodiments 1 to 40.

SCOPE OF DISCLOSURE

While certain embodiments of the inventions have been described, these embodiments have been presented by way of example only and are not intended to limit the scope of the disclosure. For example, although the present application describes the embodiments of aerial mycelium and processes herein with respect to food and textiles, it will be understood that the products and processes could be implemented for other applications, such as for foam-like materials or for scaffolding. Such scaffolding can be used for cultivating mammalian cells or other animal-type cells or for biomedical applications. This process is also an alternative to submerged culture systems for producing pure mycelium for extracting proteins, metabolites, cell wall components, or cytosolic components. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable sub-combination. Although features may be described above as acting in certain combinations, one or more features from a claimed combination can, in some cases, be excised from the combination, and the combination may be claimed as a sub-combination or variation of a sub-combination.

The features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from (i.e., plus or minus) exactly parallel by less than or equal to 45 degrees, 40 degrees, 35 degrees, 30 degrees, 25 degrees, 20 degrees, 15 degrees, 10 degrees, 5 degrees, 3 degrees, 1 degree, or 0.1 degree, and any ranges therebetween. As another example, in certain embodiments, the term "substantially non-parallel" refers to a value, amount, or characteristic that departs from (i.e., plus or minus) exactly zero or 180 degrees by more than 45 degrees, 50 degrees, 55 degrees, 60 degrees, 65 degrees, 70 degrees, 75 degrees, 80 degrees, 85 degrees, and up to 90 degrees, and any ranges therebetween. As another example, in certain embodiments, the terms "generally orthogonal," "generally perpendicular," "substantially orthogonal" and "substantially perpendicular" refer to a value, amount, or characteristic that departs from (i.e., plus or minus) exactly 90 degrees by less than or equal to 15 degrees, 10 degrees, 5 degrees, 3 degrees, 1 degree, or 0.1 degree, and any ranges therebetween.

The scope of the present disclosure is not intended to be limited by the specific disclosures of preferred embodiments in this section or elsewhere in this specification and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method of making an aerial mycelium, comprising:
providing a growth matrix comprising a substrate and a fungus;

incubating the growth matrix as a solid-state culture in a growth environment for an incubation time period; and introducing aqueous mist into the growth environment throughout the incubation time period, or a portion thereof;

wherein the aqueous mist has a mist deposition rate and a mean mist deposition rate, and the mean mist deposition rate is less than or equal to about 10 microliter/cm$^2$/hour, thereby producing extra-particle aerial mycelial growth from the growth matrix;

wherein the growth matrix comprises the substrate and a fungal inoculum, said fungal inoculum comprising said fungus; or the growth matrix comprises a colonized substrate, said colonized substrate comprising the substrate, wherein said substrate is previously colonized with mycelium of said fungus.

2. The method of claim 1, wherein:

the growth environment comprises a growth atmosphere having a relative humidity, an oxygen ($O_2$) content, and a carbon dioxide ($CO_2$) content, wherein the $CO_2$ content is at least about 0.02% (v/v) and less than about 8% (v/v);

the mist deposition rate is less than or equal to about 150 microliter/cm$^2$/hour; and the mean mist deposition rate is less than or equal to about 5 microliter/cm$^2$/hour or is less than or equal to about 3 microliter/cm$^2$/hour.

3. The method of claim 1, wherein the mist deposition rate is less than about 100 microliter/cm$^2$/hour.

4. The method of claim 3, wherein the mist deposition rate is less than about 10 microliter/cm$^2$/hour.

5. The method of claim 2, wherein the $CO_2$ content is within a range of about 0.2% (v/v) to about 7% (v/v).

6. The method of claim 2, wherein the $CO_2$ content is greater than about 2% (v/v).

7. The method of claim 6, wherein the $CO_2$ content is within a range of about 3% (v/v) to about 7% (v/v).

8. The method of claim 1, wherein the mist deposition rate is less than about 2 microliter/cm$^2$/hour.

9. The method of claim 8, wherein the mean mist deposition rate is within a range of about 0.2 to about 0.8 microliter/cm$^2$/hour.

10. The method of claim 8, wherein the mist deposition rate is less than about 1 microliter/cm$^2$/hour.

11. The method of claim 1, wherein the mist deposition rate is at least about 0.05 microliter/cm$^2$/hour and the mean mist deposition rate is at least about 0.02 microliter/cm$^2$/hour.

12. The method of claim 8, wherein the ratio of the mist deposition rate and the mean mist deposition rate is within a range of about 3:1 to about 1:1.

13. The method of claim 1, wherein the mean mist deposition rate is less than or equal to about 2 microliter/cm$^2$/hour.

14. The method of claim 1, wherein the mean mist deposition rate is less than or equal to about 0.5 microliter/cm$^2$/hour.

* * * * *